(12) United States Patent
Satake et al.

(10) Patent No.: US 7,099,724 B2
(45) Date of Patent: Aug. 29, 2006

(54) INFORMATION PROCESSING SYSTEM

(75) Inventors: Kazuki Satake, Kanagawa (JP);
Hiroyuki Mori, Kanagawa (JP); Naoko Takeda, Tokyo (JP); Ritsuko Inoue, Kanagawa (JP); Masayoshi Kanno, Tokyo (JP); Miho Kamiyama, Tokyo (JP)

(73) Assignee: Sony Corporation, (JP)

( * ) Notice: Subject to any disclaimer, the term of this patent is extended or adjusted under 35 U.S.C. 154(b) by 191 days.

(21) Appl. No.: 10/297,554

(22) PCT Filed: Apr. 11, 2002

(86) PCT No.: PCT/JP02/03594

§ 371 (c)(1),
(2), (4) Date: Jun. 13, 2003

(87) PCT Pub. No.: WO02/084552

PCT Pub. Date: Oct. 24, 2002

(65) Prior Publication Data

US 2003/0236776 A1 Dec. 25, 2003

(30) Foreign Application Priority Data

| Apr. 11, 2001 | (JP) | P2001-113102 |
| May 16, 2001 | (JP) | P2001-146810 |
| Jun. 4, 2001 | (JP) | P2001-168378 |
| Jun. 4, 2001 | (JP) | P2001-168379 |
| Jun. 8, 2001 | (JP) | P2001-174086 |
| Aug. 17, 2001 | (JP) | P2001-247746 |
| Jan. 8, 2002 | (JP) | P2002-011289 |
| Jan. 24, 2002 | (JP) | P2002-016085 |

(51) Int. Cl.
*G06F 17/00* (2006.01)

(52) U.S. Cl. ............... 700/90; 715/514; 707/4

(58) Field of Classification Search ........... 700/90; 715/514, 515; 707/4
See application file for complete search history.

(56) References Cited

U.S. PATENT DOCUMENTS

| 5,838,965 A * | 11/1998 | Kavanagh et al. ...... 707/103 R |
| 6,679,442 B1 * | 1/2004 | Morii et al. ............ 241/24.1 |
| 6,681,188 B1 * | 1/2004 | Sakurai et al. ......... 702/30 |
| 2002/0156545 A1 * | 10/2002 | Sekino et al. ......... 700/90 |

* cited by examiner

*Primary Examiner*—Jayprakash N. Gandhi
(74) *Attorney, Agent, or Firm*—Lerner, David, Littenberg, Krumholz & Mentlik, LLP

(57) ABSTRACT

An information processing apparatus capable of easily executing calculation of an environmental load volume (LCA result). Inventory data, that is data of individual materials and components, is used as the basic data of aggregate data when calculating the environmental load volume. The aggregate data is made up of a plurality of inventory data. When information per product is inputted, aggregate data is calculated based on the inputted information and the aggregate data is used for calculation of LCA result. The LCA result is calculated also using other LCA results already calculated. The apparatus can be applied to a computer for calculating the environmental load volume.

4 Claims, 80 Drawing Sheets

FIG.6

| OBJECT DATA AND ITS OPERATION | AUTHORIZATION LEVEL | | | | |
|---|---|---|---|---|---|
| | 1 | 3 | 5 | 7 | 9 |
| PRODUCT INFORMATION | | | | | |
|   PRODUCT TYPES AUTHORIZED TO MODIFY (BY A PRODUCER AND A PERSON WITH AUTHORITY TO MODIFY) | | | | | |
|     SEARCH | O | O | O | O | O |
|     CORRECT | O | O | O | O | O |
|     DELETE | O | O | O | O | O |
|     APPLY | O | O | O | O | O |
|     REGISTER | x | O | O | O | O |
|   NON-AUTHORIZED ITEMS WITHIN THE REGISTERED PRODUCT CATEGORY | | | | | |
|     SEARCH | O | O | O | O | O |
|     CORRECT | x | x | O | O | O |
|     DELETE | x | x | O | O | O |
|     APPLY | x | x | O | O | O |
|     REGISTER | x | x | O | O | O |
|   PRODUCT CATEGORIES NOT-REGISTERED WITHIN THE SAME MANAGEMENT DIV. | | | | | |
|     SEARCH | x | x | O | O | O |
|     CORRECT | x | x | x | x | O |
|     DELETE | x | x | x | x | O |
|     APPLY | x | x | x | x | O |
|     REGISTER | x | x | x | x | O |
|   PRODUCT CATEGORIES IN OTHER MANAGEMENT DIV. | | | | | |
|     SEARCH | x | x | x | x | O |
|     CORRECT | x | x | x | x | O |
|     DELETE | x | x | x | x | O |
|     APPLY | x | x | x | x | O |
|     REGISTER | x | x | x | x | O |
| INVENTORY IN A DIVISION TO WHICH THE INVENTORY INFORMATION BELONGS | | | | | |
|   INVENTORY IN A DIVISION TO WHICH THE INVENTORY INFORMATION BELONGS | | | | | |
|     PRODUCE/GENERATE | x | x | O | O | O |
|     CORRECT | x | x | O | O | O |
|     DELETE | x | x | O | O | O |
|     SUM-UP PROCESSING | x | x | O | O | O |
|   INVENTORY IN OTHER DIVISIONS TO WHICH THE INVENTORY INFORMATION DOES NOT BELONG | | | | | |
|     PRODUCE/GENERATE | x | x | x | x | O |
|     CORRECT | x | x | x | x | O |
|     DELETE | x | x | x | x | O |
|     AGGREGATION PROCESSING | x | x | x | x | O |
| APPROVAL OF USER REGISTRATION | x | x | O (1,3 ONLY) | O (1,3,5 ONLY) | O |
| APPROVAL OF PRODUCT CATEGORY | x | x | O (1,3 ONLY) | O (1,3,5 ONLY) | O |
| | USER SECTOR | | SECOND MANAGEMENT SECTOR | | FIRST MANAGEMENT SECTOR |

FIG.10

MASTER TABLE

| NO. | NAME | USER DIVISION | AUTHORIZATION | CATEGORY OF PRODUCT IN USE | | |
|---|---|---|---|---|---|---|
| | | | | 1 | 2 | 3 |
| 1 | A | 4 | 1 | 5 | 2 | 3 |
| 2 | B | 4 | 1 | 5 | | |
| 3 | C | 4 | 5 | 5 | | |
| 4 | D | 4 | 5 | 6 | | |
| 5 | E | 4 | 3 | 5 | | |
| 6 | F | 1 | 9 | | | |

FIG.15

| USER ID | |
| --- | --- |
| NAME | |
| ASSIGNED OFFICE | |
| MAIL ADDRESS | |
| TELEPHONE NO. | |

"SELECT A DATA MANAGEMENT DIVISION (DEPARTMENT)"

- ● DIVISION X
- ○ DIVISION Y
- ○ DIVISION Z

● 1:REGULAR USERS    ○ 3: APPROVED BY

| TO NEXT PAGE | END OF PROCESS |

DISPLAY

| USER ID | USER NAME | AUTHORITY | USER DIV. | SECTION/ROOM ASSIGNED TO | PRODUCT CATEGORY | MAIL ADDRESS | PHONE NO. | EXT. NO. | DATE OF APPLICATION |
|---|---|---|---|---|---|---|---|---|---|
| ☐ 1234567 | A | 1 | × | ROOM ABC | CMR | xxx@sss.com | 044-xxxx-△△△△ | xx-xx-00 | 2001/04/02 |
| ☐ | B | 1 | × | ROOM XYZ | VTR | ooo@sun.com | 044-xxxx-0000 | xx-xx-△△ | 2001/04/15 |

○ REGISTER    ○ DELETE    ○ SEARCH    ○ PRINT    ◁ RETURN

DISPLAY

USER ID [ ]  USER NAME [ ]

AUTHORITY [ ]  DIVISION TO USE. [ALL ▼]

SECTION ASSIGNED TO [ ]  PRODUCT CATEGORY [ALL ▼]

LAST DATE OF LOG-IN [WITHIN ONE MONTH ▼]  LAST DATE OF UPDATING [WITHIN ONE MONTH ▼]

[SEARCH]

| | USER ID | USER NAME | AUTHORITY | DIV. TO USE | SECTION/ROOM ASSIGNED TO | MAIL ADDRESS | PHONE NO. | EXT. NO. | DATE APPLIED |
|---|---|---|---|---|---|---|---|---|---|
| ☐ | 1234567 | A | 1 | × | ROOM ABC | xxx@sss.com | 044-xxxx-△△△△ | xx-xx-00 | 2001/04/02 |

○ DELETE  ○ PRINT  ◁ RETURN

DISPLAY 71

FIG.23

HEADER

| DATA MANAGEMENT DIV., INVENTORY/AGGREGATION AGGREGATION | ENVIRONMENTAL DIV. INVENTORY AGGREGATION USED ▶ | LAST DATE OF UPDATING | 2000/09/08 |
|---|---|---|---|

| INFORMATION TO GENERATE | DATA ENTRY SUPERVISOR NO. | 123456 ×× ○○ | ENTERED BY | ○○△△ |
|---|---|---|---|---|

DATA DIVISION    STAGE    STRUCTURE INFORMATION ▶

PRODUCT CATEGORY

| 1 ▶ | 2 ▶ | 3 ▶ | 4 ▶ |
|---|---|---|---|
| 5 | 6 | 7 | 8 |

APPLICATION CATEGORY

| 1 ▶ | 2 ▶ | 3 ▶ | 4 ▶ |
|---|---|---|---|
| 5 | 6 | 7 | 8 |

SUBJECT

| ITEM | ELECTRIC POWER | | |
|---|---|---|---|
| CONVENTIONAL NAME | | | |
| CHEMICAL FORMULA | | | |
| BUSINESS DIVISION | | | |
| PLACE OF PRODUCTION | Japan | ▶ | SITE OF DELIVERY | Japan ▶ |
| QUANTITIES | 1.0 | | UNIT | kWh ▶ |
| DISTRIBUTION PERCENTAGE | 1.0 | | | |

CLASSIFICATION

| MAIN CLASSIFICATION | ENERGY | SUB CLASSIFICATION | ELECTRIC POWER ▶ |
|---|---|---|---|

71

DISPLAY

FIG.24

INPUT

| NO | CLASSIFICATION | SUB CLASSIFICATION | ITEMS | MEAN VALUES | UNITS | UPPER LIMIT | LOWER LIMIT | CITATION | REMARKS |
|---|---|---|---|---|---|---|---|---|---|
| 1 | ENERGY | FUEL SYSTEM | COAL | 2 | kg | | | 1 | |
| 2 | ENERGY | FUEL SYSTEM | PETROLEUM | 2 | kg | | | 1 | |
| 3 | ENERGY | FUEL SYSTEM | NUCLEAR FUSION MATERIAL | 0.1 | kg | | | 1 | |
| 4 | RAW MATERIALS | WATER RESOURCES SYSTEM | | 1 | kg | | | 1 | |

OUTPUT

| NO | CLASSIFICATION | SUB CLASSIFICATION | ITEMS | MEAN VALUES | UNITS | UPPER LIMIT | LOWER LIMIT | CITATION | REMARKS |
|---|---|---|---|---|---|---|---|---|---|
| 1 | EMISSION | ATMOSPHERE | CARBON DIOXIDE | 0.5 | kWh | | | 1 | |
| 2 | EFFLUENT | HYDROSPHERE | EFFLUENT | 1 | kg | | | 1 | |

OTHERS

| NO | CLASSIFICATION | SUB CLASSIFICATION | ITEMS | MEAN VALUES | UNITS | UPPER LIMIT | LOWER LIMIT | CITATION | REMARKS |
|---|---|---|---|---|---|---|---|---|---|
| 1 | CALORIFIC VALUE | CALORIFIC VALUE | COAL | 2 | MJ | | | 1 | |
| 2 | CALORIFIC VALUE | CALORIFIC VALUE | PETROLEUM | 1 | MJ | | | 1 | |

DATA QUALITY ET. AL.

YEAR OF ACQUISITION: 2000
TIME SPAN:
GEOLOGICAL RANGE: WITHIN JAPAN
TECHNICAL FIELDS:
RELIABILITY: A
PRODUCTION QUANTITY OF MAIN PRODUCTS:
NUMBER OF DATA SAMPLES:
NOTES ON RELIABILITY:
DATA DISCLOSURE: UNCLASSIFIED
LIMIT OF DATA DISCLOSURE:
OTHERS:
FORM OF DELIVERY:

CITATION

| NO | TYPES OF DOCUMENTS | TITLES OF PUBLICATION | PUBLICATION |
|---|---|---|---|
| 1 | | | STATISTIC YEARBOOK OF ENERGY |
| 2 | | | |
| ... | | | |
| 8 | | | |

DISPLAY 71

FIG.25

| STAGE NAME | | INFORMATION TO INPUT |
|---|---|---|
| STRUCTURE INFORMATION | | INPUT MATERIAL/PARTS STRUCTURE |
| MANUFACTURE INFORMATION | | INPUT INFORMATION ON THE MANUFACTURE OF THE PRODUCT |
| MAINTENANCE | | INPUT INFORMATION OF A PART TO REPLACE |
| MANUFACTURE ET. AL. | PACKAGE SUBSTRATE | INPUT INFORMATION OF A PACKAGE SUBSTRATE |
| | PRODUCTION YIELD | INPUT A PRODUCT YIELD |
| IN USE/STANDBY | IN USE | INPUT INFORMATION OF THE PRODUCT IN USE |
| | STANDBY | INPUT INFORMATION OF THE PRODUCT IN STANDBY |
| TRANSPORT | | INPUT INFORMATION OF THE PRODUCT DURING TRANSPORTATION |
| DISCARD/RECYCLE | DISCARD/TRASH | INPUT INFORMATION OF THE PRODUCT IN DISCARDING |
| | RECYCLE | INPUT INFORMATION OF THE PRODUCT IN RECYCLING |

FIG.26

HEADER

| | | |
|---|---|---|
| DATA MANAGEMENT DIV., INVENTORY/AGGREGATION AGGREGATION | TV INVENTORY AGGREGATION USED ▶ | LAST DATE OF UPDATING 2000/09/08 AGGREGATE VERSION |

INFORMATION TO GENERATE

| INPUT OPERATOR NO | 123456 ××○○ | ENTERED BY ○○△△ |
|---|---|---|

DATA DIVISION    STAGE    STRUCTURE INFORMATION ▶

PRODUCT CATEGORY

| 1 ▶ | 2 ▶ | 3 ▶ | 4 ▶ |
|---|---|---|---|
| 5 | 6 | 7 | 8 |

APPLICATION CATEGORY

| 1 MECHANICAL ▶ | 2 ▶ | 3 ▶ | 4 ▶ |
|---|---|---|---|
| 5 | 6 | 7 | 8 |

SUBJECT

| ITEM | REMOTE CONTROL | |
|---|---|---|
| CONVENTIONAL NAME | | |
| CHEMICAL FORMULA | | |
| MANUFACTURING DIV. | Japan | |
| PLACE OF PRODUCTION | | ▶ SITE OF DELIVERY Japan ▶ |
| QUANTITIES | 1.0 | UNIT kg ▶ |
| DISTRIBUTION PERCENTAGE | 1.0 | |
| MAIN CLASSIFICATION | SUB CLASSIFICATION | COMPOSITE PARTS ▶ |

DISPLAY 71

FIG.27

| INPUT | | | | | | | | |
|---|---|---|---|---|---|---|---|---|
| NO. | CLASSIFICATION | SUB CLASSIFICATION | ITEMS | MEAN VALUES | UNITS | UPPER LIMIT | LOWER LIMIT | CITATION | REMARKS |
| 1 | MATERIAL | ▶ PLASTICS | ▶ ABS | ▶ 0.5 | kg ▶ | | | 1 | |
| 2 | MATERIAL | ▶ METALS | ▶ SUS | ▶ 0.2 | kg ▶ | | | 1 | |
| 3 | MATERIAL | ▶ COMPOSITE PARTS | ▶ PACKAGING SUBSTRATE | ▶ 0.1 | kg ▶ | | | 1 | |
| 4 | ENERGY | ▶ ELECTRIC POWER SYSTEM | ▶ | 1 | kWh ▶ | | | | |

OUTPUT

| NO. | CLASSIFICATION | SUB CLASSIFICATION | TITLE | MEAN VALUES | UNITS | UPPER LIMIT | LOWER LIMIT | CITATION | REMARKS |
|---|---|---|---|---|---|---|---|---|---|
| 1 | WASTES | ▶ SOLID | ▶ TRASH MATERIAL | ▶ 0.1 | kg ▶ | | | 1 | |

OTHERS

| NO. | CLASSIFICATION | SUB CLASSIFICATION | ITEMS | MEAN VALUES | UNITS | UPPER LIMIT | LOWER LIMIT | CITATION | REMARKS |
|---|---|---|---|---|---|---|---|---|---|
| 1 | RECYCLING MATERIAL | ▶ PLASTIC | ▶ ABS | ▶ 0.2 | kg ▶ | | | 1 | |

DATA QUALITY ET. AL.

- YEAR OF ACQUISITION: 2000
- TIME SPAN:
- GEOLOGICAL RANGE: WITHIN JAPAN
- TECHNICAL FIELDS:
- RELIABILITY: A ▶
- PRODUCTION QUANTITIES OF THE MAIN PRODUCT:
- NUMBER OF SAMPLES:
- COMMENT ON THE RELIABILITY:
- DATA DISCLOSURE: UNCLASSIFIED ▶
- LIMIT OF DATA DISCLOSURE:
- OTHERS:
- DELIVERABLE FORM:

CITATION

| NO. | TYPES OF DOCUMENT | TITLES OF REFERENCE |
|---|---|---|
| 1 | PUBLICATION ▶ | PLASTIC STATISTIC |
| 2 | ▶ | YEARBOOK |
| ⋮ | ▶ | |
| 8 | | |

DISPLAY

HEADER

| | | | | | |
|---|---|---|---|---|---|
| DATA MANAGEMENT DIV. | TV | | | LAST DATE OF UPDATING | 2000/09/20 |
| INVENTORY/AGGREGATION | AGGREGATION | | | AGGREGATE VERSION | |
| | USE OF AGGREGATION ▶ | | | | |

| | | | |
|---|---|---|---|
| INFORMATION TO GENERATE | INPUT OPERATOR NO. | 123456 | |
| | PERSON IN CHARGE | | ENTERED BY  ○○△△ |

DATA DIVISION  STAGE  STRUCTURE INFORMATION ▶

PRODUCT CATEGORY

| 1 ▶ | 2 ▶ | 3 ▶ | 4 ▶ |
|---|---|---|---|
| TV | | | |
| 5 ▶ | 6 ▶ | 7 ▶ | 8 ▶ |

APPLICATION CATEGORY

| 1 ▶ | 2 ▶ | 3 ▶ | 4 ▶ |
|---|---|---|---|
| MECHANICAL | | | |
| 5 ▶ | 6 ▶ | 7 ▶ | 8 ▶ |

SUBJECT

| ITEM | REMOTE CONTROL | | |
|---|---|---|---|
| CONVENTIONAL NAME | | | |
| CHEMICAL FORMULA | | | |
| MANUFACTURING DIV. | Japan | | |
| PLACE OF PRODUCTION | | ▶ | SITE OF DELIVERY  Japan ▶ |
| QUANTITIES | 1.0 | | UNIT  pcs ▶ |
| DISTRIBUTION PERCENTAGE | 1.0 | | |

| MAIN CLASSIFICATION | MATERIAL | SUB CLASSIFICATION | COMPOSITE PARTS ▶ |
|---|---|---|---|

71

DISPLAY

FIG.29

| INPUT | | | | | | | | |
|---|---|---|---|---|---|---|---|---|
| NO. | CLASS | SUBCLASS | ITEMS | MEAN VALUES | UNITS | UPPER LIMIT | LOWER LIMIT | CITATION REMARKS |
| 1 | RAW MATERIAL | FOSSILE RESOURCES SYSTEM | CRUDE OIL | 2 | | | | 1 |
| 2 | RAW MATERIAL | MINERAL RESOURCES SYSTEM | IRON ORE | 2 | kg | | | 1 |
| 3 | RECYCLE MATERIAL | PLASTIC | ABS | 0.3 | kg | | | 1 |

OUTPUT

| NO. | CLASS | SUB CLASS | ITEMS | MEAN VALUES | UNITS | UPPER LIMIT | LOWER LIMIT | CITATION REMARKS |
|---|---|---|---|---|---|---|---|---|
| 1 | WASTES | SOLID | WASTE MATERIAL | 0.1 | pcs | | | 1 |
| 2 | EMISSION | ATMOSPHERE | CARBON DIOXIDE | 0.1 | ## | | | |

OTHERS

| NO. | CLASS | SUBCLASS | ITEMS | MEAN VALUES | UNITS | UPPER LIMIT | LOWER LIMIT | CITATION REMARKS |
|---|---|---|---|---|---|---|---|---|
| 1 | RECYLED MATERIAL | PLASTIC | ABS | 0.2 | kg | | | 1 |
| 2 | CALORIFIC VALUES | CALORIFIC VALUE | CRUDE OIL | 0.2 | MJ | | | 1 |

DATA QUALITY ET. AL.

YEAR OF ACQUISITION: 2000
TIME SPAN
GEOLOGICAL RANGE WITHIN JAPAN: WITHIN JAPAN
TECHNICAL FIELDS: A
RELIABILITY
PRODUCTION VOLUME OF THE MAIN PRODUCT
NUMBER OF SAMPLES
COMMENTS ON THE RELIABILITY
DATA DISCLOSURE: UNCLASSIFIED
LIMIT TO THE DATA DISCLOSURE
OTHERS
DELIVERABLE FORMS

REFERENCE

| NO. | TYPES OF DOCUMENTS | TITLES OF PUBLICATION |
|---|---|---|
| 1 | PUBLICATION | PLASTICS STATISTIC YEARBOOK |
| 2 | | |
| : | | |
| 8 | | |

DISPLAY

FIG.30

BASIC INFORMATION

| Field | Value |
|---|---|
| LAST DATE OF UPDATING | 2000/12/06 |
| AGGREGATE VERSION | TV200001-02 |
| REGISTRATION NO. | TV-0001-06 |
| INPUTTING OPERATOR | 123456 |
| PERSONS AUTHORIZED TO MODIFY | 234567 |
| | 345678 |
| | 456789 |
| APPROVED BY | 12345 |
| BENCH MODEL TYPE | TV-3 |
| PRODUCT MODEL TYPE | TV-3X |
| PART NO. | |
| DATE OF ASSESSMENT | |
| DATE OF ISSUANCE OF THE PLANNING | 2000/01/13 |
| ON-LINE DATE | 2001/01/01 |
| PLACE OF PRODUCTION | JAPAN |
| PLACE OF DELIVERY | JAPAN |

LATEST UPDATING BY ○○△△

△△×× AUTHORIZED PERSONS TO MODIFY (1)
AUTHORIZED PERSONS TO MODIFY (2)
AUTHORIZED PERSONS TO MODIFY (3)

NOTES

DISPLAY

STRUCTURE INFORMATION

| | TARGET VALUE | CURRENT | PREVIOUS | REMARKS |
|---|---|---|---|---|
| GROSS WEIGHT (MEASURED) | 12500 | 13040 | 13420 | |
| GROSS WEIGHT (ADDED UP) | | 13000 | 13400 | |
| GROSS WEIGHT REDUCTION RATE (%) | | 104% | 107% | |

| APPLICATION CATEGORY | APPLICATION | MATERIALS/PARTS CATEGORY | MATERIALS/PARTS | NO. OF PIECES | CURRENT | PREVIOUS | REMARKS |
|---|---|---|---|---|---|---|---|
| KEY PARTS | CRT | KEY PARTS | CRT-1 | 1 | 5000 | 5000 | |
| KEY PARTS | DY | KEY PARTS | DY-1 | 1 | 500 | 500 | |
| MECHANICAL | SPEAKER | COMPOSITE PARTS | SPEAKER TABLE | 1 | 2000 | 2100 | |
| ELECTRICITY | PACKAGE SUBSTRATE | COMPOSITE PARTS | PACKAGE SUBSTRATE A | 1 | 1500 | 1600 | |
| PARTS | HOUSING | PLASTICS | ABS | 1 | 2500 | 2600 | |
| PARTS | WIRING | COMPOSITE PARTS | COAXIAL CABLE | 1 | 500 | 550 | |
| PACKAGING MATERIALS | CUSHION MATERIAL | PLASTICS | PS | 1 | 500 | 520 | |
| PACKAGING MATERIALS | | PAPERWOOD | CARDBOARD | 1 | 500 | 530 | |

DISPLAY 71

FIG.34

TRANSPORTATION

PRODUCT VOLUME cm³    CURRENT  PREVIOUS  REMARKS
                     [166,000] [////]   [ ]

A TRANSPORTATION DISTANCE BETWEEN RESPECTIVE COUNTRIES ASSUMES A TYPICAL VALUE OF THE FOLLOWING MEAN VALUE FOR TRANSPORTATION FROM ( ) FACTORY IN JAPAN TO A SALES OFFICE.

PROVIDED BY ( ) LOGISTICS

TRANSPORTATION MEANS BETWEEN RESPECTIVE COUNTRIES IS ASSUMED ON THE FOLLOWING CONDITIONS

DISTANCE 1,000km
5 TON CARGO TRUCK 1,000km
LOAD FACTOR 60%
MILAGE 6.0km/l

DISPLAY

| LCA RESULT | REVIEW | CARBON DIOXIDE EMISSION | ENERGY CONSUMPTION | RESOUCES CONSUMPTION | OTHERS |

OTHERS
INFORMATION ON MATERIALS/PARTS

| APPLICATION CATEGORY | INORGANIC MATERIAL | ORGANIC MATERIAL | PLASTICS | METALS | PAPERS/WOODS | GLASS | COMPOSITE PARTS |
|---|---|---|---|---|---|---|---|
| MECHANICAL | | | | | | | 1.8 |
| ELECTRICAL | | | | | | | 0.1 |
| PARTS | | | 0.5 | | | | 0.3 |
| WRAPPING MATERIAL | | | | | | | |

INFORMATION OF REUSABLE MATERIALS (ON THE LEFT SIDE) AND QUANTITIES THEREOF (ON THE RIGHT SIDE)

| APPLICATION CATEGORY | PLASTICS | METALS | PAPERS/WOODS | GLASS |
|---|---|---|---|---|
| MECHANICAL | | | | |
| ELECTRICITY | | | | |
| PARTS | 0.5 | 0.2 | | |
| WRAPPING MATERIAL | | | | |

INFORMATION OF THE WASTES

| SOLID:DISPOSAL TREATMENT | 2 |
| SOLID:RECYCLE TREATMENT DETAILS WITHIN LIFE STAGE | 1 |
| LIQUID:DISPOSAL TREATMENT | 1 |
| LIQUID:RECYCLE TREATMENT DETAILS WITHIN LIFE STAGE | 1 |

DISPLAY

STRUCTURE INFORMATION

| | TARGET VALUE | CURRENT | PREVIOUS |
|---|---|---|---|
| GROSS WEIGHT (MEASURED VALUE) | 30 | 40 | 45 |
| GROSS WEIGHT (ADDED-UP VALUE) | | 38 | 43 |
| GROSS WEIGHT REDUCTION RATE (%) | | 133% | 150% |

| APPLICATION CATEGORY | APPLICATION | MATERIAL/PARTS CATEGORY | MATERIALS/PARTS | GROSS WEIGHT (g) CURRENT | GROSS WEIGHT (g) PREVIOUS | REMARKS |
|---|---|---|---|---|---|---|
| KEY PARTS ▶ | | MD-M ▶ | MD-1 ▶ | 11 | 13 | |
| ASSEMBLY ▶ | UPPER REEL | PLASTICS ▶ | ABS ▶ | 1 | 1 | |
| ASSEMBLY ▶ | LOWER REEL | PLASTICS ▶ | POM ▶ | 2 | 2 | |
| ASSEMBLY ▶ | UPPER SHELL | PLASTICS ▶ | ABS ▶ | 3 | 3 | |
| ASSEMBLY ▶ | LOWER SHELL | PLASTICS ▶ | ABS ▶ | 3 | 3 | |
| ASSEMBLY ▶ | P CASE (BODY) | PLASTICS ▶ | PS ▶ | 5 | 6 | |
| ASSEMBLY ▶ | P CASE (COVER) | PLASTICS ▶ | PS ▶ | 5 | 6 | |
| PARTS IN STOCK ▶ | CARD | PAPER/WOOD ▶ | PAPER ▶ | 1 | 1 | |
| PARTS IN STOCK ▶ | LABEL SHEET | PAPER/WOOD ▶ | ADHESIVE PAPER ▶ | | 1 | |
| WRAPPING MATERIAL ▶ | FILM | PLASTICS ▶ | OPP ▶ | 1 | 1 | |
| WRAPPING MATERIAL ▶ | CARTOON | PAPER/WOOD ▶ | PAPER ▶ | 5 | 6 | |

DISPLAY 71

| PARTS DATABASE | PARTS A1 | | PARTS B1 | | PARTS C1 | | ... |
|---|---|---|---|---|---|---|---|
| SUPPLIER 2-1 | PERFORMANCE STANDARDS CAD PACKAGING | ⋮ | PERFORMANCE STANDARDS CAD PACKAGING | ⋮ | PERFORMANCE STANDARDS CAD PACKAGING | ⋮ | |
| | PARTS A2 | | PARTS B2 | | PARTS C2 | | |
| SUPPLIER 2-2 | PERFORMANCE STANDARDS CAD PACKAGING | ⋮ | PERFORMANCE STANDARDS CAD PACKAGING | ⋮ | PERFORMANCE STANDARDS CAD PACKAGING | ⋮ | |
| ⋯ | ⋯ | | ⋯ | | ⋯ | | |
| | PARTS AN | | PARTS BN | | PARTS CN | | |
| SUPPLIER 2-N | PERFORMANCE STANDARDS CAD PACKAGING | ⋮ | PERFORMANCE STANDARDS CAD PACKAGING | ⋮ | PERFORMANCE STANDARDS CAD PACKAGING | ⋮ | |

FIG. 46

[COMPARISON DISPLAY] [ATTRIBUTES SUCCEEDING] [REENTER SEARCH CONDITIONS] [END]

| INHOUSE DATABASE DETAILED INFORMATION | | | | |
|---|---|---|---|---|
| MODEL NAME | TCFD51BS | 134918 | TCFD53BS | TCFE53BS |
| MANUFACTUER'S NAME | CORPORATE A | CORPORATE B | CORPORATE A | CORPORATE C |
| PN | 80000001 | 80000001 | 80000002 | 80000001 |
| SB NO. | 34512 | 34512 | 34512 | 34513 |
| FAMILY NAME | STATIONARY CERAMIC CAPACITOR (FIXED) | STATIONARY CERAMIC CAPACITOR (FIXED) | STATIONARY CERAMIC CAPACITOR (FIXED) | STATIONARY CERAMIC CAPACITOR (FIXED) |
| DESCRIPTION | CAP TCFD51BS,134918 | CAP TCFD51BS,134918 | CAP TCFD53BS | CAP TCFE53BS |
| PACKAGE TYPE | TAPING | TAPING | TAPING | |
| PARTS SYMBOL NAME | C-CER-000001 | C-CER-000001 | C-CER-000001 | C-CER-000002 |
| SUBSTRATE HOLE/LAND SIZE DIAGRAM | C-CER-01-001 | C-CER-01-001 | C-CER-01-001 | C-CER-01-002 |
| RATED VOLTAGE VALUE | 50V | 50V | 50V | 50V |
| ELECTROSTATIC CAPACITANCE VALUE | 22pF | 22pF | 27pF | 33pF |
| ELECTROSTATIC CAPACITANCE UPPER LIMIT VALUE | +50% | +50% | +50% | +50% |
| ELECTROSTATIC CAPACITANCE LOWER LIMIT VALUE | -50% | -80% | -50% | -50% |
| DATE OF REGISTRATION | 1997/10/01 | 1997/10/01 | 1998/08/01 | 1999/03/25 |
| REGISTERED BY | xxxxx | wwwww | yyyyy | zzzzz |
| DATE OF UPDATING | 1997/10/01 | 1998/02/14 | 1997/08/03 | 1999/03/25 |
| UPDATED BY | xxxxx | wwwww | yyyyy | zzzzz |

DISPLAY

SEARCH RESULT COMPARISON SCREEN

| MANUFACTURER | x x x | x x x | x x x | x x x |
|---|---|---|---|---|
| MANUFACTURER'S MODEL NAME | x x x | x x x | x x x | x x x |
| ELECTROSTATIC CAPACITANCE | x x x | x x x | x x x | x x x |
| RATED VOLTAGE | x x x | x x x | x x x | x x x |
| TEMPERATURES | x x x | x x x | x x x | x x x |
| OUTSIDE DIMENSION | x x x | x x x | x x x | x x x |
| TYPE (CLASS) | x x x | x x x | x x x | x x x |
| COST | x x x | x x x | x x x | x x x |
| DATE OF DELIVERY | x x x | x x x | x x x | x x x |

RETURN — 251

71

DISPLAY

FIG.59

Dear Customer ....Co.:

We acknowledge receipt of your order. Please confirm the contents of your order as indicated below.
Order Serial No. ××××××:
1. Model/Type : ××××××
   Quantity: ×××××
   Price: ××××××
2. Model/Type : ××××××
   Quantity: ×××××
   Price: ××××××
   Total Price: ××××××

Destination of shipment (Address, telephone No. Person in charge)
××××××××××××××
Deadline of Delivery    ×××××
Method of Payment     ×××××

Our Contact Address and Person in Charge
××××××××
××××××××

DISPLAY

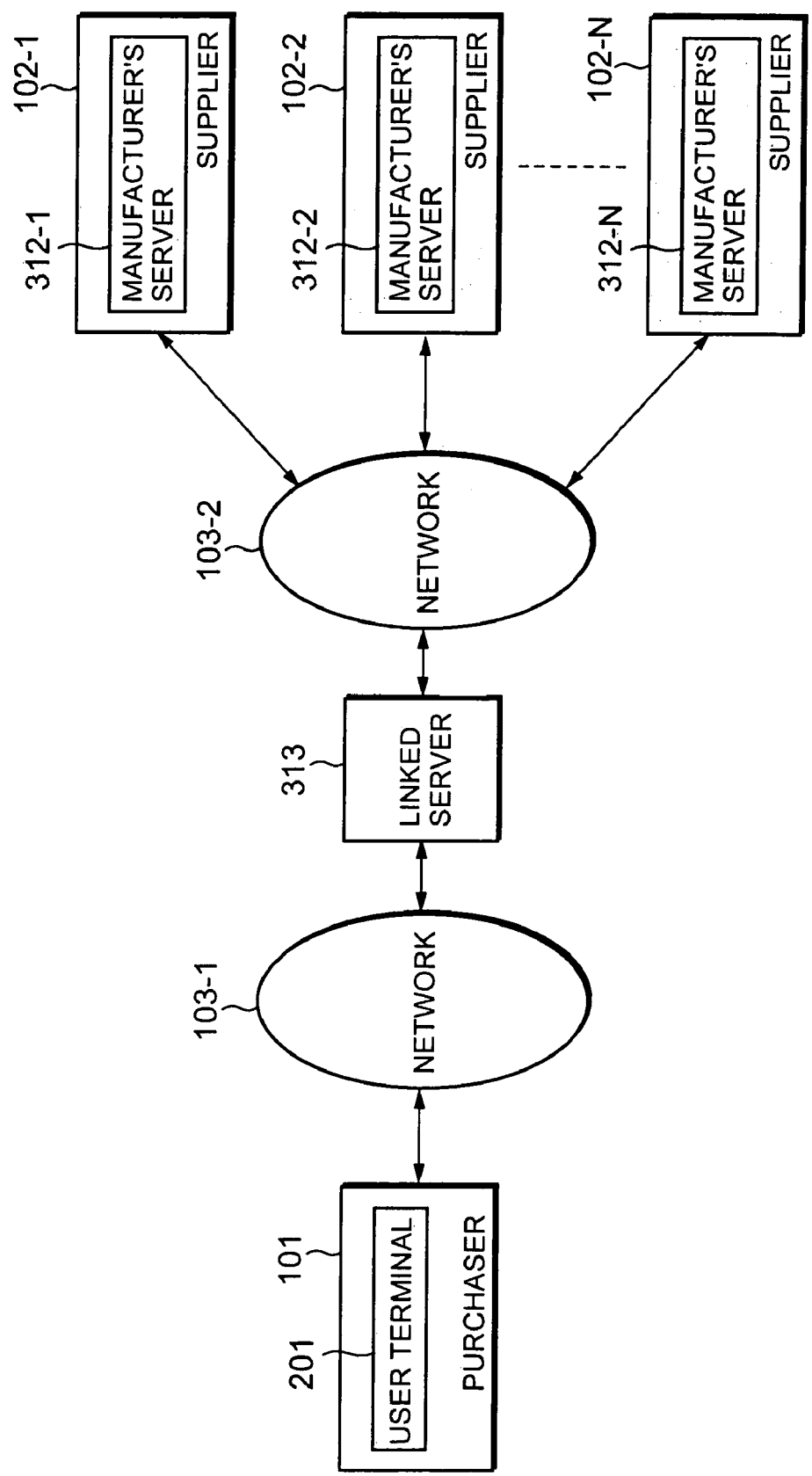

| | STANDARD TERMINOLOGY DATABASE | | | | |
|---|---|---|---|---|---|
| | JIS TERMS | A CORPORATION | B CORPORATION | C CORPORATION | D CORPORATION |
| 1 | MAXIMUM OPERATING VOLTAGE | MAXIMUM VOLTAGE | MAXIMUM RATED VOLTAGE | MAXIMUM ALLOWABLE VOLTAGE | MAXIMUM SERVICE VOLTAGE |
| 2 | ELECTROSTATIC CAPACITANCE | LINE CAPACITANCE | POLE CAPACITANCE | ELECTROSTATIC CAPACITANCE | INSULATION CAPACITANCE |
| 3 | CONTACT RESISTANCE | CONCENTRATED CONTACT RESISTANCE | CONDUCTION RESISTANCE | CIRCUIT RESISTANCE | CONTACT RESISTANCE |
| 4 | INSULATION RESISTANCE | INSULATION RESISTANCE | INSULATION RESISTANCE | INSULATION RESISTANCE | INSULATION RESISTANCE |
| 5 | WITHSTAND VOLTAGE | WITHSTAND VOLTAGE | WITHSTAND VOLTAGE | DIELECTRIC STRENGTH | WITHSTAND VOLTAGE |
| 6 | RATED VOLTAGE | RATED VOLTAGE | MAXIMUM SERVICE VOLTAGE | MAXIMUM RATED VOLTAGE | RATED VOLTAGE |
| 7 | RATED CURRENT | RATED CURRENT | MAXIMUM SERVICE (OPERATING) CURRENT | MAXIMUM RATED CURRENT | RATED CURRENT |

FIG.70

STANDARD TERMINOLOGY DATABASE 351

| | JIS TERMINOLOGY | IEC TERMINOLOGY | A CORPORATION | B CORPORATION | C CORPORATION | D CORPORATION |
|---|---|---|---|---|---|---|
| 1 | MAXIMUM SERVICE VOLTAGE | maximum oparating voltage | MAXIMUM VOLTAGE | MAXIMUM RATED VOLTAGE | MAXIMUM ALLOWABLE VOLTAGE | HIGHEST OPERATING VOLTAGE |
| 2 | DIELECTRIC CAPACITANCE | capacitance | LINE CAPACITANCE | POLE CAPACITANCE | DIELECTRIC CAPACITANCE | INSULATION CAPACITANCE |
| 3 | CONTACT RESISTANCE | contact resistance | CONCENTRATED CONTACT RESISTANCE | CONDUCTION RESISTANCE | CIRCUIT RESISTANCE | CONTACT RESISTANCE |
| 4 | INSULATION RESISTANCE | insulation resistance | INSULATION RESISTANCE | INSULATION RESISTANCE | INSULATION RESISTANCE | INSULATION RESISTANCE |
| 5 | WITHSTAND VOLTAGE | dielectric strength | WITHSTAND VOLTAGE | WITHSTAND VOLTAGE | DIELECTRIC STRENGTH | WITHSTAND VOLTAGE |
| 6 | RATED VOLTAGE | rated voltage | RATED VOLTAGE | MAXIMUM SERVICE VOLTAGE | MAXIMUM RATED VOLTAGE | RATED VOLTAGE |
| 7 | RATED CURRENT | rated current | RATED CURRENT | MAXIMUM SERVICE CURRENT | MAXIMUM RATED CURRENT | RATED CURRENT |

FIG.74

NON-OPERATING PARTS LIST

| NO. | SUPPLIER CODE | SUPPLIER NAME | P/N PART NUMBER | PART NAME | SSS DIE | LAST ORDER | | COMMENT |
|---|---|---|---|---|---|---|---|---|
| | | | | | | DATE | FROM | |
| | | | | | | | | |
| 1 | 123456 | ABC Kogyo, Ltd. | 1-234-567-89 | ELECTROLYTIC CAPACITOR 33/100 | × | 92/01/22 | 500 Ichinomiya | UNDER APPLICATION |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |

PERSON IN CHARGE    CONTACTING ADDRESS    DATE OF ENTRY

FIG. 82

501A <PADICS: PART STRUCTURE INFORMATION SYSTEM>

<FIELD AN EXAMPLE>
- PN (Parts Number) "REFERENCE KEY"
- DATE OF PN REGISTRATION
- NAME OF THE PART
- REGISTERED DIVISION
- SDI DIV. (RATING CLASS OF THE PART)
- CHANGE HISTORY
- PS (Part Structure) STRUCTURE TYPE

501B <SPRINGS: PARTS PURCHASING INFORMATION SYSTEM>

<FIELD AN EXAMPLE>
- PN (Parts Number) "REFERENCE KEY"
- NAME OF THE PART
- PURCHASING DIV.
- PARTS CATEGORY
- NAME OF THE SUPPLIER
- PRICE/CURRENCY UNIT
- PRICE
- UPDATING HISTORY

501C <KIS: DIE ACCOUNT SYSTEM>

<FIELD AN EXAMPLE>
- PN (Parts Number) "REFERENCE KEY"
- NAME OF THE DIE
- DIE OWNING DIV.
- NAME OF THE SUPPLIERS
- THE NUMBER OF YIELD (QUANTITY OF THE PRODUCT PRODUCED FROM THE DIE
- INCOME EXPENSE/DEPRECIATION EXPENSE
- STOCK GROUP/INVENTORY GROUP

501D <GRIMS: SERVICE PARTS INFORMATION SYSTEM>

<EXEMPLARY FIELD>
- PN (Parts Number) "REFERENCE KEY"
- PS (Parts Structure) STRUCTURE PRODUCT TYPE
- PRODUCT CODE
- NAME OF THE PART
- NAMES OF THE PURCHASE SUPPLIERS
- STOCK SITE/STOCK QUANTITY
- MAINTENANCE GROUP

501E <GALILEO: CUSTOMER SERVICE ACTIVITY INFORMATION SYSTEM>

<FIELD AN EXAMPLE>
- PS (Parts Structure) STRUCTURE PRODUCT TYPE
- PRODUCT CODE
- DATES OF PRODUCTION STARTING/ENDING
- SUPPLIERS OF THE MANUFACTURING DIVISION
- NAMES OF THE PURCHASING SUPPLIERS
- DESIGN FLAG/REPAIR OBJECT FLAG
- PLANNING/PRODUCTION CUT OFF FLAGS

INFORMATION PROCESSING SYSTEM

TECHNICAL FIELD

The present invention relates to an information processing system, and in particular, relates to an information processing system suitable for application in calculation of life cycle assessment.

BACKGROUND ART

Through a significant development of human production activities in recent years, an enormous growth has been attained in scientific and technological fields as well as in the economic field; on the other hand, however, there is an increasing apprehension of environmental destruction in global scale caused by consumption of resources and energy for supporting these scientific and technological as well as economic activities. In the industrial fields, attempts at reducing the environmental damages caused by value-added products as much as possible are considered to become more and more active in the future.

Under these circumstances, a method has been proposed in which a LCA (life cycle assessment) for quantitatively assessing an environmental load of a product, i.e., load that affects the environment throughout a life cycle from extraction of the material, its manufacture, and a disposal thereof.

The proposed LCA, which has an advantage that environmental loads can be obtained quantitatively, is, however, associated with a problem that volume of data that must be obtained until the calculation of its environmental load are enormous, requiring complicated calculation for its assessment, thereby requiring a considerably large number of processes until a result thereof is obtained. Further, because a result of calculation is restricted within a given condition, there is a problem that the result of calculation may change greatly depending on a assumptions and/or variables to be considered.

Further, the data considered necessary for calculation of LCA extend to broad areas. For example, although a variety of numbers of parts (components) data are required for constituting one product, there is a problem that it takes lots of time and efforts to collect and manage the data. Still further, there is a problem that a process to search a desired data from an enormous volume of data related to these components may be very time-consuming and tedious.

DISCLOSURE OF THE INVENTION

The present invention has been contemplated in view of the above-mentioned problems, and to provide means for enabling to evaluate an environmental load within a corporation that covers a plurality of products by allowing reviewing environmental data of these products quickly in routine works, and constantly checking their conditions and reliability of data.

An information processing system according to the present invention is characterized by including a first information processing apparatus that includes a management means for managing a database to be dealt with by the information processing system, a second information processing apparatus that includes an aggregation means for aggregating data related to a predetermined division to these data in the database under management of the management means, and a third information processing apparatus that includes a calculation means which, by extracting data to calculate an environmental load volume from the database on the basis of a product information inputted, calculates the environmental load volume.

The above-mentioned the first information processing apparatus to the third information processing apparatus are connected via a network for allowing data exchange with each other, and the data thus exchanged through the network may be enciphered or subjected to a security-check.

The above-mentioned data may be exchanged using a web browser.

A function of an information processing system according to an embodiment of the invention will be described.

In the information processing system according to the invention, the first information processing apparatus manages the database to be dealt with by the information processing system; the second information processing apparatus, among the data in the database, adds data related to the predetermined division to the database; and the third information processing apparatus, on the basis of information related to a product inputted, extracts data for calculating an environmental load volume from the database, and calculate the environmental load volume.

The first information processing apparatus according to the invention is characterized by including: a production means for producing inventory data; a generation means for generating aggregate data from a plurality of inventory data produced by the production means; a management means for managing a database including the inventory data and the aggregate data; and an extraction means for extracting a aggregate data from the database under management of the management means and for calculating an environmental load volume.

The above-mentioned inventory data may include a flag that indicates whether or not its data can be used as a basis-for generating the aggregate data by the generation means.

The above-mentioned management means is allowed to manage the inventory data and the aggregate data in the database as sorted according to product categories.

The above-mentioned generation means is allowed to attach a version number to the aggregate data generated, so that the management means can manage the aggregate data by the version number.

The above-mentioned extraction means is allowed to extract the aggregate data on the basis of the version number thereof.

Further, provided with an input means for inputting product information, the above-mentioned extraction means is allowed to specify the aggregate data to be extracted by the product information inputted by the input means.

The system may further include a storage (memory) means for storing the product information inputted by the input means therein by sorting into each product category.

The system may further include a calculation means for calculating the environmental load volume using the aggregate data extracted by the extraction means, and a display control means for controlling a display of the environmental load volume calculated by the calculation means.

The above-mentioned calculation means is allowed to calculate the environmental load volume also using other environmental load volumes already having been calculated.

Still further, the system is allowed to include a memory means for storing the environmental load volumes calculated by the calculation means as sorted per product category.

A display screen of the environmental load volume the display of which is controlled by the display control means is allowed to display at least one or more out of a summary, a carbon dioxide emission quantity, an energy consumption quantity, a resources consumption quantity, details thereof, an amount to use of a recycled material, and an amount of a recyclable material.

The display screen of the environmental load volume the display of which is controlled by the display control means is allowed to display the environmental load volume in juxtaposition with another one that is calculated for the same product at a different timing.

Furthermore, the system may include an identifying means for identifying a user having a first authorization who can instruct to generate both the inventory data produced by the production means and the aggregate data to be generated by the generation means without any limitation; a user having a second authorization who can instruct to generate both the inventory data to be generated by the production means and the aggregate data to be generated by the generation means with a limitation that the authorization should be within a scope of a predetermined division; and a user having a third authorization devoid of the privileges granted to the first and the second authorizations, wherein the identifying means is enabled to perform its identification by referring to a table in which the above-mentioned authorizations and the above-mentioned users are correlated.

Still further, a memory (storage) means for storing at least one of the product information and the environmental load volume may be included, wherein a piece of information is added to the product information supplied by the user having the third authorization and to the environmental load volume calculated from the aggregate data extracted on the basis of the product information, for indicating whether it is in a status under work, in request of registration, or in a registered status.

The above-mentioned second authorization is allowed to include an authorization to rewrite the information indicative of a status in request of registration to the information indicative of a status of already registered.

The above-mentioned table may be arranged to indicate a correlation between the above-mentioned authorizations and the above-mentioned users as sorted per product category.

The second and the third authorizations described above may grant the authorization for the users having the second authorization or the third authorization to exercise their authorizations within a limit of the predetermined division registered in advance, and within a limit of the product category.

The first authorization described above may include an authorization to control the table described above, so that user information newly to be entered is to be approved by the user having the first authorization.

The user information newly to be entered into the table may be supplied at least to one of the user having the first authorization and the user having the second authorization via e-mail.

The information to be supplied via the e-mail at least to one of the user having the first authorization and the user having the second authorization may be arranged to contain at least information related to a division (section) to which the information belongs or information of a product category desired to be registered within the product categories dealt with by the division (section).

In the case where the identifying means described above identifies that the user having the first authorization has accessed, all data constituting the database which is under management of the management means is allowed to be accessed, and there is arranged further to include a provision means for providing image data constituting a display screen capable of instructing to generate data to be added to the database.

In the case where the identifying means identifies that the user having the second authorization has accessed, the user thereof is allowed to access only to the data related to the predetermined division within the data constituting the database under management of the management means, and further with inclusion of a provision means for providing image data constituting a display screen capable of instructing to generate data related to the predetermined division to be added to the database.

In the case where the identifying means identifies that the user having the third authorization has accessed, further, a provision means may be included for providing image data for constituting a display screen for execution of a calculation of the environmental load volume within a range of the product category that the user has registered, among from the data constituting the database under control of the management means.

Further, a first providing means for providing image data of an input screen for allowing entry of information necessary for generating the inventory data to be generated by the production means, and a second providing means for providing image data of an input screen for allowing entry of information necessary for generating the aggregate data to be generated by the generation means may be included.

The input screen according to the image data provided by the first or the second provision means may be arranged to include at least a column to display information of literature that was referred to when generating (producing) the inventory data.

A first information processing method according to an embodiment of the invention is characterized by including: a production step of producing an inventory data; a generation step of generating a aggregate data from a plurality of inventory data produced in the production step; a management step of managing a database including the inventory data and the aggregate data; and an extraction means for extracting a aggregate data from the database controlled in the management step, for calculating an environmental load volume.

A first program in a recording medium according to the invention is characterized by including: a production step of producing an inventory data; a generation step of generating a aggregate data from a plurality of inventory data produced by a processing in the production step; a management step of managing the database including the inventory data and the aggregate data; and an extraction means for extracting the aggregate data from the database controlled by a processing in the management step for calculating the environmental load volume.

The first program according to the invention enables a computer to execute a production step for producing the inventory data; a generation step for generating a aggregate data from a plurality of inventory data produced by processing in the production step; a management step for managing the database including the inventory data and the aggregate data; and an extraction step for extracting the aggregate data from the database controlled by the processing in the management step for calculating an environmental load volume.

Functions in the first information processing apparatus, the first information processing method, the first recording medium and the first program according to an embodiment of the invention will be described.

In the first information processing apparatus and the method as well as the program embodying the invention, an inventory data is produced, a aggregate data obtained from a plurality of inventory data is produced, the database including the inventory data and the aggregate data is managed, and a aggregate data for calculating an environmental load volume is extracted from the database under management.

The second information processing apparatus according to the invention is characterized by including: an input means for inputting data for identifying a user; a table management means for managing a table in which a user and an authorization assigned thereto are correlated; a database management means for managing the database including the inventory data and the aggregate data; an identification means for identifying an authorization of the user by referring to the table under control of the table management means, from data inputted from an input means; and a provision means for providing image data corresponding to the authorization of the user identified by the identification means.

The image data to be provided by the provision means described above may be arranged to include data that constitutes an input screen through which to enter product information.

The image data to be provided by the provision means may be arranged to be data of a display screen which allows use of the inventory data and the aggregate data only within an extent of product categories that are registered by the user.

The display screen described above may be arranged to have an arrangement for allowing entry of the product information in accordance with its life stage.

The display screen described above may be arranged to constitute an image screen for each life stage owned by product information entered.

The input display screen for entering basic information relative to the information within the life stage described above may be provided with a column for displaying at least one of a registration number for identifying the product information, a product name, a place of manufacture of the product, and a place of destination of the product.

The input display screen for entering the basic information described above may be provided further with a column for displaying a version number of the aggregate data described above.

The input display screen for entering the basic information may be provided still further with a column for displaying a timing of assessment, whereby the registration number described above is changed in accordance with the timing of assessment.

The registration number having a different timing of the assessment can be arranged to change its ending number corresponding to the timing of the assessment.

The input display screen for entering structure (constitution) information or maintenance information within the life stage is enabled to have a column to enter names of material or components (parts), and a column to enter a quantity of the material or the components to be used that are entered into the column for entering the names of material or the components.

Still further, a calculation means can be included for calculating an environmental load volume using the extraction means for extracting the aggregate data under management of the database management means, by referring to the names of the materials or components entered in the column for entering the same, the aggregate data thus extracted by the extraction means, and the quantity of use entered through the column for entering the same.

On the input display screen for entering a product yield within the life stage described above, a column for entering the product yield is provided, and a correction means for correcting the environmental load volume calculated by the calculation means on the basis of the product yield entered through the column for entering the same may be further included.

On the input display screen for entering the structure (constitution) information or the maintenance information, there may further be provided with a column for entering a category of the materials or the components, a management means for managing the names of the materials and components entered in the column for entering the names of the material or components by sorting into each category of the materials or the components, and a control means for controlling so that when the category is entered in the column for entering the category of the material or the component, names of materials or components corresponding to the materials or components sorted within the category are caused to be entered in the column for entering the material or components (parts) names.

On the input display screen for entering the structure information, there may be further included an input column for entering an application category, thereby enabling further to comprise: a management means for managing the material names and the components names entered in the column for entering the same as sorted per each application category; and a control means for controlling that when the application category is entered in the column for entering the application category, the materials names or the components names sorted within its category are caused to be inputted in the column for entering the materials name or the components name.

On the input display screen for entering the manufacture information within the life stage, there may be provided a column for entering a manufacture process name and a column for entering a quantity thereof to use.

There may be further included a calculation means for calculating an environmental load volume using the extraction means for extracting the aggregate data under management of the database management means in reference to the name of a process entered in the column for entering the manufacture process, the aggregate data extracted by the extraction means, and the quantity of use entered in the column for entering the quantity of use.

On the input display screen for entering a product yield within the life stage, there is provided a column for entering the product yield, and a correction means may be further included for correction of the environmental load volume calculated in the calculation means on the basis of the product yield entered in the column for entering the product yield.

On the input display screen for entering the manufacture information there is further provided a column for entering a manufacturing division, and there may be further included a management means for managing the manufacture process name entered through the column for entering the manufacture process name as sorted per each manufacturing division, and a control means for controlling so that when the manufacturing division is inputted in the column for entering the manufacturing division, a manufacture process name corresponding to the manufacture process name that is classified into this manufacturing division is caused to be inputted into the column for entering the manufacture process name.

On the input display screen for entering energy of manufacturing a packaging-substrate within the life stage, there may be provided an option to select between a cost basis and a components basis for calculating the energy of manufacturing the packaging substrate.

Out of the options described above, when an option to calculate the manufacturing energy of the packaging substrate on the components basis is selected, there may be provided columns for entering a name of its components and a quantity of the components corresponding to its name, wherein the name of the components may be a name corresponding to the product information entered in the input display screen.

An extraction means for extracting a aggregate data corresponding to the option selected above from the database under management of the database management means, and a calculation means for calculating an environmental load volume using the aggregate data extracted by the extraction means and the quantity entered in the column for entering the quantity may be further included.

On the input display screen for entering information related to transportation of the product within the life stage, there may be provided a column for entering a volume of the product.

There may be further included an extraction means for extracting a aggregate data corresponding to a production site of the product and a place of destination of the product which were entered in an input display screen of a different life stage, and a calculation means for calculating an environmental load volume using the aggregate data extracted by the extraction means described above and the volume entered in the column for entering the volume of the product.

On an input display screen for entering information related to a status in use or standby, there may be provided columns for entering an option for a power source for use in the status in use or at standby of the product, an input item corresponding to the power source optioned above, and a value corresponding to the input item.

There may be further included a first calculation means for calculating electric energy on the basis of the value inputted in the column for entering the value corresponding to the input item described above, an extraction means for extracting a aggregate data corresponding to the electric energy calculated by the first calculation means from the database under management of the database management means, and a second calculation means for calculating an environmental load volume using the aggregate data extracted by the extraction means.

On the input display screen for entering information related to disposal or recycle within the life stage described above, there may be provided an option to select between disposal and recycling.

The input display screen for entering the information related to the disposal and recycle may be provided further with a column for indicating the site of destination of the product and a ratio of disposal by dumping of the product at that site as well as a ratio of incineration of the product when the disposal is selected in the option, thereby, upon setting of the site of its destination, indicating the dumping ratio and the incineration ratio associated with that site of destination.

There may be further included: a first calculation means for calculating a weight of dumping and a weight of incineration respectively from a weight of the product, a weight of combustible materials of the product, a weight of non-combustible materials thereof, a predetermined dumping ratio at its destination site and an incineration ratio that were inputted at least in one of the input display screens for entering the structure information and the maintenance information in other life stages, or that were calculated from the information inputted; an extraction means for extracting a aggregate data corresponding respectively to the weight of dumping and the weight of incineration calculated by the first calculation means from the database under management of the database management means; and a second calculation means for calculating an environmental load volume using the aggregate data extracted by the extraction means.

Further, when the recycle in the option is selected on the input display screen for inputting the information related to the disposal or the recycle, there may be included an extraction means for extracting a aggregate data corresponding to the weight of the product and a aggregate data corresponding to the weight of the recyclable materials which were inputted via the input display screen for inputting the structure information or calculated from the information inputted from the database under management of the database management means, and a calculation means for calculating an environmental load volume using the aggregate data extracted by the extraction means.

Still further, a third calculation means may be included for calculating the environmental load volume by calculating the weight of the product per each category of the materials or components, i.e., extracting a aggregate data corresponding to a weight of incineration per category of the materials or the components, and using the aggregate data thus extracted.

Still more, a second calculation means may be included for calculating the environmental load volume by calculating the weight of the product per each material or component category, extracting a aggregate data corresponding to a weight to be recycled per material or category, and using the aggregate data thus extracted.

Further, a third calculation means may be included for calculating a difference between the aggregate data corresponding to the weight to be recycled per each material or component category and a aggregate data for use of a gain calculation.

A second information processing method according to an embodiment of the invention is characterized by including: an input control step for controlling entry of data for identifying a user; a table management step for managing a table in which users and authorizations belonging to the users are correlated; a database management step for managing a database including inventory data and aggregate data; an identification (discrimination) step for identifying (discriminating) an authorization of a user by using data inputted in the input control step as controlled by a processing therein and referring to the table under management of the table management step as managed by a processing therein; and a supply step for providing image data corresponding to the authorization belonging to the user as identified in the identification step by a processing therein.

A second recording medium program according to the invention is characterized by including: an input control step for controlling entry of data for identifying the user; a table management step for managing a table in which the user and the authorization belonging to the user are correlated; a database management step for managing a database including an inventory data and a aggregate data; an identification step for identifying an authorization of the user from the data the input thereof is controlled by processing in the input control step and by referring to the table under management by processing in the table management step; and a supply step for providing image data corresponding to the authorization of the user as identified by processing in the identification step.

The second program according to the invention enables a computer to execute the input control step for controlling entry of the data for identifying the user; the table management step for managing the table in which the user and the authorization belonging to the user are correlated; the database management step for managing the database including the inventory data and the aggregate data; the identification step for identifying the authorization belonging to the user by referring to the table under management in the table management step by using the data the entry thereof being controlled by processing in the input control step; and the supply step for supplying the image data corresponding to the authorization belonging to the user as identified by processing in the identification step.

Functions in the second information processing apparatus, the second information processing method, the second recording medium and the second program will be described.

In the second information processing apparatus, the method and the program thereof, the table in which the user and the authorization belonging to the user are correlated is managed, the database including the inventory data and the aggregate data is managed, the table under management is referred to in accordance with the data inputted, the authorization belonging to the user is identified, and the image data corresponding to the authorization belonging to the user thus identified is provided.

A third information processing apparatus according to an embodiment of the invention is characterized by including: a storage means for storing information related to the components that satisfy a predetermined condition; a supply means for providing the information related to the components stored in the memory means to a different apparatus; a judgment means for judging whether or not a specific component, the information of which is stored in the storage means, satisfies the predetermined condition, when the information thereof is requested from a different apparatus; and a storage execution means for executing a storage processing to store the predetermined component in the storage means when the predetermined component is judged to satisfy the predetermined condition by the judgment means.

When the predetermined component is stored in the storage means by the storage execution means, an accounting means for accounting may also be included.

When providing the information related to the components by the supply means described above, the accounting means for billing may be included as well.

The predetermined condition described above may further include at least one of conditions related to the rules and standards set up by the manager who manages the storage means and related to the packaging.

The information related to the components to be stored by the storage means may be arranged to contain at least one of the standards information of the component, the packaging information, CAD information and performance information.

A third information processing method according to the invention is characterized by including: a storage control step for controlling storage of information related to the component that satisfies a predetermined condition; a supply step for providing the information related to the component, the storage thereof being controlled by processing in the storage control step, to a different apparatus; a judgment step for judging, when the stored information of the predetermined component under control of the memory control step is requested from other apparatuses, whether or not the predetermined component complies with the predetermined condition; and a storage execution step for executing, when the predetermined component is judged by processing in the judgment step to satisfy the predetermined condition, a process of the storage of the predetermined component being controlled by processing in the control memory step.

A third program in a third recording medium according to the invention is characterized by including: a storage control step for controlling storage of information related to a component that satisfies a predetermined condition; a supply step for supplying information related to the component the storage of which is controlled by processing in the storage control step to another apparatus; a judgment step for judging, when information of a predetermined component the storage of which is controlled in the storage control step is requested from another apparatus, whether or not the predetermined component satisfies a predetermined condition; and a storage execution step for executing a process for controlling the storage of the predetermined component by processing in the control storage step, when the predetermined component is judged to satisfy the predetermined condition by processing in the judgment step.

The third program according to the invention causes a computer to execute: a storage control step for controlling the storage of information related to the component that satisfies a predetermined condition; a supply step for supplying the information related to the component the storage of which information is controlled by processing in the storage control step to another apparatus; a judgment step for judging, when the memory (stored information) of the predetermined component the storage of which is controlled by the storage control step is requested from another apparatus, whether or not the predetermined component satisfies the predetermined condition; and a storage execution step for executing a process to control the storage of the predetermined component by processing in the control storage step.

Functions in the third information processing apparatus, the third information processing method, the third recording medium and the third program embodying the invention will be described.

In the third information processing apparatus and the method as well as in the program according to the invention, the information related to the component that satisfies the predetermined condition is provided to another apparatus, and when the storage of the predetermined component is requested from another apparatus, only when the predetermined component is judged to satisfy the predetermined condition, the predetermined component is stored in memory.

A component search apparatus embodying the invention is characterized by including: a storage means for storing components information that contains at least components specification information which is common to respective components makers; a receiver means for receiving search request information from user terminals; an information search means for searching components information stored in the storage means in response to a search request information, and outputting search result information corresponding to a result of searching; and a transmit means for transmitting the search result information to the user terminal.

A components search system embodying the invention, a component search apparatus in the components search system searches component information on the basis of search request information received from the user terminal via the network, wherein the user terminal is provided with a transmission means for transmitting the search request information, and wherein the components search apparatus is characterized by including: a storage means for storing components information which contains at least components specification information which is common to respective components makers; a receiving means for receiving search request information from the user terminal; information search means for searching components information stored in the storage means, and outputting search result information corresponding to a search result; and a transmission means for transmitting the search result information to the user terminal.

Functions in the components search apparatus and the components search system according to the embodiment of the invention will be described.

In the components search apparatus and the components search system according to the invention, because that the components search apparatus: stores the components information containing at least the components specification information common to all the components makers; receives the search request information from the user terminal; searches the components information stored on the basis of the search request information; outputs search result information corresponding to the search result; and transmits the search result information to the user terminal, the user can search components having the same specification available from different makers simultaneously and easily.

A term (terminology) conversion apparatus embodying the invention is characterized by including: a storage means for storing terms used by respective components makers in association with a standardized terminology; a receiving means for receiving specification information from the user terminal; a conversion means for converting terms used in the specification information received by the receiving means into a standardized terminology; and a transmission means for transmitting the specification information converted into the standardized terminology by the conversion means to a terminal of components makers.

The term conversion system according to the invention is a term conversion system for converting the terms used in the specification information received by the term conversion apparatus from the terminal into the standardized terminology, and is characterized by including: a transmission section for transmitting the specification information by the user terminal; a storage means for storing terms used by respective components makers by corresponding to the standardized terminology by the term conversion apparatus; a receiving means for receiving specification information from the user terminal; a conversion means for converting the terms used in the specification information received by the receiving means into standard terminology; and a transmission means for transmitting specification information converted into the standard terminology by the conversion means to the terminals of components makers.

Operations in the term conversion apparatus and the term conversion system according to the invention will be described.

According to the term conversion apparatus and the term conversion system embodying the invention, because that the term conversion apparatus stores the terms used by respective components makers corresponding to the standard terminology, receives specification information from the user terminal, converts terms used in the specification information received to standardized terms, and sends the specification information the terms in which was converted into the standard terminology to the terminals of components makers, the user can save troublesome, tedious work to associate the specification name the user knows with a specification name used in the components maker at the destiny of transmission of the specification information.

An updating apparatus for a components database embodying the invention is characterized by including: a data hold means, upon receiving an inoperative components list from a plurality of suppliers, for holding the inoperative components lists received; a format conversion means for automatically converting at least a portion of the inoperative components lists being held to a formalized inoperative components list; and an updating means for updating the components database on the basis of the converted inoperative components list.

An updating method for the components database embodying the invention is characterized by including: a data hold step upon receiving inoperative components lists from a plurality of suppliers for holding the inoperative components lists received; a format conversion step for automatically converting at least a portion of the inoperative components lists being held to a formatted inoperative components list; and an update step for updating the components database on the basis of the converted inoperative components list.

Operations in the updating apparatus and the updating method for the components database according to the invention will be described.

In the updating apparatus and the method of the components database according to the invention, because the inoperative components list is provided from the components makers at the suppliers and the components database is updated using thus provided information, a work load to be imposed on the updating of the parts (components) database can be substantially reduced. Further, by conversion of the lists submitted in versatile formats differing from a supplier to a supplier to a predetermined format, it becomes possible to effectively utilize the inoperative components lists.

A parts (components) database system embodying the invention is a components database system including a plurality of databases related to parts, and is characterized in that when information in the database is changed at a request from the terminal, a reference key which is capable of uniquely identifying the information within the plurality of databases is extracted, relevant (related) information is specified from within the plurality of databases by the reference key, and the relevant information thus specified is updated.

A conventional parts database system is in effect directed to a processing on the side of the server, however, in the parts database system according to the invention, a parts database system including terminals is discussed in order to clarify a processing on the network.

In an updating method of a database system including a plurality of databases related to parts, the updating method of the parts database system embodying the invention is characterized by including: when it becomes necessary to update the parts database system, an extraction step of extracting a reference key for use of data identification from the plurality of databases; and an updating step for specifying related information from the plurality of databases by the reference key, and updating the related information thus specified.

In a database control unit for controlling a plurality of databases related to parts, the database control unit embodying the invention is characterized by including: an extraction means for extracting a reference key which is capable of identifying information uniquely among within the plurality of databases; and an update means, by specifying related information from among the plurality of databases with the reference key, for updating the related information thus identified.

In a database control method for controlling a plurality of databases related to parts, the database control method embodying the invention is characterized by including: an extract step for extracting a reference key which is capable of identifying information uniquely within the plurality of databases; and an update step for specifying related information from within the plurality of databases by the reference key, and updating the related information specified.

In a recording medium recorded with a database control program for controlling a plurality of databases related to parts, the database control program embodying the invention is characterized by including: an extract step for extracting a reference key which is capable of identifying data uniquely within the plurality of databases; and an update step, by specifying related information from within the plurality of databases with the reference key, for updating the related information specified.

In a recording medium recorded with a database control program for controlling a plurality of databases related to parts, a recording medium embodying the invention is characterized by including: an extract step for extracting a reference key which is capable of identifying data uniquely within the plurality of databases; and an update step, by specifying related information from within the plurality of databases with the reference key, for updating the related information specified.

In the following, functions in the parts database system and the updating method thereof, the database control unit and the control method thereof, the database control program as well as the recording medium embodying the invention will be described.

In the parts database system embodying the invention, because the reference key is extracted from within the plurality of databases and the related information which was specified in accordance with the reference key is updated, a consistency between the plurality of databases can be secured.

In the update method of the parts database system embodying the invention, because the reference key is extracted from within the plurality of databases and the related information which was specified in accordance with the reference key is updated, a consistency between the plurality of the databases can be secured.

In the database control unit embodying the invention, because the reference key is extracted from within the plurality of databases and the related information which was specified according to the reference key is updated, consistency between the plurality of databases can be secured.

In the database control method embodying the invention, because the reference key is extracted from within the plurality of databases and the related information specified on the basis of the reference key, is updated, consistency among the plurality of databases can be secured.

In the database control program embodying the invention, because the reference key is extracted from within the plurality of databases and the related information specified on the basis of the reference key is updated, consistency among the plurality of databases can be secured.

In the recording medium embodying the invention, because the reference key is extracted from within the plurality of databases and the related information specified on the basis of the reference key is updated, consistency between the plurality of databases can be secured.

BRIEF DESCRIPTION OF DRAWINGS

FIG. 6 is a diagram describing authorization levels.

FIG. 10 is a diagram showing a master table.

FIG. 15 is a diagram showing a user registration display screen.

FIG. 21 is a diagram showing a display screen for executing approval of a user registration.

FIG. 22 is a diagram showing a display screen for conducting a user search.

FIG. 23 is a diagram showing an inventory data input screen.

FIG. 24 is a diagram continuing from FIG. 23.

FIG. 25 is a diagram describing stages.

FIG. 26 is a diagram showing an inventory data input screen.

FIG. 27 is a diagram continuing from FIG. 26.

FIG. 28 is a diagram showing a aggregate data input screen.

FIG. 29 is a diagram continuing from FIG. 28.

FIG. 30 is a diagram showing an input screen for basic information.

FIG. 31 is a diagram showing an input screen for structure (constitution) information.

FIG. 34 is a diagram showing an input screen for transportation data.

FIG. 40 is a diagram showing an LCA result display screen.

FIG. 41 is a diagram showing an input screen for structure information.

FIG. 44 is a diagram describing information stored in a parts information database 111.

FIG. 46 is a diagram describing standards information.

FIG. 55 is an example of search result comparison display screen displayed at the user terminal.

FIG. 59 is an example of order receipt acknowledgement formats generated at a maker's terminal.

FIG. 65 is a diagram showing a configuration of a terminology conversion system according to one embodiment of the invention.

FIG. 66 is a diagram showing an exemplary standard terms database.

FIG. 70 is a diagram showing an example of standard terms databases.

FIG. 74 is a schematic diagram showing an exemplary formatted inoperative parts list.

FIG. 77 is a schematic diagram for describing field information in a plurality of databases the present invention can be applied to.

FIG. 82 is a schematic diagram for describing field information of a plurality of database systems.

BEST MODE FOR CARRYING OUT THE INVENTION

Figure 1:
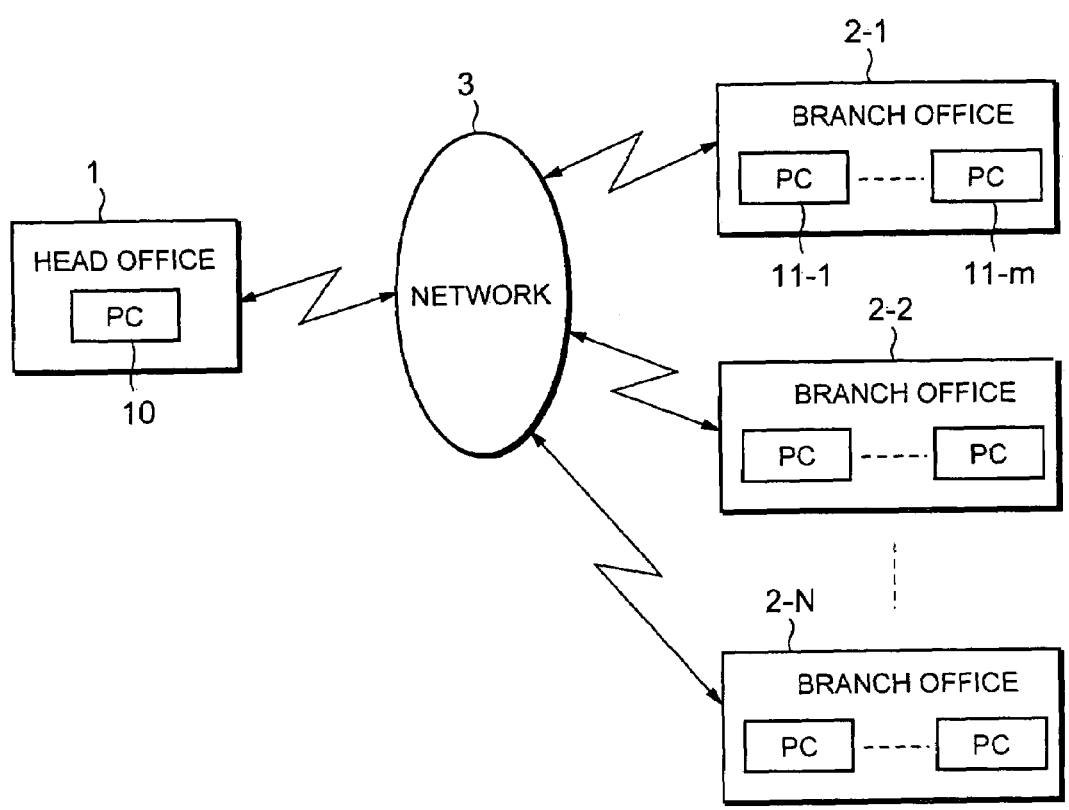
FIG. 1 is a diagram showing a configuration of an LCA system according to one embodiment of the invention.

In the following, a preferred embodiment of the invention will be described with reference to the accompanying drawings. FIG. 1 is a diagram showing a configuration of an information processing system for calculating a LCA (Life Cycle Assessment) according to a preferred embodiment of the invention. A head office 1 and branch offices 2-1 to 2-N are connected via a network 3 so as to be able to exchange data mutually.

In this embodiment, the head office 1 refers to a division that has an overall authorization to control a system and data that will be described later, and branch offices 2-1 to 2-N refer to a division that has only a limited authorization partially to be able to manage (to use) the system and data. The branch offices 2-1 to 2-N have their authorizations further divided internally (Details thereof will be described later).

More specifically, if an information processing system shown in FIG. 1 exists within one corporation (Here, the information processing system will be described by way of example as applied to an LCA system), head office 1 refers to a division that has an authorization to administer the whole system, and branch offices 2-1 to 2-N refer to divisions other than the head office 1, i.e., a respective factory and so on. Further, it may be assumed that head office 1 refers to a corporation A, and branch offices 2-1 to 2-N refer to a corporation B and so on besides the corporation A.

The head office 1 is provided with a PC (Personal Computer) 10. Likewise, branch office 2-1 is provided with PC 11-1 to 11-m. Also, branch offices 2-2 to 2-N are provided with a plurality of PCs, likewise. In the following description, branch offices 2-2 to 2-N will be described simply as branch 2 unless they need to be identified from one another. Likewise, PC 11-1 to 11-m will be described simply as PC 11 unless they need to be identified from one another (The same applies to other apparatuses or the like). Further, in the following description, respective PCs provided at branches 2-1 to 2-N will be represented by PC 11.

By the way, the head office 1 is provided with not only one PC10, but also with a plurality thereof. Here, the following description will be made assuming that one PC 10 executes their processing representatively.

The network 3 which is constructed with wireless and/or cables is a network represented by the Internet or the like. PC11 may be connected directly with the network 3 or may be connected via a LAN (Local Area Network) within the branch 2. Further, as described above, because the head office 1 and the branch 2 may be located within one corporation, the network 3 by itself may be constructed by LAN or may have a structure connected with a dedicated cable.

The branch 2 is provided with a plurality of PCs 11, however, a predetermined number of units among them are divided into a group of PCs 11 (to be described as PC 12 though not indicated in FIG. 1 in order to discriminate from other PC 11) that have a narrow range of authorization than the authorization granted to that at the head office 1, and into another group of PC11 that have a narrower range of authorization than the authorization granted thereto (the above-mentioned group of PC11).

Here, it should be noted that the expression "have an authorization" means that the user who operates PC10 or PC11 actually has its authorization. Even if the same personal computer (PC) is used, depending on its authorization of the operating user (who logged in), contents that can be processed differ. However, for the convenience of description, the expression "to have an authorization" will be used appropriately to mean the authorization granted to PC10, PC11 or PC12.

Figure 2:
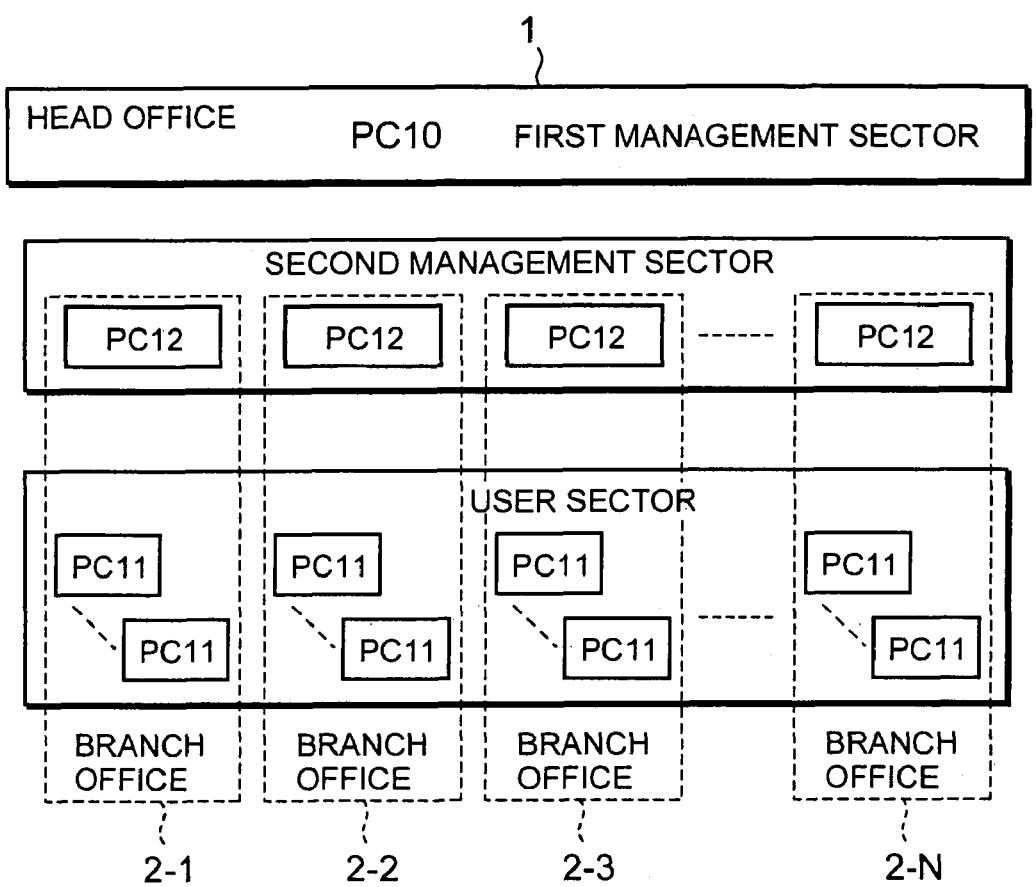
FIG. 2 is a diagram describing a sector.

In other words, as for classification of authorizations described above, in the present embodiment, LCA system includes three sectors as described in FIG. 2. That is, the LCA system is comprised of a first management (administration) sector that administers the whole system (data), a second management sector that manages (uses) a branch system (data) within branch 2 that is within a portion under administration of the first management sector, and a user sector that uses the system (data) chiefly under management of the second management sector.

Figure 3:
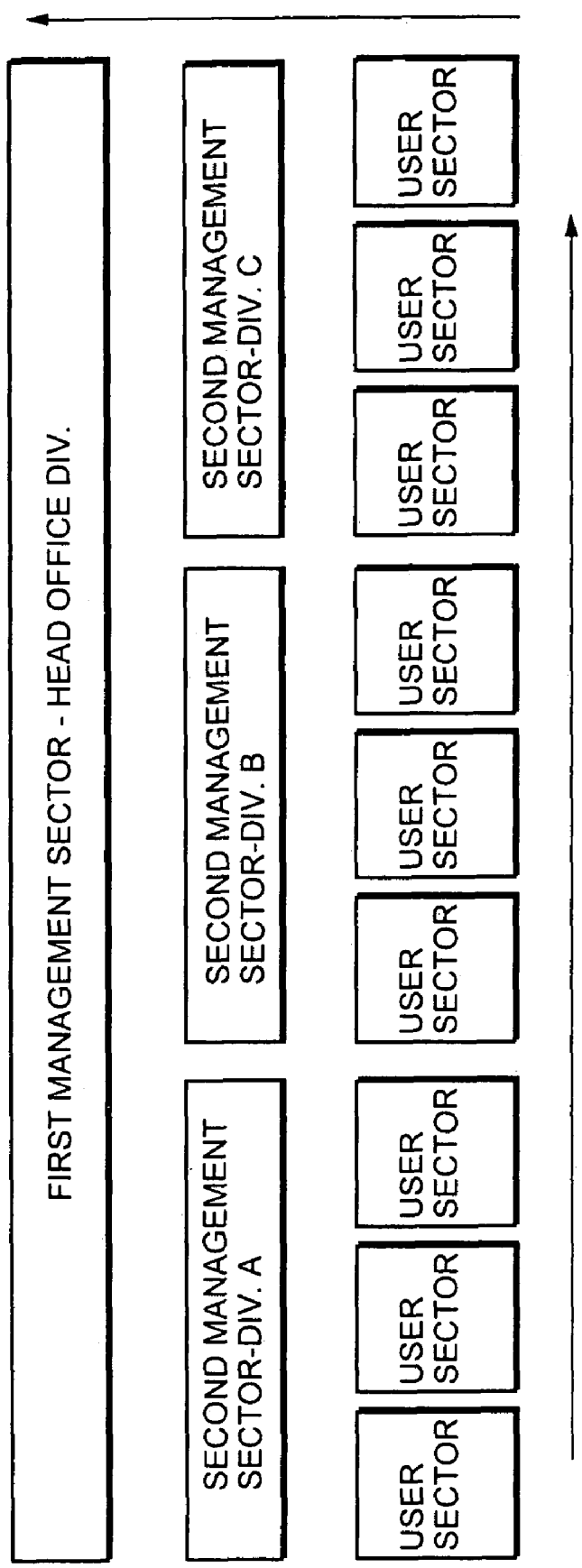
FIG. 3 is another diagram describing a sector.

When the LCA system according to the embodiment of the invention is constructed within one company, a relation, for example, as shown in FIG. 3 will apply. That is, the first management sector corresponds to a head office, the second management sector corresponds to a unit of divisions, and the user sector corresponds to a unit of divisions/sections. In FIG. 3, as the second sector, three divisions of Division A, Division B and Division C are provided, and in each division there are provided three user sectors. Such a system with a three-layered structure is constructed in each company.

Figure 4:
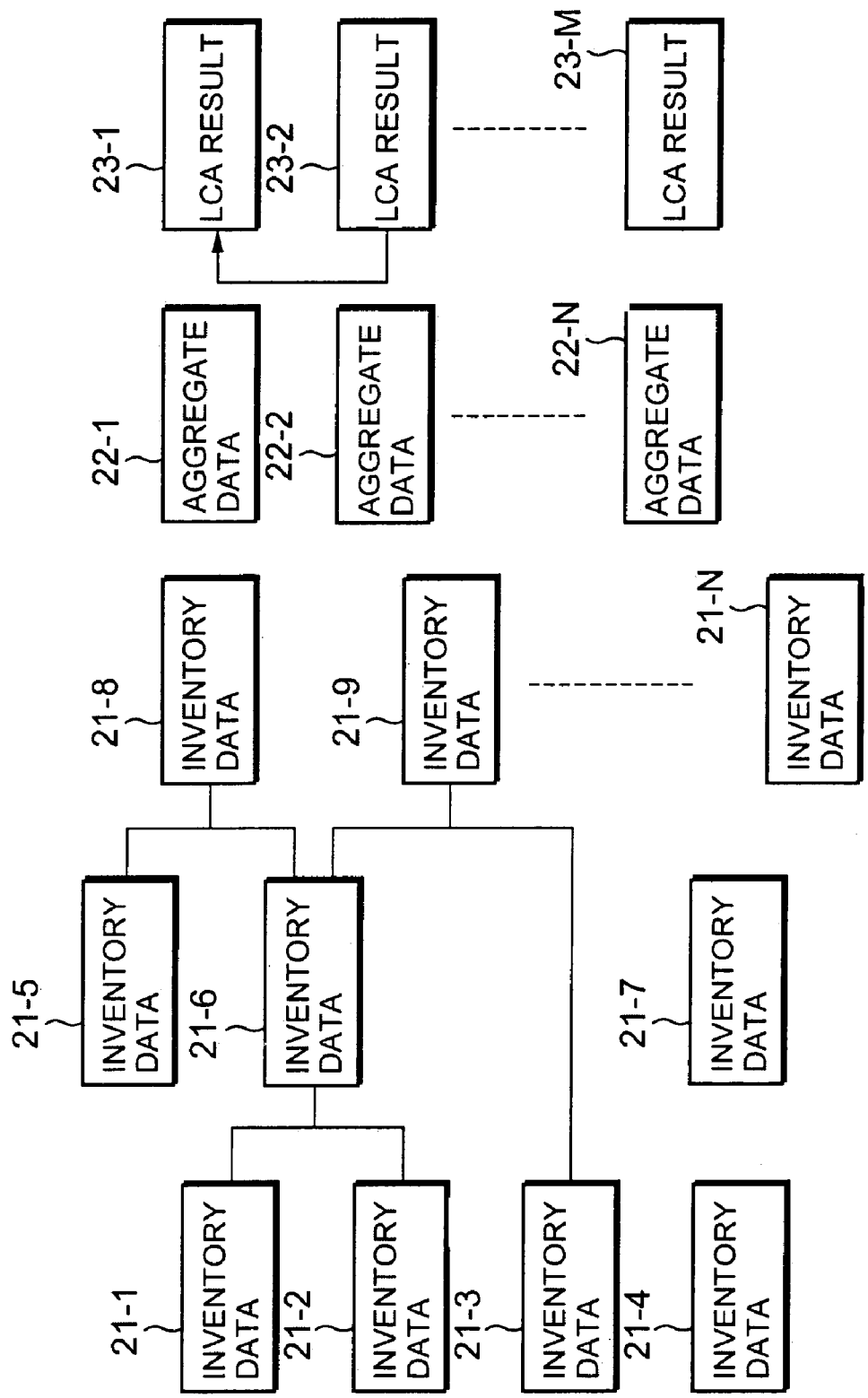
FIG. 4 is a diagram describing data.

Here, in order to describe the authorization furthermore, data to be dealt with in this embodiment will be explained. The data can be classified into data that can be generated, data that can be referred to, or the like according to authorization. FIG. 4 is a diagram describing a mutual relation among data to be dealt with in this embodiment. The data as shown in FIG. 4 can be classified mainly into two types of inventory data and aggregate data.

The inventory data is data that indicates a relationship between an input of respective materials and parts and an output thereof. For example, it is data indicating such a relation that in order to manufacture a material A, a quantity B of a material C is inputted, and a quantity D of waste E is discharged. This inventory data has referred to another inventory data that in order to manufacture the material C, a quantity F of a material G is inputted, and a quantity F of carbon dioxide is emitted (outputted).

Inventory data describing such relationships exist in a plurality of numbers, for example, from inventory data 21-1 to 21-N as shown in FIG. 4. Inventory data 21 may exist sometimes singularly, or may exist in association by reference to other inventory data 21. Inventory data 21-6 refers to inventory data 21-1 and inventory data 21-2.

Figure 5:
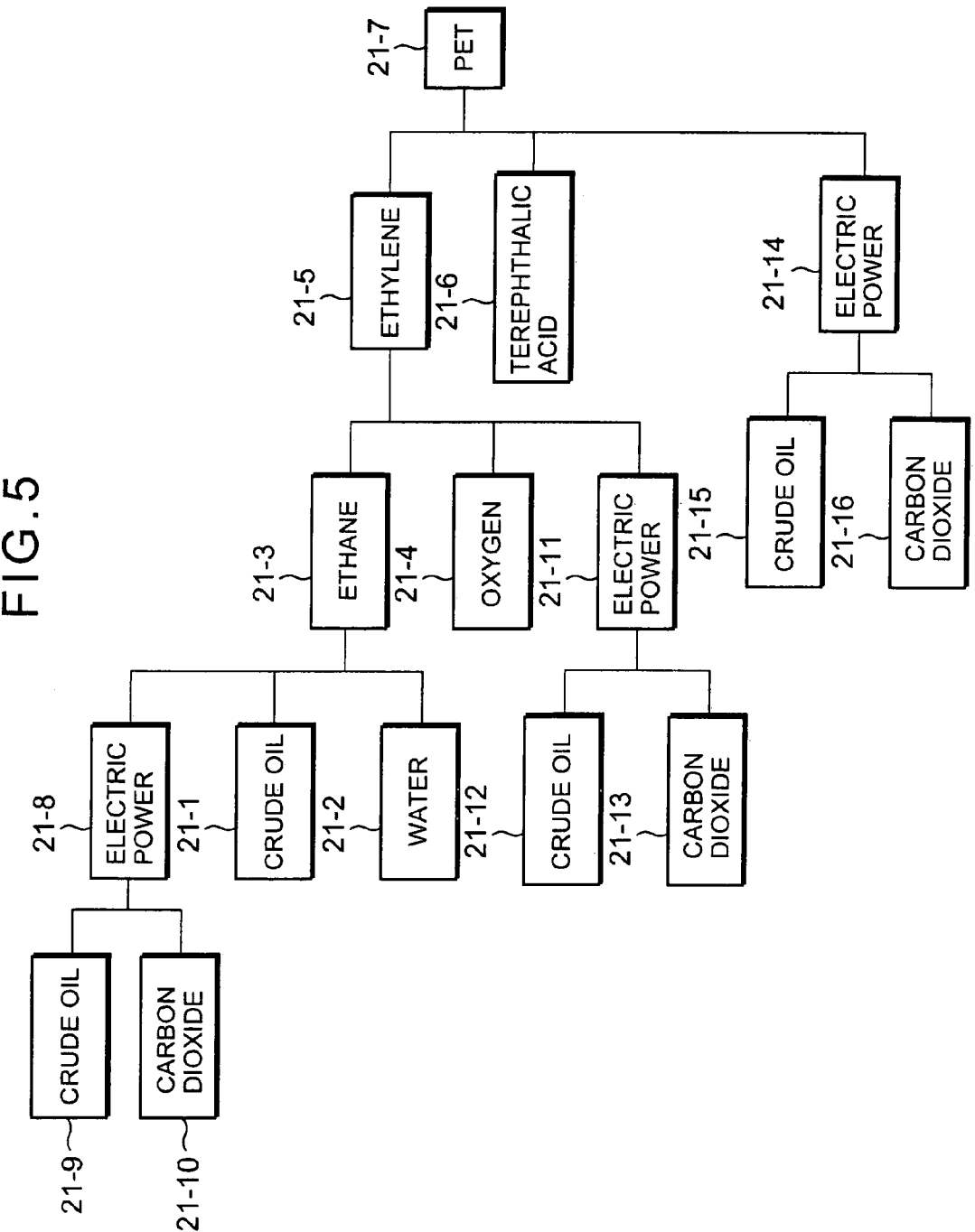
FIG. 5 is a diagram showing specific examples of data.

With reference to FIG. 5, a more specific case will be described. From crude oil inventory data 21-1 and water inventory data 21-2, ethane inventory data 21-3 is produced. From ethane inventory data 21-3 and oxygen inventory data 21-4, ethylene inventory data 21-5 is produced. Further, from ethylene inventory data 21-5 and terephthalic acid inventory data 21-6, PET inventory data 21-7 is produced.

Further, electric power inventory data 21-8 is produced from crude oil inventory 21-9 and carbon dioxide inventory data 21-10, assuming that crude oil is inputted and carbon dioxide is emitted (here, for convenience of explanation, other power generation is omitted as a negligible value).

As described above, the plurality of inventory data 21 exist singularly, or correlated with others.

Aggregate (aggregation, add-up) data is data obtained by aggregating a plurality of inventory data 21, and there exist a plurality of aggregate data 22-1 to 22-N as shown in FIG. 4. Aggregate data 22 exists as data of parts (components) and/or materials like PET aggregate data 22, copper aggregate data 22 or the like.

By referring to the specific example of inventory data 21 in FIG. 5, aggregate data 22 will be described. For example, as for PET aggregate data 22 (indicated as inventory data 21-7 in FIG. 5), assuming that firstly, crude oil X kg and water Y kg were used as materials, and carbon dioxide Z Kg is emitted due to energy (here, mainly electric power), by using the crude oil inventory data 21-1 and water inventory data 21-2, a quantity of emission of carbon dioxide is calculated. By carrying out such processing to other inventory data 21-1 to 21-6 that are connected to PET inventory data 21-7, a PET aggregate data 22 (not indicated in FIG. 5) is generated.

As described above, aggregate data 22 is data in which data of materials and emission are calculated. From these data, through a processing to be described later, using data of a quantity of emission of carbon dioxides, a quantity of energy consumption and a quantity of resources consumption, LCA results 23-1 to 23-M (FIG. 4) of product information are calculated. By enabling for this LCA result 23 to contain correlated information, it is enabled, for example, for LCA result 23 related to TV receivers to use LCA result 23 related to cathode ray tubes already produced.

Inventory data 21 and aggregate data 22 are managed (controlled) as sorted per product category to be described later.

Inventory data 21 has items such as specific materials or parts unique to a specific product, and items of basic materials such as electric power or crude oil that will be used commonly throughout the whole products. If the LCA system according to the embodiment of the invention is constructed within one corporation, and in the case this corporation manufactures a plurality of types of products, it is preferable for inventory data 21 related to the specific materials and specific parts unique to the specific products to be generated and managed in a division handling this product (a site close to its manufacturing site), using appropriate data suited to its division, however, as for the regular inventory data 21 such as electric power and crude oil, it is not preferable to use different data within the same company.

Therefore, the inventory data has such a scheme that a management division that executes generation and management of the inventory data is designated, and unless a special permission is given, a generation and modification of the inventory data outside one's own management division is not allowed. This scheme will be described in the following.

The first management sector (section) administers the whole inventory data 21 and the whole aggregate data 22. Management in the first management sector, in this case, means that as for the inventory data 21, processing of search, correction and deletion can be executed, and that as for the aggregate data 22, processing such as search can be executed. The second management sector manages a limited inventory data 21 and aggregate data 22. The term "limited" in this case means that it is limited to a portion of the product category (even with respect to this category, further limitation may be added as will be described later) dealt with, for example, within branch 2.

The user sector is allowed to calculate a final environmental load volume using aggregate data 22 only within the product category that is managed by the second sector that is an upper division of the user sector.

As for the production of inventory data 21, if a division of a user who logged in is the division A, its inventory data 21 produced by the user becomes an inventory data 21 of the division A. Namely, although the user in the first management sector can generate inventory data 21 as a user in the first management sector, he/she is not allowed to produce inventory data 21 in division A as a user of division A.

In this system, in order to clarify which division manages which data, information indicating that which data is under management of which division is displayed on a display screen the user observes. For example, by referring to FIG. 28 to be described later, on an upper left portion in the drawing, "Data Management Division" is displayed, in this instance, a division named "TV" is indicated to manage the data.

The inventory data 21 and aggregate data 22 shown in FIG. 4 are stored and managed in a storage device (not shown) provided in PC 10 at the head office 1.

The authorization will be described further with reference to FIG. 6. The authorization described hereinabove can be indicated in 5 levels in this embodiment. In FIG. 6, five levels of 1, 3, 5, 7 and 9 are provided as authorization levels. By use of odd numbers as described above, it becomes possible to realize, for example, that a predetermined user (who belongs to the second management sector or the user sector) may be granted additional authorization other than originally assigned for a predetermined period of time, by providing an authorization level 2 (of course, 4, 6 or the like will do).

Further, without limitation of the predetermined period of time, if some processing depending on a particular authorization increases in the future, or if a necessity to provide a new authorization arises, authorization levels in even numbers may be used.

It should be understood that the authorization levels may be set not in odd numbers but in even numbers as well. Further, it is also possible to set up levels greater than 5 or less than 5. As for the number of levels, it is preferable to set up an appropriate number depending on a scale of the system or the like.

The authorization levels 1 and 3 are authorization levels granted to the user sector, the authorization levels 5 and 7 are authorization levels granted to the second management sector, and the authorization level 9 is an authorization level granted to the first management sector.

The authorization level 1 allows execution of processing of search, correction, deletion and application related to a model name having a modification authorization in product information. Here, the product information is meant to be information related to a product each branch 2 manages (manufactures), and also information to be inputted at the time of calculation of environmental loads in each life cycle stage to be described later. Therefore, those one to whom the authorization level 1 is given are mainly those who are involved in the development of a product.

The expression "related to the model/part having the modification authorization" is meant that the authorization to modify the information is limited only to the information related to the product (related to the product for which the user was registered as having a modification authorization at the time of entry of the product information) the user is involved in the development thereof. The modification refers to search, correction, deletion and application.

To the user in the authorization level 1, a permission to execute processing of correction and deletion is given within the limit of the product information having the modification authorization. The application (request) is a processing to be executed for registering product information one has generated as a formal data (to put into a status usable by the other users), with a permission of the user in the authorization level 3 given.

The user in the authorization level 1 is also capable of searching information related to an item having no modification authorization within a registered product category. As for the expression "the registered product category", although the user who wishes to use the LCA system according to the invention must execute a process of registration in advance to be described later, in items of the registration, there is an item of selecting a product category, and thus it refers to the product category the user has registered as an item the user wishes to execute a processing such as a searching or the like.

The expression "the item (product) having no authorization to modify within the registered product category" refers to product information within a plurality of product categories, access to which was registered already, but is not given authorization to modify, or refers to a product the product information of which is not produced by oneself. With respect to such products, the user in the authorization level 1 is given permission only to execute a process of searching.

Figure 7:
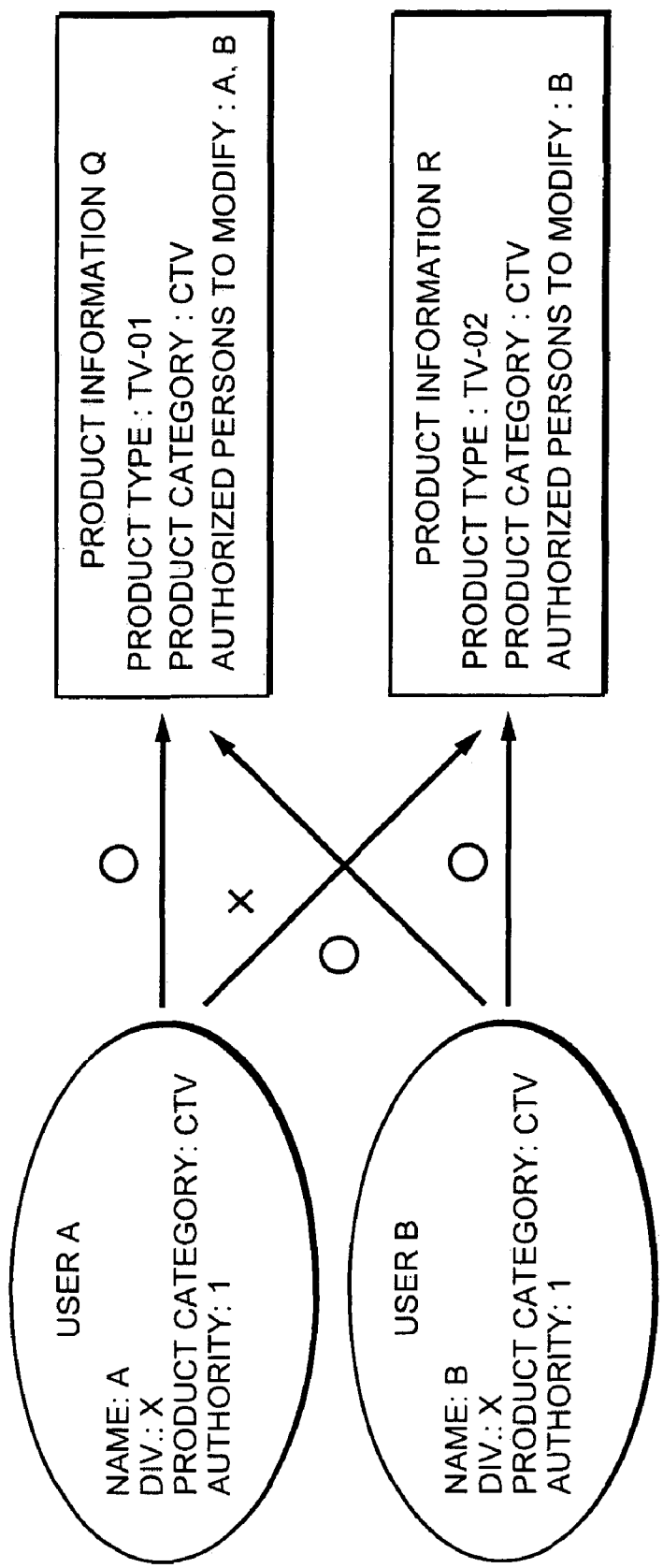
FIG. 7 is a diagram describing a process of correction in accordance with authorization level.

The process the user can execute who is given the authorization level 1 will be described further by referring to FIG. 7. User A having a name A and user B having a name B both belongs to division X, registered CTV as a product category, and are given authorization level 1. Under product information Q, it is specified that a product model name is TV-01, a product category is CTV, and persons having authorization to modify are user A and user B. Under product information R, it is specified that a product model name is TV-02, product category is CTV, and persons having authorization of modify is only user B.

User A is registered as a person having authorization to modify with respect to product information Q, however, is not registered as a person having authorization to modify with respect to product information R. Therefore, although user A can execute processing such as search, correction, deletion, application with respect to the product information Q, he can only execute a process of search with respect to the product information R. In contrast, because the user B is registered as a person having authorization to modify in both of the product information Q and the product information R, he is allowed to execute processing of search, correction, deletion and application in both of them.

As described above, by limiting the processing such as correction, deletion and application only to the user who is registered as the person having authorization to modify (i.e. a user who produced the product information, or a user who is given permission by that user), such a trouble can be avoided that a user who has no authorization deletes the data inadvertently.

The user in the authorization level 3 is further given a permission to be able to execute a processing of registration with respect to a product type having authorization to modify, in addition to the processing permitted to the user in the authorization level 1. The user in the authorization level 3 corresponds, for example, to a supervisor of the person in the authorization level 1. The processing of registration is a process to approve the data the user in the authorization level 1 applies to be added to the database.

Figure 8:
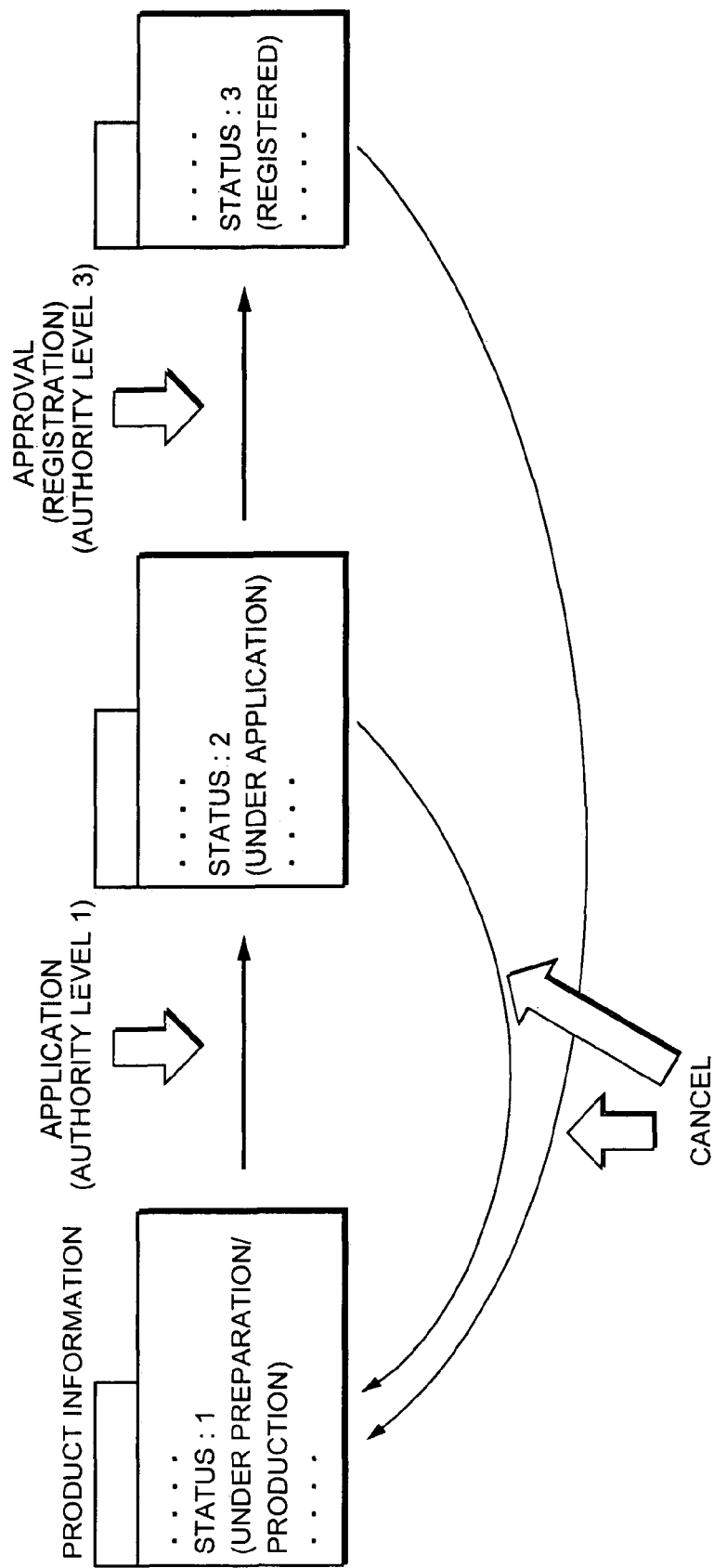
FIG. 8 is a diagram describing a process of application and a process of approval.

By referring to FIG. 8, further description of the application and the registration will be given. The user in the authorization level 1 (hereinafter, referred to as user A, if appropriate) generates product information. This product information under preparation is in a status open to a user who is registered if in the same product category. Upon completion of generation of the product information, the user A executes a processing of application. This processing is performed by operating a button of application (not shown) displayed on a display screen for use in producing the product information.

By operating the button of the application, this product information proceeds from a status 1 of under preparation to a status 2 of under application. Such a change in status is controlled by a status code.

With respect to such product information under application, if the user in the authorization level 3 and who has authorization to execute processing of application to that product information (who is referred to as user B) executes the processing of registration, the status code thereof is changed to a registration status of status 3. Upon registration, its product information is handled as a formal data, and put in a status open for other users to browse. By way of example, the product information even if in a stage prior to becoming the formal data, it may be put in a status open for other users to browse.

Processing of correction, deletion of the product information once registered as the formal data as described above is set no more executable. By setting as above, the product information having been registered as the formal data is secured to be prevented from such occurrence that it is deleted or destroyed (changed) inadvertently or by mistake.

User A is capable of deleting the product information which was applied in error and in the status of application, namely, to return to the status of preparation. Likewise, user B is capable of returning the product information which was approved and registered in error to the status under preparation.

As described above, by causing for the status code indicating the status of data to be contained in the product information, and allowing execution of the processing of the application, approval, cancellation and the like, it is enabled to clarify identification of the data if it is data under preparation, post preparation, under application or a formal (registered) data thereby enabling to execute its management and operation smoothly.

By setting up steps of the application (of request) and the approval, and by allowing a different user to execute these processing, that is, by providing a scheme or framework to check certainty of the product information by people more than two, it is enabled to enhance reliability of the product information generated (registered). When executing LCA, it is very important that the data to be used (including inventory data 21, aggregate data 22 and the like) has a high reliability, and it is important to enhance the reliability by providing such framework.

Returning to the description of the authorization levels in reference to FIG. 6, authorization levels 5 and 7 are authorizations to be assigned to users who belong to the second management sector, wherein basic processing permitted to them are the same. However, the reason of providing the authorization level 5 and the authorization level 7 is for enabling to differentiate in minute portions in the processing whether to approve or not, to correspond to a newly added processing, to differentiate between a subordinate and a supervisor, and the like.

The authorization levels 5 and 7 (hereinafter, referred to as authorization level 5 unless there is a need to discriminate between authorization levels 5 and 7) are defined to include authorizations to execute, in addition to the processing permitted to the user in the authorization level 3, a processing of correction, deletion, application and registration within the registered product category with no authorization to modify, a processing of search within the product category in the same management division but is not registered, and further processing of generation, correction, deletion and aggregation for the inventory data in the division belonging thereto.

The users in the authorization level 5 and authorization level 7 are also given an authorization to approve or not an application from a user who applied for a user registration, and an authorization to approve or not an application from a user who applied for addition and/or deletion of a product category. However, it should be noted that the user in the authorization level 5 is given the authorization to approve the application submitted only from the users in the authorization levels 1 and 3, and the user in the authorization level 7 is given the authorization to approve the application submitted only from the users in the authorization levels 1, 3 and 5.

As described hereinabove, the second management sector has a broader authorization than that of the users in the user sector, for example, it has a responsibility for managing the LCA system and the data in the branch 2. Thereby, from a viewpoint that any associate other than those who originated the product information should be also responsible for management of the product information if it is within the product category of already registered in order for its product category to be dealt with properly by the branch office 2, the user in the authorization level 5 is given the authorization to execute the processing of generation of the product information, correction, deletion, application, registration and the like thereof.

Further, the user in the authorization level 5 is given an authorization to be able to execute only a processing of search through the product category in the same management division outside the registration. By way of example, here, the authorization to be able to execute the processing of search is defined to include an authorization, after execution of the search, to be able to display (for browsing) the contents thereof (the search). For the user in the authorization level 5, because the authorization to manage the product category to be dealt with in the branch 2 is given, the user in the authorization level 5 are basically in a status of already registered in the whole product categories to be dealt with by the branch 2 to which the user belongs.

Therefore, basically, for the user in the authorization level 5, "the product category in the same management division outside the registration" does not exist unless the user in the authorization level 5 intentionally deletes the registered product category or the like.

Further, the user in the authorization level 5 is also given an authorization to be able to execute processing such as search, correction, deletion and addition with respect to the inventory data in the division the user belongs to. The reason of giving such authorization is for sharing work loads from each other because it is considered to be difficult in view of its enormous volume for the authorization level 9 (the user belonging to the head office 1 that supervises the whole system) to generate and manage the whole inventory data.

Still further, the user in the authorization level 5 who is closer to an actual site of manufacturing the product is capable of producing a more needed inventory data than the user in the authorization level 9 remote from the actual site of manufacturing the product. Because of the reason described above, the user in the authorization level 5 is given the authorization to be able to execute processing of correction of the inventory data, deletion, aggregation (a process to generate aggregate data from the inventory data) and the like.

However, because the inventory data is data which is required to have a high level of reliability, and be managed accurately and safely, the user in the authorization levels 1 or 3 even though they are positioned closer to the actual site of manufacturing the product is not given the authorization to execute processing of correction of the inventory data or the like.

Figure 9:
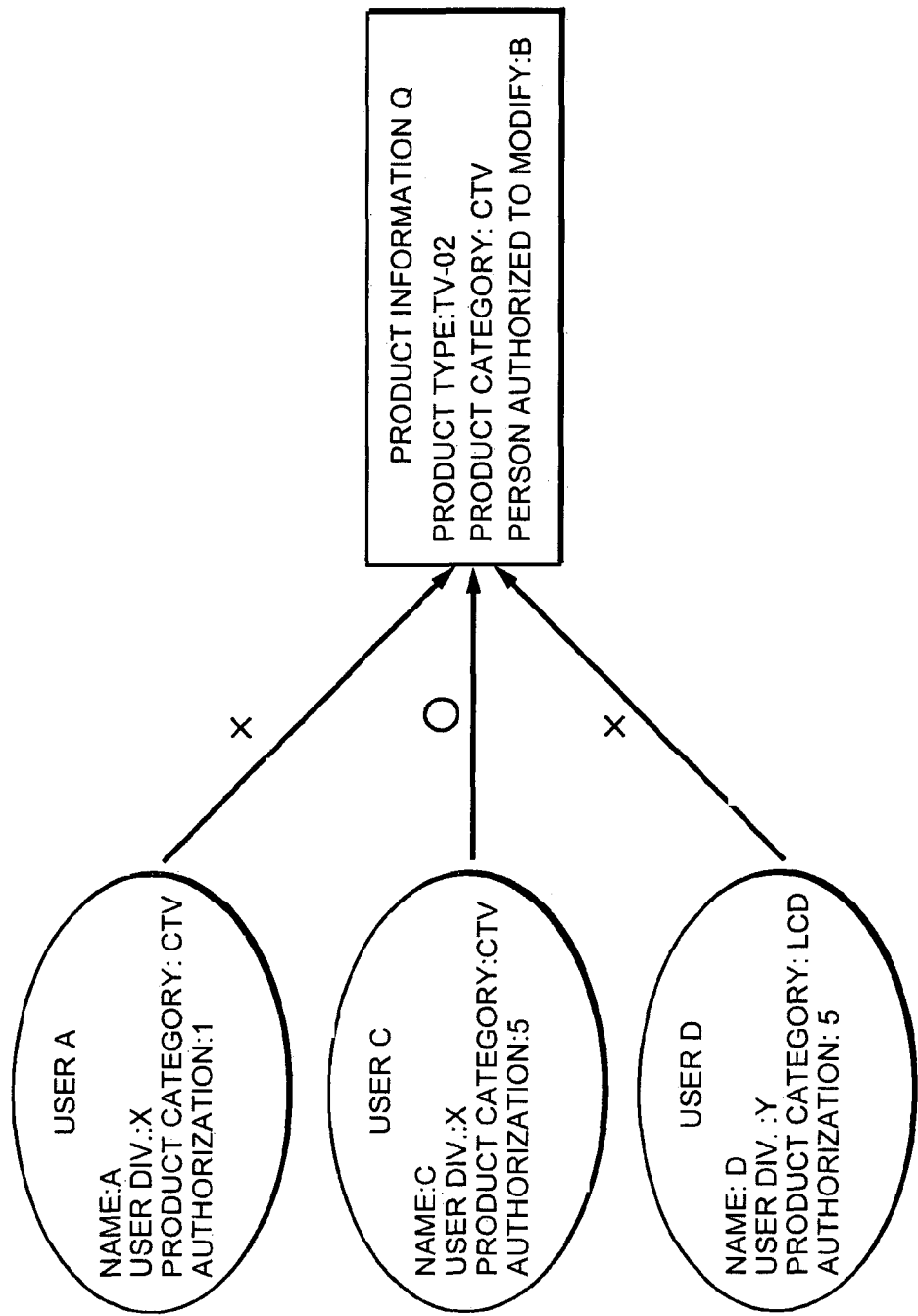
FIG. 9 is a diagram describing a process of deletion in accordance with the authorization level.

Here, differences in the processing the user in the authorization levels 1, 3 and 5 can execute will be described with reference to FIG. 9. In FIG. 9, a description will be made mainly by way of example of processing of deletion. User A having a name A is shown that a division of user is X, a registered product category is CTV, and an authorization level is 1. User C having a name C is shown that a division of user is X, a registered product category is CTV, and an authorization level is 5. User D having a name D is shown that a division of user is X (Y?) a registered product category is LCD and an authorization level is 5.

The user A, because of its authorization level being 1 and not being registered as a person having the authorization to change product information Q, is not allowed to execute processing of deletion with respect to product information Q. In contrast, the user C, although not registered as a person having an authorization to change the product information Q, because of its authorization level being 5, and because of a coincidence in product categories, can execute processing of deletion with respect to the product information Q.

The user D, although its authorization level is 5 likewise the user C, because its division of user differs from the management division X that administers the product information Q, cannot execute processing of deletion with respect to the product information Q. That is, because the user D specifies management division Y as the user for the product information Q, which is different from management division X which administers the product information Q, the user D cannot execute any processing with respect to the product information Q.

Now, back to the description of the authorization levels in reference to FIG. 6, a user granted an authorization level 9, namely, the user in the first management sector is given an authorization to execute the whole processing with respect to the whole data to be dealt with in the LCA system.

The reason why there are provided the processing that can be executed and the other that cannot be executed depending on the authorization levels is to make it easier to manage the product information and the inventory data as well as to enhance the reliability thereof. Further, by provision of the processing that can be executed and the other that cannot be executed depending on the authorization levels, and by displaying only a button corresponding to the processing that can be executed on an operating screen, a convenient and easier to use function will be provided to the user, with useless information omitted.

As described above, because there arises a difference in the processing that can be executed, it is required for the authorization level itself to be managed adequately. The authorization level is granted by the user in the first management sector who receives a request from a predetermined user side. Further, the product category and the like that the predetermined user can execute its registration is limited to a portion permitted by the user in the first management sector, and it is not designed to permit a registration in the whole product categories desired by the predetermined user.

If the user in the first management sector is supposed to execute processing of the whole requests from a predetermined user side, for example, if the scale of the company is large and the number of employees increases, a work load on the user in the first management sector increases substantially. Therefore., it may be arranged so that the second management sector is also allowed to execute the processing of the requests from the user in the user sector. In other words, this means that the request from the user in the lower authorization level is executed by the user in the upper authorization level.

That is, the user in the first management sector processes the request from the user in the second management sector, and the user in the second management sector processes the request from the user in the user sector (the user in the first management sector, of course, can process the same). By arranging as described above, the processing that must be executed by the user in the first management sector may be lessened.

For example, as described hereinabove with reference to FIG. 6, by granting the authorization to approve application of the user registration also to the user in the second management sector, the user in the first management sector is no more required to execute the processing of approval for all the users who use the system, thereby lightening the burden of processing by the user in the first management sector. Further, sometimes it is more suitable for the second management sector closer to the actual site than the first management sector to manage the user in the user sector, thereby enabling the management to be extended more thoroughly.

Such authorization levels and product categories are managed by PC 10 (FIG. 1) provided on the side of the first management sector. For example, they are managed according to a master table as shown in FIG. 10. Namely, it is a table in which the name, user division, authorization level and application product categories are correlated. The use division and the application product category may be managed directly by name thereof, or may be managed by a number or the like assigned thereto.

The user division refers; to a division (department) the user has desired of its registration at the time of processing of the registration to be described later, and basically refers to the division to which the user belongs. This master table is stored in a storage device (not shown) in PC 10.

Figure 11:
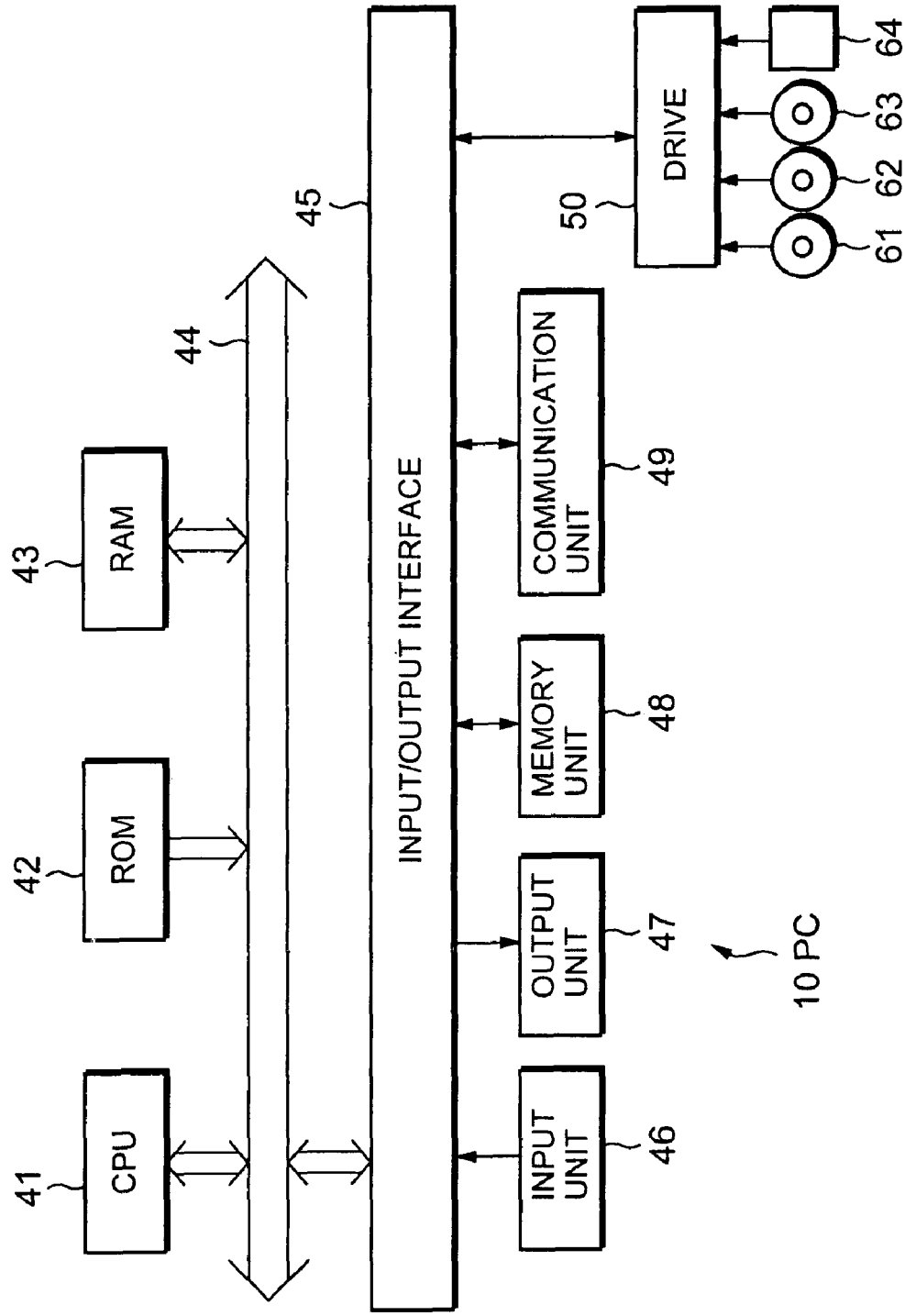
FIG. 11 is a diagram showing an example of internal structures of PC10.

An internal architecture of PC 10 will be described. FIG. 11 is a diagram showing an example of internal architectures of PC 10. A CPU (Central Processing Unit) 41 in PC 10 executes versatile processing in accordance with programs stored in a ROM (Read Only Memory) 42. In a RAM (Random Access Memory) 43 is stored appropriately data and a program necessary for executing various processing by CPU 41. An input/output interface 45 is connected with an input unit 46 including a key board and a mouse, and outputs a signal inputted via the input unit 46 to CPU 41. Further, the input/output interface 45 is also connected with an output unit 47 including a display, a speaker and the like.

Still further, the input/output interface 45 is connected with a storage device 48 including a hard disk or the like, and also with a communication unit 49 which executes data exchange with other apparatuses (for example, PC 11) via network 3 (see FIG. 1). Drive 50 is used when reading or writing data to and from a recording medium such as magnetic disc 61, optical disc 62, photo-magnetic disc 63, semiconductor memory 64 and the like.

By way of example, because basic architectures of PC 11 and PC 12 are the same as that of PC 10, its description is omitted.

In the next, an operation of the LCA system shown in FIG. 1 will be described by referring to FIG. 12 and a flowchart therein. Here, an operation to be carried out between PC 10 in the head office 1 belonging to the first administration sector and PC 12 in the branch 2 belonging to the second management sector or PC 11 in the branch 2 belonging to the user sector will be described. In step S1, PC 11 or PC 12 (hereinafter, referred to as PC 11 unless PC 12 needs to be identified) upon activation of a predetermined program by instruction from the user causes an initial display screen (a log-in screen for connecting to the LCA system) as shown in FIG. 13 to be displayed on a display 71 serving as the output unit 47.

Figure 13:
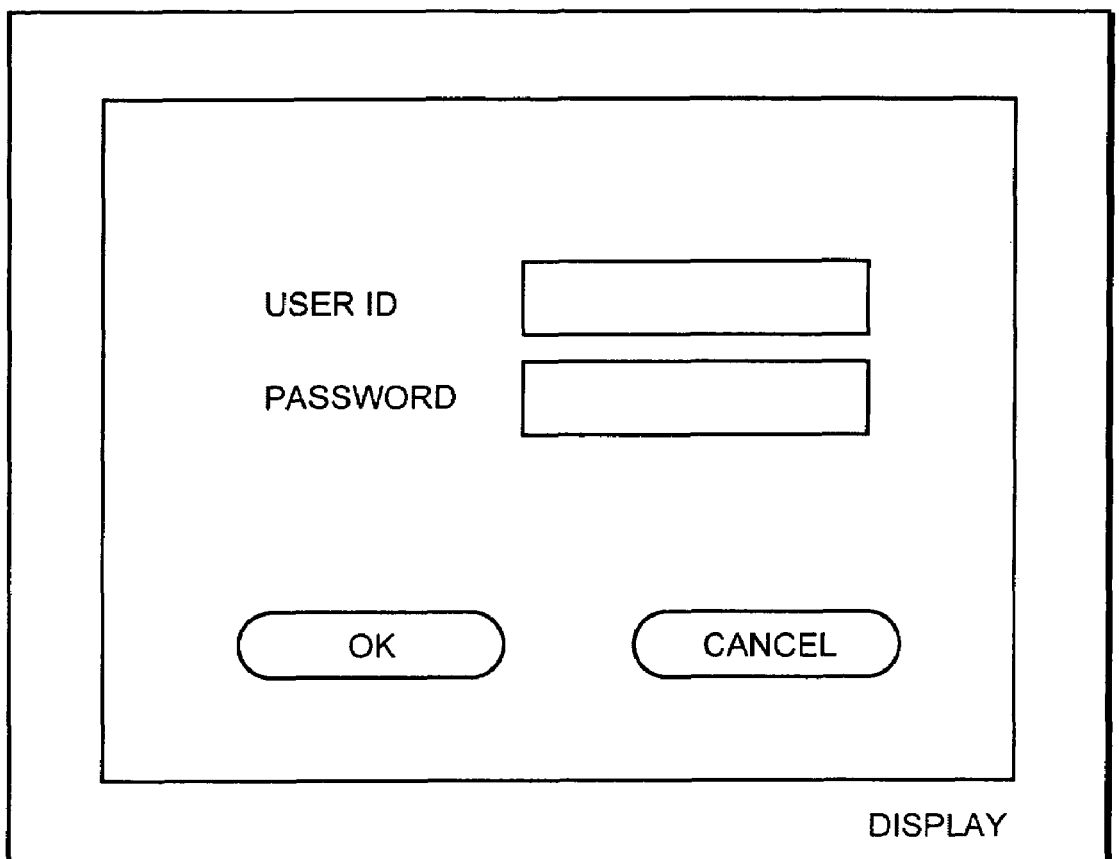
FIG. 13 is a diagram showing an initial display screen.

The initial screen to be displayed thereon, for example, as shown in FIG. 13, has an input block to input a user ID (employee number or any number capable of identifying an individual), a block to input a password, a button to operate when logging in (OK button), a button to operate when canceling its log-in, and the like. In case the present system is desired to be used, the user needs to complete a user registration in advance. By the way, the user ID needs not be limited to the employee number, but any data that can uniquely identify the user who requests the log-in may be used.

Because the user ID and the password are not granted if the registration is not completed (even if the user ID is an employee number, usually the password is not granted (not validated until the registration is completed)), a new user who accesses for the first time cannot enter his user ID and/or password. Even if succeeded to enter, as a result of authentication processing in step S11, the user is rejected the use of the system (judged as a new user).

Thereby, in a status where at least one of the user ID and the password is not entered, if the log-in button is operated, the user who requested its log-in will be judged to be a new user. Thereby, PC 10 or PC 11, by using such a method described above, may decide whether or not the user is a new user, in other words, whether or not the user is one who needs a user registration.

By the way, if such a system capable of authenticating each employee (user) is already set up in a company using the LCA system, in other words, if such a system capable of authenticating each access to a network including the LCA system used in the company is built up, the authentication may be executed using this system. In the case where such the system is introduced, because information of user IDs (employees' numbers), mail addresses, affiliations (departments/sections) the users belong to, and the like is controlled as correlated in most cases, such information existing may be used in the processing in the LCA system as well.

After the user ID and the password have been inputted on the log-in screen as shown in FIG. 13, if the button "log-in" is operated, these pieces of information are transmitted to PC 10. In step S11, PC 10 executes authentication processing using the information transmitted. The authentication processing is executed by determination whether or not the user corresponding to the user ID is registered in the master table. Further, when the user is registered in the master table, the authentication processing precedes a determination whether or not the password is correct. By the way, the determination whether the password is correct or not may be omitted if it is not required, for example, by use of its own authentication system unique to its organization capable of completing the authentication (of the password). In such a case, it is not required for the side of PC 10 that carries out the authentication processing as the LCA system to administer the passwords.

Using a result of the authentication processing, it is determined in step S12 whether or not the user who requested a log-in is a user who has already completed a user registration for using the LCA system and has been registered. In step S12, if the user who requested log-in was determined not to be a user who is registered, the step proceeds to S13, where a processing for a user registration is executed. This processing for the user registration will be described in detail later. On the other hand, in step S12, if the user who logged in is determined to be a user who is registered, the step proceeds to S14, in which it is determined whether or not the user who logged in is a user who belongs to the first administration sector.

As described hereinabove, PC 10 administers the master table as shown in FIG. 10, thus, by referring to the master table, it can determine an authorization level (the sector the user belongs to) of the user who logged in. In step S14, if the user who logged in is determined not to belong to the first administration sector (not the user in the authorization level 9), the step proceeds to S15 in which it is determined whether the user belongs to the second management sector or not.

In step S15, if the user who logged in is determined not the user who belongs to the second sector (not the user in the authorization levels 3 or 5), because it is assumed that the user is determined to be a user in the user sector, data for use of a display screen adapted to the user level of the user who logged in with reference to the master table is sent in step S16.

Likewise, in step S14, if the user who logged in is determined to be a user who belongs to the first administration sector, the process proceeds to S17, in which a display screen data for use by the user who belongs to the first administration sector is sent. Further, in step S15, if the user who logged in is determined to be a user who belongs to the second management (administration) sector, the step proceeds to S18, in which a display screen data for use by the user who belongs to the second management sector is sent.

As for the display screen to be sent as described above, items based on the data in the information on the authorizations, the user division and the application product categories described in the master table are transmitted. That is, in this display screen, various considerations are taken into account such as not to display an access button for access operation so that the user is prevented from accessing the information of the other division outside the division the authenticated user belongs to.

Figure 12:
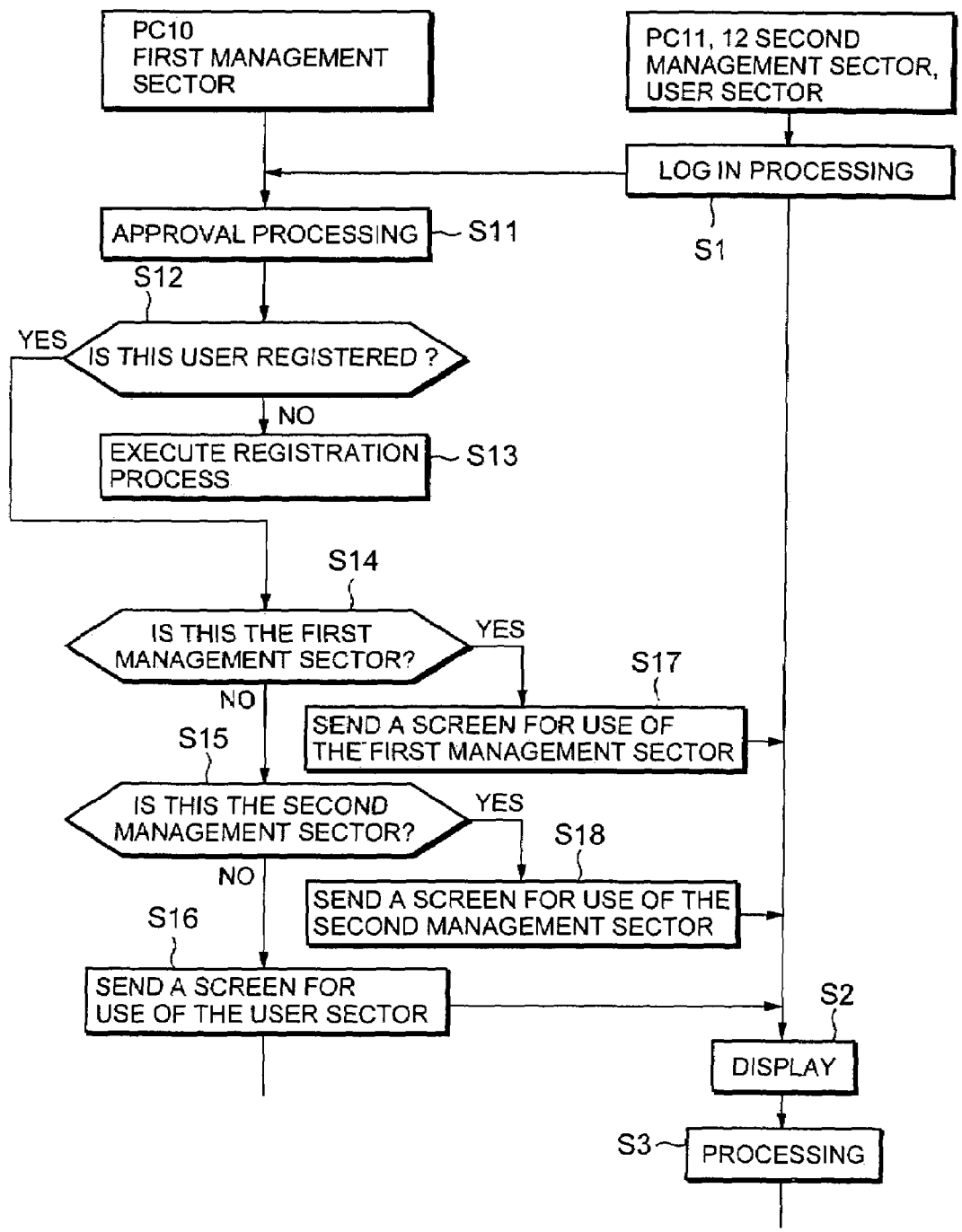
FIG. 12 is a flowchart describing operation of LCA system.

According to the above-mentioned processing based on the flowchart shown in FIG. 12, it is arranged such that after identifying whether the user who logged in is registered in the master table as shown in FIG. 10 or not (the processing in step S12), the sector the user belongs to (user sector) is determined (steps S14, S15), then data of a display screen corresponding to the user who logged in is sent on the basis of information of the product category and the like (steps S16-S18), however, it may be arranged also such that by omitting the processing in step. S14 and step S15 (that is, determination of respective sectors is not made), data of a display screen corresponding to the user who logged in is sent on the basis of the authorization, the user division and the product category, thereby integrating respective processing from step S16 to S18 into one processing.

PC 11 displays a display screen based on the display screen data received in step S2 on a display 71. This display screen as described above is allowed to display only the buttons corresponding to the processing or the like the user who logged in can execute, thereby providing a user-oriented display screen easier to use. Using such a display screen, the user can execute a predetermined processing in step S3. In step S3, for example, the processing the user in the second management sector executes includes entries of inventory data, aggregate data and the like. Further, as the processing the user in the user sector executes, there are, for example, entry of the product information, calculation of the environmental load, and the like.

By way of example, also in the case where the first administration sector logs in the LCA system, the same steps as executed by the users in the second management sector or the user sector are followed, therefore, the description thereof will be omitted.

Figure 14:
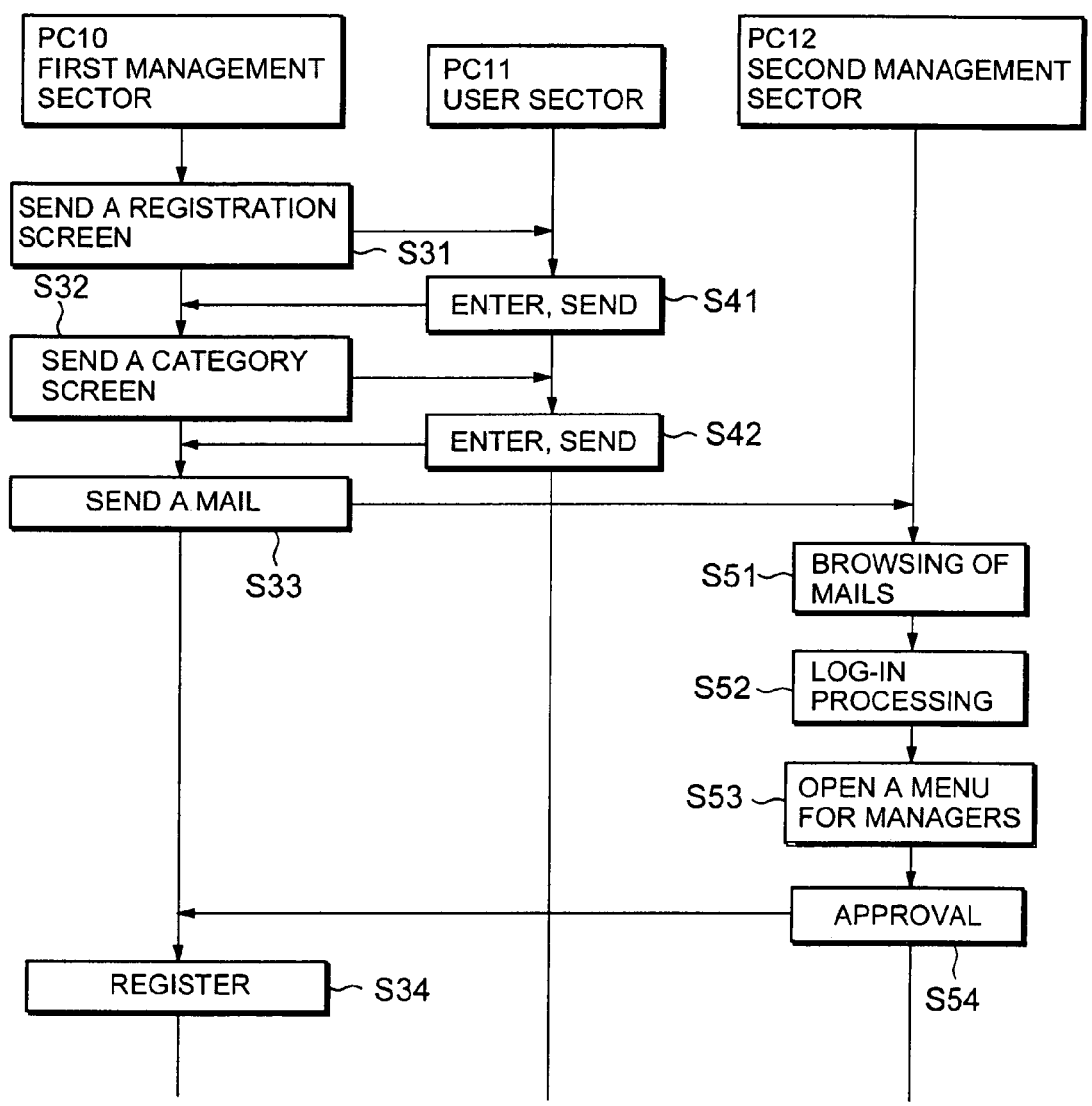
FIG. 14 is a flowchart describing procedures of user registration.

In the next, the processing of the user registration executed in step S11 will be described by referring to a flowchart in FIG. 14. As for the processing of the user registration, because it is necessary to discriminate between the first management sector. (PC 10), the second management sector (PC 12) and the user sector (PC 11), they are indicated separately in the flowchart in FIG. 14. Here, the user registration will be described by way of example where the user in the user section (the user of PC 11) requests a user registration.

PC 10, upon starting of the processing of the user registration in step S13 in the flowchart of FIG. 12, reads out the data on the registration display screen in step S31, and transmits this display screen data to PC11. PC11, upon receiving of the image data, displays a picture image on the basis of the image data on a display 71. An exemplary registration display screen to be displayed on the display 71 is shown in FIG. 15. On the user registration display screen, at first, a user ID and a name are entered. In case the user ID is an employee's serial number, because a division to which the employee belongs can be identified, it may be arranged so that the block of the division the employee belongs to is automatically displayed (without inputting by the user). Of course, it may be arranged so as to be inputted by the user as well.

The expression "automatically" used in the instant specification is intended to contain a meaning that in accordance with a predetermined program, a predetermined apparatus such as a computer, without depending on a user's manipulation, executes a predetermined processing when a predetermined event occurs.

Further, when connecting to an in-house (intra or local area) network to which the LCA system is connected, if an authentication processing for connecting to the in-house network is done prior to an authentication processing to be executed for using the LCA system, or one serves the other, the information obtained as a result of the authentication processing at the time of connecting to the intra-network may be used as well. That is, information such as a user ID, the name, a division to which the user belongs and the like can be specified as the result of authentication processing at the time of connection to the network, and thus this information may be displayed in a predetermined area on the display screen for user registration shown in FIG. 15 without troubling the user.

On the display screen for the user registration shown in FIG. 15, in order that an electronic mail requesting an approval of a user registration is sent to the first management sector and the second management sector by a processing to be described later, and that a result of approval is sent to the user who requested the user registration, there is provided a block for entering a mail address of the user who requests a user registration.

As for the telephone number, a telephone number of a division to which the user belongs is entered. Below the telephone number, an option message "Select a data management division (department)" is displayed. The "data management division" refers to a data management division within the system that desires to make use thereof. Basically, the user sector to which the user belongs, or the second management division is selected. When the user selects a different sector (data management division) to which the user does not belong, its registration is not basically permitted by a processing of approval to be described later.

Below the option block of the data management division, there are provided selection blocks to choose between a regular user and an approver. The regular user, in this case, refers to a user who belongs to the user sector in the authorization level 1, and the approver refers to a user who belongs to the second management sector in the authorization level 3.

In step S41, after predetermined information is entered in a predetermined block on the display screen for user registration as shown in FIG. 15, if a button of "to the next" is operated, the information entered is transmitted to PC 10. By way of an example, when a button of "system end" is operated, the processing of registration is interrupted, and the processing in the flowchart shown in FIG. 14 is terminated.

Figure 16:
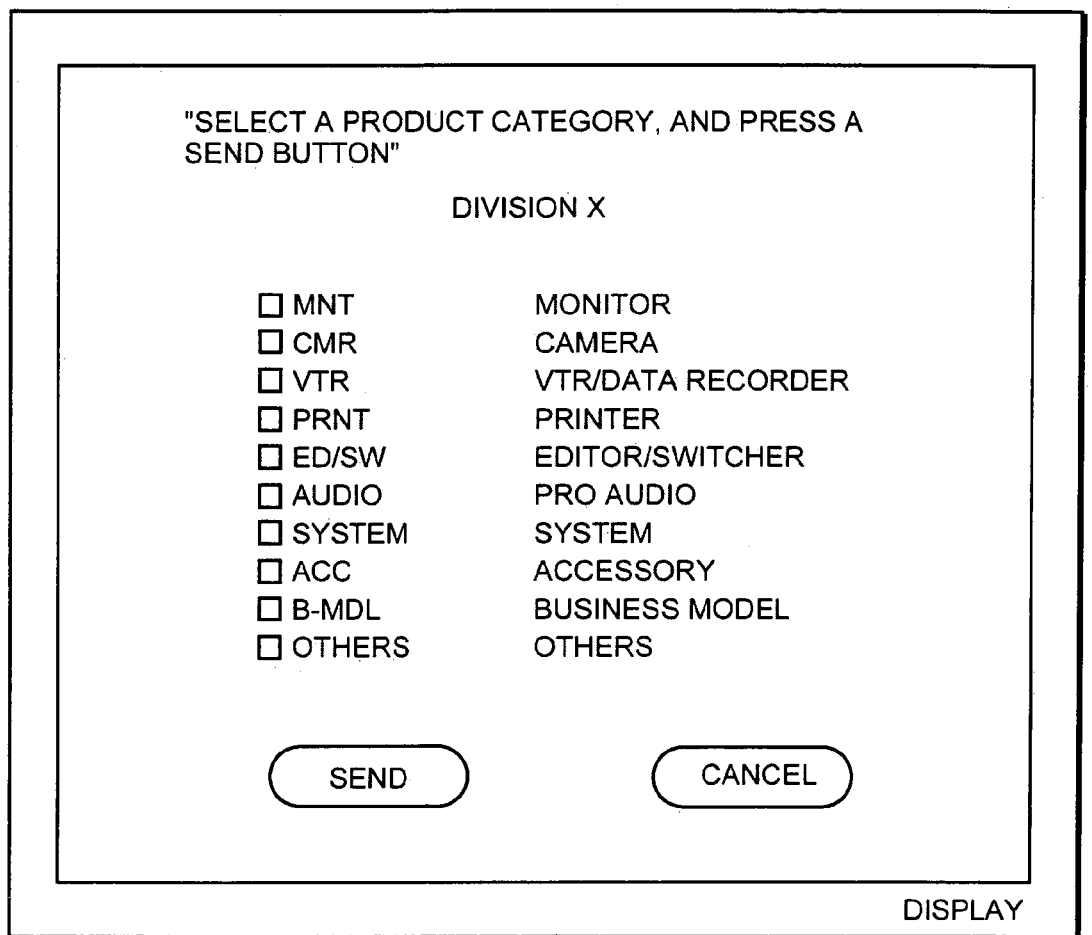
FIG. 16 is a diagram showing a product category registration display screen.

PC 10, in step S32, transmits data of display screen for selecting (registering) a category. The transmitted display screen data is processed by PC 11 to be displayed on the display 71. FIG. 16 shows an example of display screen for selecting a product category to be displayed on the display 71.

Because the data management division of the user is selected on the display screen for user registration shown in FIG. 15, only such product categories the data management division can register are displayed on the display screen for registration of product categories shown in FIG. 16. Below the data management division (of the user) selected by the user in the preceding display screen, a message "Select a product category to be used, and press a send button" is displayed. Under this message, a plurality of choices of the product categories is displayed. In this instance, because only those product categories related to the division selected in the option block in the data management division of the user is displayed, the display screen is simplified, and inconveniences troubling the user in finding an appropriate category to select, and erroneously selecting different categories of other divisions can be prevented.

The registration until the data management division and the registration of the product category may be executed in succession as described hereinabove, however, it may be arranged so as to be executed separately (at a different time) as well. This is for allowing the registered product category to be changed later, in consideration of such a case where the user at the time of user registration does not recognize a proper product category the user oneself should register, or in order to correspond to such a case where the first management sector considers it better to allow for the registration of the product category to be executed after the permission of the user registration. In the case they are executed in succession, it is preferable to provide for a function to be able to change (alter) or correct at a later time.

When necessary items are inputted on the display screen for registration of the product category as shown in FIG. 16 and the send button is operated, the data thereof is transmitted to PC 10 via the network 3. PC 10 stores the information entered via the display screen for registration shown in FIGS. 15 and 16 in the storage device 48 (see FIG. 11), and adds the information received related to the user into the master table as shown in FIG. 10 under management thereof to be stored therein.

As for the information to be described in the master table, because it relates to the product category and the authorization level, it is preferable that, at the time of registration, after judgment if the request of the user who requested registration is absolutely correct or not, an actual registration is then executed. Thereby, it may be arranged also such that data related to items necessary for the user registration is checked by the user in the first management sector or the second sector, then only a portion thereof judged to belong to the authorization is executed its registration processing.

That is, a step of temporary registration may be provided, and after the temporary registration, an actual registration processing (formal registration) may be executed. Here, a temporary registration is assumed to be executed, and this temporary registration will be described using the flowchart of FIG. 14 in the following. When the steps of temporary registration are provided, necessary items to be inputted by PC 11 in steps S41 and S42 are information for use of the temporary registration. Data transmitted from PC 11 to PC 10 for the temporary registration is registered in a list of temporary registration users under management of PC 10.

While the information of the user who requested a temporary registration is registered in the list of the temporary registration, an electronic mail is sent to a manager who is responsible, in this case, the user in the first management sector or the second management sector, notifying that there exists a user who submitted a new request of registration. When a user in the user sector requests a user registration, an electronic mail is sent to the user in the second management sector notifying the request thereof for the use of the division by the user. Regardless of the division to be used by the user who requested the user registration, an e-mail is sent to the user in the first management sector.

In this instance, because the user in the user sector requested the user registration, e-mails are sent to the users in the first management sector and the second management sector. The user in the second management sector, in step S51, browses the e-mails transmitted. When the user in the second sector who received the e-mail acknowledges that there exists a user who applied a user registration as a result of browsing the e-mail, executes a processing to log in the LCA system in step S52.

The processing to log in the LCA system to be executed in step S52 is done in the same manner as the processing in step S1 in the flowchart of FIG. 12. Further, although omitted in the flowchart of FIG. 14, by execution of the processing to log in the LCA system in step S52, a series of processing shown in the flowchart of FIG. 12 are executed sequentially. As a result, in this instance, instep S15, it is judged to be the user in the second management sector that requested the log in, then, in step S18, the data of the display screen for use of the user in the second management sector is sent. As a result, in step S2, an appropriate display screen suitable for the user who requested the log in is displayed on the display 71 of PC 12.

Figure 17:
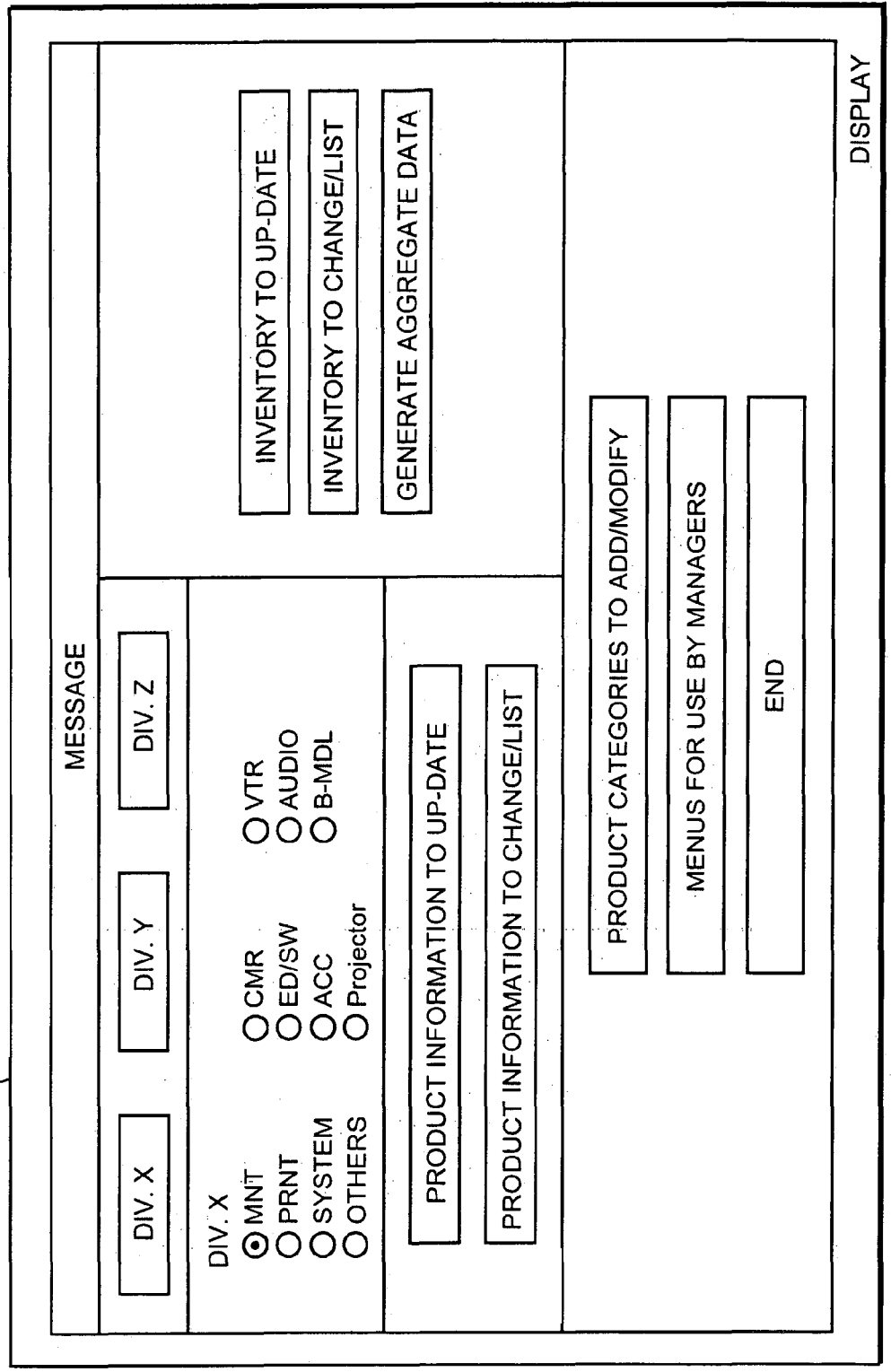
FIG. 17 is a diagram showing a display screen displayed to a user in a first management sector.
Figure 18:
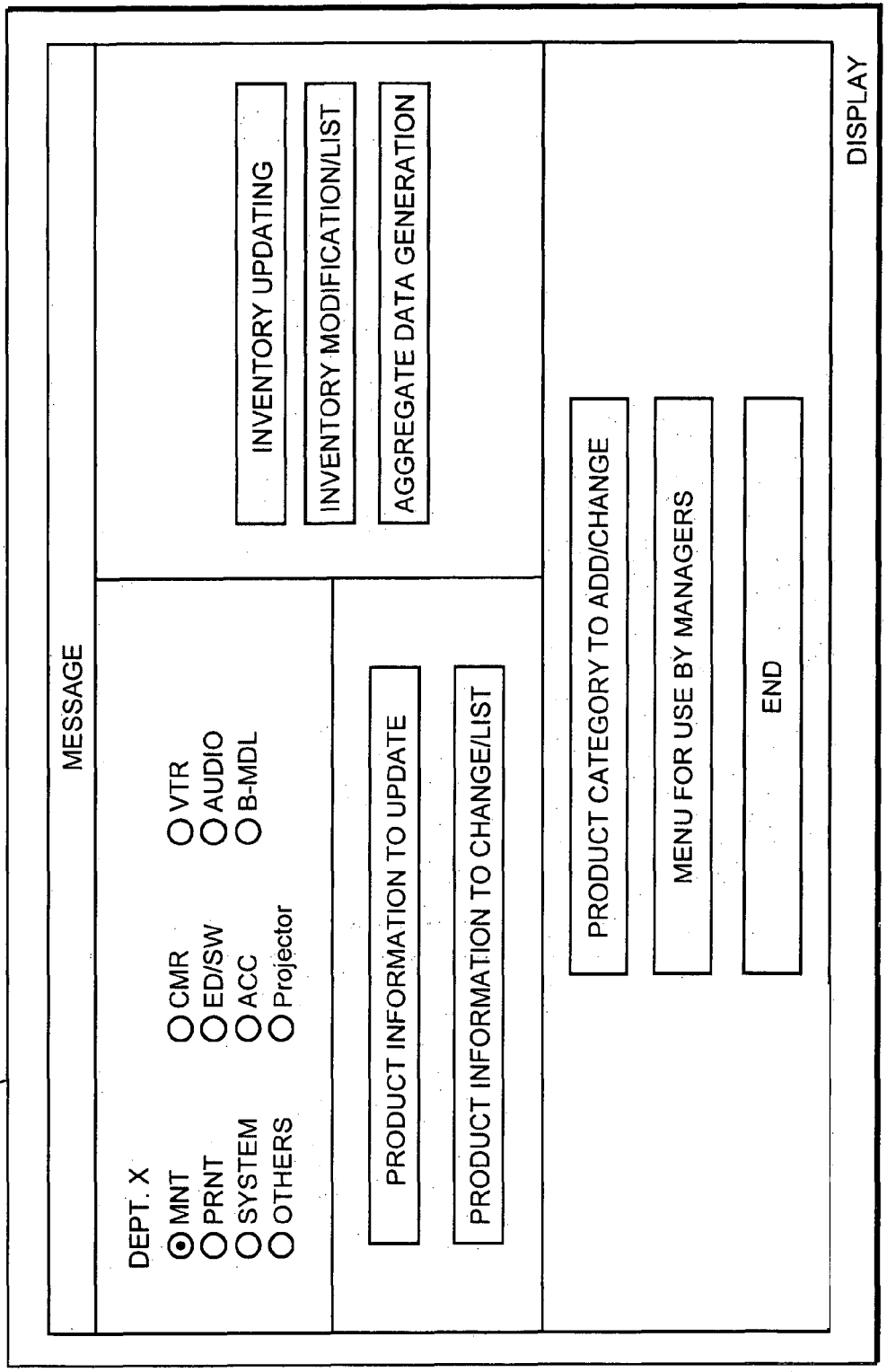
FIG. 18 is a diagram showing a display screen displayed to a user in a second management sector.
Figure 19:
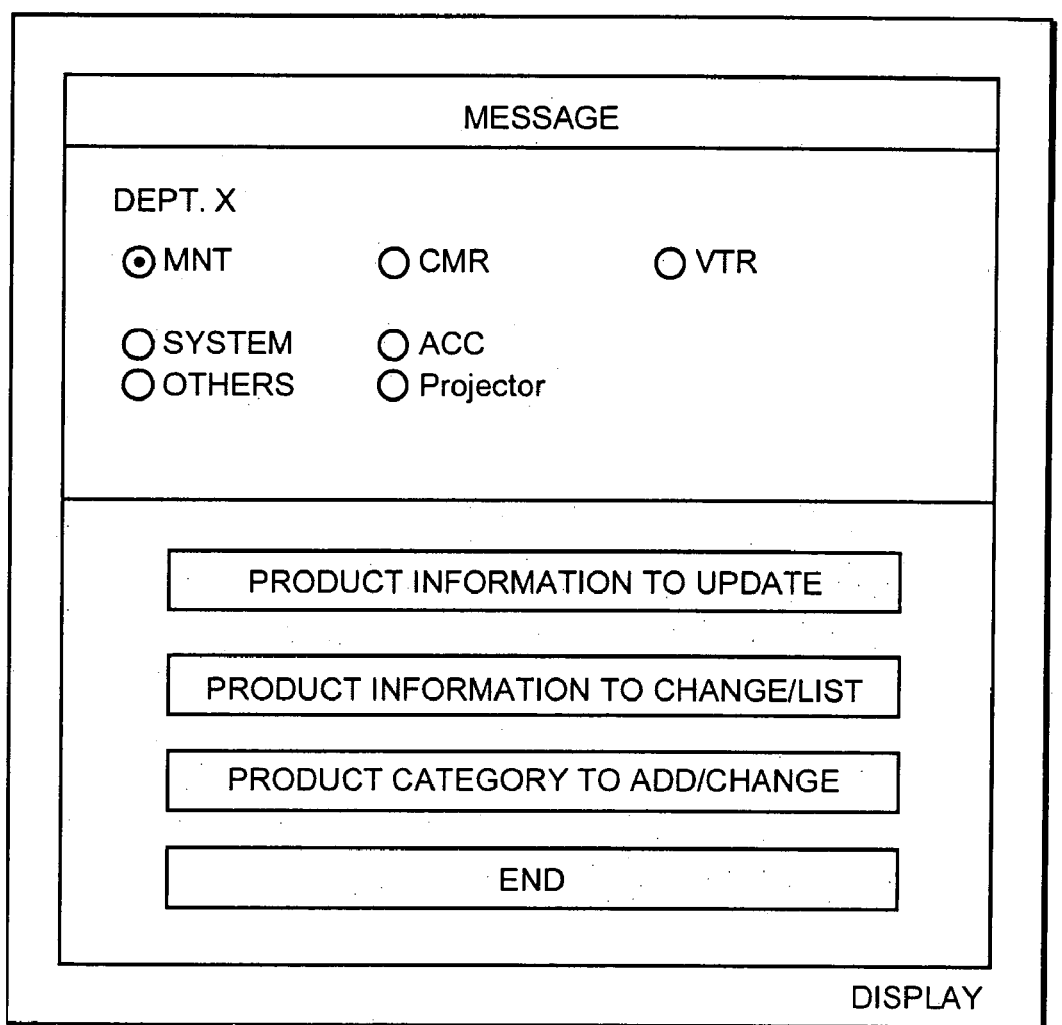
FIG. 19 is a diagram showing a display screen displayed to a user in a user sector.

Now, respective display screens to be displayed on the display 71 when the users in the first management sector, the second management sector and the user sector log in will be described. FIGS. 17 to 19 show exemplary display screens (display screens displayed as a processing of step S2) to be displayed when the users in the first management sector, the second management sector or the user sector access the LCA system, and approval thereof is completed. FIG. 17 shows an example of display screen to be displayed when the user in the first management sector logged in.

In FIG. 17, in upper portion thereof, a message is displayed. In this message, items desired to be notified concurrently to the users in the first management sector, for example, schedule information such as date and time of meetings, are displayed. Items displayed on the left-hand side in FIG. 17, first of all, in an upper section thereof, buttons indicating names of divisions are displayed. In this case, three buttons for three divisions of "Div. X", "Div. Y" and "Div. Z" are displayed. Of these buttons, product categories related to any one of the buttons that is operated are displayed below the buttons. In the lower portion of a list of the product categories, a button of "product information to update" and a button of "product information change/list" are displayed.

The button of "product information to update" is a button to be operated when new product information is desired to be added and registered, and the button of "product information change/list" is a button to be operated when the product information already registered is desired to be changed or when the product information already registered is desired to be displayed in a list.

In FIG. 17, items displayed on the right-hand side thereof are a button of "inventory to update", a button of "change/list inventory" and a button of "generates a aggregate data". In the lower portion thereof, there are displayed 4 buttons of "add/change product category", Menus for managers, and "end".

The button of "inventory to update" is a button to be operated when a new inventory data is desired to be added and registered, the button of "change/list the inventory" is a button to be operated when the inventory data already registered is desired to be changed or when the inventory data registered is desired to be displayed in a list, and the button of "generate a aggregate data" is a button to be operated when a aggregate data is to be generated using the inventory data already registered and the like.

The button of "add/change a product category" is a button to be operated when the product category is desired to be altered (changed) such as to add a new one or delete, the button of "menu for the managers" is a button to be operated when a processing committed to the manager is desired to be executed, which will be described later, and the button of "end the system" is a button to be operated when use of this LCA system is desired to be stopped.

As described above, the user in the first management sector manages the whole data to be handled in the system. Thereby, as described above, on the left-hand side of the drawing there are displayed the buttons for handling the whole data of the whole divisions, and on the right-hand side thereof there are displayed the buttons for handling the inventory data and aggregate data.

FIG. 18 shows an example of display screen to be displayed to the user in the second management sector when the user (in this case one who belongs to division X) logged in. For the user in the second management sector, it is displayed in such manner that the user can handle only the data of the division to which the user belongs. Thereby, in the example shown in FIG. 18, only the product categories related to the division X are displayed on the left-hand side of the drawing.

Further, when the button of "change/list product information" is operated, it is controlled so that only the product information related to the division X is displayed. Still further, the three buttons displayed on the right-hand side of the drawing are the same buttons as displayed in FIG. 17 when the user who belongs to the first management sector logged in, however, when the user in the first management sector operated (on the display screen shown in FIG. 17), the whole inventory data and the whole aggregate data are displayed as an object of processing, but when the user who belongs to the second management sector operated (on the display screen shown in FIG. 18), in this instance, a limited inventory data and aggregate data relating only to the division X are displayed as an object of processing.

FIG. 19 is a diagram showing an example of display screen to be displayed to the user who belongs to the user sector in an authorization level 1 (in this instance, the user who belongs to division X). The user who belongs to the user sector is only allowed to handle the data of the division the user belongs to, and of the product categories the user is registered in advance. Thereby, as shown in FIG. 19, of the product categories related to the division X, only the product categories the user is registered in advance are displayed.

Further, all the buttons related to the inventory data and aggregate data such as "inventory to update", "change/list the inventory", and "generate aggregate data" which are displayed on the display screen (FIGS. 17, 18) for the user who belongs to the first management sector or the second management sector, are not displayed at all. This is because that as described above, the authorization level of the user who belongs to the user sector is 1 or 3 (see FIG. 6), and at this authorization levels, it is not permitted to handle the inventory data and the aggregate data, and thereby, there is no need to display such buttons for handling the inventory data.

However, for the user at the authorization level 3, who is granted a privilege to overview the aggregate data, at least the button of "change/list the inventory" or the like is displayed on the display screen for use of the user in the authorization level 3 in addition to the display screen for the user at the authorization level 1.

The display screen to be displayed after the log in and the authentication processing was executed is caused to display only the items related to the data the user who logged in can handle, thereby, such a trouble can be prevented that a person who does not have authorization executes the processing to change or delete the data inadvertently. Further, because only the items related to those that are allowed to process are displayed, the arrangement of the display screen can be simplified easy to observe, hence improving user-friendliness.

Such an instance when the user selects a desired processing from the display screens from FIGS. 17 to 19 will be described in the following. Now, back to the description of the flowchart in FIG. 14, the processing related to the user registration will be described. When the user in the second management sector recognizes existence of a user who requested approval of user registration by browsing e-mails, and logs in the LCA system, a display screen as shown in FIG. 18 is displayed on the display 71 of PC 12 at that user.

On the display screen for use of the user in the second management sector, three buttons are provided in the lower portion of the display screen. Of these three buttons, the button of "menu for managers'" is operated in step S53. This button of menu for managers' is displayed only on the display screen such as one shown in FIG. 17 for the user in the second management sector and for the user in the first management sector who has authorization to manage the user in the user sector, and another one shown in FIG. 18 for the user in the second management sector who has authorization to manage the user in the user sector.

Figure 20:
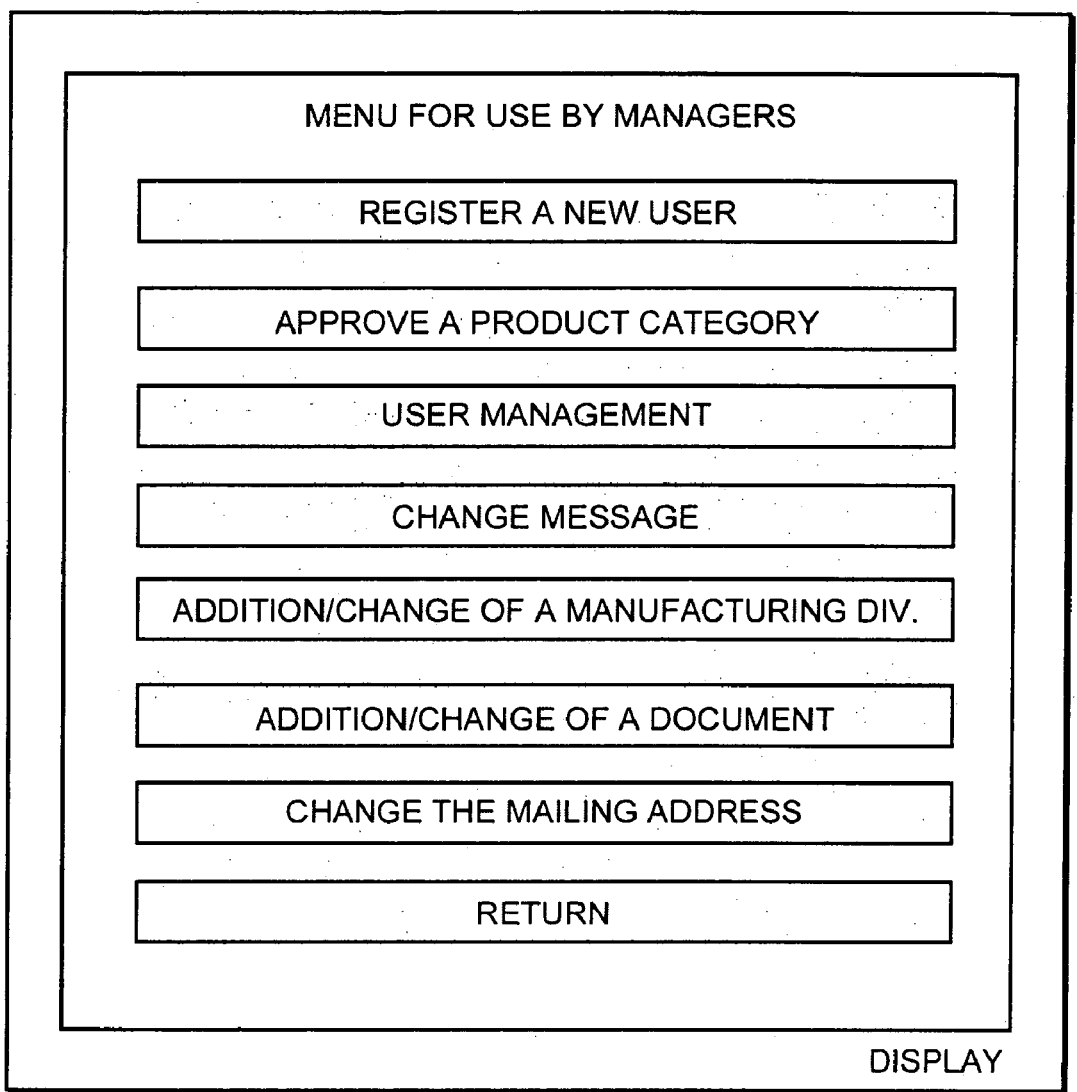
FIG. 20 is a diagram showing a display screen indicating a menu for use by managers.

When the button of "menu for managers" is operated, the display screen is switched to a display screen as shown in FIG. 20. On the menu for the managers, there are provided such buttons as "register a new user", "approve a product category", manage the user", "change the message", "add/change a manufacturing division", "add/change document name", "change the mail address", and "return". Among these buttons, when executing approval of the user registration, a button of "register a new user" is operated. When the button of "register a new user" is operated, the screen is switched to a display screen as shown in FIG. 21.

A display screen shown in FIG. 21 indicates an instance where two users request user registration. Items displayed here include "user ID", "user name", "authorization", "division to be used", "department/section the user belongs to", "product category", "mail address", "phone number", "extension number" and "date of request". Of these items, information entered or selected by the user as a temporary registration using the display screens as shown in FIG. 15 or 16 are displayed, respectively.

In the lower portion of the display screen, buttons such as "register", "delete", "search", "print" and "return" are provided. When the button of "register" or "delete" is operated, the user information which is checked in a check box provided on the left side of "user ID" is addressed to as an object of its operation. The user in the second management sector, by referring to the information displayed, checks the check box of the user who is judged eligible for registration, and operates the button of "register". Further, when the user is judged not eligible for registration, the check box for the user thus judged is checked, and then the button of "delete" is operated.

When the button of "register" is operated, its associated information is transmitted to PC 10, and in step S34, a formal registration processing is executed. The processing of the formal registration is executed by causing the user information newly approved of its user registration to be written into the master table under management of PC 10. After completion of the formal registration, the user who requested the registration is allowed to use the LCA system within an extent having been approved. Also, a function to notify the user of its permission to use via e-mail may be provided as one of the processing at the time of registration.

In FIG. 21, when a user name is clicked, information related to the product categories the user requested registration is displayed. The information related to the product category is also displayed in a box of item of "product category" in FIG. 21; however, the item displayed in this box is only a single category.

In case the user requested registration of only one category, this single category will be displayed, however, in case the user requested registration of a plurality of categories, a single representative category is displayed with a mark such as prefixed or suffixed indicating a plurality of registration being requested. When such a mark is displayed, the user who determines whether to grant the user registration or not, clicks the user name so as to be able to review the information related to product categories.

The user who judges whether or not to approve the user registration by clicking the user name and reviewing the product categories, examines if only those categories that are permitted of its use are checked. If such a category that is not permitted of its use is checked within the product categories the user checked requesting registration thereof, the user who judges whether or not to approve the user registration can remove the check therein, alternately, if use of another category that is not checked in the request of registration is desired to be permitted, the user who judges can enter a check mark in this category.

When the product categories have been checked, and the button of "register" (FIG. 21) is operated as described above, the formal registration is executed in PC 10. In FIG. 21, a button of "search" is a button to be operated when a predetermined user is desired to be searched from within the users who newly requested registration. A button of "print" is a button to be operated when a list of users who newly requested registration is desired to be printed. When a button of "return" is operated, the display screen returns to the screen shown in FIG. 20.

In the menu for use by the managers shown in FIG. 20, buttons other than the button of "register a new user will be described. A button of "approve a product category" is a button to be operated when the user, who is already registered, therefore, who has completed registration of product categories that can be used, requested a change (to add, delete or the like) in the product categories, and when a process to judge whether or not to approve the request is to be executed.

Because the information to be used in the LCA system is top secret information, also the user registration including browsing and usable product categories is restricted not to be executed without approval of the manager. Therefore, an addition to or a change in the product categories after completion of the user registration is required not to be executed without approval of the manager as well. Thereby, the addition or change in the product categories is executed by the same processing as that in the request of the user registration described above.

In the display screen, as shown in FIG. 19, for the user in the user sector, when the button of "add/change the product category" is operated, the information of its operation is transmitted to PC 10. PC 10 sends a display screen for use in selection of category likewise, for example, the processing in step S32 in the flowchart of FIG. 14. The display screen to be sent is such a display screen (not shown) on which the product category which was registered by the user (allowed to use) has a check mark.

On this display screen, when a user in the user level enters necessary items and operates a send button (not shown) (a process corresponding to the processing in step S42), a mail is sent on PC 10. Transmission of this mail is executed in the same manner as the processing in step S33 in the flowchart of FIG. 14. In the same manner as the processing in subsequent steps to follow step S33, the processing of approval of changes such as addition and the like with respect to the product categories is executed. As described above, by arranging such that also for the product categories, its change or the like must have approval of the manager, it is ensured to prevent a leak of top secret information to outside.

Back to the description of the buttons on the display screen shown in FIG. 20, the button of "management of the user" is a button to be operated when management of the users who are registered in the LCA system is desired to be executed. The management of the users is executed, for example, by prompting the users who do not use the LCA system for a predetermined period of time after registration to delete the registration (by searching such users for prompting), and by carrying out maintenance of the product categories and authorizations in accordance with transfer of the users. When the button of "management of users" is operated, the screen of display 71 is switched to a display screen as shown in FIG. 22.

A search screen shown in FIG. 22 is arranged to enable to search information under such conditions as "user ID", "user name", "authorization", "division to be used", "name of division", "where the user belongs to", product category", "last logged in date", and "last updating date". If one or more conditions out of these search conditions are set up and the button of "search" is operated, a search is executed on the basis of these conditions set up, and its result is displayed in the lower portion of the screen. In the example of FIG. 22, one data is displayed as the data that coincided with the search conditions.

When a user registration displayed as a result of this search operation is desired to be deleted, a button of "delete" provided in the lower portion of the screen is operated. In FIG. 22, although an example provided with three buttons of "delete", "print", "return" is indicated, it is not limited thereto, and other buttons may be provided as well. For example, a button of "send a mail" may be provided so as to implement a function to be able to send a mail to the user who is an object of deletion, notifying its consequence prior to deletion of the registration.

Back to the description of the display screen for use by the managers shown in FIG. 20, a button of "change the message" is a button to be operated when a message to be displayed in the upper portion of the display screen shown in FIGS. 17 to 19 is desired to be changed. A button of "add/change the manufacturing division" is operated, for example, in FIG. 23 to be described later, when a select item to be displayed in a pull-down menu from an item of "division" in an item of "subject" is desired to be added or changed.

A button of "add/change a document name" is operated on a display screen to be described later, for example, in FIG. 24, when a select item to be displayed in a pull-down menu from an item of "document type" in a box of "citation" is desired to be added or changed. A button of "change a "mailing address" is a button to be operated when a mailing address of the mail to be transmitted in step S33 in the flowchart of FIG. 14 is desired to be changed. A button of "return" is a button to be operated when returning to a previous display screen (for example, the display screen shown in FIG. 17).

A processing in step S3 in the flowchart of FIG. 12 will be now described. FIGS. 23 and 24 are diagrams showing examples of display screens to be displayed on the display 71 as a result that the user in the first management sector logs in, and in a status of the display screen shown in FIG. 17 being on display, when the user, who desires to generate an inventory data as a desired processing, operates the button of "inventory to update". The display screen shown in FIG. 23 and the display screen shown in FIG. 24 are a screen that constitutes one frame of display, and a desired portion thereof can be viewed by scrolling or the like.

The display screen shown in FIG. 23 is a header portion common to the display screen for entering inventory data, and is a portion in which the information as to the user who inputs data, and the information as to the product to be entered are displayed. In the header portion, at first, "data management division", "last updating date", and "information of data generator" are displayed, however, these pieces of information are information that is updated without troubling the user at the time when this display screen is displayed. The reason these pieces of information (information related to the user who logged in) that are updated are displayed is because that the result of authentication carried out at the time of log-in is reflected.

Use or non-use of aggregation (a flag to use aggregate data) is enabled to be selectable, and when the use of aggregation is selected, it is displayed in a pull-down in other inventory data to be selectable, and if its use is selected, the inventory data will be reflected on a subsequent aggregation processing, and if its non-use is selected, non-display is caused in the pull-down of other inventory data, and the inventory data is not reflected on the subsequent aggregation processing.

In a stage of a data division, a life cycle stage of the product information is enabled to be selected in a menu of pull-down format. Now, this stage will be described by referring to FIG. 25. As its life cycle stages, there are set up seven stages of "structure information", "manufacture information", "maintenance", "the other than manufacture", "use/standby", "transport", and "disposal/recycle".

In the stage of "structure information", structures of materials and parts are inputted. In the stage of "manufacture information", product manufacturing information is inputted. In the stage of "maintenance", information of parts in need of replacement due to deterioration with an elapse of time of operation is inputted. In the stage of "the other than manufacture", information of a packaging substrate, yield of the product and the like is inputted.

In the stage of "in-use/at-standby", information of the product in a status of use, for example, electric power consumption at use or the like, and that while at standby are inputted. In the stage of "transport", information of the product during transportation (for example, from a factory to a sales shop, and from the sales shop to a dumping site or the like) is inputted. In the stage of "disposal/recycle", information of the product while it is disposed and/or recycled is inputted.

Although the present embodiment will be described by way of example of the above-mentioned seven stages, however, it is not limited thereto, and there may be set up more stages than these seven stages.

Back to the description of the example of display in the header portion shown in FIG. 23, the example of display shown in FIG. 23 indicates an instance where "structure information" is selected in a stage of the data division. A "product category" displayed immediately below the data division is a column for selecting a related product category when entering the product information, and is enabled to choose in a menu of a pull-down format. Likewise, "application category" enables to choose an application category by a menu in a pull-down format.

"Subject" is a column for entering a name of the product and the like which is an object of processing. A "name" in the "subject" column is a block for entering a name (title) of the product information to be inputted. A "conventional name" and "chemical formula" are provided for limiting the product that may have a different name other than the name which is conventionally used in the production site, or entered in the column of "name", or to differentiate a product that uses different materials though their names are alike or the same. "Division (business sector)", "production site", and "destination of product" are provided for limiting the place where the subject matter is produced or the like.

"Quantity" is a block to enter a value depending on a "unit", and the user inputs a desired value on the basis of a unit (the user has chosen) displayed in the box of the unit. In the example of display shown in FIG. 23, it indicates an inventory data of electric power at 1 kWh.

The user, by choosing a unit, in the unit the user desires, can input a quantity, however, the inventory data 21 or aggregate data 22 sometimes must refer to other data as described above, and if these data are managed in different units, at the time when referring to these data, a processing to convert the units is required. Thereby, on the user side, even if the user can input a quantity using a desired unit, when processing the data thus inputted, the user will have to manage (process) the data by coordinating the units, or by converting the units appropriately as required.

Thereby, when managing the data, they will be managed in unified units, for example, weighing gauge in kg, volumetric system in m3, area gauge in m2, length gauge in m, calorific quantity in MJ. Using these units as a basic unit, a variable processing may be executed as required.

"Distribution percentage" is inputted depending on a product and as required. "Main class" and "subclass" are boxes-to choose from within a menu what class the name entered in the box of "name" belongs to, and in the example of display shown in FIG. 23, it is indicated that the main class of electric power is energy, and subclass thereof is electric power.

An example of display shown in FIG. 24 is a portion depending on the information of the header portion shown in FIG. 23. In a column of "input", in this instance, data of materials and energy to be inputted in order to generate 1 kWh of electricity is entered, and in a column of "output", data of carbon dioxide and the like to be outputted other than the electricity as a result of generation of 1 kWh of electricity is entered. In a column of "the others", additional data such as a calorific value and the like to be inputted and outputted in actual processing other than the materials are entered. By entering these data such as calorific values and the like, in aggregation processing, a total calorific value can be calculated.

In the columns of "input", "output" and "the others", "items of class", "subclass", "name", "mean value", "unit", "upper limit", "lower limit", "citation" and "remarks" are provided, respectively. In a block of "class", a main class is selected, and depending on this selected main class, an option of "subclass" is determined, then this option is displayed in a pull-down menu format.

"Name." is also arranged to be selected from an option menu to be displayed in a pull-down format, and its option menu to be displayed depends on "class" and/or "subclass". "Mean value" is inputted of its value by the user. "Unit" is selected an appropriate unit fitted to "mean value" entered. "Upper limit", "lower limit" and "remarks" are entered as required.

In a column of "citation", a number (No.) corresponding to a document cited as a reference described in the block of the citation in the lowest portion of the display screen shown in FIG. 24 is entered. In this instance, only one document is described in "citation" block, and No. 1 is allocated to this document, thereby, "1" is described in the block of "citation".

The reason for the provision of "citation" and "data quality, et al." is because that as the life cycle assessment (LCA) is a value calculated under given conditions, these conditions need to be clarified. Thereby, by providing the columns of "data quality, et al." and "citation", it is enabled to record these data therein indicating in detail under what conditions, from where and when they are obtained.

In the next, a display screen for use by the user in the second management sector when producing inventory data is shown in FIGS. 26 and 27. The display screen as shown in FIGS. 26 and 27 is displayed when the button of "inventory to update" is operated from the display screen for use of the user in the second management sector shown in FIG. 18. We assume here that the division that uses the display screen for generating the inventory data shown in FIGS. 26 and 27 is a division that manages the production of television receivers. Items to be displayed in a header portion shown in FIG. 26 are the same as those in the header portion shown in FIG. 23.

However, in the header portion shown in FIG. 26, because it is the division that manages production of television receivers, "TV" in a box of "data management division", "TV" in a box of "product category", and "mechanical" in a box of "application category are displayed (selected), respectively. Further, "remote control" in a box of "name" in a column of "subject", "raw material" in a box of "main class", and "composite part" in a box of "subclass" are displayed, respectively.

In a portion shown in FIG. 27, items to be displayed therein are the same as those in the portion shown in FIG. 24. However, in the portion shown in FIG. 27, information depending on the information in the header portion of FIG. 26 is displayed. Options to be displayed when entering items such as "input", "output" and "the others" in the portion shown in FIG. 27 include, as an object of selection, in this instance, both of the inventory data under management of the first management sector and an inventory data under management of a division in the second management sector, in this case, the division that manufactures television receivers.

Subsequently, the aggregate data will be described. When the inventory data is updated by the user in the first management sector or by the user in the second management sector, a set of aggregate data is generated. As for the aggregate data, a set of aggregate data for the inventory data with a flag indicating "use" of the aggregate data attached is generated for each management division (per each division of the second management sector), and each set of the aggregate data thus generated is managed by a version number assigned thereto.

As a respective set of the aggregate data is designated of its version number, the user in the user sector can decide an appropriate set of aggregate data to be used in the calculation of the environmental load. FIGS. 28 and 29 show examples of displays of aggregate data generated. Items of display in the header portion shown in FIG. 28 are the same items of display as those in the header portion shown in FIG. 23 or 26.

In the header portion shown in FIG. 28, because it is an example of displays of aggregate data, "aggregation" is indicated in the "inventory/aggregation" box. Further, in the box of "aggregate version", "TV-0001" and a version number are indicated. This version number, upon execution of a processing such as updating, is changed, for example, to "TV-0002".

A display portion shown in FIG. 29 is a portion depending on the information of the header portion shown in FIG. 28, and in this instance, a aggregate data on the remote controller of the television receivers as the structure information is displayed.

The aggregate data, upon its generation, without releasing (holding back disclosure to the user in the user sector), maybe used as a test version as well. The aggregate data generated is used at first, for example, as the test version to be used only within a division involved in the manufacture of the television receivers, then, is disclosed to the user sector at an appropriate timing or the like. This can be managed on the basis of the aggregate version number.

Calculation of the environmental load using the aggregate data will be described. As to the environmental load, a program is provided for each stage of the life cycle, and by allowing the user to input data in accordance with a predetermined display screen so that the processing is executed in accordance with the program, the calculation proceeds. A program for calculating the environmental load calculates an environmental load mainly by executing three processing. Firstly, a aggregate data necessary for calculation is selected from the database, secondly, a numerical value for each item of the environmental load is calculated from the quantities inputted as the product information, and thirdly, a numerical value summed up for each item of the environmental load is displayed on an LCA result display screen.

Selection of the aggregate data is executed by searching and extracting a flag attached in advance to the inventory data. In the following, a series of processing from inputting of the product information to calculation of the environmental load will be described. Here, the description will be made by way of example assuming that the user in the user level involved in the manufacture of television receivers carries out the processing.

In the present embodiment, a display screen for inputting product information is comprised of seven display screens of "basic information", "structure information" "manufacture information", "the other than manufacture" "in-use/at-standby", "transportation", and "disposal/recycle".

As described hereinabove, as a preliminary procedure prior to browsing such display screens for inputting the product information, the user carries out a processing of log-in, as a result, because an authorization level and a division the user belongs to are judged, a display screen on which only related information determined on the basis of this judgment is displayed. This can prevent a leak of information to the users in other management divisions as well as improve ease-to-use capability by holding back from providing useless information to the users observing the display screens.

FIG. 30 is a display screen for inputting data related to the "basic information". Using this display screen for the basic information, basic information such as a product name and the like is inputted. "Registration number" is to be attached automatically, and its number uses a serial number attached to a product category name. In the boxes of "entered by", "person authorized to change" and "approved by" are entered (displayed) a name, employee number and the like. The person authorized to change and an approver are users involved in the processing described above with reference to FIGS. 7 and 8.

"Assessment timing" is a box to enter a period of time the assessment is carried out. In the case of a new entry, "assessment timing" may be indicated as "a time when an object is set". To describe the assessment timing further, in the present embodiment, even for the same product, plural LCA assessments at a different timing are enabled. This is because that in a life span of a product from its development, a mass production, to a model change post the mass production, environmental assessments at respective timing is required.

FIG. 31 is a diagram showing a display screen for inputting data related to "structure information". On this display screen, "materials/parts", namely, aggregate data is designated, and a "quantity of use" is inputted. Using the designated aggregate data, and in accordance with the quantity of use inputted, an environmental load volume is calculated.

In order to prevent for the option menu display from becoming enormous (to prevent for the items displayed in a pull-down format from becoming enormous), the aggregate data is sorted into tables of "application category" and "material/parts category in advance. When the user. (design engineer or the like) selects (decides) the "application category and the "material/parts category", only names of aggregate data sorted out from these categories are displayed as options in a column of "material/part".

In the column of "application", a design engineer can input data directly, and attach a name easy to identify by the engineer when displaying an LCA result. Further, on the input display screen of the "structure information", there are provided blocks for a measured value of "gross weight", a summed up value of "gross weight", and "gross weight reduction ratio". In these blocks, there are provided columns for "target value", "current", "previous", and "comments", respectively.

For the measured value of the gross weight, a value actually measured is inputted, and for the summed up value of the gross weight, a value added up on data, on the basis of the data inputted is displayed. The gross weight reduction ratio is a value in percentage obtained by dividing the measured value of the gross weight by a target value.

Figure 32:
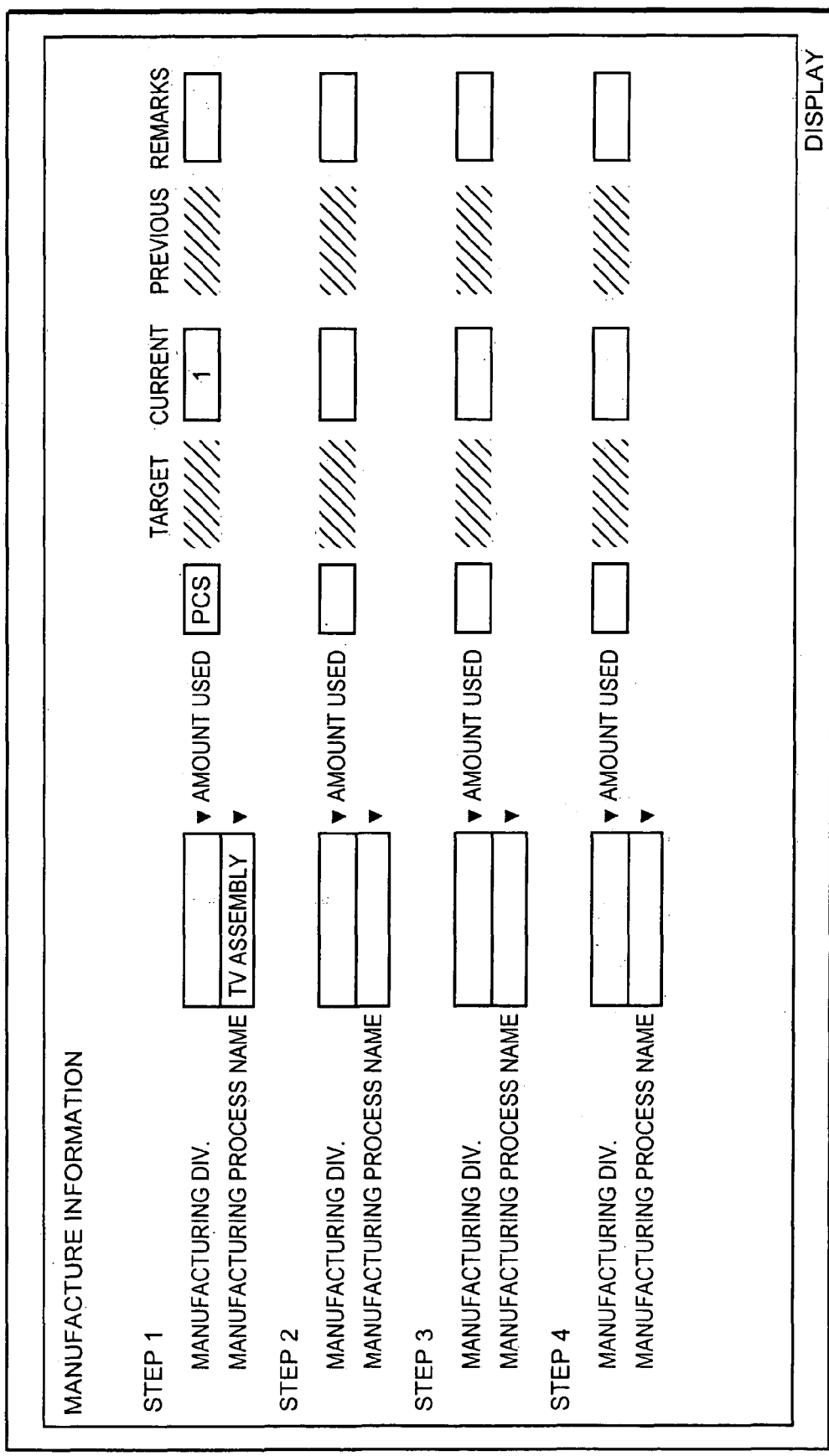
FIG. 32 is a diagram showing an input screen for manufacturing information.

FIG. 32 is a diagram showing a display screen for inputting "manufacture information". On this display screen, "manufacturing division" and "manufacturing process name" are selected, and a quantity to use" is inputted. Using a aggregate data instructed, a quantity of the environmental load corresponding to the inputted quantity of use is calculated. Further, by sorting the aggregate data on a table of a business operator in advance, only the names of sorted out aggregate data are displayed in a column of "manufacturing process name" corresponding to a "manufacturing division name" selected by the design engineer.

Figure 33:
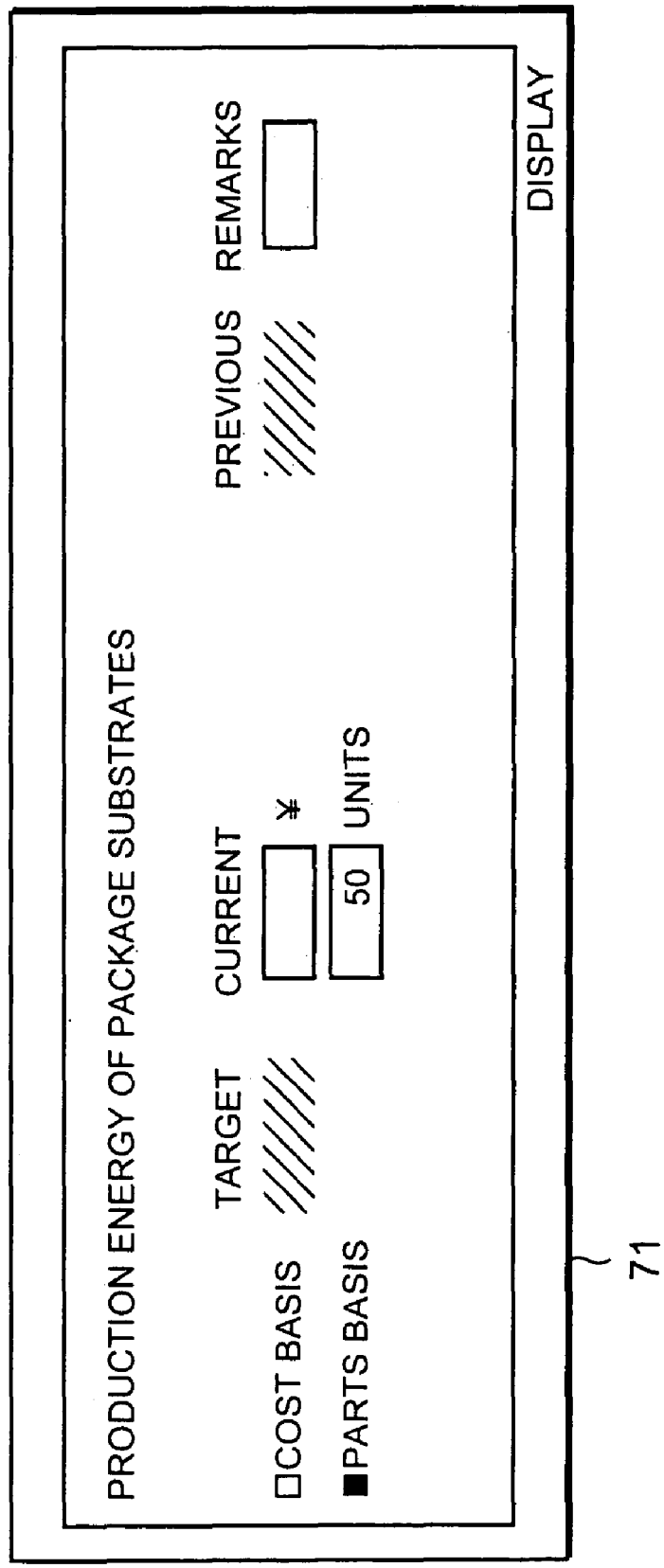
FIG. 33 is a diagram showing an input screen for manufacture and others.

FIG. 33 is a diagram showing a display screen for inputting information related to "the other than manufacture". The "the other than manufacture" is provided to supplement data that cannot be calculated in the "structure information" described with reference to FIG. 31 or the "manufacture information" described with reference to FIG. 32. An example of display screen shown in FIG. 32 indicates an example of approximating an environmental load volume at the time of manufacturing packaging substrates. On a packaging substrate, ICs (Integrated Circuits) and devices that have large energy consumption at the time of manufacture thereof are mounted.

In the "structure information", although an environmental load volume resulting from its materials (such as silicon, copper and the like) is calculated, the other environmental load volume due to energy consumption at the time of manufacturing the same is not taken into account. Thereby, on the display screen of "the other than manufacture", an environmental load volume due to energy consumption at manufacturing is approximated from a statistic data, and supplemented.

A method of approximation in this instance can be selected from a "cost basis" and a "part basis". When the cost basis is selected, aggregate data for a cost basis calculation are specified, and its environmental load value is calculated from a total cost of the packaging substrates inputted.

When the part basis is selected, a quantity of parts is required to be inputted for each part displayed. Then, using aggregate data of each part, an environmental load volume corresponding to the values inputted is calculated. Here, by presetting parts to be displayed for each product category, user-friendliness can be enhanced.

By the way, the name of part to be displayed at a place of the part basis (IC in this instance in FIG. 33) depends on the product information (product category), and transistor, resistance and the like other than IC may also be displayed. Further, the name of part to be displayed at the place of the part basis is not limited to one, and a plurality of names may be displayed. A box to input a quantity is provided corresponding to the name of part displayed.

FIG. 34 is a diagram showing a display screen for inputting information related to "transportation". As described with reference to FIG. 30, because "production site" and "destination of product" are inputted at the time of inputting "basic information", from this information, aggregate data are specified. Thereby, the user is only required to input a volume of the product. A basic unit of the inventory data is, for example, data per volume of the product.

Figure 35:
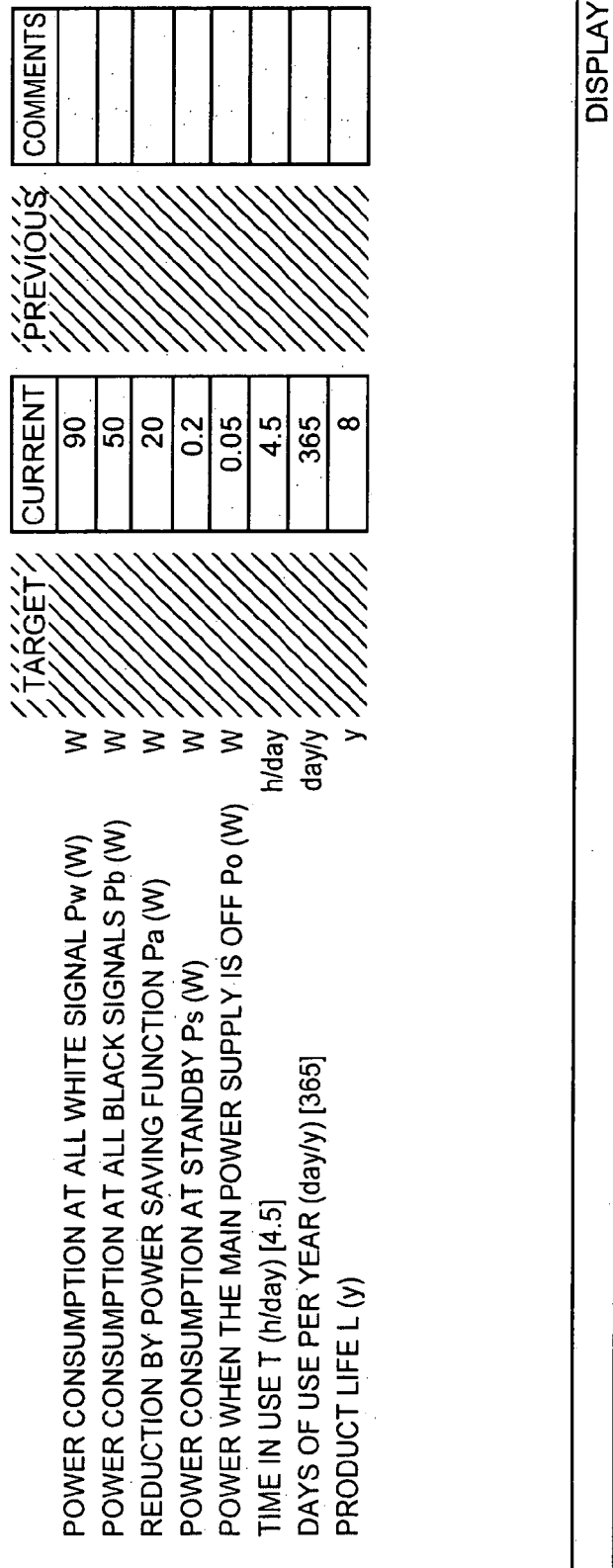
FIG. 35 is a diagram showing an input screen for data in use/at standby.

FIG. 35 is a diagram showing a display screen for inputting information related to "in use/in standby". As the information of "in use/standby", first of all, a power source must be specified. In an example of display screen shown in FIG. 35, an instance where "television (Japan)" is selected is indicated. Corresponding to a power supply construction selected, a value inputting column is displayed. The user (design engineer) is required only to input a value in accordance with the value inputting column displayed. An electric power is calculated from the value inputted, and an environmental load volume corresponding to this electric power is calculated.

Figure 36:
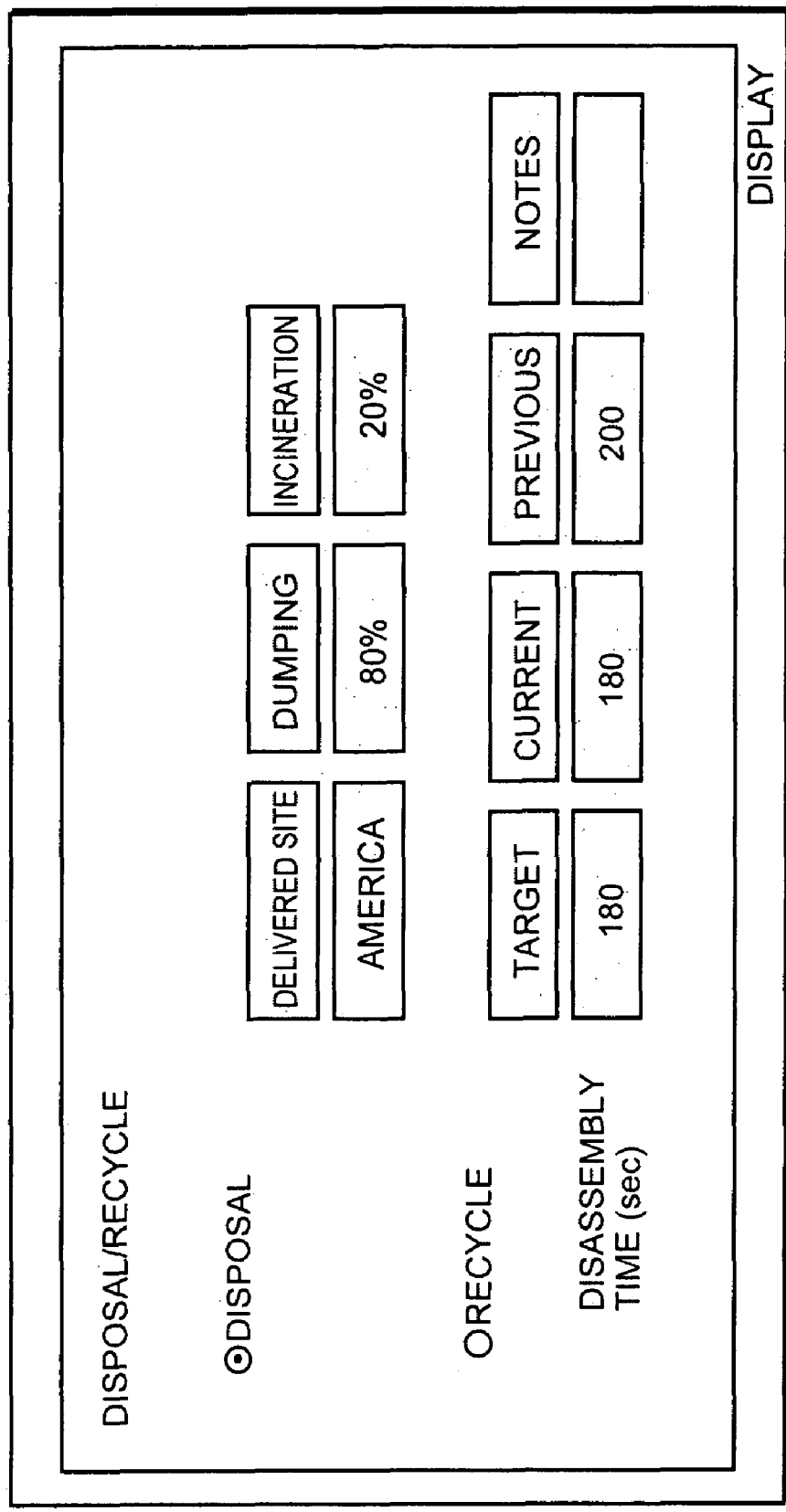
FIG. 36 is a diagram showing an input screen for data of disposal/recycling.

FIG. 36 is a diagram showing a display screen for inputting information related to the "disposal/recycle". The design engineer can choose disposal or recycle. In accordance with this selection, its environmental load volume is programmed for calculation. In case the disposal is selected, its environmental load volume is calculated by the following equation.

Environmental load volume=load quantity (volume) due to transportation of wastes+load quantity due to incineration+load quantity by dumping.

An environmental load volume due to transportation of wastes is calculated from a product weight calculated with "structure information", and using aggregate data of wastes transportation. The environmental load volumes due to incineration and dumping are obtained from "destination of products" inputted at "basic information", and by obtaining a weight ratio of incineration and dumping which are preset by referring to a look-up table prepared in advance. For example, if the "destination of products" is Japan, 80% by incineration and 20% by dumping are assumed.

From the "structure information", using the material/part category, a gross weight of the combustible (for example, paper, woods and the like) and a gross weight of the others (non-combustible materials such as metals and the like) are summed up. Assuming that a weight portion of the total of the combustible weight obtained by multiplying with the incineration ratio is to be incinerated, using this aggregate data of incineration, its environmental load is calculated. Assuming the other weight portion to be allocated to dumping, the environmental load is calculated using aggregate data of the dumping.

If recycle is selected, the environmental load volume is calculated by the following equation.

Environmental load volume=load quantity due to transportation of recycle article+load quantity due to recycle processing The environmental load volume due to transportation of recycle articles is calculated from the product weight inputted on the display screen of "structure information", using aggregate data of the recycle transportation. At the time of recycle processing, from the "structure information", respective weights of recycle weights (for example, of glass, metals and the like) are summed up. Using these weights and the aggregate data of respective recycle processing, the environmental load volume is calculated.

Further, as for the recycle, an environmental load volume comparison value with a virgin material (hereinafter referred to as a gain) is displayed. Here, using aggregate data for calculating a gain of the virgin material prepared in advance, a difference between the aggregate data of recycle processing calculated earlier and the aggregate data for calculating the gain is calculated and displayed.

By inputting respective data on the display screens described hereinabove by referring to FIGS. 30–36, a final environmental load volume is calculated (a result of LCA is displayed). FIGS. 37 to 40 are diagrams showing LCA result display screens.

Figure 37:
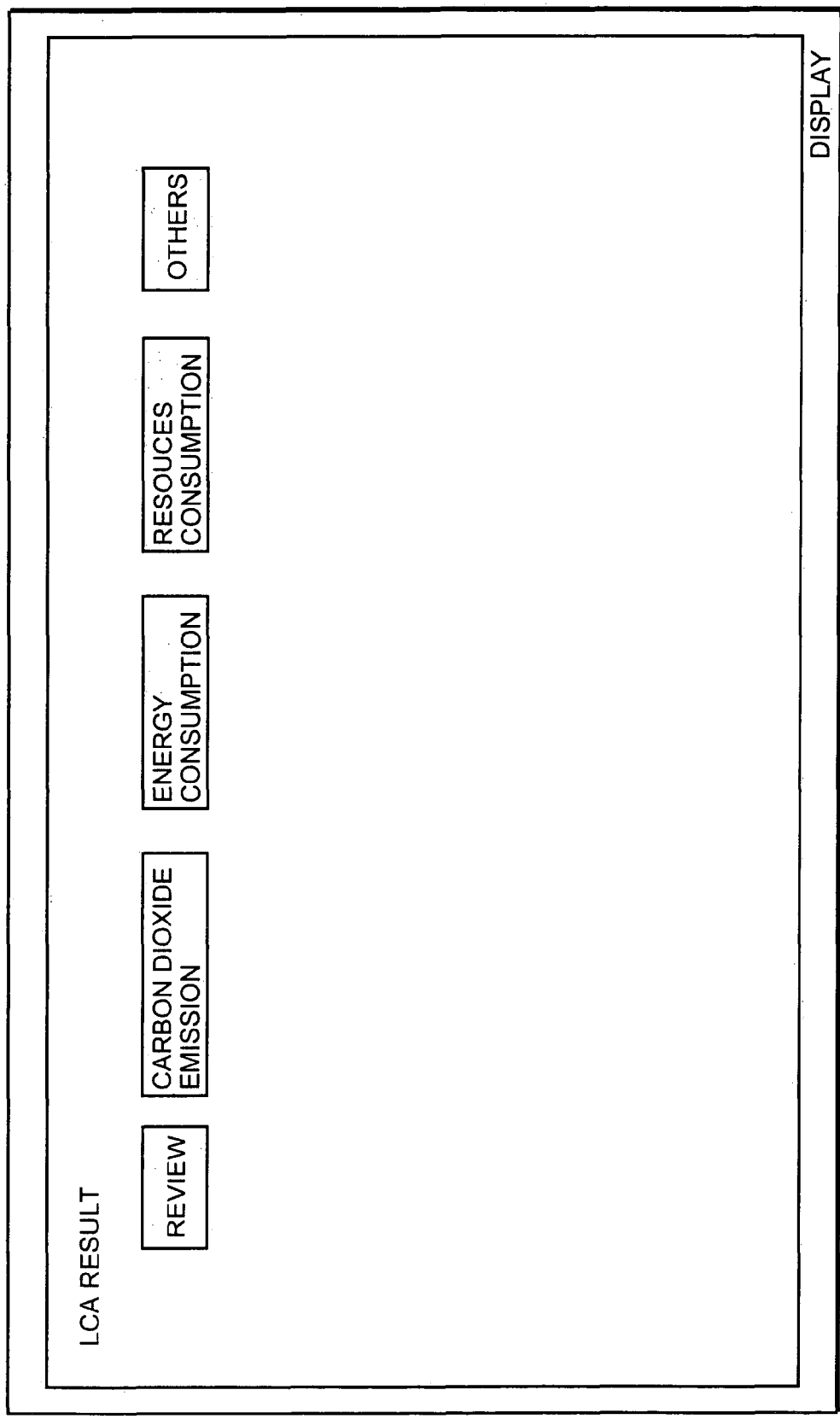
FIG. 37 is a diagram showing an LCA result display screen.

It is taken into account so that the LCA result display screen is enabled to sum up (aggregate) not only a gross amount of a respective environmental load item, but also to aggregate in a large range as well as in a minute range thereof. Firstly, as shown in FIG. 37, items that can be displayed as a result of LCA are displayed. In an example shown in FIG. 37, items such as summary", "carbon dioxide emission", "energy consumption", "resources consumption" and "the others" are indicated as the items that can be displayed.

Figure 38:
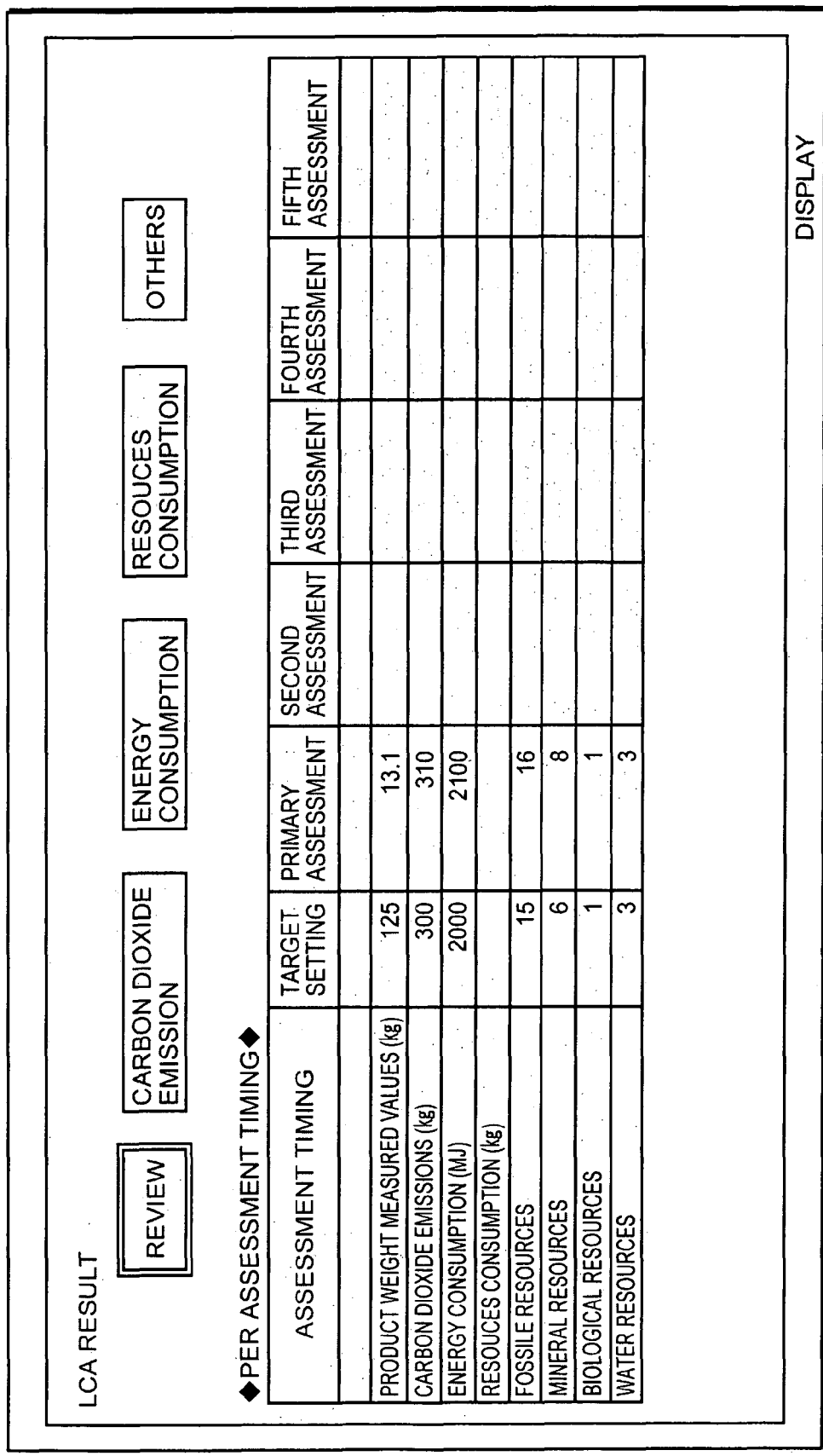
FIG. 38 is a diagram showing an LCA result display screen.

When the user selects the item of "summary" on the display screen as shown in FIG. 37, the screen is switched to a display screen as shown in FIG. 38. On the screen of the summary, a total amount of a respective environmental load item per respective assessment timing is displayed.

Figure 39:
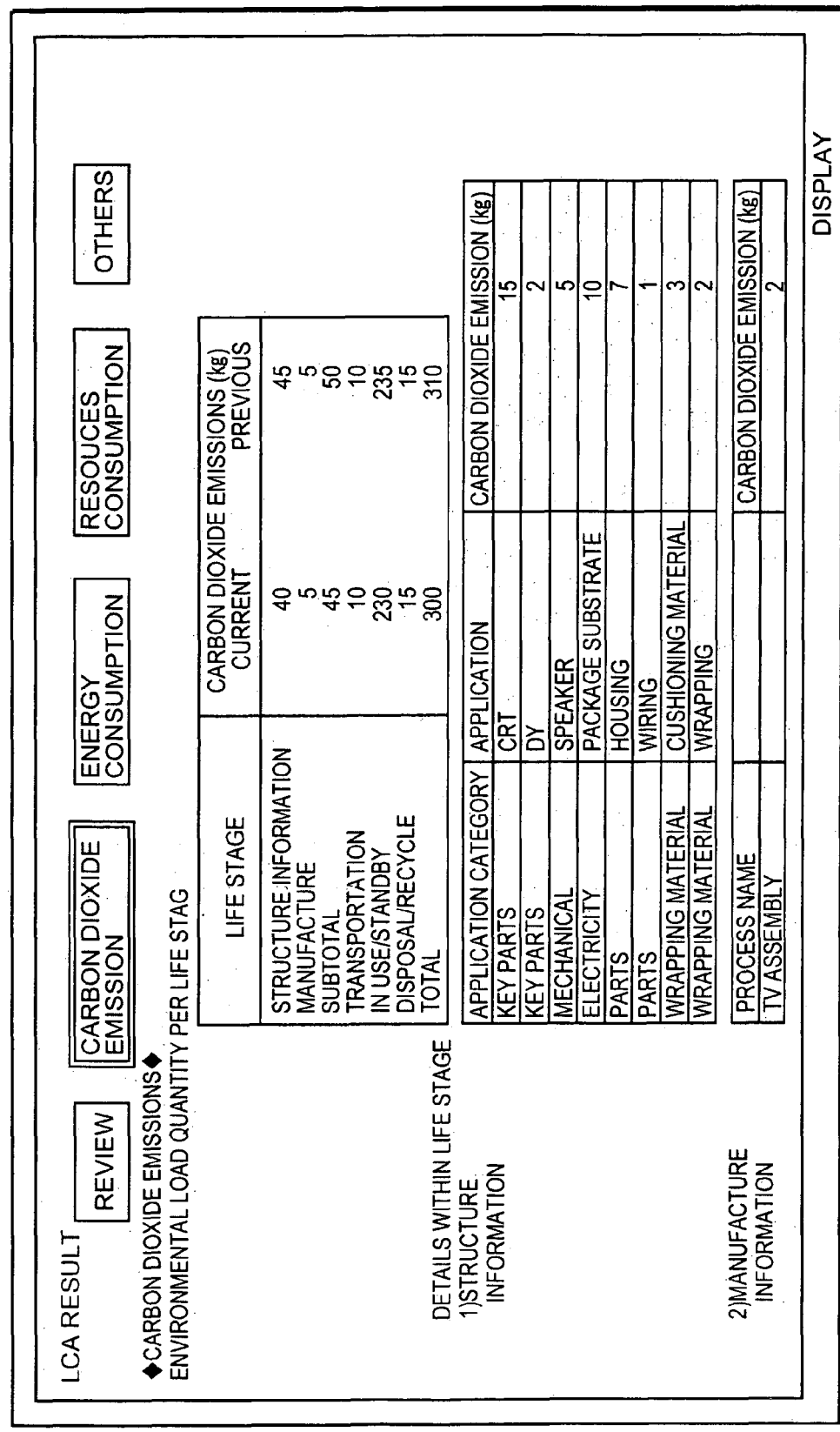
FIG. 39 is a diagram showing an LCA result display screen.

When the item of "carbon dioxide emission" is selected out of respective environmental load items such as "carbon dioxide emission", "energy consumption", "resources consumption" and the like, the screen is switched to a display screen as shown in FIG. 39. A display screen to be displayed according to a respective environmental load item (a screen of the carbon dioxide emission in an example shown in FIG. 39) is further divided into two portions of display one for respective life cycle stages and another for detailed display within each life cycle stage.

By the way, the example of display shown in FIG. 39 displays only a portion thereof, in such a case, the user can observe the other portion not being displayed by scrolling the screen or the like.

Further, it is also possible to calculate and display information useful to the environmental assessment other than the environmental load, and when the item of "the others" is selected, the screen is switched to a display screen as shown in FIG. 40, so as to calculate and display "amount of recycle materials used", "amount of recyclable materials" and "amount of wastes".

In the above-mentioned embodiment, the description is made by way of example of a case where the user involved in the manufacture of television receivers carries out processing, in the next, the description will be made by way of example of a case where the user is in the user sector and is involved in the manufacture of MD (Mini Disc: Trade Name). A product information input screen for allowing a design engineer in MD development division to input product information is comprised of 6 display screens of "basic information", "structure information", "manufacture information", "the other than manufacture", "transport" and "disposal/recycle".

In the present embodiment, the life cycle stage corresponding to the product category displays only a necessary stage. The input screen of the "in-use/at-standby" displayed as the product information input screen in the television receivers is not displayed as it is not necessary in the MD (MD itself does not consume energy in a status of in-use or at-standby, thereby its display is not necessary).

The "basic information", "manufacture information", "transport", "disposal/recycle" displayed on the product information input display screen to be used by the user involved in the manufacture of the MD are the same in principle with the display screen the user who manages the above-mentioned television receivers refers to, thereby, the description thereof is omitted.

FIG. 41 is a diagram showing a display screen for inputting "structure information" within the product information display screen the user involved in the manufacture of MD refers to. A name of aggregate data to be displayed in a column of "materials/parts" can be handled by 3 kinds of names of "name", "conventional name" and "chemical formula". This is because that a material such as an organic substance may be called by a plurality of names, thereby in order to prevent for the design engineer to error in his/her selection" they are described in juxtaposition. It is further arranged such that the use can choose one of these three types to be displayed in preference thereby enhancing ease-to-use by the user.

Further, by provision of a host and subordinate relation between product categories, it is enabled to call up product information as a key part directly. As shown in FIG. 41, when inputting the structure information as MD, by selecting "key parts" in "application category", and selecting the product information of MD recording medium from the names of products displayed, it is enabled to call up the product information having been entered as an MD recording medium separately as linked therewith. By arranging as described above, it is enabled for those parts that are manufactured at different sites to be calculated of their total environmental load volume as the whole product, without efforts to acquire the product information and re-enter the same.

Figure 42:
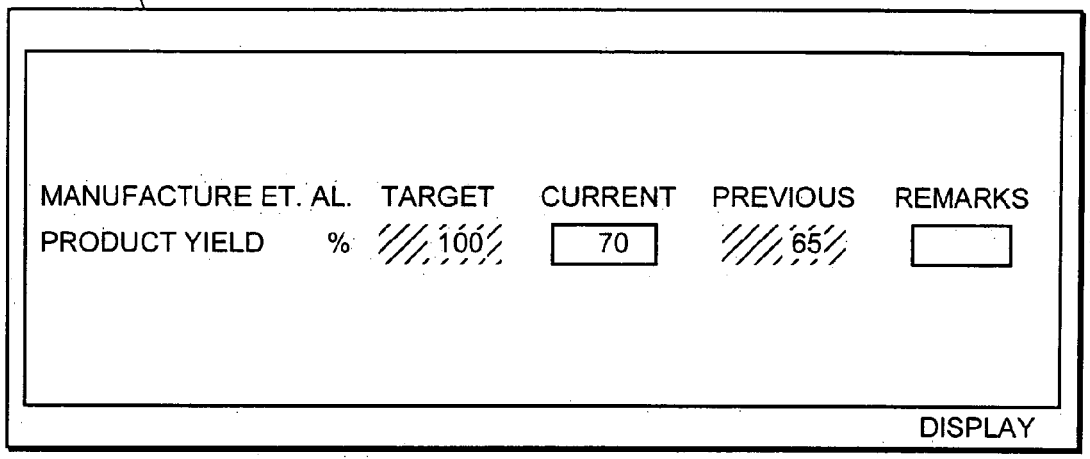
FIG. 42 is a diagram showing an input screen for manufacture and others.

FIG. 42 is a diagram showing a display screen for inputting information related to the "the other than manufacture" within the product information input display screen which the user involved in the manufacture of MD refers to "The other than manufacture" complements items that cannot be calculated only with the "structure information" and the "manufacture information". Here, calculation of the environmental load volume taking into account a product yield will be described. Among the products, there are such ones that have a low product yield, and their actual environmental load volume is larger than that of the materials used in actual products and energy consumed. By inputting product yields as to these products, correction of calculated results of the "structure information" and "manufacture information" is carried out.

A calculation result obtained from "structure information" and "product information" by inputting the product yield into the input column thereof is divided by the product yield. Further, amount of wastes is divided by disposed products and is displayed on the LCA result.

The product information generated as described above can be searched via a list, search display screen (not shown). After displaying a list on the display screen and specifying a desired data, by operating buttons of a display, alter (change), copy, change of assessment timing and the like, the following processing is allowed to be executed.

By specifying desired product information on the list, search display screen, and depressing an assessment timing up-button, it is enabled to generate product information of the same product having different assessment timing. As for the registration number, by providing an interlocking mechanism to interlock, for example, the last two digits of number thereof with an assessment period of time, a differentiation from update product information or the like can be ensured. Further, product information and LCA result immediately preceding thereto are displayed along new data for facilitating comparison with each other.

To supplement the description of the product category described above, because all of the respective inventory data, aggregate data and product information are managed under each product category, it becomes possible to construct a system that does not depend on the organization. Further, because all the users in the system are registered in an authorization echelon according to each product category, operation within the organization such as of generation of data, change and deletion thereof, request of product data, registration thereof is enabled.

As hereinabove described, if the LCA is calculated according to the present invention, by provision of the authorization levels, inadvertent processing such as erroneous editing or deletion of the inventory data and aggregate data can be prevented thereby facilitating management as well as improving the reliability of the data. Further, because the display screen to be displayed to the user changes depending on the authorization level, a screen arrangement is limited absolutely to the items that are indispensable to the user, thereby improving the user-friendliness.

By application of the present invention as described hereinabove, within the organization handling a plurality of products, by checking environmental data of the products within daily activities quickly while constantly checking conditions and reliability of data, the environmental load assessment can be performed. Still further, by application of the present invention, not only a highly reliable LCA data can be provided quickly, but also it can be operated speedily even among complicated and interrelated product manufacturing divisions within the organization.

In the embodiment described hereinabove, in the case the information processing system shown in FIG. 1 (LCA system) exists in one organization, it is described that the head office 1 is the division that has authorization to manage the whole system, and the branches 2-1 to 2-N are divisions different from the head office 1, i.e., respective factories or the like. Further, in the case the LCA system is comprised of a plurality of organizations, it is described that the head office 1 corresponds to company A, and branches 2-1 to 2-N correspond to companies B . . . , et al., different from the company A.

Further, when calculating the environmental load volume according to the embodiment described above, it is described to be calculated using the inventory data, the aggregate data and the LCA result, however, in the stage of calculation (generation) of these data (result) itself, various data pertaining to various materials and parts are used for generation thereof. For example, the inventory data, as described above, is the data which indicates the relation between the input of individual materials/parts and the output thereof, therefore, the data related to individual materials and parts are required at the stage of generating the inventory data.

The work to collect and process these data related to the individual materials and parts by the users in the first management sector and/or the second management sector is a time-consuming task because it is versatile and requires enormous processing. Further, actually, it is not that all of the materials and parts are manufactured and managed within one organization, but generally, many of them are procured from external organizations. Acquisition and processing of data related to these materials and parts procured from the external organizations will be a substantial work.

Therefore, the data related to the individual materials and parts (hereinafter referred to only as parts representing them all, because basically any of them will do as an object of handling) will be managed in cooperation with external organizations (makers).

Here, a processing at the time of purchasing a predetermined part will be described. In case the part is manufactured in an external organization (supplier side), it is general that a plurality of data exchange related to the part takes place between this supplier side and a purchaser side that purchases the part.

As procedures to be executed for the purchase of the parts, there are, for example, whether or not the introduction of the parts is completed, documents describing a basic specification, dimensional data, performance and others are prepared, handed-over, and verified. Such data exchange between the supplier and the purchaser is done mostly in documents, and further, such exchange in documents takes place several times, still further, there is a problem that a time and effort required for such single exchange is substantial.

Further, there may arise such a problem that, in the case where the purchaser side manufactures a plurality of products, and these products are processed by different persons respectively in charge, if the same kind of parts are to be used in different products, these different persons respectively in charge of the different products are likely to request the supplier to manufacture the same kind of parts independently, thereby causing inefficiency.

Therefore, by constructing a common database that can be used both by the supplier side and the purchaser side, time spent in processing of work on the supplier side and the purchaser side will be shortened, thereby enabling efficient processing to be achieved. Such a method will be described in the following.

Figure 43:
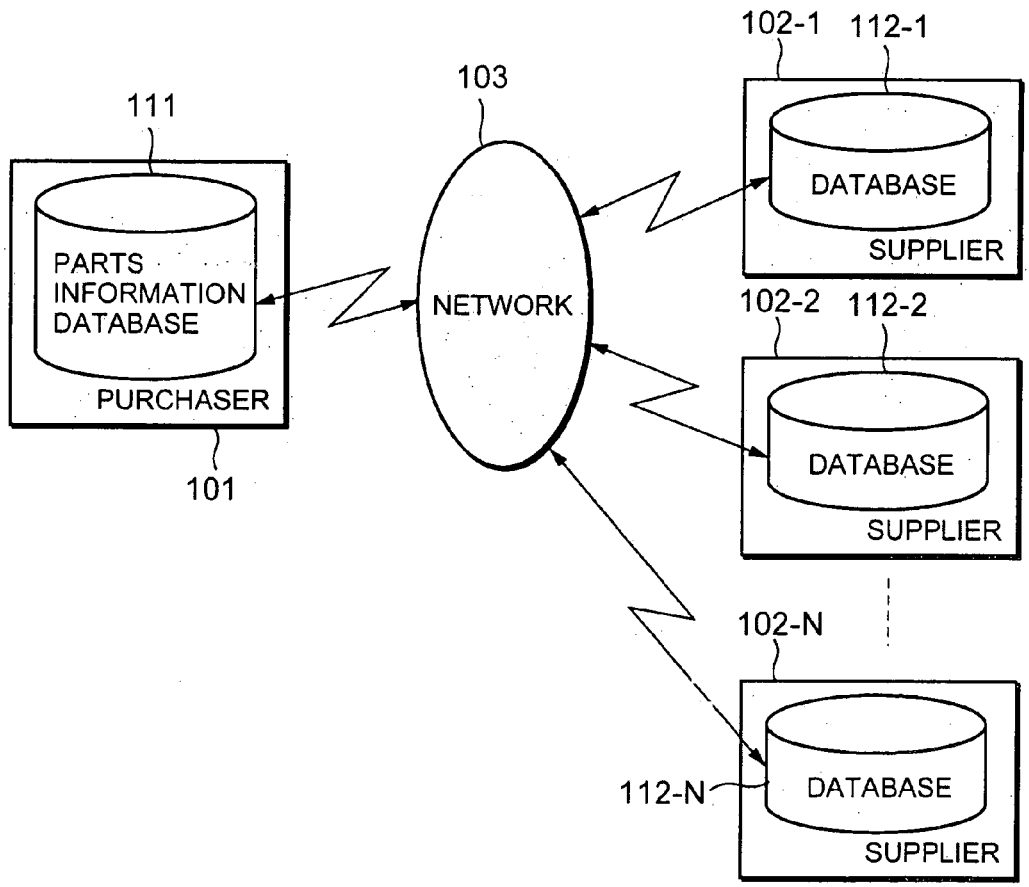
FIG. 43 is a diagram showing a configuration of an information processing system according to another embodiment of the invention.

FIG. 43 is a diagram showing a configuration of an information processing system according to one embodiment of the invention. A purchaser 101 who purchases the parts and a supplier 102-1 to 102-N who supplies the parts are connected via a network 103 so as to be able to exchange data with each other.

The purchaser 101 is provided with a parts information database 111 storing information related to various parts. The supplier 102-1 to 102-N is also provided with databases 112-1 to 112-N storing information related to the parts they supply (they deal with).

In the following description, unless the supplier 102-1 to 102-N and the database 112-1 to 112-N need to be differentiated, they will be referred to simply as supplier 102, and database 112. Other apparatuses will be described likewise.

In the case where the system shown in FIG. 1 is comprised within one organization, the purchaser 101 corresponds to the first management sector (user therein) in the head office 1, and the parts information database 111 can be stored in the storage device 48 (FIG. 11) of PC 10. Further, the purchaser (supplier?) 102 corresponds to an external organization (maker who manufactures the parts) not shown in FIG. 1, and database 112 corresponds to a storage device in a computer each organization has.

In the case the system shown in FIG. 1 is comprised of a plurality of organizations, the purchaser 101 corresponds to the head office 1, and the supplier 102 corresponds to the branch 2. The network 103, likewise the network 3 in FIG. 1, is comprised of a network such as an Internet, LAN or the like.

Here, the purchaser 101 is a corporation that manufactures a predetermined product and a plurality of corporations that manufacture and supply parts of the predetermined product are the supplier 102, and the data of the parts information database 111 is allowed to be browsed not only by the purchaser 101, but also by the supplier 102. However, there may be imposed some limitation or may not any limitation with respect to this browsing.

For example, although the parts information database 111 is allowed to store information of the parts handled by respective corporations, if this information is disclosed without any limitation, the suppliers 102-1 to 102-N is allowed to observe information of the other suppliers 102-1 to 102-N. If such an instance may cause a problem, there may be imposed some limitation so that, for example, only disclosed information can be freely accessed while the other confidential information cannot be accessed, or that information of the other supplier 102 cannot be observed at all (only the in-house information can be observed).

The purchaser 101 freely can access and observe the data stored in the parts information database 111. In the case the purchaser 101 manufactures a plurality of products and has a person in charge for each of the plurality of products, or in the case there exist a plurality of different departments involved even for one product such as a design department, a design support department, a packaging department and the like, all of the persons involved therein are allowed to use the parts information database 111 without any limitation.

By allowing the plurality of persons involved to use the same parts information database 111, it is enabled to prevent a duplicated processing by different persons such as the different persons respectively in charge place a request of a supply of the same kind of parts, and also to prevent for the same kind of parts from being attached with a different part number.

With reference to FIG. 44, the information stored in the parts information database 111 will now be described. Respective information is stored per each supplier 102-1 to 102-N, per each part dealt with by a respective corporation, and per each item of such as the product information, standard information, CAD information and package information. For respective suppliers 102-1 to 102-N, although the parts they handle and the number thereof differ from one another, with respect to their parts, data of 4 items of the above-mentioned product information, standard information, CAD information and package information are stored, respectively.

By the way, although it is described that in the parts information database 111, the above-mentioned four items of information are stored, but it is not limited thereto, and other information maybe stored as well, or it is not always necessary that the above-mentioned four items of information is to be stored. Information to be stored may be changed as required.

Figure 45:
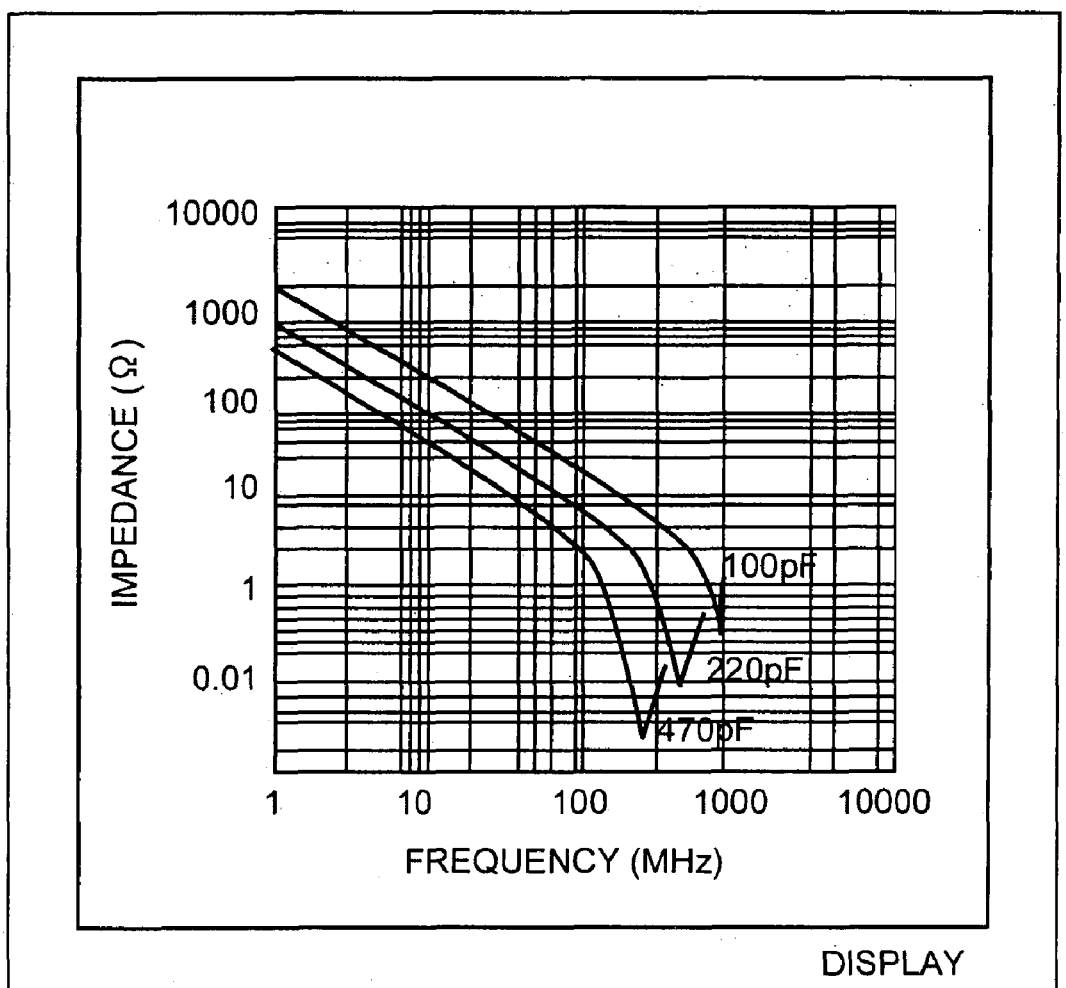
FIG. 45 is a diagram describing performance information.

Performance information of the parts is, for example, as shown in FIG. 45, information pertaining to the performance of the parts, and is indicated using a graph or the like. The graph shown in FIG. 45, and graphs shown in FIGS. 46 to 47 are information stored in the parts information database 111 that can be observed, respectively, for example, they are samples of display to be displayed on the display 71 serving as the output device 47 of PC 10 having the internal structure as shown in FIG. 11.

The standards information of the parts is information indicating standards, for example, as shown in FIG. 46 that are set up in the corporation the purchaser 101 belongs to. In the parts information database 111, only such parts that conform to these standards are stored. FIG. 46 shows an example of displays comparing a plurality of parts conforming to equivalent standards.

Figure 47:
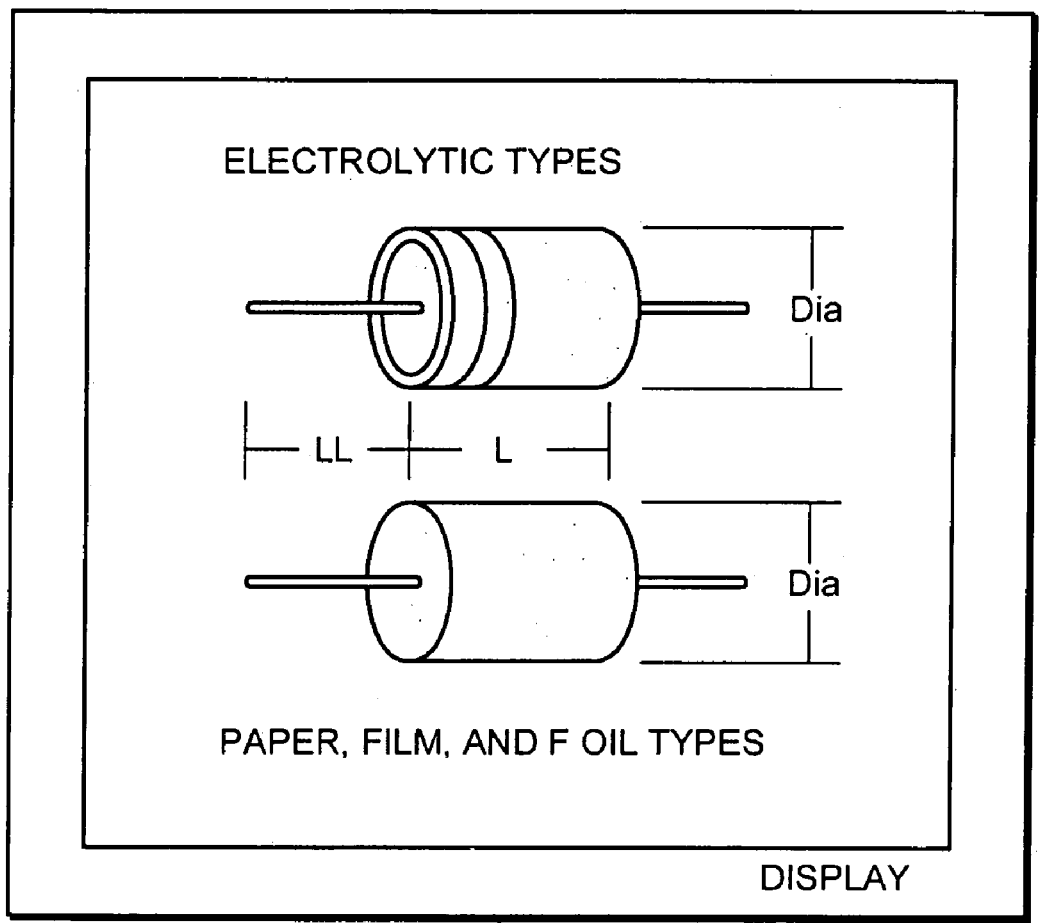
FIG. 47 is a diagram describing CAD information.
Figure 48:
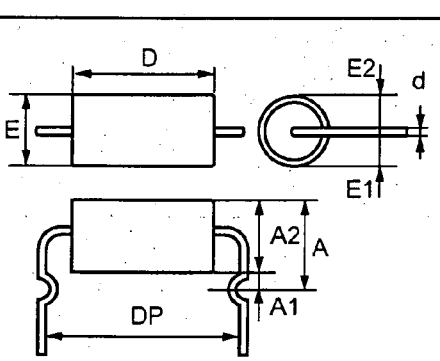
FIG. 48 is a diagram describing packaging information.

The CAD information is information, for example, as shown in FIG. 47, indicating an appearance (a perspective view) or the like of the part designed using CAD. The package information is information, for example, as shown in FIG. 48, indicating detailed information such as dimensions of the part and the like for use when mounting into an actual product. By referring to this information according to the package information, when the part is judged not fit to the package, the data of this part is not stored in the parts information database 111.

The information as described above is stored in the parts information database 111. In the next, the processing using the parts information database 111 will be described. By referring to a flowchart in FIG. 49, processing by the supplier 102 will be described. In step S111, the supplier 102 accesses the parts information database 111 provided in the purchaser 101 via network 103.

When accessing the parts information database 111, there may be provided a process to enter a password or the like in order to authenticate the supplier 1 who is permitted access. Further, there may be provided an accounting process to be able to account for use of the database when access is made. This accounting may be repeated at every access, or made once at the time the supplier 102 obtained permission of access (at the time the purchaser 101 issued access permission) and no further charge billed for subsequent access.

When the access processing to the parts information database 111 is completed in step S111, the supplier 102 executes a search of the parts in a next step S112. This process of search of the parts is executed when a request to supply a part A with a predetermined specification is issued from the purchaser side 101. The supplier 102 searches through the parts information database 111 to determine whether or not the part A corresponding to the specification of the request exists, and if it exists, the supplier can determine that this part A has been traded already with the purchaser 101, or it has been delivered thereto.

By searching through the parts information database 111 as described above, even in such a case where the persons in charge on the purchaser side 101 and the supplier side 102 have been transferred, both sides can recognize the parts that have been handled already with each other, thereby preventing a duplicated processing from being repeated for the same kind of parts.

Further, when a sales promotion of a predetermined part is desired, the processing of search of the part will be executed in order to determine whether or not this part is registered in the parts information database 111. When this part is not registered, this part proceeds to be registered. After registration thereof, when a purchase of a new part is planned on the purchaser side 101, and when the purchaser 101 searches through the parts information database 111, the newly registered part will be outputted as a result of the search, thereby consequently promoting the sales of this part.

Figure 49:
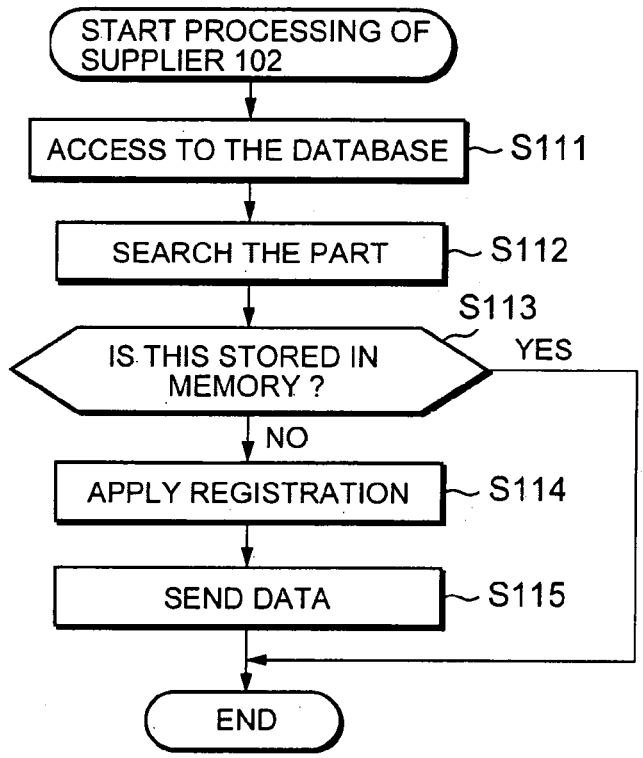
FIG. 49 is a flowchart describing process sequences on the side of suppliers.

In step S113, using a result of the search of the part in the step S112, it is determined whether or not the part being searched has been registered (stored) in the parts information database 111. In case the part being searched is determined in step S113 to have been registered in the parts information database 111, the processing of the flowchart shown in FIG. 49 is terminated.

On the other hand, if the part being searched is determined in step S113 not to have been registered yet in the parts information database 111, the step proceeds to S114, where the supplier 102 request the purchaser 101 to register the part that has been searched and found not to have been stored. Then, in step S115, the data of that part is sent.

Figure 50:
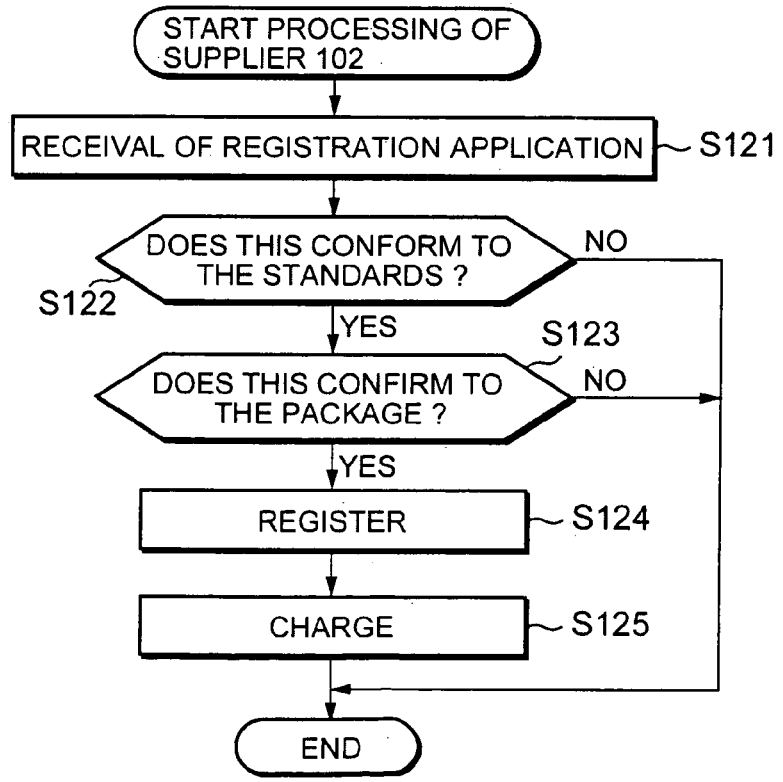
FIG. 50 is a flowchart describing process sequences on the side of a purchaser.

The processing in step S114 and step S115 may be executed by data exchange via the network 103 or by post mail or the like. When a registration request is sent from the supplier side 102 as described above, the purchaser side 101 carries out registration processing in accordance with the steps in the flowchart as shown in FIG. 50.

The purchaser 101 who receives a registration request from the supplier 102 in step S121 determines whether or not the part requested of its registration conforms to the standards within the corporation in step S122. If determined to conform to the standards, the step proceeds to S123, where it is determined if it conforms to the package. If determined to conform to the package, the step proceeds to S124 where the part requested of its registration is registered in the parts information database 111.

As described hereinabove, only such parts conforming to the standards and the package are registered in the parts information database 111, and those parts that do not conform to either one of the standards and the package are not registered in the parts information database 111. Needless to mention, even those parts that do not conform to the standards or the package may be registered as well if required.

The judgment whether or not the part requested of its registration conforms to the standards and the package to be executed in steps S122 and S123 may be carried out by a person or by the computer that controls the parts information database 111.

When the registration is completed in step S124, an accounting processing is executed in step S125. This accounting processing is for charging a registration fee. The accounting processing may be arranged so as not to be executed, in that case, the processing of step S125 is omitted.

The part information thus registered in the parts information database 111 is used, as described above, when the supplier 102 searches and/or when a different person in charge of a different product within the corporation on the side of the purchaser 101 searches through the database. By allowing to store the parts data from a plurality of suppliers 102 in the parts information database 111 that can be accessed by both the purchaser 101 and the supplier 102, it is enabled easily to compare and examine the parts handled by different suppliers 102, for example, as shown in FIG. 46. Further, various processing required until the delivery of the parts can be simplified, and inconveniences such as a duplicated processing can be avoided.

At the time of production of a predetermined product, it is a problem how one can acquire a predetermined part with a predetermined specification. As described above, by use of the above-mentioned method, it becomes possible to carry out the comparison and examination of the parts dealt with by different suppliers 102, thereby substantially simplifying the processing required until the delivery of the parts, and avoiding the inconveniences such as duplicated processing. However, in order to further improve the user-friendliness, another embodiment of the invention will be described.

In order to obtain appropriate parts having a desired specification, a material procurement and inventory department in the corporation (hereinafter, referred to as the user) gathers catalogues from respective parts makers to search appropriate parts having the desired specification, then places an order to purchase the parts. Nowadays, because it has become possible to carry out a specification search of parts on a Web page the parts makers provide, it is generally practiced by the user to search for appropriate parts having a desirable specification on the Web page, and place a purchase order for such parts.

However, it happens often that parts specification information the user acknowledges differs from the parts specification information listed on the Web page accessed by the user. Therefore, the user must correlate the part specification information the user recognizes with the part specification information of the part maker at the access site, then execute a specification search.

Further, although it is an indispensable task for procurement of the parts to extract a plurality of parts data of a desired specification from parts information of respective parts makers and compare prices of the parts on the basis of the extracted data, the user will have to spend enormous time in this task. This is due to the fact that in order; to compare the prices of the parts, the user must access each maker's Web page and execute specification searches.

Thereby, it becomes important to provide a part search apparatus and a part search system easily capable of searching parts having a desirable specification and comparing prices of the parts having the same specification offered from different makers.

Thereby, the part search apparatus and the part search system easily capable of searching the parts having the desirable specification, and comparing the prices of the parts of the same specification from the different makers will be described in the following.

Figure 51:
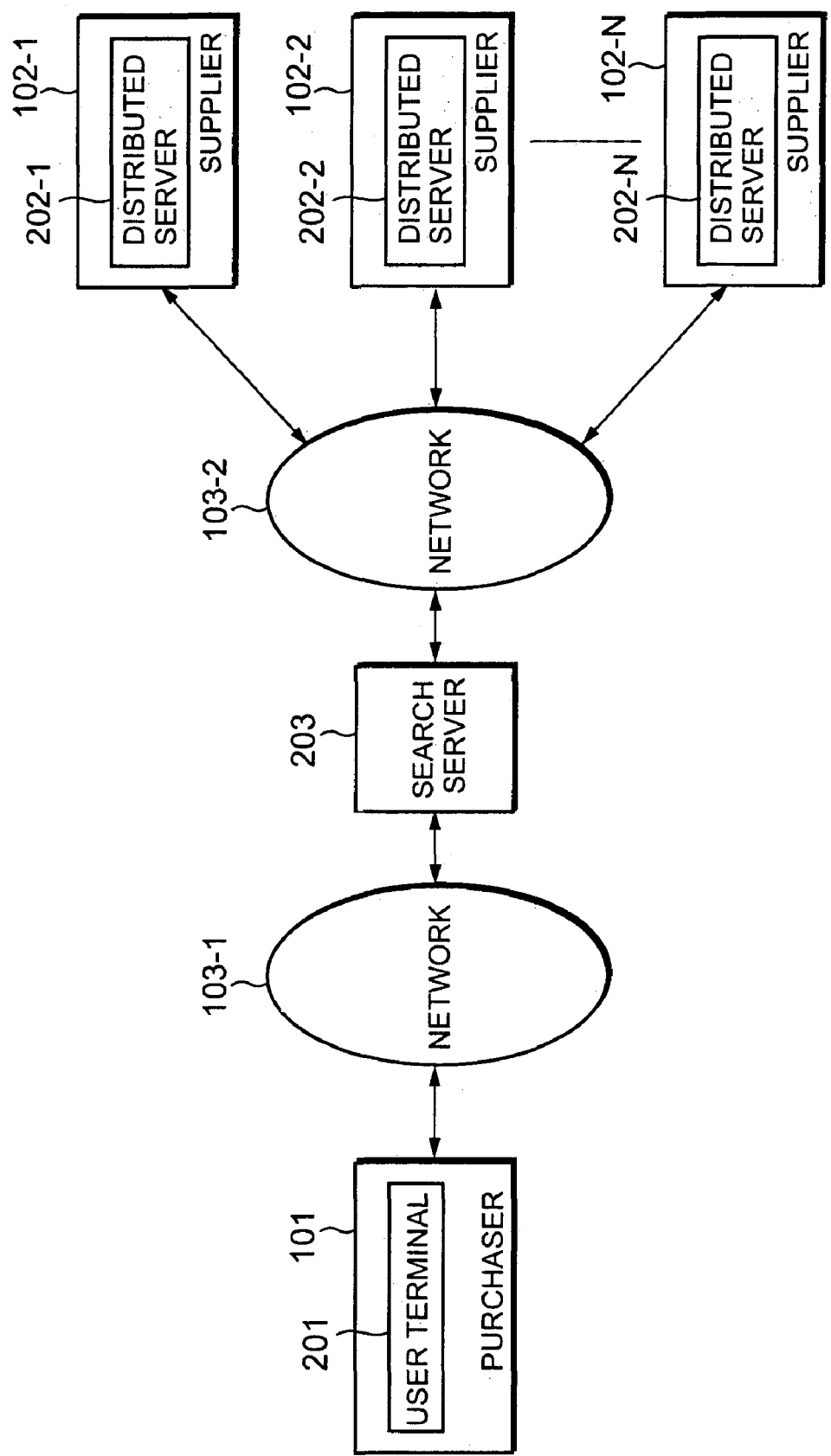
FIG. 51 is a diagram showing a structure of a parts search system according to an embodiment of the invention.

FIG. 51 is a diagram showing a configuration of the part search system according to an embodiment of the invention.

This part search system is comprised of a user terminal 201, a plurality of distributed servers 202 and search servers 203. The user terminal 201 is a terminal the purchaser 101 uses, and the distributed servers 202-1 to 202-N are terminals to be used by the supplier 102-1 to 102-N.

The user terminal 201 is connected to a search server 203 via network 103-1. The network 103-1 is, for example, an intranet (Trade Name) LAN or the like.

A plurality of distributed servers 2 are connected to the search server 203 via network 103-2. Here, the network 103-2 refers to, for example, LAN such as Intranet (Trade Name). By the way, in the present embodiment, an example in which the distributed servers 202-1 to 202-N are connected respectively to the search server 203 via the network 103-2 will be described. Here, the distributed server 202 is assumed to be managed by a different parts maker such as that the distributed server 202-1 is a server storing parts information of parts manufacturing corporation A, the distributed server 202-2 is a server storing parts information of parts manufacturing corporation B, and the distributed server 202-3 is a server storing parts information of parts manufacturing corporation C.

The user terminal 201 is a terminal capable of browsing Web page on the network such as network 103-1, as well as exchanging e-mails. More specifically, the user terminal 201 is a PC 10 having an internal constitution, for example, as shown in FIG. 11, provided with a Web browser and an E-mail software preinstalled. Here, for convenience of explanation, an example having one user terminal 201 connected to the search server 203 is illustrated and will be described, however, it should be understood that the number of units of the user terminal 201 is not limited thereto.

Because the internal constitution of the user terminal 201, the distributed server 202 or the search server 203 is basically the same as the internal constitution of PC 10 shown in FIG. 11, thereby, their illustration and description will be omitted.

The distributed server 202 is a server leased from a corporation operating the search server 203 to a respective parts maker (supplier 102), and in this distributed server 202, parts information of the respective parts maker is stored. This parts information contains at least parts specification information, and preferably, contains parts designation information, parts specification information, parts price information and desired delivery date information. The parts designation information is information for designating or specifying the parts, for example, such as the name of a maker, the name of a product model (type) of the maker, or the like. The parts specification information is information pertaining to a specification of the parts, for example, data of electrostatic capacity, rated voltage, temperatures, outer dimensions, model types and the like. Here, the parts specification information refers to the information converted from a format unique to a respective parts maker to a format common to the respective parts makers.

The parts price information is information pertaining to prices of the parts, and the desired delivery date information is information indicating the number of days required until the maker delivers the ordered parts to the user. By way of example, in the present embodiment of the invention, storage of the parts information in the distributed server 202 is performed by respective parts makers. More specifically, the respective parts maker executes storage of the parts information using an input device (not shown) provided in the distributed server. As described above, by enabling the storage of the parts information into the distributed server 202 to be operated by the respective parts makers, abundant parts information can be stored in the distributed server 202.

Although it is not shown here, each parts maker has a maker's terminal, and this terminal is connected to the search server 203 via a network, for example, such as network 103-1. This maker's terminal is a terminal capable of browsing Web pages on the network such as network 103-1, and also exchanging mails. More specifically, the maker's terminal is a personal computer preinstalled with a Web browser and an e-mail software. Further, the maker's terminal can be shared with the distributed server 202.

Further, because the maker's terminal can be implemented with the same structure as the above-mentioned user terminal 201, illustration and description of the structure of the maker's terminal will be omitted.

The search server 203 is a server that, on the basis of a search request information sent from the user terminal 201, via the network such as network 103-2, can search through the distributed server, 202(-1), distributed server 202(-2) and distributed server 202(-3), and can send search result information corresponding to a result of the search to the user terminal 201 via the network 103-1. More specifically, it is a server that can generate a file described in HTML (HyperText Markup Language), XML (extensible Markup Language) or the like, and send this file to the user terminal 201 via the network 103-1. Further, the search server 203 is the server that can store the file described in HTML, XML or the like, and in response to a request from the user terminal 201, sends this file to the user terminal 201. On the Web browser of the user terminal 201, a Web page is displayed on the basis of the file received from the search server 203.

An example of display screen (Web pages) displayed on the Web browser at the user terminal 201 on the basis of the file sent from the search server 203 to the user terminal 201 will be shown in the following.

Figure 52:
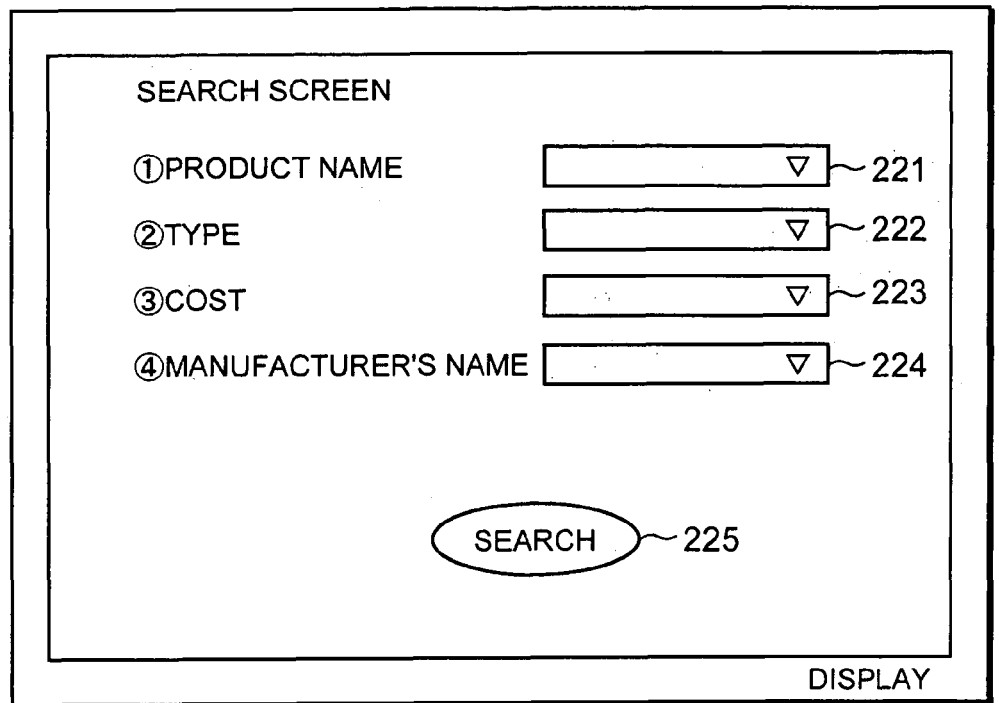
FIG. 52 is an example of search screens displayed at a user terminal.

FIG. 52 is an example of the display screen (for example, on a Web page) for selecting search information. Such a display screen is displayed on display 71 of the user terminal 201. A parts kind (parts name) selection box 221 is a box for selecting a parts kind of the parts the user desires to search. More specifically, when the parts kind selection box 221 is clicked, a table menu of parts kinds (hereinafter, referred to as a pull-down menu) is displayed. On this pull-down menu, parts names such as capacitor, resistance, inductance and the like are displayed.

A parts type selection box 222 is a selection box of a pull-down menu type for selecting a type of parts the user desires to search. On this pull-down menu, types of parts corresponding to the parts kind (parts name) selected in the parts kind selection box 221 are displayed. For example, in case a capacitor is selected in the parts kind selection box 221, types of parts such as electrolytic capacitor, ceramic capacitor, film capacitor and the like are displayed.

A cost selection box 223 is a selection box of a pull-down menu type for selecting a range of cost for the parts the user desires to search. On this pull-down menu, for example, a price range of the parts is displayed. A maker name selection box 224 is a selection box of a pull-down menu type for selecting a maker of the parts the user desires to search. On this pull-down menu, names of parts makers the parts information of which is stored in the distributed server 202 are displayed. Here, makers' names such as parts makers A, B, C and the like are displayed.

A search button 225 is a button to link to a search display screen for selecting detailed information. By the way, in order to be able to link to the search display screen for selecting detailed information, it is necessary at least to select the parts kind (name) in the parts kind selection box 221.

Figure 53:
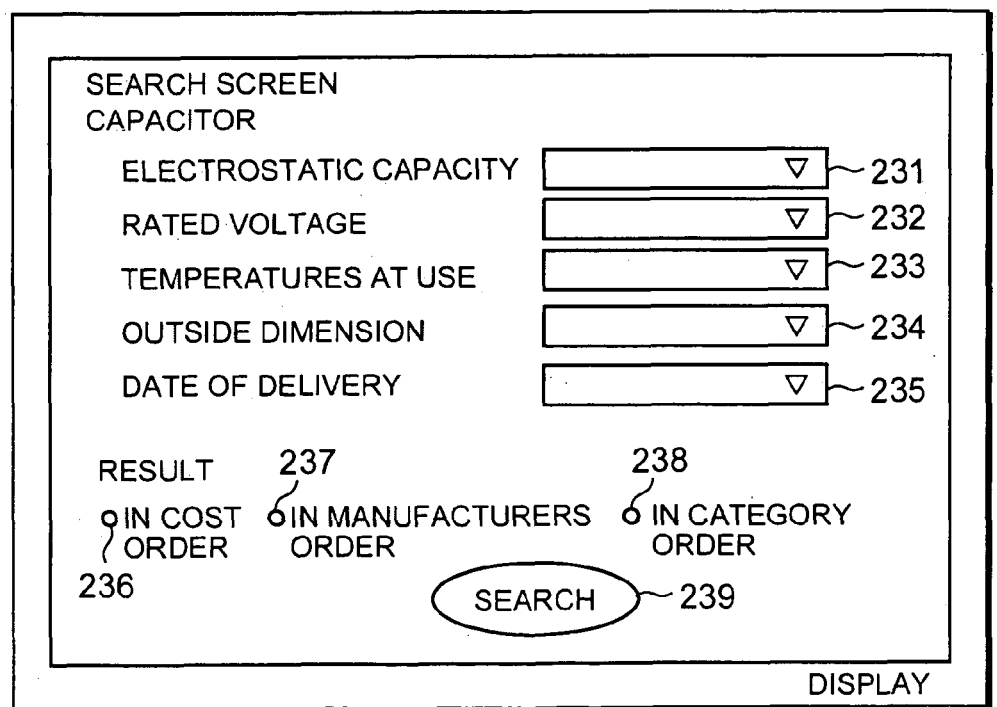
FIG. 53 is an example of search screens displayed at the user terminal.

FIG. 53 is an example of search display screen for selecting detailed search information. Here, this example is an instance where in the parts kind selection box 221 on the search display screen shown in FIG. 52, the capacitor is selected as the parts kind (name) desired to search. An electrostatic capacity selection box 231 is a selection box of a pull-down menu type for selecting an electrostatic capacity of the capacitor the user desires to search. A rated voltage selection box 232 is a selection box of pull-down menu type for selecting a range of rated voltages of the capacitor the user desires to search. A temperature selection box 233 is a selection box of pull-down menu type for selecting a range of temperatures of the capacitor the user desires to search.

An outer dimension selection box 234 is a selection box of pull-down menu type for selecting a range of outer dimensions of the capacitor the user desires to search. A delivery date selection box 235 is a selection box of pull-down menu type for selecting a range of delivery dates of the capacitor the user desires to search. A cost select portion 236 is a selection portion to determine whether to display a search result in order of costs or not, a maker select portion 237 is a selection portion to determine whether to display the result of selection in order of the makers or not, and a parts type select portion 238 is a selection portion to determine whether the result of selection to be displayed in order of the parts kinds or not.

A search button 239 is a button for displaying a search result display screen to be described later. More specifically, by depressing this search button 239 search request information corresponding to the search information selected on the above-mentioned search screen is sent from the user terminal 201 to the search server 203. Here, by depressing the search button 239, the search request information corresponding to the search information selected on the search display screens shown in FIGS. 52 and 53 is transmitted to the search server 203.

Figure 54:
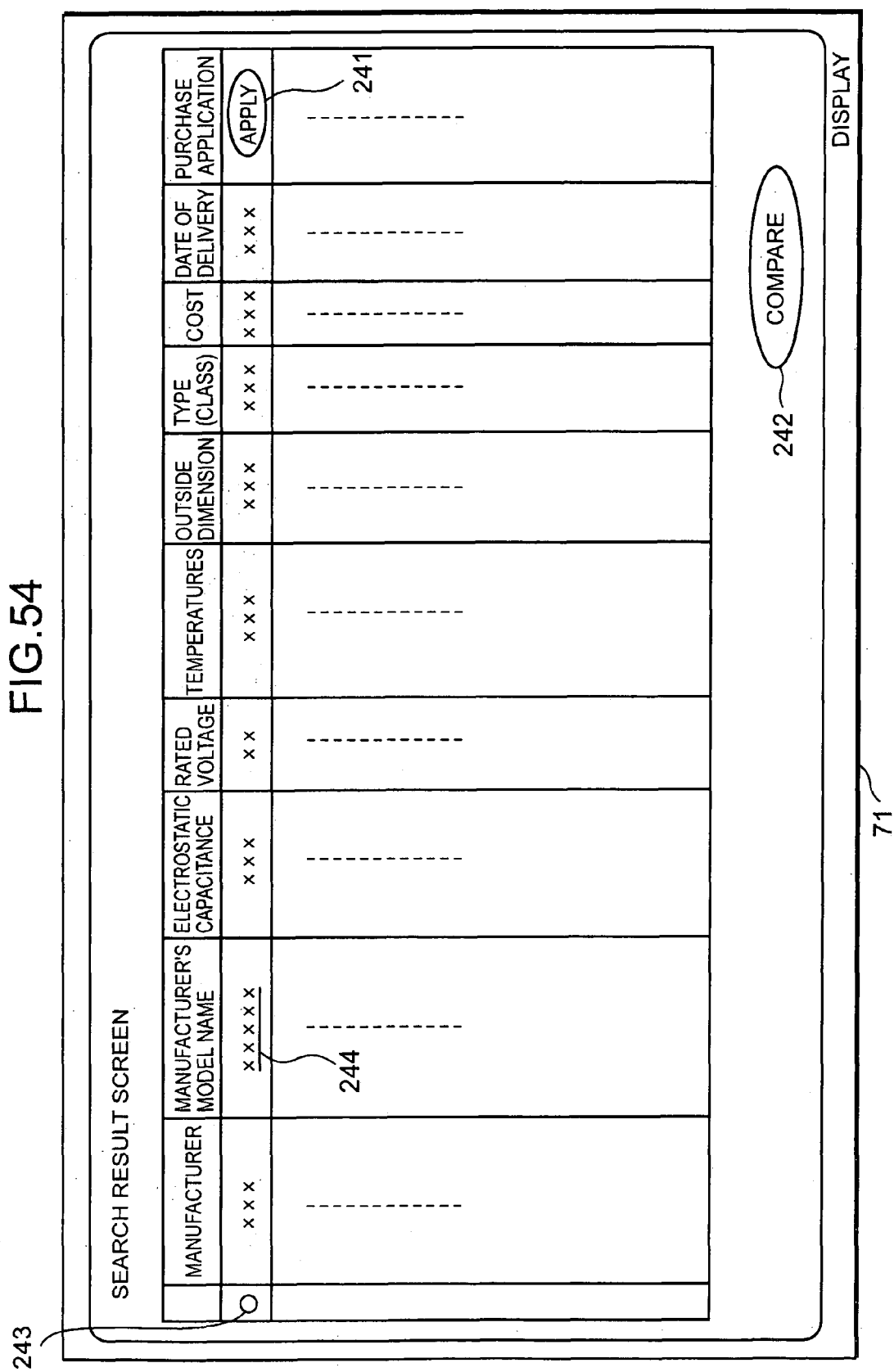
FIG. 54 is an example of search result display screen displayed at the user terminal.

FIG. 54 shows an example of search result display screen. Here, FIG. 54 shows an example of search result display screen displayed on the display 71 of the user terminal 201, as a result that a search result corresponding to the search information selected on the search display screens shown in FIGS. 52 and 53 was searched by the search server 203, and sent. As shown in FIG. 54, on the search result display screen, contents of information such as the name of maker, the model name of the maker, electrostatic capacity, rated voltage, temperature, outer dimensions, model type, cost, date of delivery, and the like are displayed.

An application button 241 is a button for displaying a purchase order application display screen to be described later. A comparison button 242 is a button for displaying a search result comparison display screen to be described later. Here, by selecting the parts information the user desires to compare using a selection box 243, only the parts information the user desires to compare can be displayed on the search result comparison display screen. Further, in a maker's model name character box 244, a link to the parts maker's Web page describing detailed information related to the parts of this model name is pasted.

FIG. 55 shows an example of search result comparison display screen. The search result comparison display screen is a display screen in which arrangements of the rows and columns of the search result display screen are interchanged. By way of example, on the search result comparison display screen, only the parts information selected in the above-mentioned selection box 243 is displayed. Thereby, the user can easily compare prices of the parts of the same specification belonging to different makers. A return button 251 is a button for returning to the search result display screen.

Figure 56:
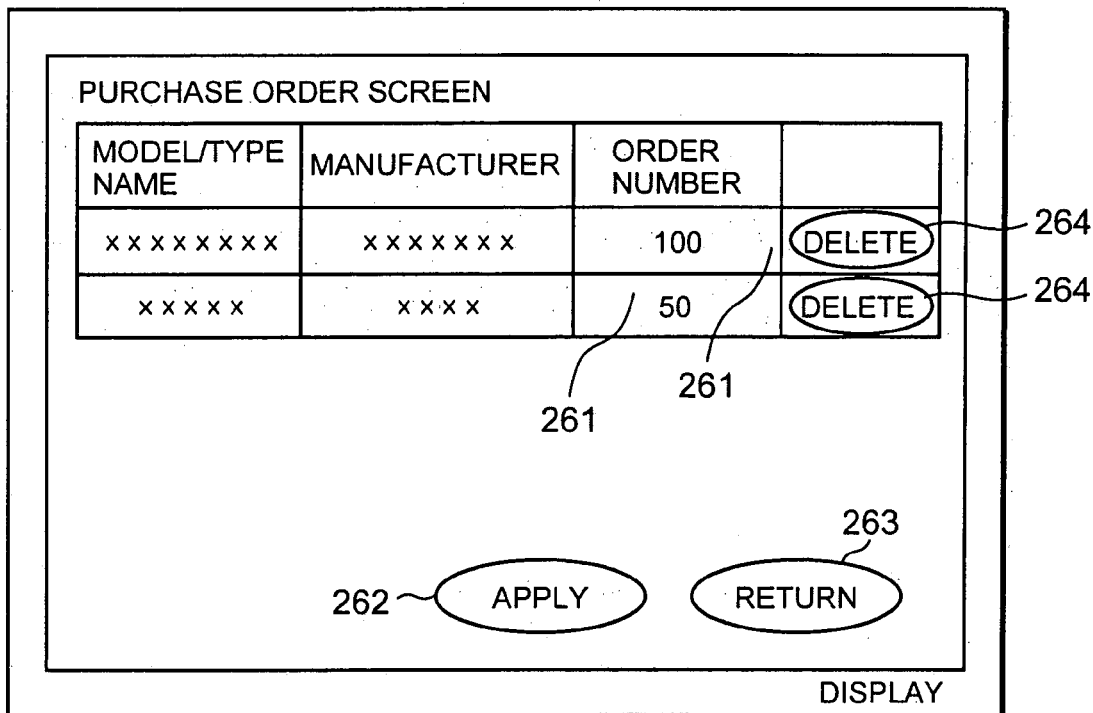
FIG. 56 is an example of purchase application display screen displayed at the user terminal.

FIG. 56 shows an example of purchase order application display screen. As shown in FIG. 56, on the purchase order application screen, the names of makers and the names of model types are displayed. The order number box 261 is a box for inputting the number of pieces of the parts the user desires to purchase. An application (order) button 262 is a button for displaying a user authentication display screen to be described later. A return button 263 is a button for returning to the search result display screen. By way of example, by returning to the search result display screen using this return button 263, and by depressing the application (order) button 241, it is also possible to display a plurality of parts information as shown in FIG. 56. That is, the user can place orders for a plurality of parts of the same makers, or for a plurality of parts of different makers simultaneously. A delete button 264 is a button for deleting the parts information displayed from the purchase order application display screen.

Figure 57:
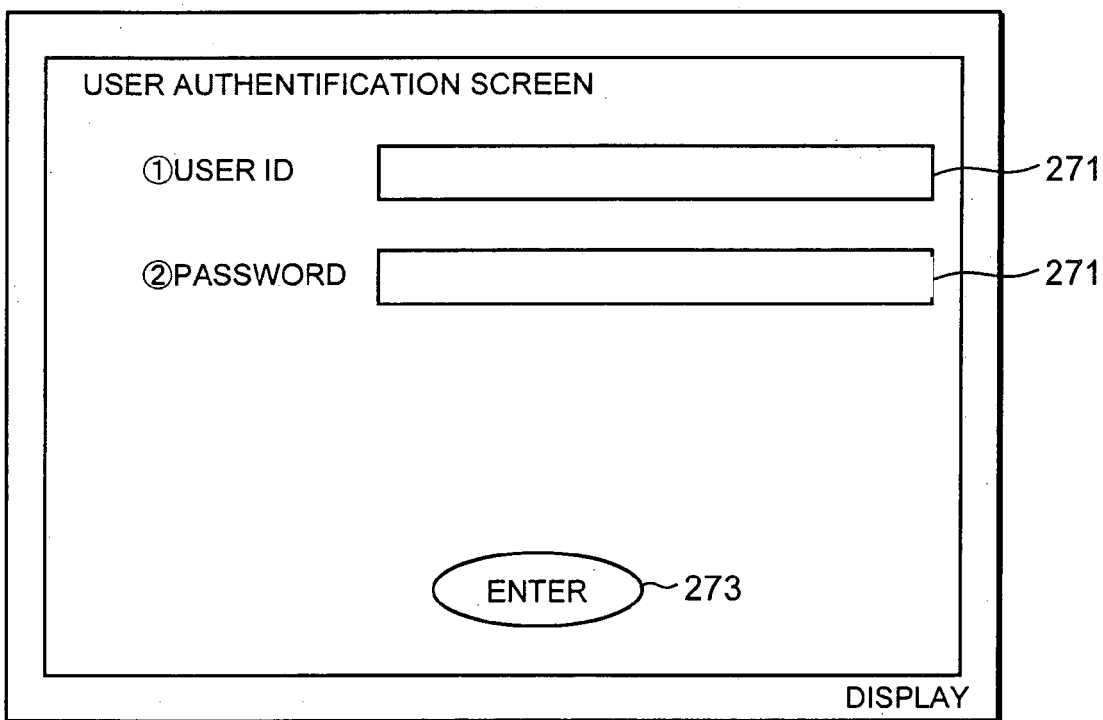
FIG. 57 is an example of user authentication display screen displayed at the user terminal.

FIG. 57 shows an example of the user authentication display screen. As shown in FIG. 57, on the user authentication display screen, USER ID input box 271 for inputting a user ID (Identification) and PASSWORD input box 272 for inputting a user password are provided. After inputting the user ID and the user password that are given to the user in advance into these input boxes, if ENTER button 273 is operated, an order application contents verification display screen to be described later is displayed. By the way, the user ID and the user password are ones that have been given to the user prior to the placement of the order of the parts.

More specifically, the user, prior to placement of the order, accesses the search server 203 to complete the user registration, and then, the user can obtain this user ID and user password. At the time of the user registration, the user is required to enter user information such as the name of corporation, address, mail address, telephone number and the like (hereinafter referred to as user information) into predetermined spaces on the Web page. By the way, this user information is stored in a storage unit (not shown) in the search server 203.

Figure 58:
FIG. 58 is an example of application contents verification screen displayed at the user terminal.

FIG. 58 shows an example of the order application contents verification display screen. As shown in FIG. 58, on the order application contents verification display screen, information such as the name of model (type), the name of maker, the number of pieces of order, price, subtotal, total and the like is displayed. A verification button 281 is a button for ordering the parts displayed on the purchase order contents verification display screen to the parts maker. More specifically, by pressing this button, request application information corresponding to the information displayed on the application contents verification display screen is transmitted to the search server 203. Here, by pressing this, verification button 281, purchase request information corresponding to the application contents verification display screen shown in FIG. 58 is transmitted to the search server 203.

FIG. 59 shows an example of purchase order acknowledgment forms. This purchase order acknowledgment form is a form returned from a maker terminal to the user terminal 201 when the maker terminal receives the purchase request information from the user terminal 201 via the search server 203. On this purchase request acknowledgment form, information such as the name of model/type of the parts the user ordered, quantities, amount of money, address of delivery of the parts, date of delivery, method of payment, contact address of the maker who received the order and the like are described. Thereby, the user at the user terminal 201 can confirm if there is any error in his/her order.

Figure 60:
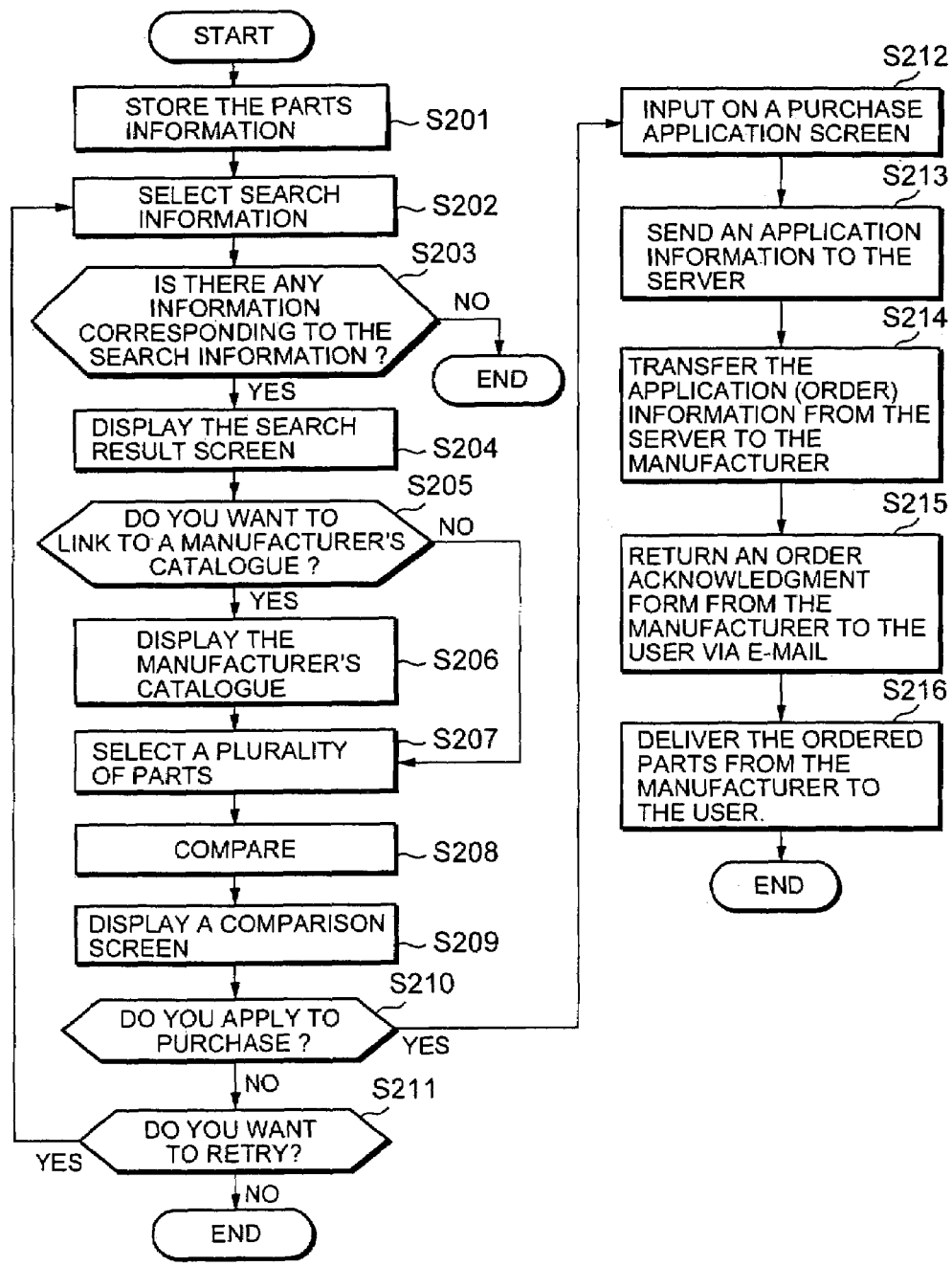
FIG. 60 is a flowchart for describing a search operation and a search processing in the parts search system.

FIG. 60 shows a flowchart for describing the search operation and the search procedures in the parts search system according to one embodiment of the invention. Here, an example in which the user desires a capacitor as the parts to be searched will be described.

In step S201, a respective parts maker stores parts information of its own into the distributed server 2. Here, the parts specification information contained in the parts information is described on a format common to the whole corporations as converted from respective formats unique to respective corporations.

In step S202, the user, using the user terminal 201, accesses the search server 203, causing the Web browser to display the search display screen shown in FIG. 52. Then, selecting the capacitor in the parts name (model) selection box 221, further after selecting the type of capacitor the user desires to search, a cost range and the name of makers, appropriately in the type selection box 222, the cost selection box 223 and the makers' name selection box 224, the search button 225 is pressed. Thereby, the search display screen shown in FIG. 53 is displayed on the Web browser at the user terminal 201.

Then, in the electrostatic capacity selection box 231, the rated voltage selection box 232, the temperature selection box 233, the outer dimension selection box 234 and the delivery data selection box 235, an electrostatic capacity range of the capacitor, a rated voltage range a temperature range, an outer dimension range and a delivery date range that the user desires to search are appropriately selected. Further, if necessary, selecting in the cost selection box 236, the maker selection box 237 and the type selection box 238, then, the search button 239 is operated. By this operation, search request information corresponding to the search display screens shown in FIGS. 52 and 53 is sent from the user terminal 201 to the search server 203.

In step S203, the search server 203, in response to the search request information received from the user terminal 201, searches through the distributed server 202. As a result of search, if information corresponding to the search request information exists, the process proceeds to S204. If no parts information corresponding to the search request information exists, the search processing is ended. At the time of ending the search processing, there may be provided a step to display a message on the display 71 at the user terminal 201 notifying the user of its ending.

In step S204, the search server 203 sends search result information corresponding to a search result to the user terminal 201. Then, the user terminal 201, upon receiving the search result information, and on the basis of the search result information received, displays a search result display screen on the Web browser.

In step S205, the user at the user terminal 201, after browsing the search result display screen displayed on the Web browser, in order to learn further detailed parts information, decides whether or not to link to a maker's catalogue. If the user desires to link to the maker's catalogue, and clicks the maker's model name (parts name) character portion 244, the step proceeds to S206. If the user does not desire to link to the maker's catalogue, and does not click the maker's model name character portion 244, the step proceeds to S207.

In step S206, the Web, page describing the catalogue of the parts maker is displayed on the Web browser at the user terminal 201. That is, the Web browser of the user terminal 201 displays information on the basis of an HTML file including the maker's catalogue information transmitted from a server (not shown) that stores the catalogue information of the parts maker.

In step S207, the user selects, in the selection box 243, the parts information the user desires to compare from the parts information on the search result display screen shown in FIG. 54. In step S208, the user operates the comparison button 242 in the search result display screen shown in FIG. 54. The step proceeds to S209, where the search result comparison display screen shown in FIG. 55 is displayed on the Web browser at the user terminal 201. Then, the user after browsing this search result comparison display screen depresses the return button 251 to return to the search result display screen shown in FIG. 54.

In step S210, the user decides whether or not to purchase the parts. When the user desires the purchase of the parts, and operates the application button 241 in the search display screen shown in FIG. 54, the step proceeds to S212. When the user does not desire to purchase the parts, and does not operate the application button 241 in the search display screen shown in FIG. 54, the step advances to S211.

In step S211, the user determines whether or not a retry is desired. When the user decides a retry of the search desired, and instructs its decision by operating the user terminal 201, the step returns to the step S202, in which the user selects search information again. If the user does not desire a retrial of the search, the parts search is. terminated.

In step S212, on the Web browser of the user terminal 201, the purchase application display screen shown in FIG. 56 is displayed. The user, after inputting the number of pieces of the parts to order in the order number box 261, operates the application button 262. Thereby, on the Web browser of the user terminal 201, the user authentication display screen shown in FIG. 57 is displayed. Then, after the user ID and the password having been inputted respectively in the user ID input box 271 and the password input box 272, and when the ENTER button 273 is operated, the Web browser of the user terminal 201 displays the order application contents verification display screen shown in FIG. 58. The user, after verifying the contents of order on this order application contents verification display screen, operates the verification button 281.

In step S213, purchase request information corresponding to the information displayed on the application contents verification display screen shown in FIG. 58 is sent from the user terminal 201 to the search server 203.

In step S214, the search server 203, upon receiving the purchase request information from the user terminal 201, transfers the user information together with this purchase request information to the maker terminal (not shown).

In step S215, the parts maker, upon receiving the purchase request information and the user information via the maker terminal (not shown), generates the order acknowledgment form corresponding to these purchase request information and user information to be sent to the user terminal 201 via e-mail.

In step S216, the parts maker, on the basis of the purchase request information and the user information, ships the parts to the user.

As described hereinabove, according to the one embodiment of the invention, the parts maker stores the parts information on the standardized format in the distributed server 202, the user sends the search request information using the user terminal 201 to the search server 203, the search server 203 on the basis of the search request information received searches through the parts information stored in the distributed server 202 and sends the search result information corresponding to this search result to the user terminal 201, thereby, the user is enabled to search the parts of the same specification belonging to different makers simultaneously and easily.

Therefore, the user can shorten substantially the time spent in searching the parts. Further, on the basis of the search result information received from the search server 203 and displayed on the search result display screen at the user terminal 201, because the parts of the same specification belonging to the different makers and the prices of the parts are displayed, the user can easily compare the prices of the parts of the same specification belonging to the different makers.

Further, because the parts specification information displayed on the respective display screens described above is converted to the standardized format commonly applicable to the respective makers, such a situation can be avoided where the parts specification information the user recognizes and the parts specification information described on the Web page at the accessed site differs from each other.

In the next, another embodiment of the invention will be described. In the exemplary embodiment described above, the example in which the plurality of distributed servers 202 are connected to the search server 203 via the network 103-2 has been described, however, in the another embodiment to be described in the following, an instance in which a plurality of distributed servers 202' are connected to a search server 203 via a network 103 will be described.

Figure 61:
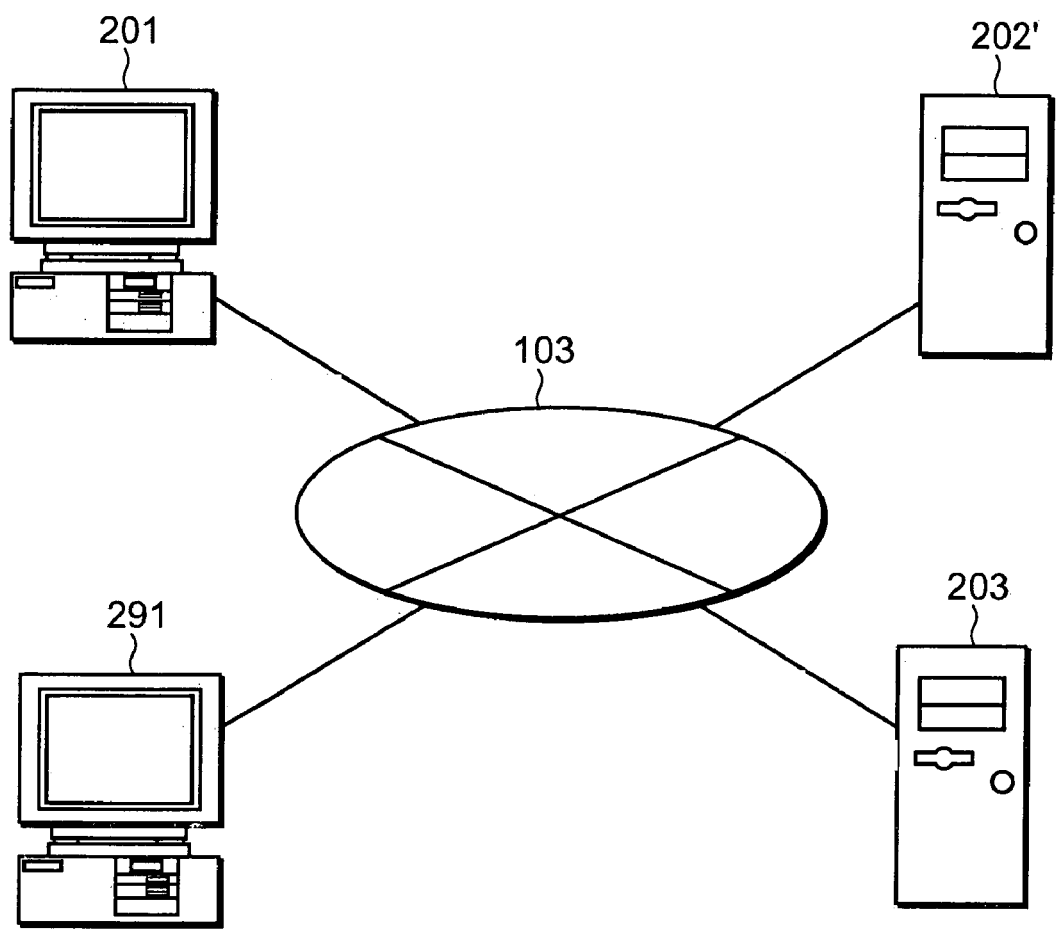
FIG. 61 is a diagram showing a configuration of a parts search system according to another embodiment of the invention.

FIG. 61 shows a structure of a parts search system according to another embodiment of the invention. This parts search system is comprised of a user terminal 201, a plurality of distributed servers 202', a search server 203, and a maker terminal 291. The user terminal 201, the plurality of distributed servers 202', the search server 203 and the maker terminal 291 are connected to a network 103.

In this example shown here, the user terminal 201, the plurality of distributed servers 202', the search server 203 and the maker terminal 291 are connected to the network 103 which is a LAN such as Internet or intranet. By the way, in FIG. 61, the same parts and symbols as those described in the above-mentioned embodiment will be omitted of their detailed description.

The distributed server 202' is a server capable of executing operation such as a directory operation in response to a command from the maker terminal 291, a transfer of a file existing in the directory, and a writing of a file sent from the maker terminal 291. The other functions and the structure of the distributed server 202', because they are approximately the same as those described in the preceding embodiment, will be omitted of their detailed description. For convenience of description, a single unit of the distributed server 202' is illustrated and described to be connected to the network 103, however, the number of units of the distributed server 202' is not limited thereto.

The maker terminal is a terminal the parts maker has, and using this maker terminal 291, via the network 103, the parts maker is allowed to perform such operation as a directory operation within the distributed server 202', a file transfer request to the distributed server 202', and writing a file in the distributed server 202'. Thereby, the parts maker, using the maker terminal 291, is capable of executing such operation as updating of parts information stored in the distributed server 202' and the like. The other functions and structure of the maker terminal 291, because they are approximately the same as those in the foregoing embodiment described above, will be omitted of their detailed description.

A search operation and a search processing in the parts search system according to the present embodiment which will be described briefly with reference to FIG. 61 are approximately the same as those described in the foregoing embodiment described with reference to FIG. 51, therefore, their detailed description will be omitted. Further, in the present embodiment to be described with reference to FIG. 61, the purchase request information may be transmitted from the user terminal 201 directly to the maker terminal 291.

As described above, according to the another embodiment of the invention, the parts maker stores the parts information prepared on the common format in the distributed server 202', the user transmits the search request information to the search server 203 using the user terminal 201, the search server 203 on the basis of the search request information received searches the parts information stored in the distributed server 202', and transmits search result information corresponding to the search result to the user terminal 201, thereby, the user is enabled to search the parts of the same specification belonging to different makers simultaneously and easily.

Thereby, the user can substantially reduce the time spent in searching the parts. Further, on the basis of the search result information received from the search server 203, on the search result display screen to be displayed at the user terminal 201, because the parts of the same specification belonging to the different makers and the prices of these parts are displayed, the user can easily compare the prices of the parts of the same specification belonging to the different makers.

Further, because the parts specification information displayed on the respective display screens described above are converted to the common format applicable to the respective parts makers, such the situation can be avoided that the parts specification information the user is aware of and the parts specification information introduced on the Web page at the accessed site differ from each other.

Hereinabove, the present embodiment of the invention has been described specifically, however, it should be understood that the present invention is not limited thereto, and many other modifications, changes and variations can be conceived within the scope of the invention.

For example, in the embodiment described above, it has been described by way of example where the respective parts makers store their respective parts information in the distributed servers 202 or 202', however, an operating company of the search server 203, in place of the respective parts makers, may store the respective parts information of the respective parts makers in the distributed servers 202 or 202'. In this case, the operating company, as a service fee for storing the parts information in the distributed servers 202 or 202', may charge the respective makers.

Further, in the embodiment described above, instead that the operating company of the search server 203 leases the distributed server 202 to the parts makers, it may be arranged also such that the respective parts makers account a rental fee.

Still further, in the embodiment described above, it may be arranged so that the operating company of the search server 203 charges the user with an access fee for accessing the search server 203. More specifically, the user, when accesses the search server 203 and carries out the user registration, may pay a user registration fee to the operating company of the searcher server 203.

Still more, although the above-mentioned embodiment is described by way of example of the instance in which the search server 203 transfers the purchase request information sent from the user to the user terminal 22, also, it may be arranged such that the search server 203, after having stored the purchase request information sent from the user, transmits the same to the maker terminal. Then, the search server 203, on the basis of the purchase request information stored in the search server 203, may generate, for example, document such as a best seller ranking for each model, a shipping schedule table for the whole parts, and send to the respective makers terminals. Generation of these documents is carried out, for example, using aggregation software the search server 203 has. Further, the operating company of the search server 203, in exchange for supplying the documents, may charge the parts maker.

Further, in the description of the embodiment of the invention described above, although it is described by way of example where the parts maker, using the input unit (not shown) provided in the distributed server 202, stores the parts information, however, it may be arranged also that the parts maker, using the maker terminal, stores the parts information in the distributed server 202. Namely, it may be arranged so that the parts maker stores the parts information in the distributed server 202 via the network 103.

In such a circumstance where a plurality of suppliers 102 (parts makers) exist as intermixed, terms used by these parts makers may differ sometimes. If the terms used by respective parts makers differ from one another, the user is required to search the desired parts by the following procedures.

Figure 62:
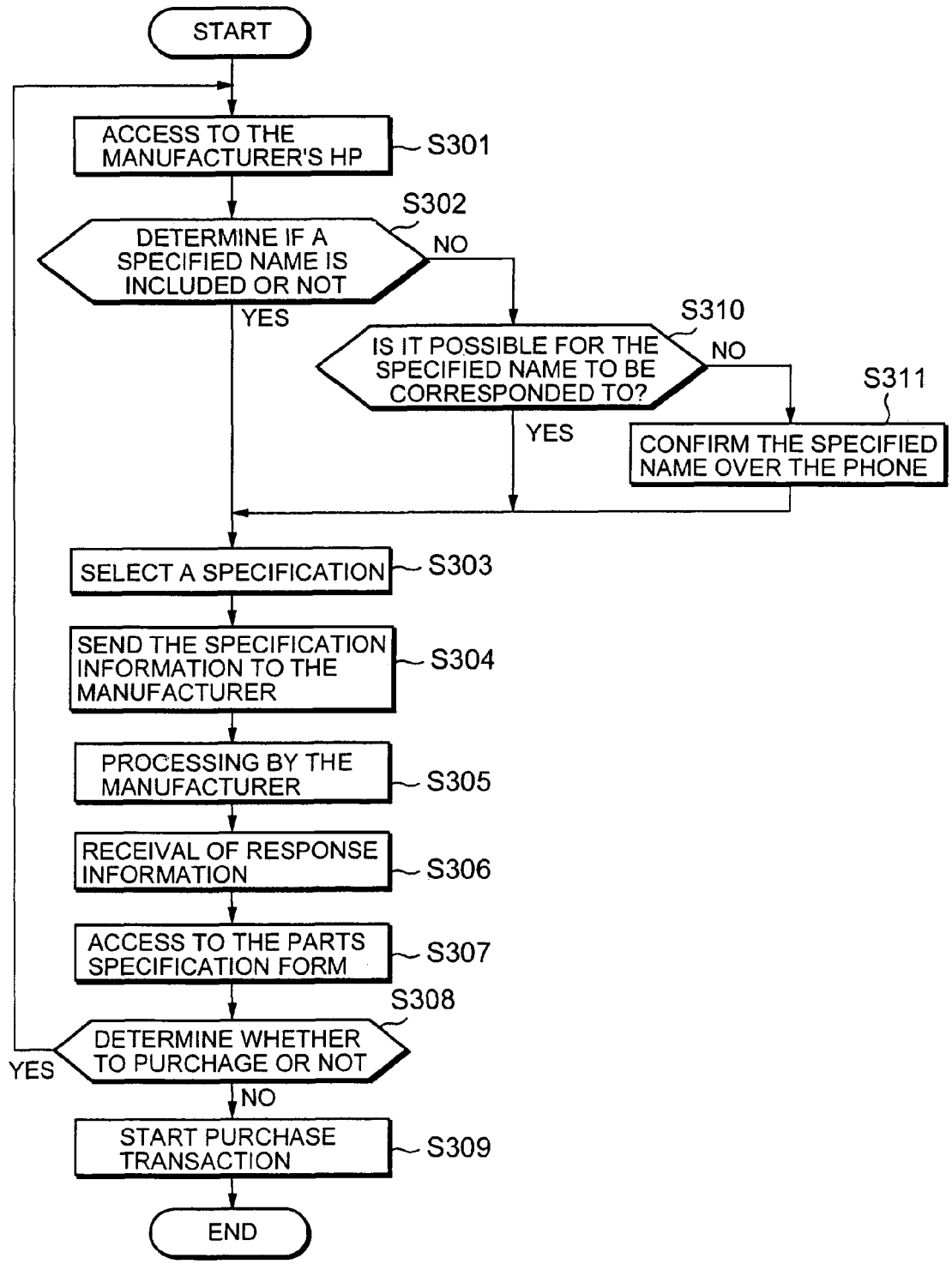
FIG. 62 is a flowchart for describing services for providing parts specification via the network.

FIG. 62 is a flowchart describing a service for providing the parts specification. Here, it will be described by way of example for providing a parts specification of a capacitor.

Figure 63:
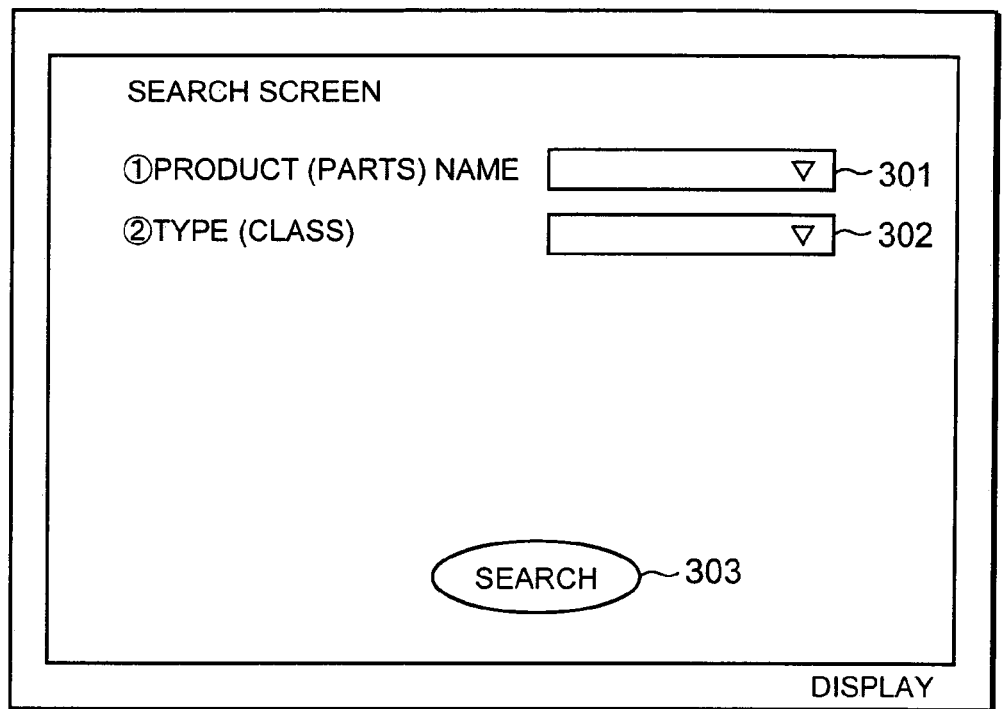
FIG. 63 is an example of search screen displayed at the user terminal.
Figure 64:
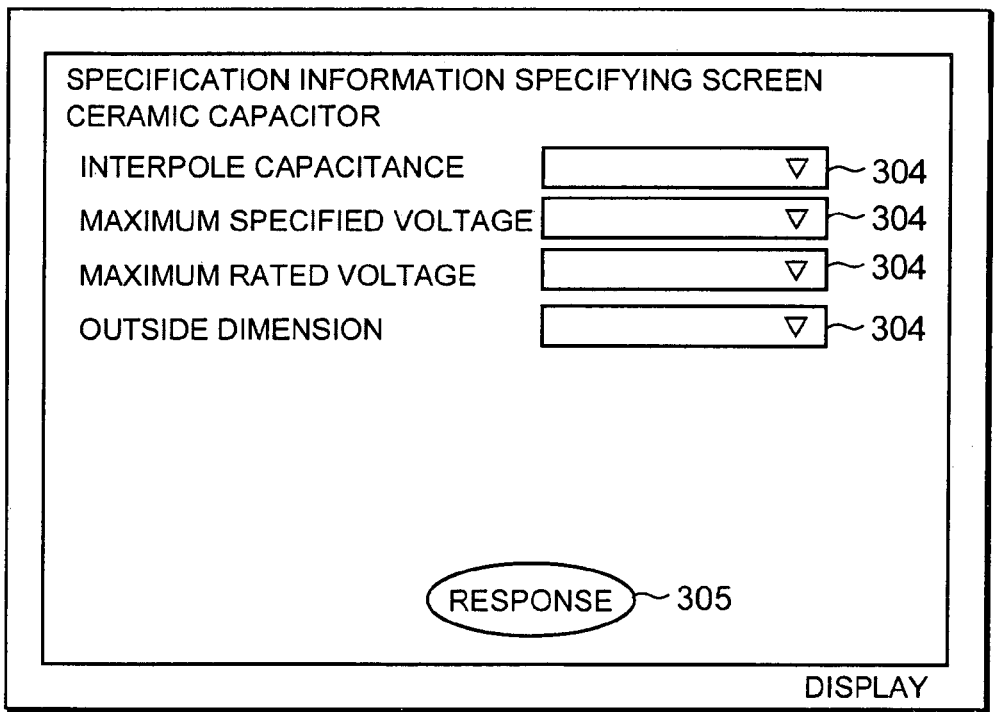
FIG. 64 is an example of specification information designation screen displayed at the user terminal.

Firstly, the user, in step S301, by using the user terminal of its own, accesses the search display screen shown in FIG. 63. The user clicks the parts kind (name) selection box 101 to cause the parts kind table (herein after referred to as the pull-down menu) to be displayed, and selects a capacitor in this pull-down menu. Then, after an appropriate selection in the parts type selection box 102 is made by the user, the search button 103 is clicked. In response to this clicking, a specification information designation display screen shown in FIG. 64 is displayed on a display (not shown) at the user terminal.

Subsequently, the user, in step S302, determines whether or not a specification name (pole capacity, maximum specification voltage, maximum rated voltage, temperature, and dimension) displayed on the specification information designation display screen coincides with the specification name the user recognizes for oneself. If the user, in step S303, determines coincidence thereof with the specification name the user is aware of, selects a desired specification in the selection column 104. Then, in step S304, the send button 105 is operated, and the specification information is sent to the parts maker.

Then, in step S305, the parts maker receives the specification information via the server of its own, and after searching the parts that satisfy this specification information, returns a mail listing the parts number of the parts searched to the user (user terminal).

Subsequently, the user, in step S306, receives via the user terminal the mail listing the parts number. Then, the user, in step S307, on the basis of this parts number, accesses a desired parts specification, further, in step S308, after browsing this parts specification, decides whether or not to purchase the parts. In step S308, if decided to purchase the parts, the user, in step S309, starts a purchase transaction such as a negotiation of the price of the parts, however if decided not to purchase, the step returns to S303, and the subsequent steps will be repeated.

On the other hand, in step S302, because of a reason that the specification name the user is aware of is not listed on the specification information designation display screen, it often occurs that the specification of the parts cannot be selected. This is due to the fact that each parts maker lists up the specification name using its own terminology unique to that maker.

In such a case, the user, in step S309, at the time when sending the specification information to the parts maker, by referring to in-house rules and standards written in terminologies unique to the maker at the accessed site, executes operation to correlate the specification name the user is aware of with the specification name unique to the parts maker at the accessed site.

Further, when correlation between these specification names cannot be attained using the rules and standards, in step S310, such a procedure as to inquire the specification name directly over the telephone to the sales department or the like of the parts maker is carried out so that the user obtains the desired name to be used.

That is, the user, due to the fact that the parts maker uses the unique terminology original thereto, the specification name the user is aware of is not listed on the specification information designation display screen, thereby preventing the specification of the parts from being selected, therefore, using the rules and standards written in the original terminology unique to the maker at the accessed site, the user had to do a troublesome processing to correspond the specification name the user knows to the specification name written in the original terminology unique to the parts maker at the accessed site, or to directly inquire the specification name over the telephone or the like to the sales department of the parts maker.

As for such procedures, because also in the rest of the parts other than the capacitors, their specification names are written in original terminology unique to respective corporations on the specification information designation display screen, the user had to do troublesome task such as consulting with their rules and standards documents for correlation, and inquiry over the telephone or the like.

Further, not limiting to the display screens shown in FIGS. 63 and 64, on any display screen for inputting specification information of the parts the user desires, generally, the specification names are described using original terminology unique to respective makers, therefore, when sending the specification information to the parts maker, the user normally had to do the above-mentioned troublesome and pains-taking work.

Therefore, without carrying out such pains-taking processing, a method whereby the specification information of the parts the user desires can be obtained easily is required. In the following, such a method will be described.

FIG. 65 is a diagram showing a configuration of a term (terminology) conversion system according to one embodiment of the invention. This term conversion system is basically the same as the parts search system shown in FIG. 51, however, in the configuration of the term conversion system shown in FIG. 65, servers managed by suppliers 102-1 to 102-N correspond to maker servers 312-1 to 312-N, and, instead of the search server 203, a link server 313 is provided.

The maker server 312, via network 103-2, is connected to the link server 313. This network 103-2 is, for example, LAN, WAN such as an intranet, or an Internet. Here, the illustration and description of the embodiment will be set forth by way of example in which the maker servers 312-1 to 312-N are connected to the link server 313, via the network 103-2. However, the number of units of the maker servers 312 is not limited thereto. By the way, the maker servers 312-1, 312-2, 312-3 may correspond to parts makers A, B and C.

The user terminal 201 is a terminal capable of browsing a Web page on the network 103-1 as well as executing transmission and reception of e-mails. More specifically, the user terminal 201 is a personal computer installed with the Web browser, electronic mail software and the like. By the way, for convenience of description, the illustration and description will be set forth by way of example in which a single unit of user terminal 201 is connected to the link server 313, however, the number of units of the user terminal 201 is not limited thereto.

Because constructions of the user terminal 201, the maker server 312, and the link server 313 are basically the same as that of PC 10 shown in FIG. 11, their illustrations and description will be omitted.

The link server 313 has a database, and the terms of the parts is stored in this database. In this database, original terms unique to each parts maker and standard industrial terms commonly used among respective makers are stored. The standard industrial terms refer to standard terms commonly used by the respective makers, more specifically, refer to the international industrial standards terminology such as JIS (Japanese Industrial Standards) terminology, IEC (International Electro technical Commission) terminology and the like. By the way, in the following description, the industrial standards terminology stored in the database is assumed to be JIS terms.

The link server 313, on the basis of the terminology stored in the database, converts the terms used in the specification information received from the user terminal 201 to the standard terms, and then can send to the maker server 312. The link server 313 sends the specification information to the parts maker (supplier 102) that is registered in advance to the link server 313. In this instance, the parts makers A, B and C are registered in advance in the link server 313.

Further, the link server 313, on the basis of the terminology stored in the database, converts the terms used in response information received from the maker server 312 into the standard terms, thereafter can send to the user terminal 201. By the way, the response information will be described later.

Further, according to the embodiment of the invention, the database is a relational database, and the original terms unique to the respective parts makers and the industrial standard terms are expressed in a two dimensional table. An example of this table is shown in FIG. 66. By the way, the data on the basis of such the table as shown in FIG. 66 is stored in the link server 313 as a standard term database 321 of the link server 313.

As shown in FIG. 66, items in the table as this standard term database 321 include JIS terms, usage terms in corporation A, usage terms in corporation B, usage terms in corporation C and usage terms in corporation D, and in this table, relational correspondence of usage of terms between these parts makers, and relational correspondence between these terms of the respective parts makers and the JIS terminology are described. This table is prepared for each type of the parts.

Further, in the standard terms database 321 owned by the link server 313, files written in HTML (HyperText Markup Language) or XML (eXtensible Markup Language) are also stored, and the link server 313 in response to a request from the user terminal 201, transmits these files to the user terminal 201. On the Web browser at the user terminal 201 which receives these file, the specification information input screen and the like are displayed.

Figure 67:
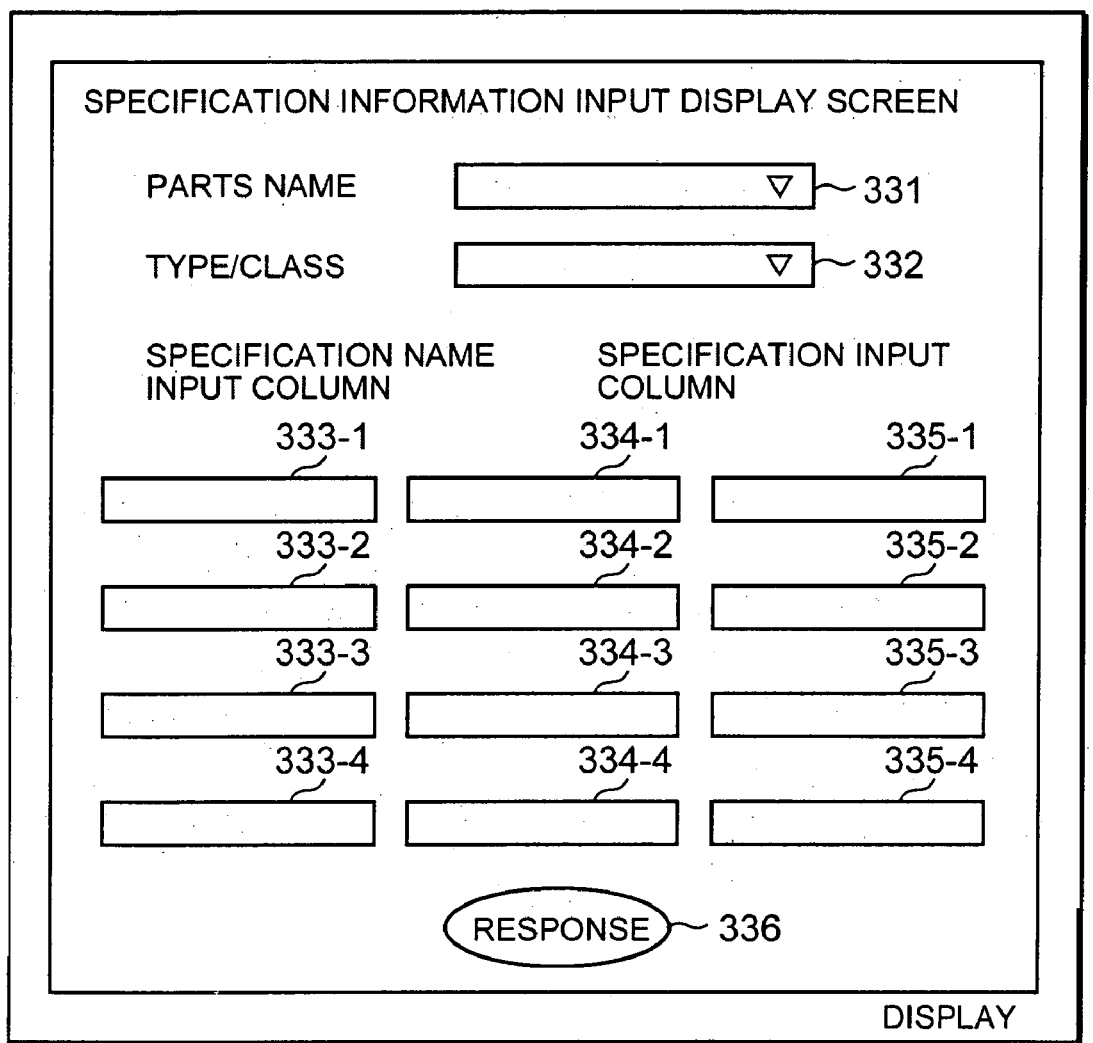
FIG. 67 is an example of specification information input screen displayed at the user terminal.

FIG. 67 shows an example of the specification information input display screen. As shown in FIG. 67, on the specification information input display screen, there are provided a parts kind (name) selection box 331, a parts type selection box 332, a plurality of specification name input column 333, a plurality of specification input columns 334 and 335, and a send button 336.

The parts kind (name) selection box 331 is a selection box of pull-down type menu for selecting a kind of the parts the user desires. On this pull-down menu, there are displayed kinds of the parts, for example, such as a capacitor, a resistance, a coil and the like. The parts type selection box 332 is a selection box of pull-down type menu for selecting a type of the parts the user desires to purchase.

In this pull-down menu, there are displayed types of the parts corresponding to the kind of the parts the user selected in the parts kind selection box 331. For example, when a capacitor is selected in the parts kind selection box 331, in the parts type selection box 332, there are displayed types of the parts kind such as electrolytic capacitors, ceramic capacitors, film capacitors and the like.

The specification name input column 333 is a column for inputting a specification name of the parts the user desires to purchase. The specification input columns 334 and 335 are columns for inputting specifications of the parts the user desires to purchase, wherein a lower limit value is inputted in the specification input column 334, and an upper limit value is inputted in the specification input column 335. Here, it is also possible that limit values are inputted only in one of the specification input columns 334 and 335 thereby limiting either one of the upper limit and the lower limit values.

The send button 336 is a button for sending the specification information to the link server 313, more specifically, by operating this send button 336, the specification information inputted on the specification information input display screen shown in FIG. 67 is sent to the link server 313.

The maker server 312 is provided with a database, and in this database, parts specifications of the parts maker that owns this database are stored. This parts specification, which describes a detailed specification or the like of respective parts, is described in a language, for example, HTML or XML. The maker server 312 can retrieve a parts specification corresponding to a parts number from the parts specifications stored in the database.

Further, the maker server 312 can also receive specification information sent from the link server 313. Each parts maker searches a part that can satisfy the specification information received via the maker server 312, generates response information corresponding to a result of this search, and responds to the link server 313. By the way, each parts maker searches the part that satisfies the designated specification information by browsing the parts specifications the each parts maker owns, or by searching through the parts specifications stored in the database.

The response information generated by each parts maker contains, at least, a parts number, and, for example, contains the parts number, URL (Uniform Resource Locators) corresponding to this parts number, specification information and shipping date, et al. Here the URL corresponding to the parts number is a URL for accessing the parts specification which describes detailed information of the parts corresponding to the parts number.

Thereby, the user who receives the response information, and enters the URL contained in the response information on the Web browser at the user terminal 201, is connected to a maker server 312 that has a domain name contained in the URL. In the URL, the parts number in addition to the domain name is contained, thereby, the maker server 312 searches a parts specification corresponding to this parts number, then sends it to the user terminal 201. By the way, the response information is responded to the user, for example, by e-mail.

Figure 68:
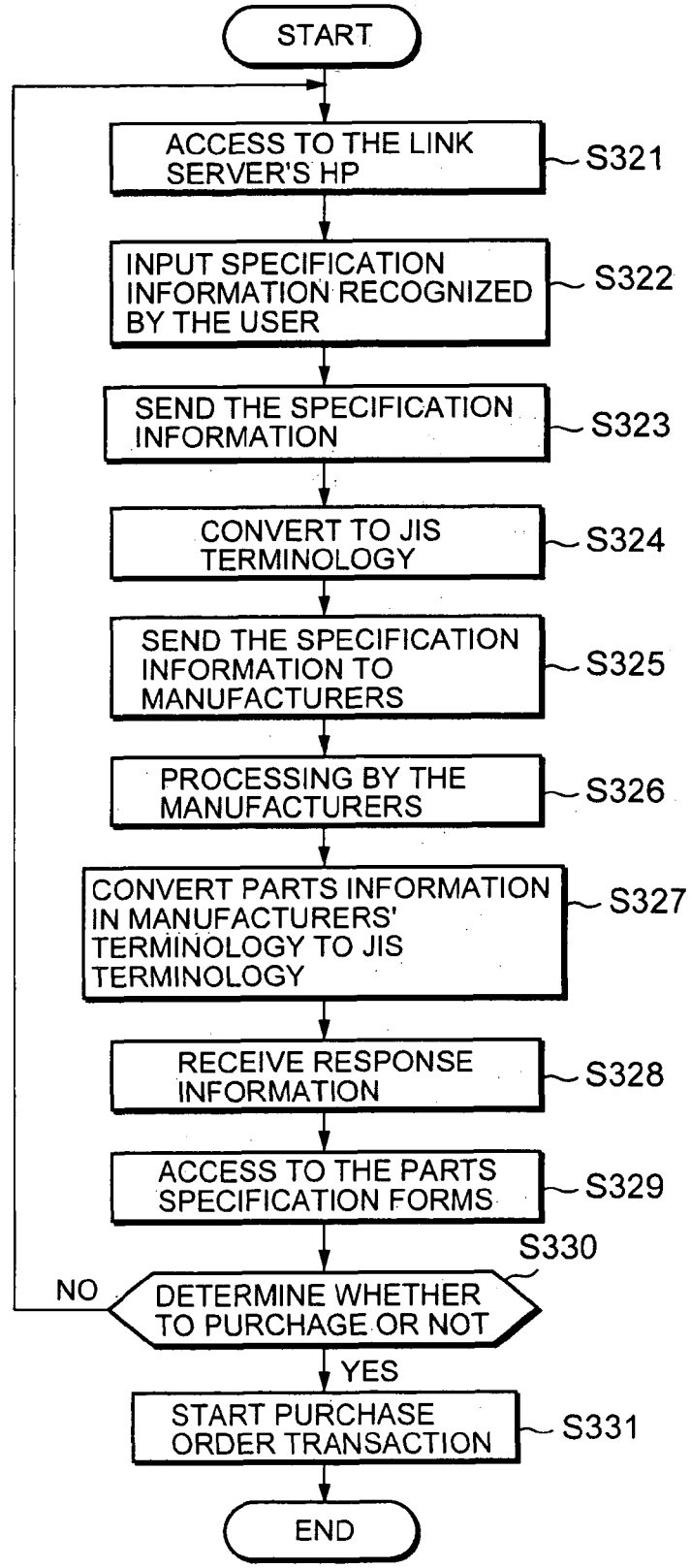
FIG. 68 is a flowchart for describing sequential steps from sending specification information to parts makers to purchasing of the parts.

By referring to a flowchart shown in FIG. 68, an example of procedures from transmission of the specification information to the parts maker until the purchase of the parts will be described. Here, an instance will be described in which the user, using the terms of corporation B shown in FIG. 66, transmits the specification information of the desired parts to the parts makers, and receives response information to this specification information from corporations A, B and C. By the way, here, the desired part in this instance is a capacitor.

Firstly, the user, in step S321, using the user terminal 201, accesses the specification information input display screen shown in FIG. 67. Then, after selecting the capacitor from the parts kind selection box 331, the user selects an appropriate type of the capacitor from the type selection box 332.

Subsequently, in step S322, the user inputs a "maximum rated voltage" which is the specification name the user recognizes into the specification name input box 333-1, and appropriately inputs a desired specification into the specification input columns 334-1 and 335-1. In the same manner, the user inputs "pole capacity", "maximum operating voltage" and "maximum operating current" which are the specification names the user knows appropriately into the specification name input columns 333-2 to 333-4, then, inputs desired specifications appropriately into the specification input columns 334-2 to 335-4. Subsequently, in step S33, the user operates the send button 336 to send the specification information to the link server 313.

Then, the link server 313, in step S324, on the basis of the terms stored in the standard usage term database 321, converts the terms used in the specification information received from the user terminal 21 to JIS terminology. Namely, the rated maximum voltage, the pole capacity, the maximum operating voltage and the maximum operating current are converted to a maximum operating voltage, electrostatic capacity, rated voltage and rated current, respectively. Then, in step S325, the specification information subjected to this term conversion is transmitted to the maker servers 312-1 to 313-3 (respective servers corresponding to respective parts makers' A, B and C) that were registered in advance in the link server 313.

Then, in step S326, each parts maker, after receiving the specification information via each maker server 312 and searching the parts that satisfy this specification information, returns response information containing the parts number of the parts searched, URL, specification information (written in original terms unique to the parts maker) to the link server 313.

Then, in step S327, the link server 313, on the basis of the terms stored in the database, converts the original terms unique to the parts maker used in the response information received from the maker server 312 to the JIS usage terms, and sends to the user terminal 201.

Subsequently, in step S328, the user receives response information via the user terminal 201. Then, instep S329, the URL contained in this response information is inserted in the Web browser to access the desired parts specification, and in step S330, after browsing this parts specification page, the user decides whether or not to purchase the parts. If the user decides to purchase the parts, in step S331, the user starts a purchase transaction such as price negotiation of the parts and the like. If the user decides not to purchase, the processing returns to step S321, and the subsequent steps of processing is repeated.

As described hereinabove, because that the link server 313 receives the specification information from the user terminal 201, and after converting the terms used in this specification information to the standard terms of usage, transmits to the maker server 312, the user can save painstaking, tedious task to correspond (correlate) the specification name the user knows to the specification name used by the parts maker at the mailing address of the specification information. Thereby, the user can convey the specification information of the desired parts easily to the parts makers. Further, the user can reduce the time to be spent in acquiring the parts specifications from the makers.

Still further, because that the link server 313 receives the response information corresponding to the specification information from the maker server 312, converts the terms used in this response information received to the standard terms of usage, and transmits to the user terminal 201, the user can save the troublesome, tedium task to convert the original terms unique to each parts maker used in the received response information to the terms of usage the user knows. Thereby the time spent after receipt of the response information until the decision to purchase the parts can be reduced substantially.

Figure 69:
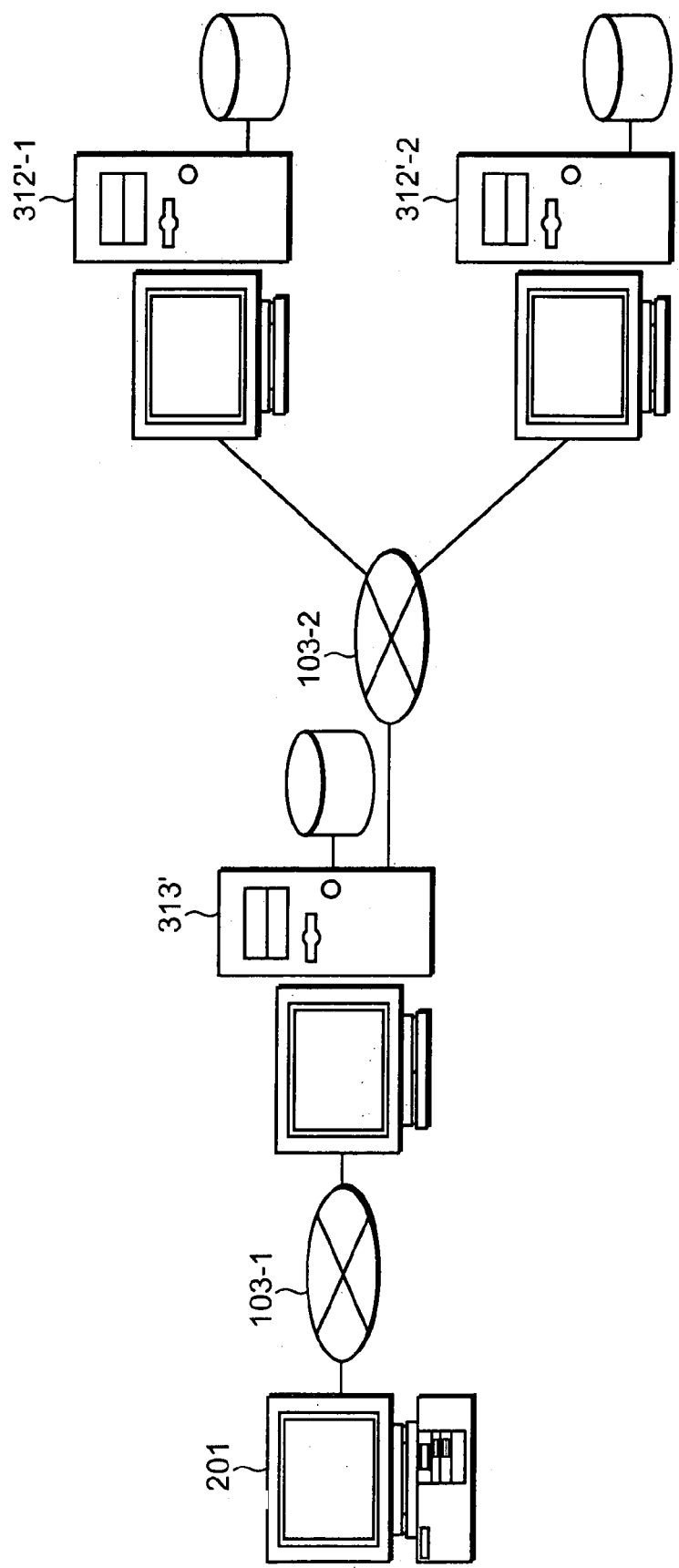
FIG. 69 is a diagram showing a structure of a terminology conversion system according to another embodiment of the invention.

In the next, a term conversion system according to another embodiment of the present invention will be described. FIG. 69 is a diagram showing a configuration of the term conversion system according to such other embodiment. In the system configuration shown in FIG. 65 and described above, it is described by way of example where the link server 313 converts the terms used in the specification information received from the user terminal 201 to the standard terms, and sends to the maker server 312, however, in the system configuration shown in FIG. 69, it will be described by way of example, in which the link server 313' converts the terms used in the specification information received from the user terminal 201 to standard terms corresponding to a destination country to which the specification information is transmitted, then sends to the maker server 312'.

By the way, in the description of the system configuration shown in FIG. 69, for convenience's sake, an instance in which mailing address of the specification information to be transmitted includes two countries will be described. More specifically, a case of sending the specification information to one country where JIS terms are used as standard terms, namely, Japan, and to another country where IEC terms are used as standard terms will be described.

The user terminal 201 is connected via network 103-1 to the link server 313'. This network 103-1 is LAN, WAN of intranet, or Internet. By the way, in this instance, the user terminal 201 is assumed to receive and transmit information in Japan.

Further, maker server 312' is connected via network 103-2 to link server 313'. This network 103-1 is, for example, an intranet such as LAN, WAN, or an Internet. In this instance, the maker server 312'-1 is a server of Japanese parts maker A, and the maker server 312'-2 is a server of a parts maker E in a foreign country where IEC terms are used as standard terms.

The link (tie-up) server 313' owns a database, in which terms of the parts are stored. In this database are stored unique terms that are used by respective parts makers in the world, and the standard terms that are used as industrial standard terms in each country or in each district. In this database, respective unique terms locally used by Japanese parts makers A, B, C and D, as well as. JIS terms and IEC terms are stored.

The link server 313', after converting the terms used in the specification information received from user terminal 201 to the standard terms corresponding to the destination country of the specification information on the basis of the terms stored in the above-mentioned database, can transmit it to the maker server 312'. More specifically, if a mailing address of the specification information is a Japanese parts maker A, the link server 313', after converting the terms used in the specification information received from the user terminal 201 to the JIS terms, transmits it to the maker server 312'. On the other hand, if the mailing address of the specification information is a parts maker E in abroad, the link server 313', after converting the terms used in the specification information received from the user terminal 201 to the IEC terms, transmits it to the maker server 312'.

Further, the link server 313', on the basis of the terms stored in its database, converts the terms used in the response information received from the maker server 312' to the JIS terms, then can transmit it to the user terminal 201. By the way, this database is a relational type database, wherein the unique terms of the respective parts makers and the industrial standard terms are expressed in a two-dimensional table. An example of standard term database 351 on the basis of this table is shown in FIG. 70.

As shown in FIG. 70, items in this table include JIS terms, IEC terms, terms of corporation A, terms of corporation B, terms of corporation C and terms of corporation D, and the unique terms of the respective corporations are correlated with JIS terms as well as IEC terms.

The other structures and functions of the link server 313', because they are substantially the same as in the system configuration shown in FIG. 65, illustration and description thereof will be omitted here. Further, the structures and functions of the user terminal 201 and the maker server 312' are substantially the same as the instance described above, illustration and description thereof will be omitted here. Still further, because the procedures from the transmission of the specification information to the parts makers until the purchase of the parts are substantially the same as the instance described above, the illustration and description thereof will be omitted here.

As described hereinabove, because that the link server 313' receives the specification information from the user terminal 201, converts the terms used in this specification information to the standard terms corresponding to the country of the mailing address of the specification information, then sends it to the maker server 312', the user can save a task of translating the specification name the user knows to a foreign language as well as associating the same to the specification name of the parts makers at the mailing address of the specification information. Thereby, the user can easily convey the specification information the user desires to purchase to the parts makers in abroad. Further, the user can easily obtain parts specifications also from abroad.

Further, the user, even if the user does not know the standard terms used in the country the specification information is to be transmitted, can acquire parts specifications from abroad. Namely, even if the user does not have enough knowledge of particular parts, the user can obtain the parts specifications easily from the parts makers in abroad.

Still further, because the link server 313' automatically executes the term conversion, any transmission errors of the specification information due to a difference in languages can be prevented. That is, the user is ensured to be able to convey precisely the specification information the user desires to purchase to the parts makers in abroad.

Further, because the link server 313' converts the terms used in the specification information to the industrial standard terms corresponding to the country of the mailing address of the specification information, the user is not required to examine the specification name of the desired parts for each country. Namely, the user can reduce substantially the time to be spent in obtaining the parts specifications from abroad.

Still further, because the specification information of the desired parts is transmitted to the parts makers in abroad via Internet, the user can convey the specification information of the desired parts to the parts makers in abroad without a time lag, and surely. Thereby, the user can shorten the time to be spent in conveyance of the specification information to the parts makers in abroad.

Still more, because that the link server 313' receives response information corresponding to the specification information from the maker server 312', converts the terms used in the response information received to the standard terms used in the country of the user, and sends it to the user terminal 201, the user can save tedious and pains-taking work to translate the terms used in the specification information contained in the response information to the mother language of the user, and to correlate the specification information contained in the response information to specification information the user can understand. Thereby, the time to be spent after receipt of the response information until the decision to purchase the parts can be reduced.

Further, the user, even if without enough knowledge and materials of the terms used by the parts makers in abroad, can read easily the response information received from the makers in abroad. Namely, the user, without a need of being fully acquainted with the parts of the parts makers in abroad, can easily understand the response information.

In the next, a term conversion system according to still another embodiment of the present invention will be described. Because a schematic configuration of the still another embodiment is substantially the same as the term conversion system shown in FIG. 65 and described above, the illustration and description thereof will be omitted. In the foregoing embodiment described with reference to FIG. 65, it is described by way of the example, in which the link server 313, after converting the terms in the specification information received from the user terminal 201 to the standard terms, transmits to the maker server 312, however, in the still another embodiment, it will be described by way of example, in which the link server 313, after converting the terms in the specification information received from the user terminal to the terms unique to the makers at the mailing address, transmits thereto.

The link server 313 owns a database, and in this database are stored terms of the parts. In this database are stored unique terms unique to each parts maker and industrial standard terms. The industrial standards terms refer to terms commonly used throughout the respective makers, more specifically, refer to national industrial standard terms such as JIS terms and IEC terms. By the way, in this case, the industrial standard terms stored in the database will be described as JIS terms.

The link server 313, on the basis of the terms stored in the database, after converting the terms used in the specification information received from the user terminal 201 to the terms corresponding to the maker at the mailing address of the specification information, is enabled to send it to the maker server 312. For example, if the mailing address of the specification information is the corporation A, the link server 313, after converting the terms used in the specification information received from the user terminal 201 to the unique terms proper to the corporation A, transmits it to the maker server 312 at the corporation A.

Further, the link server 313, on the basis of the specification information stored in its database, after converting the terms used in the response information received from the maker server 312 to the JIS terms, is enabled to send it to the user terminal 201. By the way, this database is a relational type database, in which the unique terms proper to each parts maker and the industrial standard terms are expressed in a 2-dimensional relational table. The database according to this table is enabled to use the standard term database 321 shown in FIG. 66.

The constructions and functions of the other link servers 313 are approximately the same as those of the link server 313 described above, thereby, their illustration and description will be omitted here. Further, because the constructions and functions of the user terminal 201 and the maker server 312 are approximately the same as those in the instance described above, their illustration and description will be omitted here. Still further, because the procedures from the transmission of the specification information to the parts makers until the purchase of the parts are approximately the same as in the above-mentioned case, their description will be omitted.

As described heretofore, according to the still another embodiment of the invention, because that the link server 313 receives the specification information from the user terminal 201, converts the terms used in this specification information to the terms proper to the maker at the mailing address of the specification information, and sends it to the maker server 312, the user can advantageously save a tedious, troublesome work to correspond the specification information the user knows to the specification information of the parts maker. Thereby, the user is enabled easily to convey the specification information of the desired parts to the parts maker. Further, the user can shorten the time spent in obtaining the parts specifications from the makers.

Further, by sending once the specification information of the desired parts from the user to the link server 313, the link server 313 is enabled to send the specification information to all makers that are registered in the link server 313. That is, the user is no more required to correlate the specification name the user knows with the specification name used at the mailing address of the specification information for each maker, thereby, the time spent in obtaining the parts specifications from respective makers can be substantially reduced.

Heretofore, the embodiments of the invention have been described specifically, however, the present invention is not limited thereto, and it should be understood that many other modifications, changes, variations can be contemplated within the scope of the present invention.

For example, the invention has been described by way of example, in which the terms of respective parts makers are stored corresponding to JIS terms, however, it is not limited to the JIS terms, but also the terms of the respective parts makers may be stored corresponding to the IEC terms.

Further, according to the embodiment described above, although it is described that the specification information from the user is sent to all the parts makers that are registered in the link server 313, however, it may be arranged also such that the specification information is sent only to the makers desired by the user. More specifically, it may be arranged such that after the user inputs the specification information on the specification information input display screen, a maker selection display screen is displayed at the user terminal 201, and the user selects a parts maker to transmit the specification information on this maker selection display screen.

Further, according to the embodiment described above, although it is described by way of example, in which the link server 313 converts the terms used in the response information received from the maker server 312 to the standard terms, and transmits it to the user terminal 201, however, it may be arranged also such that the maker server 312 transmits the response information directly to the user terminal 201.

Still further, according to the embodiment described above, it is described by way of the example where the table pertaining to the terms of the parts is prepared for each kind of the parts, however, it may be arranged also that the table pertaining to the terms of the parts is prepared for each maker. Further, a table describing all the terms may also be provided.

Further, in the embodiment described above, it may be arranged that the operating company of the link server collects a fee from the user. More specifically, the user, when purchasing the parts, sends the user ID given to the user in advance together with the parts number to the link server, and the link server receives this parts number and the user ID. Then, the operating company of the link server, on the basis of the parts number and the user ID, withdraws amount of a bill of the parts and a commission fee from the bank account of the user, and transfers the amount of the bill of the parts to the bank account of the parts maker.

By the way, there may be provided a single server having both the functions of the search server 203 shown in FIG. 51 and the link server 313 shown in FIG. 65. That is, such a single server can convert the terms and also execute search operation on the basis of the conversion thereof.

As described hereinabove, in the LCA system and for searching the parts relating thereto, various databases are involved. For example, the maker of the products (purchaser side 101) is normally provided with a parts database (for example, the parts information database 111 shown in FIG. 43) for managing the parts to be used in the product.

It is possible that there exists unnecessary data, in the parts database, of unnecessary parts that have become obsolete due to an interruption of manufacture of a product or elapse of its maintenance period. It is useless to include such data of the obsolete parts into the database. Although it is possible manually to remove such data of the obsolete parts, this work will be substantial and inefficient.

As a method to solve this problem, it is contemplated that by obtaining a data which has no record of shipment for the past several years (hereinafter referred to as inoperative parts list) from the parts makers supplying the parts to the user, the user searches through unnecessary parts data on the basis of this inoperative parts list, then, a work efficiency in the removal of the obsolete data of the unnecessary parts and the like can be achieved.

However, because the inoperative parts lists obtained from respective parts suppliers are written in various formats, it is required to execute a sequential browsing of the inoperative parts list as a preliminary step for the subsequent work to follow. In the sequential browsing thereof, addition of necessary information and deletion of unnecessary information are performed. However, there is a problem that actual work time to be spent in the sequential browsing is enormous and human error is likely to arise. Thereby, a fast and precise conversion to a standardized format has been difficult.

Therefore, to solve these problems described above is important in order to construct an user friendly system. In the following, an update apparatus and a method for updating parts database capable of efficiently updating the parts database on the basis of the inoperative parts lists received from the parts makers and suppliers will be described.

Figure 71:
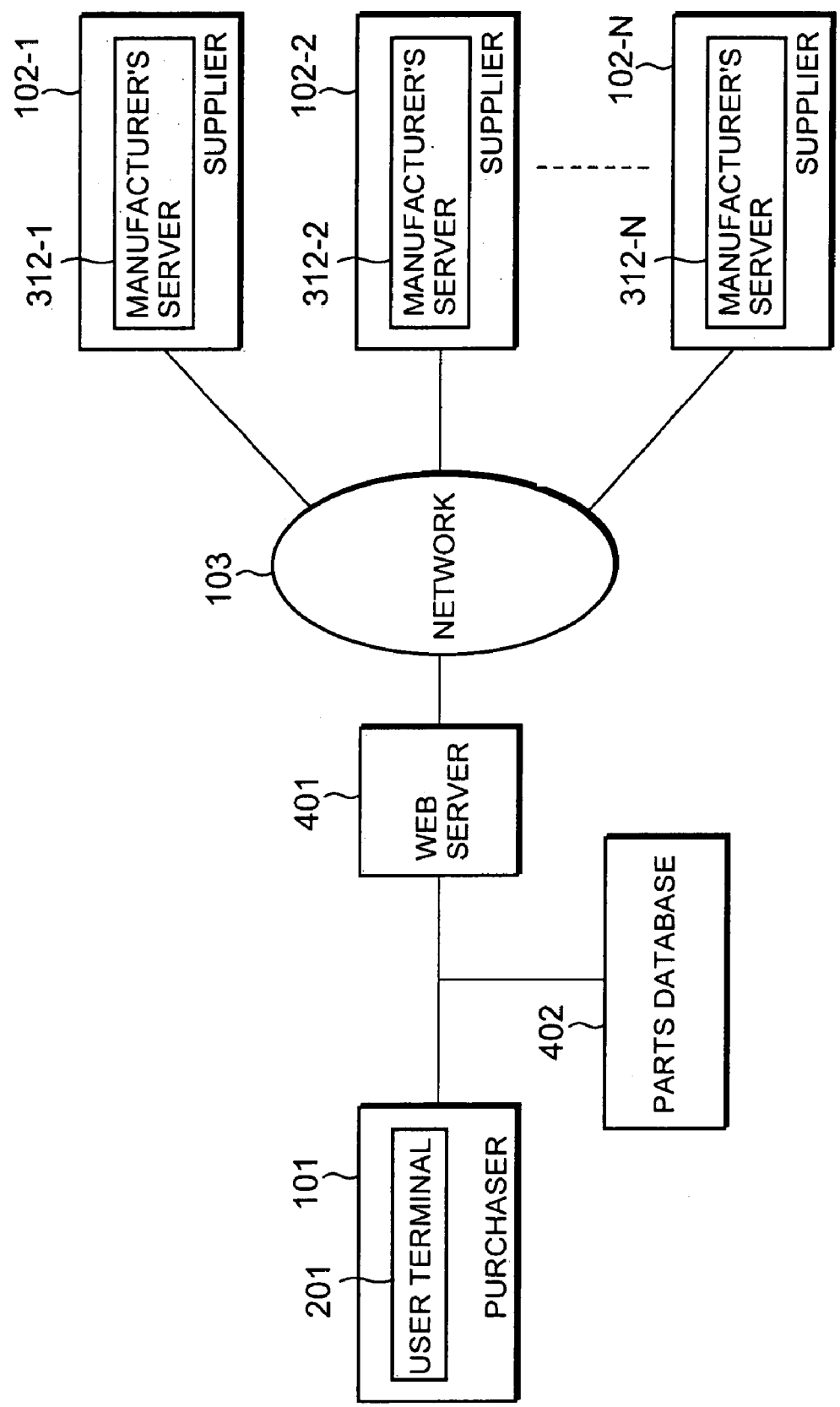
FIG. 71 is a diagram showing a structure of a system including parts database updating device according to an embodiment of the invention.

FIG. 71 is a diagram showing a configuration of an update apparatus for updating a parts database according to an embodiment of the present invention. A user terminal 201 shows a terminal at a maker that manufactures and sells, for example, electronic devices, and the maker provided with this terminal is a company in a position to purchase various parts involved in the manufacture and sales of these electronic devices from suppliers. To Web server 401, respective suppliers, for example, respective maker servers 312-1 to 312-N of respective parts makers are connected via a network 103 such as Internet or the like.

Further, to the Web server 401 and the user terminal 201, a parts database 402 which is managed by a purchaser 101 are connected. Although the parts database 402 is provided at a position illustrated in the drawing, it may be also stored in a storage unit (not shown) provided within the user terminal 201 or Web server 401. Further, this parts database 402 corresponds to the parts information database 111 shown in FIG. 43.

The maker servers 312-1 to 312-N, although not shown, are connected to a respective parts database storing respective parts that can be supplied to the customers from respective makers. More specifically, the user terminal 201 and the maker servers 312-1 to 312-N are a personal computer with Web browser and electronic mail software preinstalled.

The parts maker (supplier 102) supplies parts in response to an order from the product maker (purchaser 101) In response to a request from the user (product maker), data of inoperative parts lists are transmitted from the maker servers 312-1 to 312-N to the Web server 401. The inoperative parts list is a list of parts which were not shipped to the product maker from the supplier for the past three years, for example. Respective suppliers prepare the inoperative parts list according to their own formats, and transmit. For example, the inoperative parts list is data written in Excel (Trade Name) (hereinafter referred to as Excel data).

The user terminal 201 holds the inoperative parts list accepted from the supplier in the Web server 401, and causes the inoperative parts list stored in the Web server 401 to be converted to a standardized format inoperative parts list. This conversion processing is executed automatically by software (without troubling the user). By referring to the standardized format inoperative parts lists, the parts database 402 is updated. Updating of the parts database 402 is executed by the user terminal 201, however, a dedicated personal computer for exclusive use of the database may be provided as well.

By the way, the user terminal 201, the maker servers 312-1 to 312-N at the suppliers and the Web server 401 have basically the same structures as the PC 10 shown in FIG. 11, thereby their descriptions will be omitted.

Figure 72:
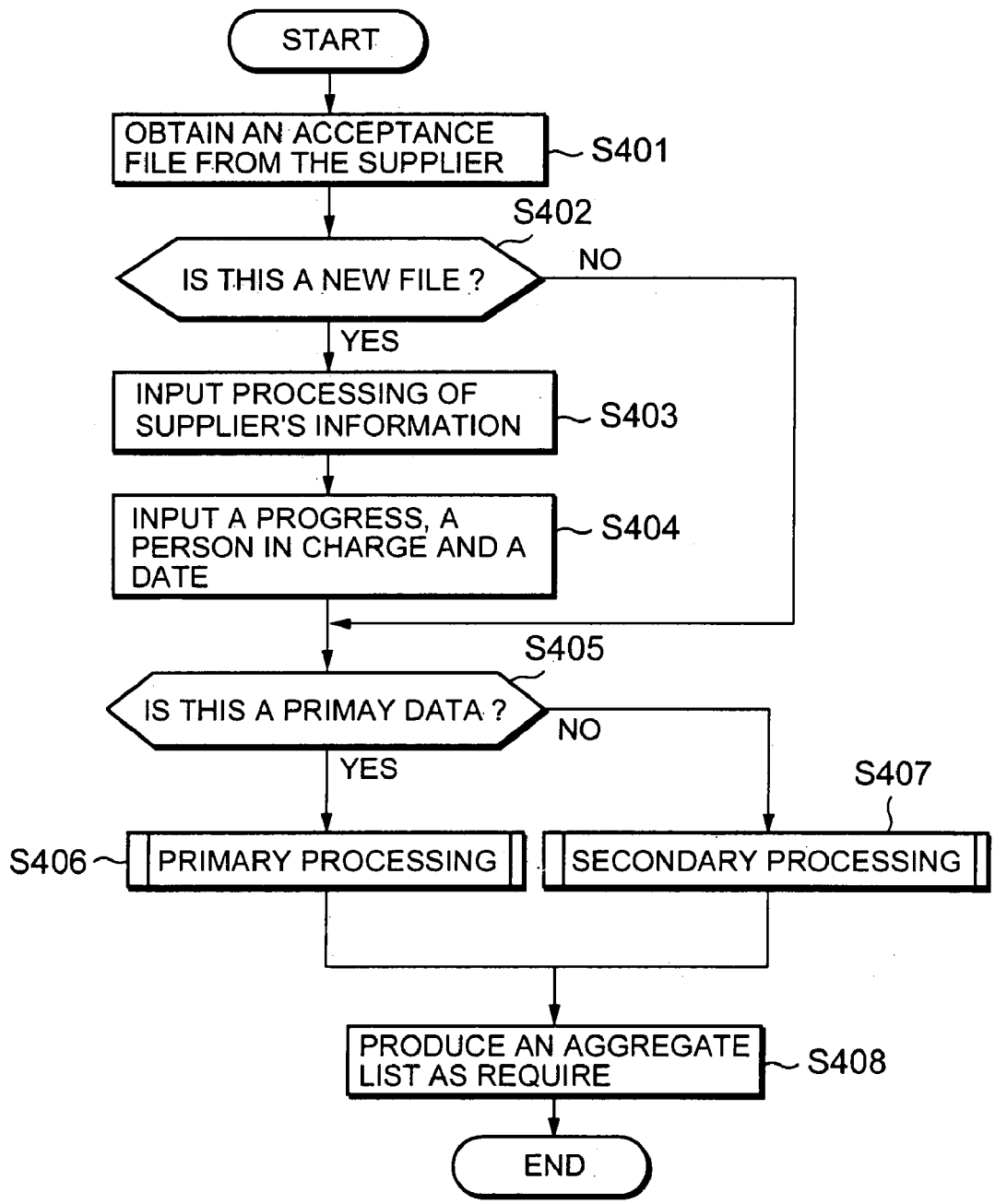
FIG. 72 is a flowchart for describing the $0^{th}$ processing for an inoperative parts list.

Processing to be executed under control of the user terminal 201 will be described further in detail. FIG. 72 is a flowchart showing a $0^{th}$ processing of the inoperative parts list received from the supplier (parts maker). In a first step S401, an original copy of the file (inoperative parts list) received from the supplier is stored in a predetermined storing area. A recipient desk who actually receives the file from the supplier is at a material/procurement department or the like in the company.

The inoperative parts lists as sent from the suppliers are written in unique formats and unique expressions proper to respective suppliers, thereby, they are not in a unified status that they can be managed uniformly. Therefore, after identifying respective contents as correctly as possible and carrying out the standardized conversion, the unified management can be operated.

In the next step S402, an accepted file is determined if it is a new file. If determined to be a new file, in step S403, a process to input supplier information is executed. For example, information such as a supplier's code, a company name of supplier, a phonetic transcription in kana of the company, a person in charge, date of submission and the like are read from the inoperative parts list and is inputted.

If it is determined not a new file in step S402, the input process of the step of S403 is skipped. Then, in step S404, for a progress control, the date, the person in charge and the like are inputted upon every progress. The progress here refers to receiving data from the supplier, consulting with other databases and the like.

In step S405, it is determined if it is a primary data or not. The primary data refers to the data as received from the supplier, namely, it means untreated data. If it is the primary data, in step S406, a primary processing is executed, if not, in step S407, a secondary processing is executed. After the primary or the secondary processing is completed, a tabulation table is generated as required in step S8.

Figure 73:
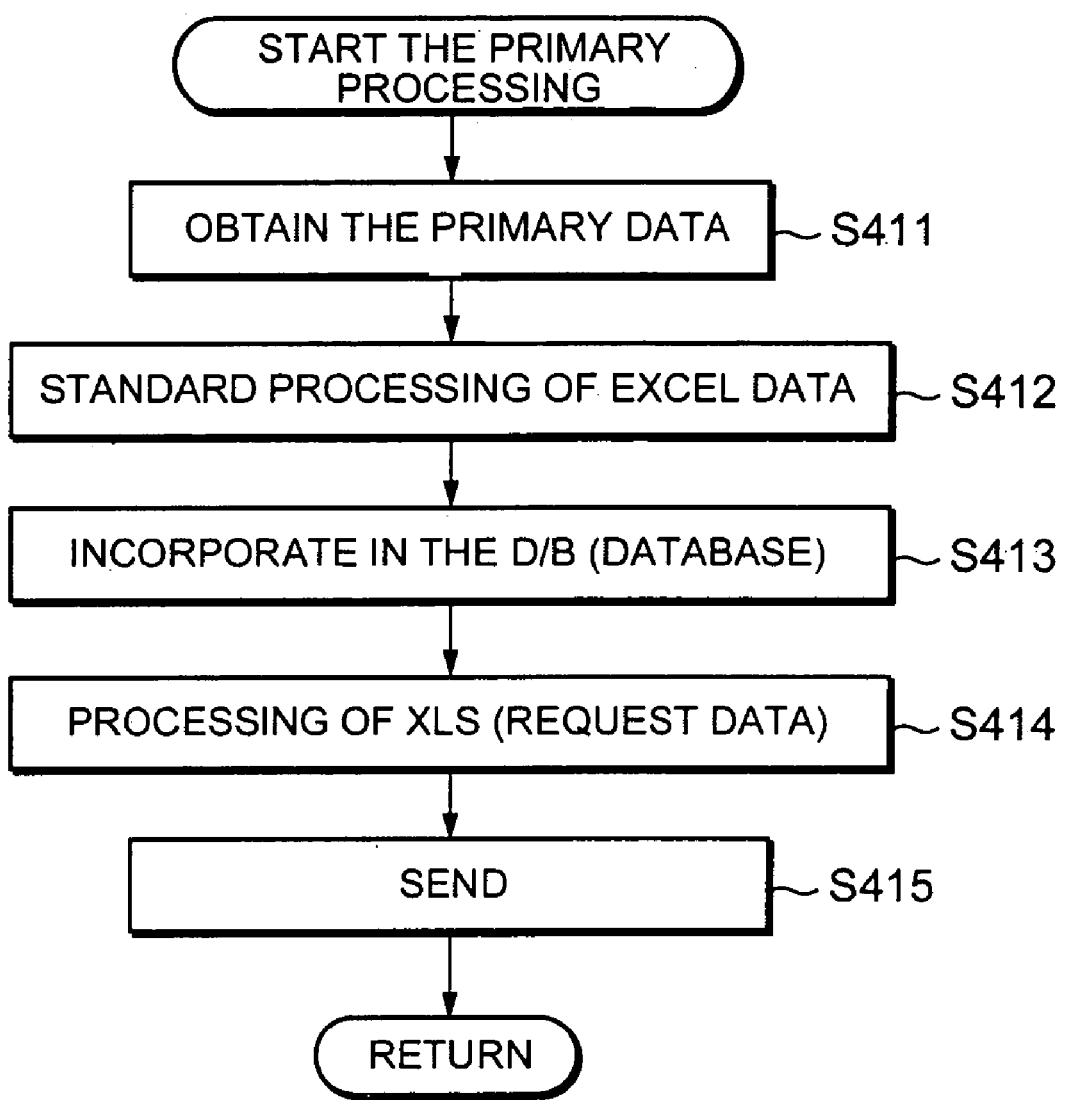
FIG. 73 is a flowchart for describing the primary processing for the inoperative parts list.

FIG. 73 is a flowchart for describing the primary processing in the step S406 in FIG. 72. The primary data (inoperative parts list) sent from the supplier (parts maker).is, for example, Excel data written in Excell (Trade Name). In step S411, an original inoperative parts list and a copy thereof are stored in a different place. The copy is prepared for a contingency. For example, the storage of the original file is in a folder "F:\PANDA PJ\Data\Org\PRC Supplier", and the storage of the copy is in a folder "F:\PANDA PJ\Data\Org\PRC Temp".

In the next step S412, an application (Microsoft Excel (Trade Name)) is activated, and in accordance with a preset program flow, a processing on the file of the copy in the "F:\PANDA PJ\Data\Org\PRC Temp" is executed, thereby standardizing the inoperative parts list supplied from the suppliers. Namely, the inoperative parts lists supplied from respective suppliers are converted to the standardized format of the inoperative parts list.

FIG. 74 shows an example of standardized inoperative parts lists. A column on the utmost left-hand side of a sheet is "No.", and respective columns toward the right-hand side in succession, are "supplier's code", "supplier's name", "part name", "specific die", "last order" ("date", "quantity", "from"), and "comments". Further, corresponding to the whole part of the sheet, boxes of "person in charge", "contact at", "date of entry" are provided. In FIG. 74, in the first row numbered "1", samples of contents for respective columns are described.

In order to convert the inoperative parts list supplied from the suppliers to the predetermined format as shown in FIG. 74, the following processing to be described later will be applicable.

For example, processing such as a release of unnecessary inter-cell association, a data format text conversion, a provision of supplier codes within the same file, unification of information in respective rows, unified expression of Yes/No field and the like will be applicable.

By activating the software automatically to execute the above-mentioned processing, the inoperative parts lists supplied from the parts suppliers can be converted to the standardized inoperative parts list (in Excel file) without troubling the user. A prefix "PRC" is attached to a file name of the inoperative parts list after the conversion, and the file is stored in a folder "F:\PANDA PJ\Data\Org\Import File". Namely, as the file name, "PRC previous file name previous sheet name. xls" is used. Here, the prefix has a function as an index to indicate that this file is in a predetermined format in subsequent data processing steps to follow, and is used to discriminate from other files in the same folder.

If the inoperative parts list from the supplier cannot be standardized by the software, a prefix of "NG" is attached to the file name in the inoperative parts list (Excel file), and is stored in folder "F:\PANDA PJ\Data\Org\NG". That is, as the file name, "NG previous file name previous sheet name.xls" is used. By the way, this automatic operation is repeated until all the files within "F:\PANDA PJ\Data\org\PRC Temp" are gone.

In step S413, an application (Microsoft ACCESS (Trade Name) is activated, and the inoperative parts list generated in the file "F:\PANDA PJ\Data\Import File" and gone through the standardizing processing is read in the management database, thereby executing unification of respective inoperative parts lists from the respective suppliers, which were handled separately.

On the basis of parts number information in the inoperative parts list having been converted, the parts numbers are sorted in accordance with a content division. Examples of the content divisions are "electricity", "mechanical", "semiconductor", "supplementary materials", "assembly parts", "service parts" and "others". By this sorting operation, the selection of a search object becomes easy.

An item (parts number, hereinafter referred to as P/N) necessary for searching the parts in the management database (this search will be referred to and PADICS search) is selected, then, in a format readable by the application (Microsoft Excel), with a prefix of "division information and date of processing" attached to the file name, it is generated and stored in the folder "F:\PANDA PJ\Data\Export File", thereby enabling a plurality of batch processing to be executed at once.

In step S414, a processing for integrating a plurality of suppliers to be filed in one Excel file is executed. This process is for generating. Excel data in response to a request from the user.

Figure 75:
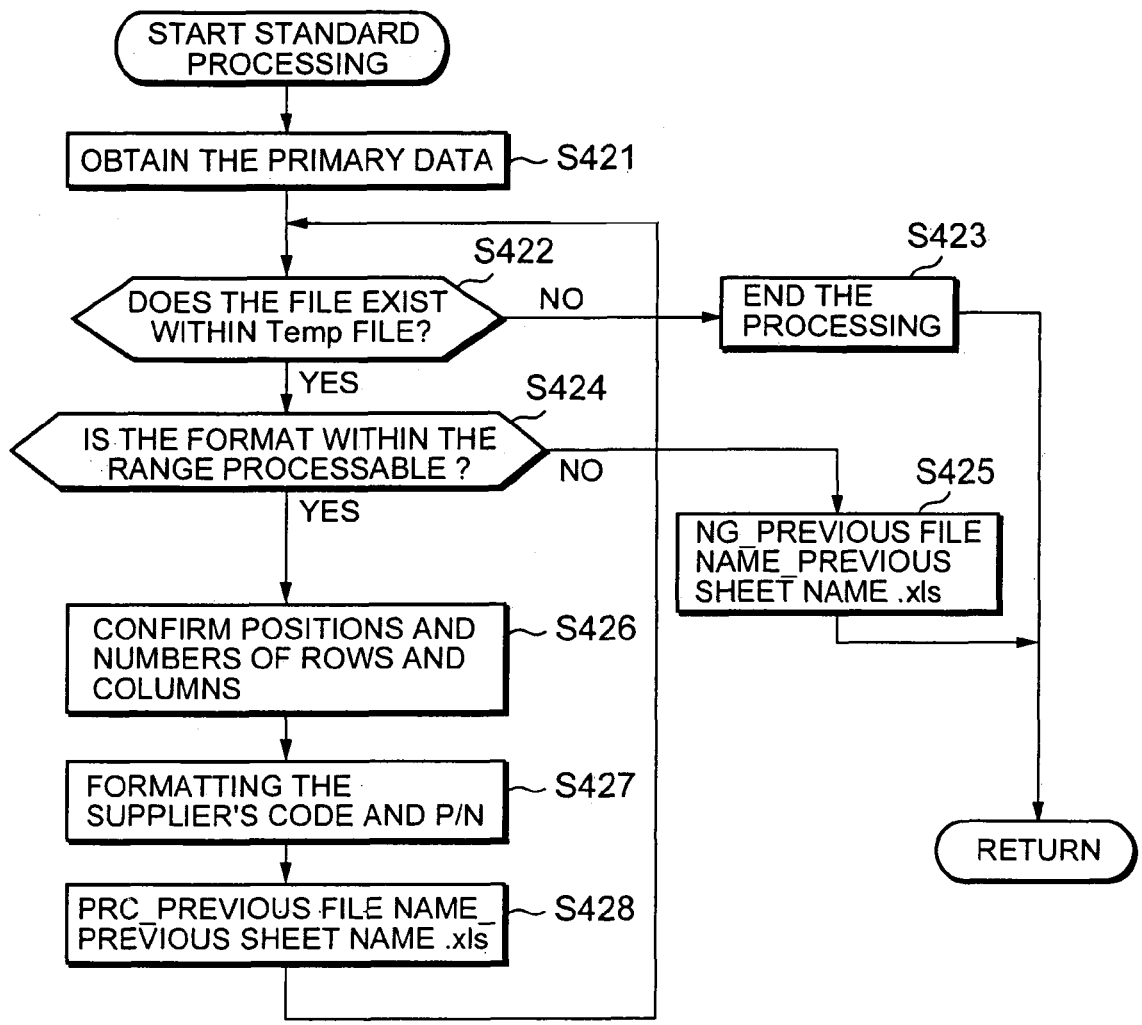
FIG. 75 is a flowchart for describing a formatted processing.

FIG. 75 shows an example of standardizing processing to be executed in step S412. In step S421, the primary data (Excel data) is stored in the folder, and in step S422, presence of a copy file of the supplier file in the Temp file is examined. If the file does not exist, the processing terminates in step S423.

If the file exists in the Temp folder, in step S424, it is determined if the file is in a format within an expected range that can be processed. This decision is done by reading information in each cell and recognizing how the sheet is structured.

In step S424, if it is determined not in the format in the range that can be processed, the step proceeds to S425, the prefix of "NG" is attached to the file name of the Excel file, as described above, and is stored in the folder "F:\PANDA PJ\Data\org\NG" In step S424, if it is determined to be in the format within the range that can be processed, in step S426, a range of its standardization is designated, and positions and numbers of rows and columns in the range designated are confirmed.

Then, in step 427, by designating a full size/half size, deleting "-", and the like, the supplier codes, part number P/N are standardized. In step S428, standardized Excel data is outputted. A file name of this outputted data is "PRC previous file name previous sheet name.xls". Then, the process returns from step S428 to step S422. Then, when all files in the folder "F:\PANDA PJ\Data\org\Temp", which stores the standardization operation in a copy file, are gone, the steps S422 and to follow are repeated.

By the way, the standardization processing shown in FIG. 75 is one example, and any other method, if it can automatically (without troubling the user) execute the standardization by means of software, is applicable to the present invention.

The processing shown in FIG. 73 described above is the primary processing for executing standardization of the inoperative parts list. In the next, the secondary processing (the secondary processing in step S407 in FIG. 72) to be applied to the data having gone through the primary processing will be described by referring to a flowchart shown in FIG. 76.

In step S431, an original copy of the PADICS search result list obtained per batch process file from a requestee is stored in the folder "F:\PANDA PJ\Data\Org\PRC Supplier\PADICS" and a copy file thereof is stored in the folder "F:\PANDA PJ\Data\Org\Temp". Preparation of the copy file is for a contingency as described above.

When the application (Microsoft Excel) is started, on the basis of a preset program flow, information necessary for tabulation is selected from the information obtained, and only such information that needs to be incorporated in the parts database is generated, with a prefix of "ISS" attached, and stored in the folder "F:\PANDA PJ\Data\Import File". In this instance, the prefix has a function to indicate, in the subsequent processing, that this file has completed of its primary processing, and is used to discriminate from other files in the same folder.

The application (Microsoft ACCESS) is started, executed for the folder "F:\PANDA PJ\Data\Import File, and stored in the parts database.

Figure 76:
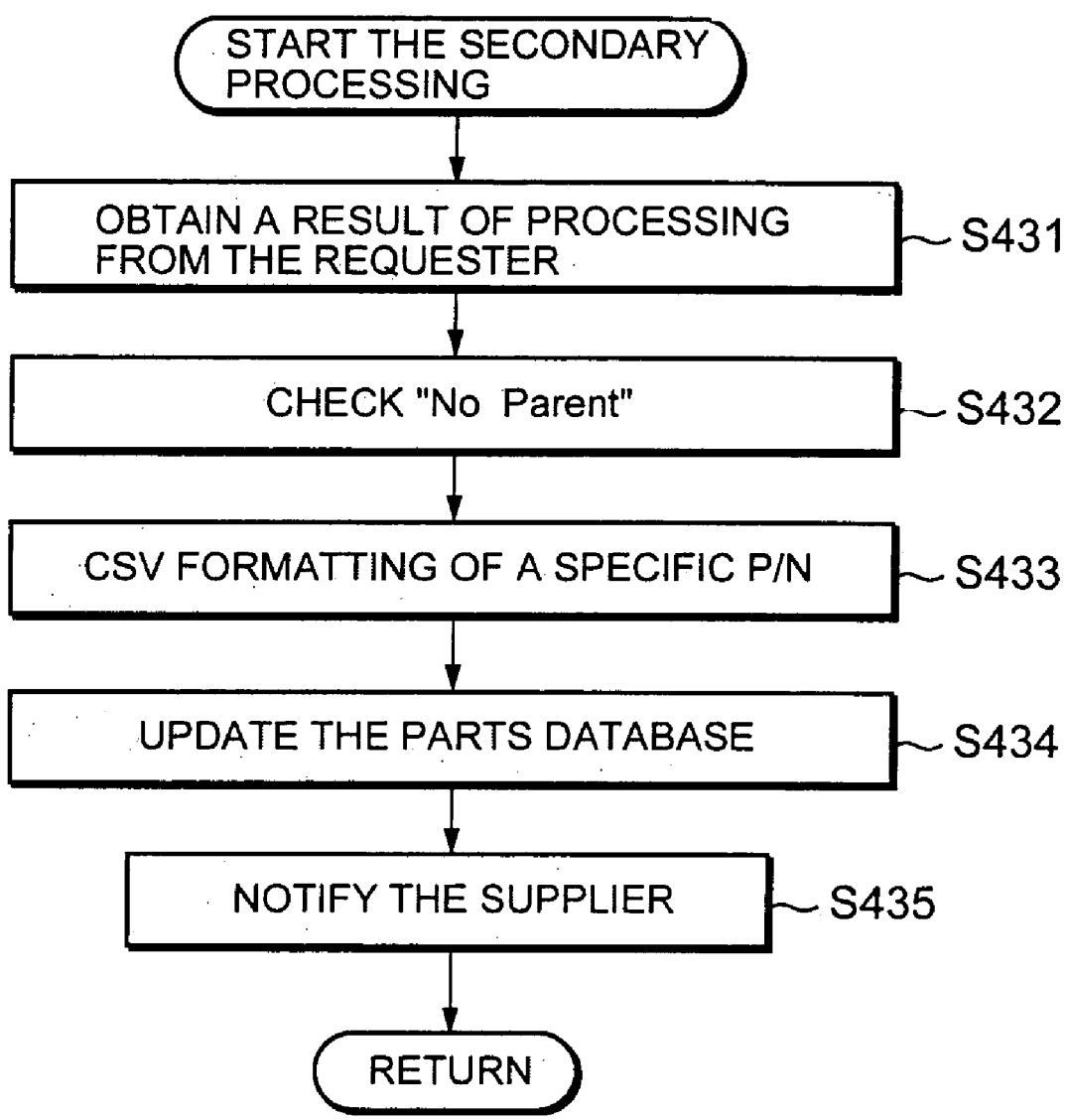
FIG. 76 is a flowchart for describing the secondary processing for the inoperative parts list.

In the flowchart shown in FIG. 76, in step S432, an instance is shown where the supplier's sheet is stored in the Temp folder, and a presence of "Parent" is to be checked. Presence of "Parent" means that one part is used in one product or in a plurality of products. Namely, "Parent" corresponds to a product. In step S432, "No Parent" check is conducted. That is, parts that are not used in the products are checked.

In step S433, the parts number of the part that is found not in use for the product is put up for CSV. The CSV (Comma Separated Value Format) is a format whereby data of the database or tabulation software are arranged item by item or cell by cell divided with a comma, and stored as a text file.

Then, in step S434, the parts database is updated. That is, the data of the parts not in use for the product is deleted from the parts database. By the way, because it is customary that even after stoppage of manufacture of the product, a predetermined period of years are designated as a parts preservation term, preferably, it is checked if the preservation term has elapsed at the same time when the part is found not in use for the product before identifying unnecessary parts.

In step S435, the referee information is sorted and tabulated according to presence of products/parts structures, SDI division, presence of P/N information and the like, and this information is added to the inoperative parts list obtained from the supplier, and is reissued to respective suppliers, to be notified to the suppliers (parts makers) via the predetermined sections.

When required, respective fields are associated for executing a complex tabulation, and which is utilized as a future guideline. As an example of tabulation, there are a progress management, an inoperative status, an estimated die disposal rate and the like.

The present invention is not limited to the embodiments described above, and it should be understood that various modifications, changes and applications can be contemplated without departing from the spirit of the present invention. For example, the software for generating the inoperative parts list may also use any application software other than Excel. Further, the method of receiving the inoperative parts list from the supplier may also use, other than the communication, such a method using a recording medium which stores the list.

A method of updating the database according to still another embodiment or still more another embodiment that can be added to the features of the embodiment will be described in the following.

It is customary, as described above, that the product maker (purchaser side 101) is provided with the parts database system (for example, a combination of the parts database 402 and the Web server 401 shown in FIG. 71). Further, the parts database system may be comprised of a plurality of parts databases.

Figure 77:
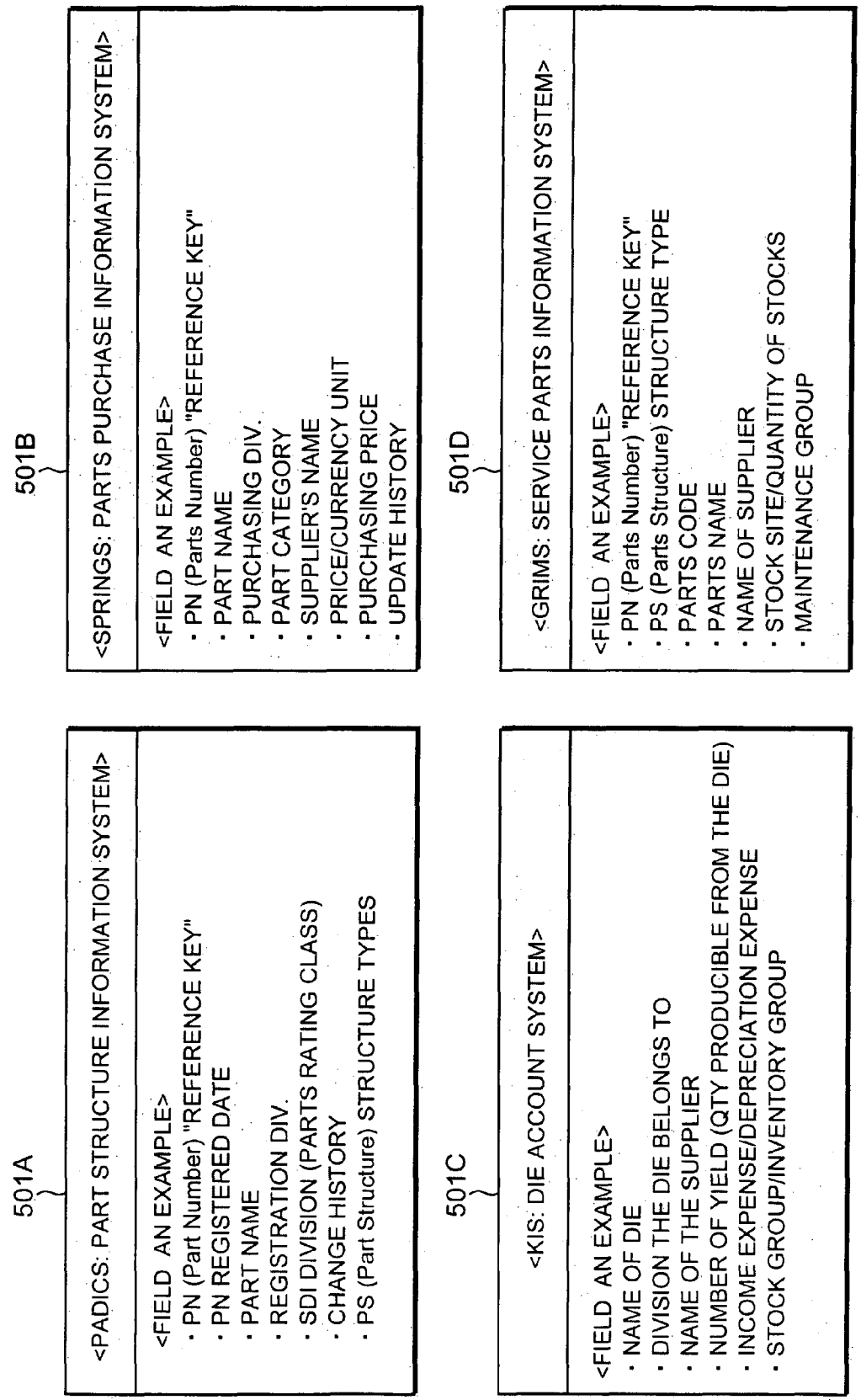

For example, as shown in FIG. 77, there may be provided four kinds of parts databases designated by reference symbols of 501A, 501B, 501C and 501D, respectively. In the following description, a parts database 501A is referred to as a parts structure information system (PADICS), a parts database 501B is referred to as a parts purchase information system (SPRINGS), a parts database 501C is referred to as a die account information system (KIS), and a parts database 501D is referred to as a service parts information system (GRIMS). In FIG. 77, examples of field information in respective databases are described.

The parts structure information system 501A is a parts configuration information system. This system 501A includes fields of a PN (Parts Number), a date of PN registration, a part name, a registration division, an SDI class (which means a part rating class, the higher rating has the higher generality of use), a history of updating, a PS (Parts Structure: which means a structured model (product)), and the like.

The parts purchase information system 501B is a parts procurement information system. This system 501B includes fields of a PN, a parts name, a purchasing division, a part category, a purchase supplier name, a unit price/currency unit, a purchase price, a history of updating and so on.

The die account information system 501C is a die accounting system. This system 501C includes fields of a PN, a die name, a die owning division, a purchase supplier name, a number of yields (the number that can be yielded from the die), an acquisition price/compensation cost, a preservation sector/inventory sector and so on.

The service parts information system 501D is a service parts information system. This system 501D includes fields of a PN, a PS, a product code, a part name, a purchase supplier name, a stock place/stock quantity, a maintenance sector and so on. The product code is a code to be attached uniquely to differentiate according to the place of destination of the same production model having the same F number. For example, this product code is attached to on the basis of a domestic specification, EU specification or the like. Normally, it coexists with the F number. The F number, which is similar to PS in the system, means the information of a structured model (product).

Where there exist a plurality of databases (systems) pertaining to a plurality of parts as described above, for example, when a discontinuance of a predetermined production model occurs (stoppage of production), in accompaniment with this, a plurality of databases are updated. In this updating, while as the plurality of the databases share a part of the field information, their link is not necessarily complete. That is, in the instance of FIG. 77, as a reference key, the PN (part number) serves as common field information.

Figure 78:
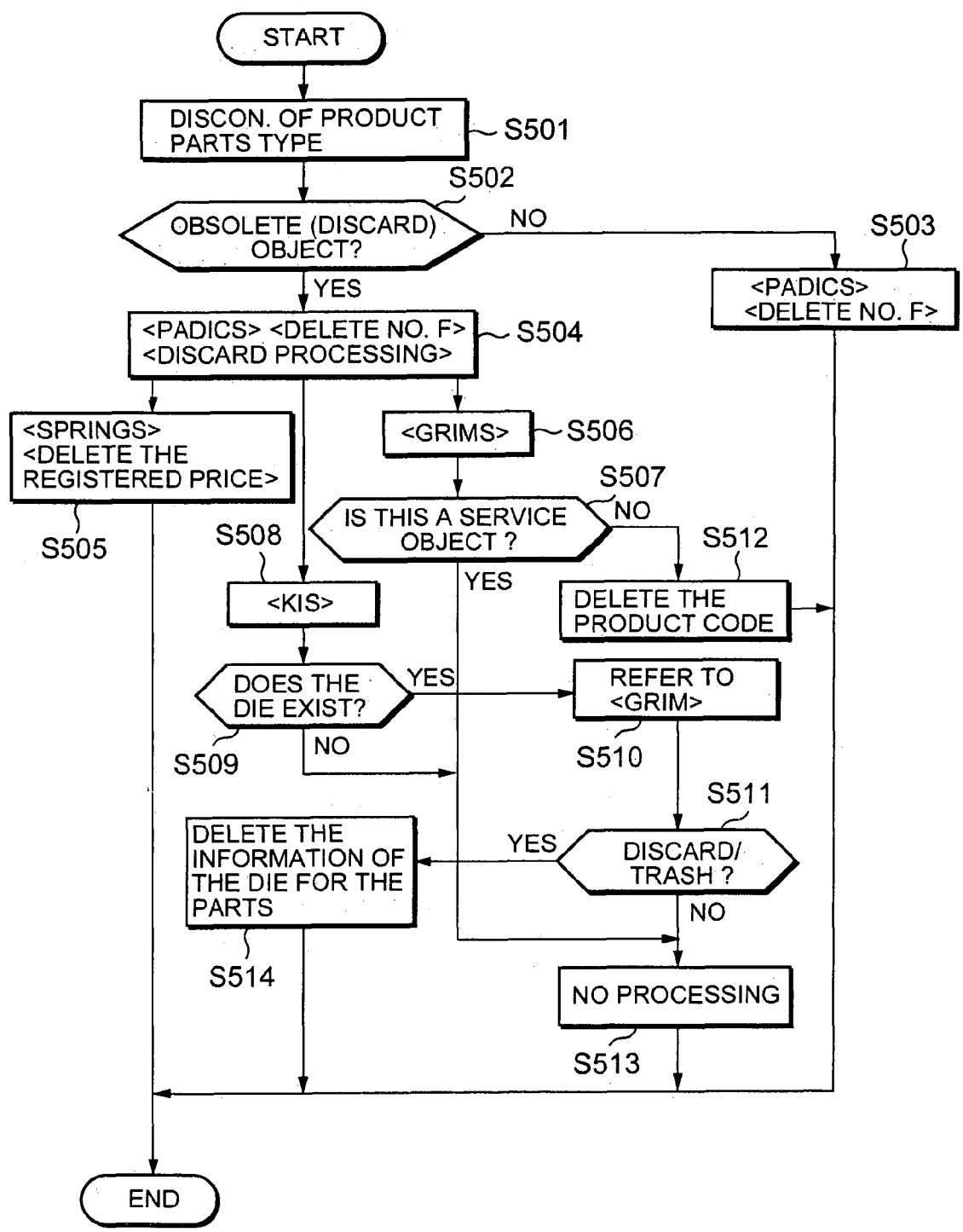
FIG. 78 is a flowchart describing a maintenance management method for a plurality of database systems.

FIG. 78 is a flowchart showing data processing sequences in the system having such the databases as above. Step S501 indicates an occurrence of discontinuance of a production model. In step S502, it is decided whether or not the part becomes an object of an obsolete number. The obsolete number is meant to delete the part data from the database. If a possibility that it is used in different products is high, namely, if it is determined to have a high degree of general use, it is determined not to be treated as an object of obsolete number, and in step S503, the F number is deleted. The information of the structure model that is discontinued is deleted.

In step S502, if determined to be an object of obsolete number, in step S504, in the parts structure information system 501A which is the main database, F number delete processing is executed, and an obsolete number processing obsolescing from the F number is executed. Further, in step S505, the unit price of the parts which is an object of obsolescing number is deleted from the parts purchase information system 501B.

Further, in step S506, the service parts information system 501D is referred to, and in step S507, it is determined whether or not it is an object of service, that is, whether or not it is within the preservation term. Even if there arises a discontinuity, it is mandatory that the parts of the discontinued model should be preserved for a predetermined period of years. If it is not the object of the service, in step S512, the product code is deleted, and if it is the object of the service, in step S513, no processing is executed.

In step S508, in accompaniment with the obsolete number processing, the die account information system 501C is referred to. Then, in step S509, the presence of the die for the part which is the object of obsolescing number is determined. If the die does not exist, in step S513, no processing is executed. If the die exists, in step S510, by referring to the service parts information system 501D, whether or not it is the service object is checked.

In accordance with a result of step S510, in step S511, it is determined whether or not the die should be disposed. If it is not the service object, in step S514, the die information of the part of interest is deleted. On the other hand, if it is the service object, in step S513, no processing is executed.

Further, in order to reduce the amount of information to be stored in the above-mentioned database, and in order to lower a price of the parts by a merit of collective procurement, standard parts are set up, and the design engineers are urged to utilize these standard parts as many as possible. More specifically, a specific division or section as a main promoter sets up standard parts in respective fields of electrical/electronic, mechanical, semiconductor, et al., and prepares a standard parts table describing information of the standard parts thus set up. Then, this standard parts table is stored in the database system.

Also, the product maker, in order to select a necessary part during design work, utilizes the above-mentioned parts database system. At this selection of the part, it is general to use PN as the search key.

Figure 79:
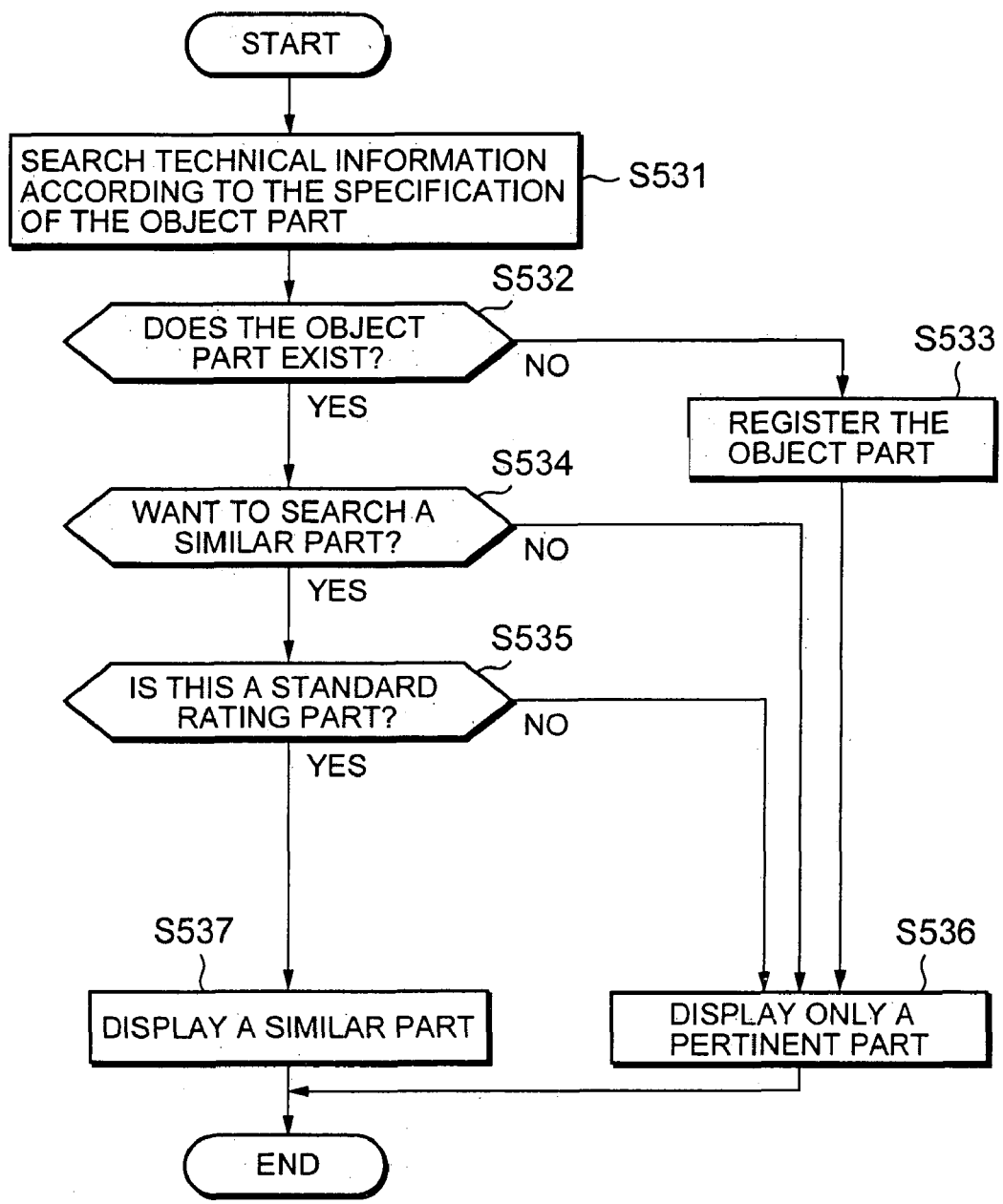
FIG. 79 is a flowchart for describing sequences of parts selection processing.

FIG. 79 is a flowchart describing sequential steps of parts selection procedures. At first, in step S531, the design engineer, on the basis of a specification of a desired object part, extracts a PN from a "cataloged brochure" or a "standard rating parts table", inputs this extracted PN on the search screen displayed on the terminal device, and sends this PN inputted to the parts structure information system 501A.

In step S532, the parts structure information system 501A receives the PN inputted on the search screen in step S531, and determines if parts information corresponding to the PN exists or not in the database. If it is judged no part corresponding to the PN exists, the parts structure information system 501A transfers the processing to step S533. If it is judged a part corresponding to the PN exists, the parts structure information system 501A transfers the processing to step S534.

If in step S532 no part corresponding to the PN is judged to be present in the database, in step S533, the parts structure information system 501A causes a part registration screen to be displayed on the terminal device prompting the user to register the object part, stores the information inputted via this display screen in the database, and transfers the processing to step S536.

On the other hand, when in step S532 a part corresponding to the PN is judged to exist in the database, in step S534, the part structure information system 501A judges if a part similar to the part corresponding to the PN exists in the database or not.

In step S534, if it is judged that a part similar to the part corresponding to the PN does not exist in the database, the part structure information system 501A transfers the processing to step S536.

On the other hand, in step S534, if it is judged that a part similar to the part corresponding to the PN exists in the database, in step S535, the part structure information system 501A judges if a standard rating part is included in the part corresponding to the PN and the part similar to the part corresponding to the PN.

In step S535, if it is judged that the standard rating part is not included, in step S536, the part structure information system 501A causes the part information corresponding to the PN to be displayed on the screen of the terminal device.

On the other hand, in step S535, if it is judged that the standard rating part is included, in step S537, the part structure information system 501A causes only information of the part that is the standard rating parts, within the parts corresponding to the PN and the parts similar to the part corresponding to the PN to be displayed on the screen of the terminal device.

Update processing of the database system to be executed as described above is executed independently in a plurality of databases. For example, although data is updated in the part structure information system 501A, its contents are not reflected on other databases. In addition, link processing for linking (associating) between the F number and the product code is not adequate. Further, even once in step S508, update information of the part structure information system 501A is displayed to the die account information system 501C, however, in step S509, if the die exists, updating in the die account information system 501C is withheld.

Thereafter, any system reference between the part structure information system 501A and the die account information system 501C is not executed. The maintenance control is committed to the die account information system 501C. That is, in principle, a respective maintenance control of a respective database is executed independently. However, in such a status as above, the following problem is likely to arise.

Because of the independent maintenance control of the data in the plurality of the databases, even if the field information is shared among them, reference of information is required to be executed individually. Thereby, sometimes, it may occur that respective information retained differs in mutual databases.

A record relevance between the databases must be declared in mutual databases in advance. However, if the mutual databases are operated independently, these procedures are not executed in a most case, and in the case where mutual complementation or the like is to be executed, it is necessary to confirm and coordinate field formats or the like beforehand.

Basically, a record updating between the databases is required to be operated in linkage. However, in the present situation where they are operated independently, these procedures must be executed in each system. Then, consistency with each other must be ensured afterward.

In order to execute the above-mentioned intersystem linkage, coordination of existing systems or reconfiguration thereof is required, thereby inevitably interrupting respective system flows.

Further, in the part selection processing described above, the following problem may arise.

Because that updating of the part information registered in the database system is not performed in sequence at each occasion, it is not seldom that a deviation arises between the part information registered in the database and the part information introduced on the catalog brochure and/or the standard rating parts table.

Because the updating of the part information registered in the database is manually processed, it is also not seldom that the part information is erroneously registered due to input error.

In the part selection processing, because the part selection is executed on the basis of PN, an ambiguous search within respective fields (categories.) on the basis of technical specifications is difficult. That is, due to non-setting of link between similar parts or due to inadequate searching, such an instance is considered to occur that information of a desired part or information of a part similar to the desired part cannot be extracted. In such an instance, even if the information of the desired part exists in the database, or an alternative similar part exists in the database, it is considered that this part information is newly to be registered (once again).

In the above-mentioned part database system, the part information once registered will be retained for ever unless a delete action is positively taken. Thereby, a problem may occur that unnecessary part information increases thereby introducing a substantial increase in the amount of information in respective databases interlinked. Further, an increase in the cost of the part maintenance management may result.

As a result of execution of the standardization activity, even in the case where the whole record data in a specific field in the system concerned are unified, such a problem may occur that due to a necessity of storing these unified fields and data to be maintained, excessive information may result in.

Because of inadequate allocation of the standard parts, a problem may be considered to arise that a price reduction by the merit of collective procurement is not sufficiently performed.

In order to carry out the link operation between the respective parts database systems, coordination or a reconfiguration of the existing systems becomes necessary, thereby causing a problem that respective systems are inevitably interrupted during this period.

Further, as to the standard parts described above, it is possible that the following problem may arise. When setting up the standard parts, because not only its set up criterion is unclear and indefinite, but also it is performed manually, they may deviate from actual status, as a result, a speedy set up of the standard parts is considered preferable.

The standard parts table described above is not directly linked with the parts database system, therefore, if there occurs any change in the standard parts table, consistency must be secured between the respective database systems and the standard parts table.

Therefore, the following database system and a method of updating the same, a database control apparatus and a method of controlling the same, as well as a database control program for solving the above-mentioned problems will be described.

In the following, by referring to FIG. 80, an embodiment of the present invention will be described. Also, in the description of the present embodiment with reference to FIG. 80, the four kinds of the databases (parts structure information system 501A, parts purchase information system 501B, die account information system 501C and service parts information system 501D) described with reference to FIG. 77 are assumed to be provided. Data fields contained in respective databases are the same as shown in FIG. 77.

Figure 80:
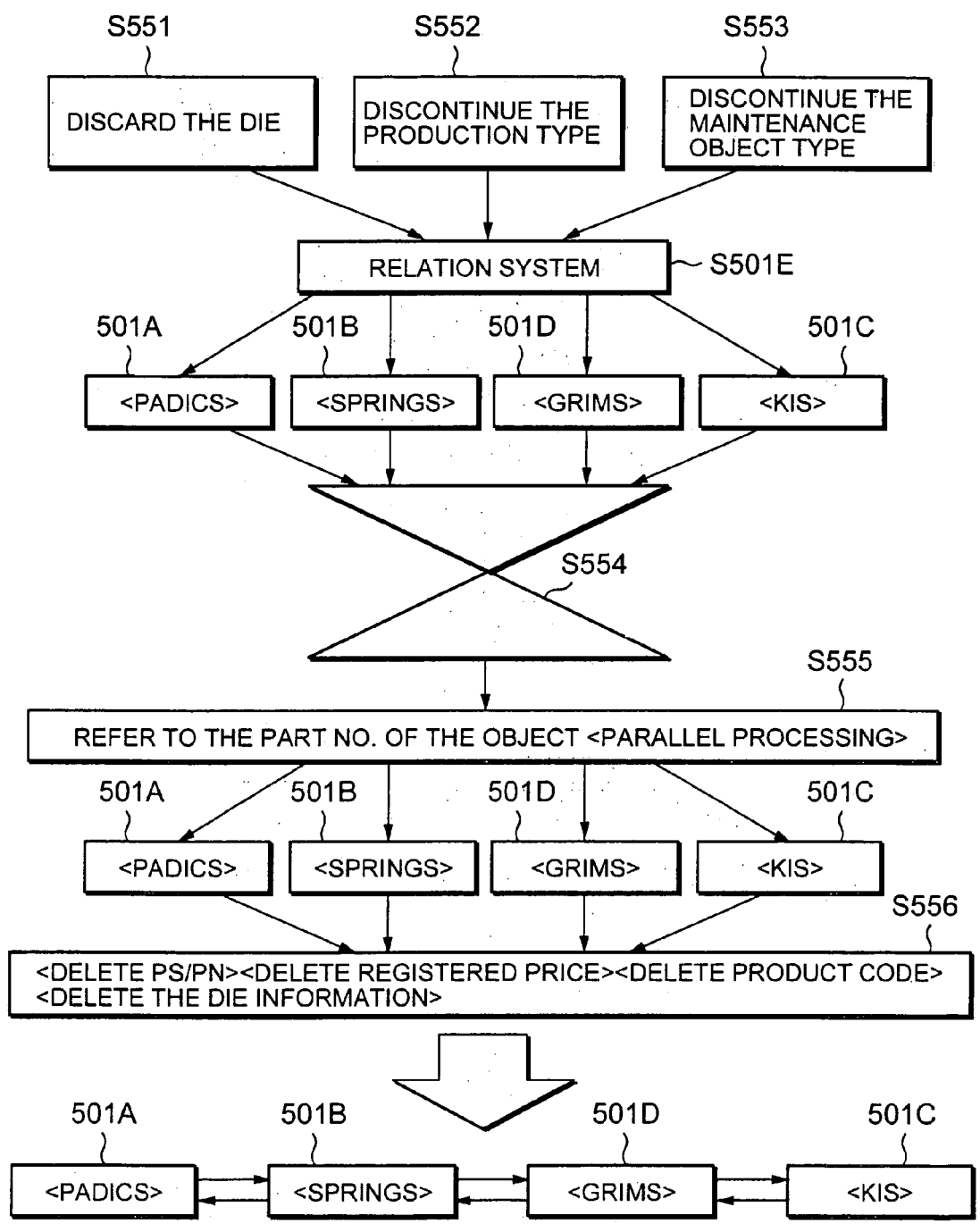
FIG. 80 is a flowchart for describing a database maintenance and management of an updating apparatus according to an embodiment of the invention.

In FIG. 80, reference symbols S551, S552 and S553 indicate an event that requires a maintenance management in a respective database system. Namely, there are shown disposal of the die 5551, discontinuity of the product model S552, and termination of the maintenance object model S553. If any one of them is executed, by referring to the field information and retained data in the parts structure information system 501A, the parts purchasing information system 501B, the die account information system 501C and service parts information system 501D, a relational system 501E temporarily stores information of a format with a similar structure of fields in these systems concerned. The database system is allowed to execute the reference operation without interrupting the system.

In step S554, as a reference key, a PN (part number) is extracted. Namely, field information commonly applicable to the databases 501A to 501D (reference key) is extracted. As a criterion of extraction at this time, a structure element of the field information such as a field format, a record length, a field name, a full size/half size of characters or the like is used. Of these fields which are contained respectively in the databases 501A to 501D, any field information of such fields that conform to all of these criteria of extraction or to more than a predetermined number thereof is extracted as the reference key. In order to improve its extraction precision, it is preferable to execute processing with a logical product of these data.

Further, if the field format, record length, field name, full size/half size and the like differ respectively between the parts structure information system 501A and the parts purchase information system 501B, the die account information system 501C or the service parts information system 50D, after completion of extraction of the reference key, a necessary conversion work is executed within the relational system 501E to allow for a mutual data sharing to be executed via the relational system 501E.

In step S555, using PN of the part which is an object of the obsolete number as the reference key, processing for the databases 501A to 501D is executed in parallel. That is, using PN as the reference key, a data (record) list is automatically generated (on the basis of a predetermined program) on the databases 501A to 501D, thereby updating (process to add, delete and change) the databases 501A to 501D.

More specifically, in step S556, deletion of PS and deletion of PN are executed for the parts structure information system 501A, deletion of the unit price registered is executed for the parts purchasing information system 501B, deletion of the die information is executed for the die account information system 501C, and deletion of the product code and deletion of PS are executed for the service part information system 501D. These processing can be executed without omission.

Further, an automatic mutual reference is executed between the parts structure information system 501A, the parts purchase information system 501B, the die account information system 501C and the service parts information system 501D so as to check presence of any difference in data. If a difference in data is found, an update processing is executed via the relation system 501E. By the way, if required, it may be arranged such that by integrating respective fields across these systems, tabulation thereof is executed. For example, tabulation of a progress control, inoperative status, an estimated die disposal ratio and the like can be generated.

Figure 81:
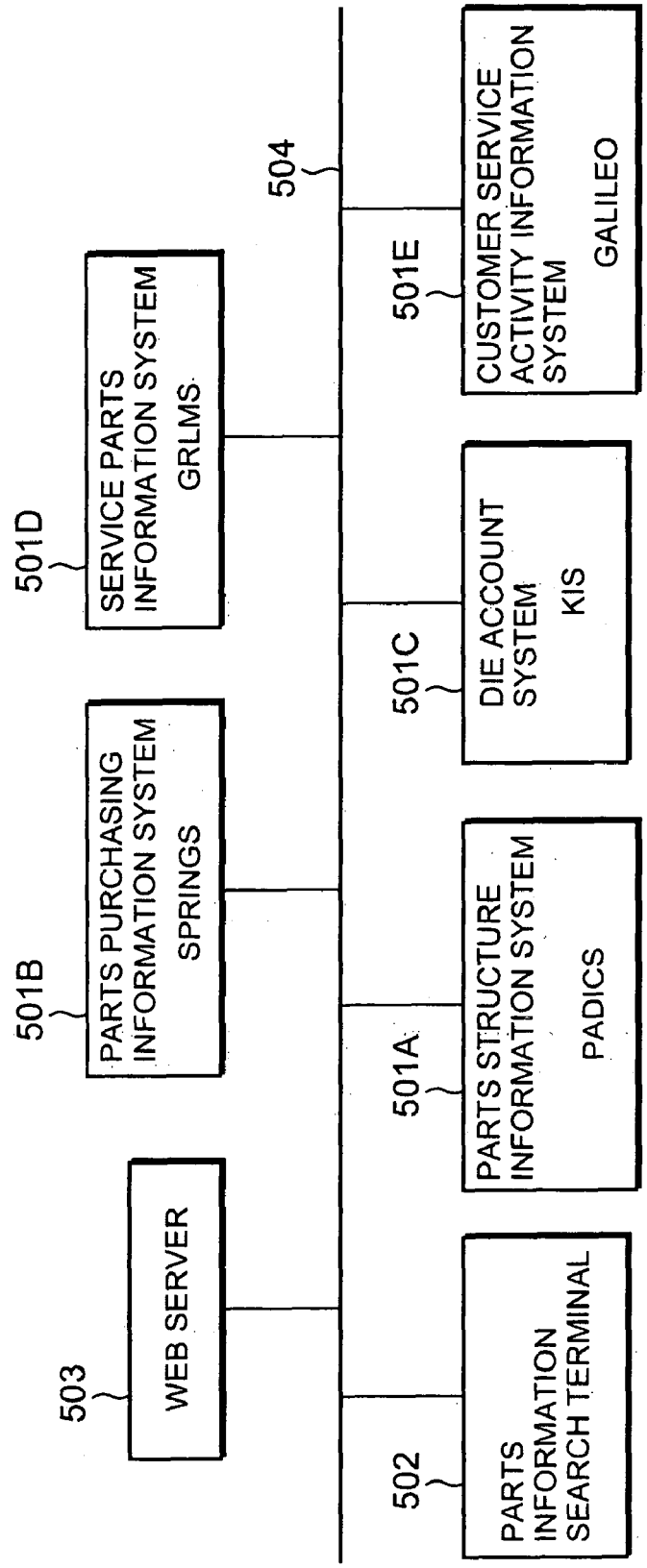
FIG. 81 is a block diagram showing an example of configurations of the parts information search system according to another embodiment of the updating apparatus embodying the invention.

In the next, a parts information search system according to one embodiment of the invention will be described. FIG. 81 is a diagram showing a configuration of the parts information search system according to another embodiment of the present invention. As shown in FIG. 81, this parts information search system is comprised of a parts structure information system 501A, a parts purchase information system 501B, a die account information system 501C, a customer service operation information system 501E, a service parts information system 501D, a parts information search terminal 502 and a Web server 503, which are mainly connected via network 504.

That is, in the parts information search system shown in FIG. 81, in addition to the four kinds of databases described with reference to FIG. 77 (parts structure information system 501A, parts purchase information system 501B, die account information system 501C and service parts information system 501D), a database 501E called as a customer service operation information system is provided. In this instance, network 504 is an intranet such as LAN (Local Area Network), WAN (Wide Area Network), or an Internet, and corresponds to the network 103 in the embodiment described above.

Further, the parts information search terminal 502 corresponds to the user terminal 201 (FIG. 51) at the purchaser 101.

By the way, because the database maintenance management in the system according to the embodiment shown in FIG. 81 is approximately the same as the database maintenance management according to the above-mentioned embodiment described in precedence, the description thereof will be omitted.

The parts information search terminal 502 is for searching the data stored in the parts structure information system 501A, the parts purchasing information system 501B, the die account information system 501C, the service parts information system 501D and the customer service operation information system 501E, via Web server 503.

More specifically, URL (Uniform Resource Locator) information is transmitted to Web server 503, and an HTML file corresponding to the URL information transmitted is received from the Web server. Then, a Web browser of the parts information search terminal 502 analyses the HTML file received from the Web server 503, and displays a search display screen. Then, the parts information search terminal 502 sends information inputted on this search display screen to the Web server 503.

The Web server 503 upon receiving this information, on the basis of the information received from the parts information search terminal 52, causes the parts structure information system 501A, the parts purchasing information system 501B, the die account information system 501C, the service parts information system 501D or the customer service operation information system 501E to execute a search through the information stored in their databases.

The parts information search terminal 502 has approximately the same structure as the PC 10 shown and described with reference to FIG. 86, that is, it can use a personal computer, thereby the illustration and description thereof will be omitted.

FIG. 82 shows an example of field information in each database. Reference symbol 1E (501E?) depicts the customer operation information system (GALILEO). In this system 501E, there are contained PS, product code, production start/stop dates, suppliers, design flag/repair object flag, and planning/production stoppage flags. By the way, because respective fields of the parts structure information system 501A, the parts purchasing information system 501B, the die account information system 501C, and the service parts information system 51D are the same as those in the embodiment shown in FIG. 77, the description thereof will be omitted.

Because the configurations of the parts structure information system 501A, the parts purchasing information system 501B, the die account information system 501C, the customer service operation information system 501E, and the service parts information system 51D, are approximately the same as the configuration of the parts information search terminal 502, their description will be omitted.

The Web server 503, in response to a request from the parts information search terminal 502, outputs an HTML file or the like stored therein. Further, the Web server 503, in response to a request from the parts information search terminal 502, causes the parts structure information system 501A, the parts purchasing information system 501B, the die account information system 501C, the customer service operation information system 501E, and the service parts information system 51D, to execute a search of the part information. By the way, because the configuration of the Web server 503 is approximately the same as the parts information search terminal 502, the description thereof will be omitted.

Figure 83:
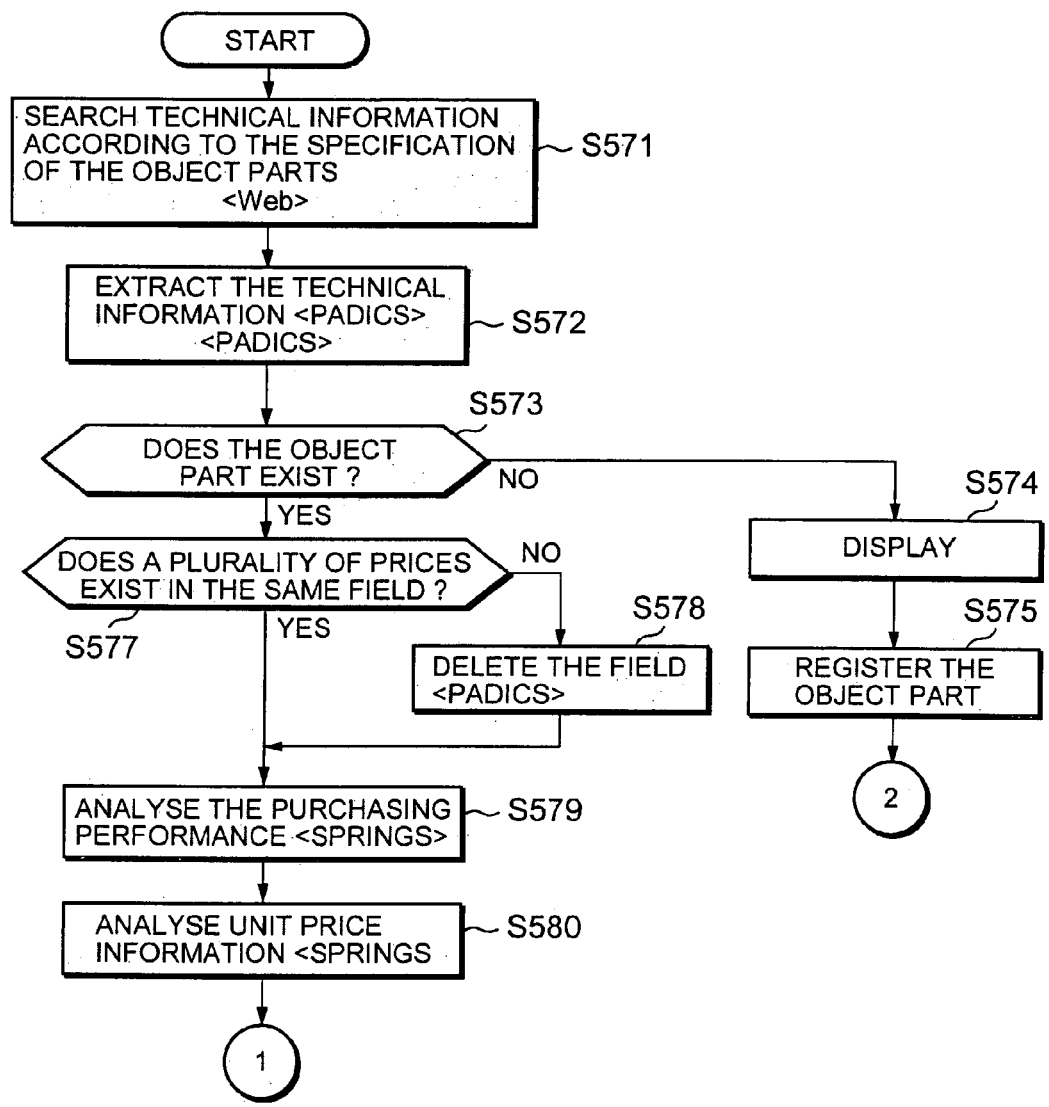
FIG. 83 is a flowchart for describing sequences of parts information search processing.
Figure 84:
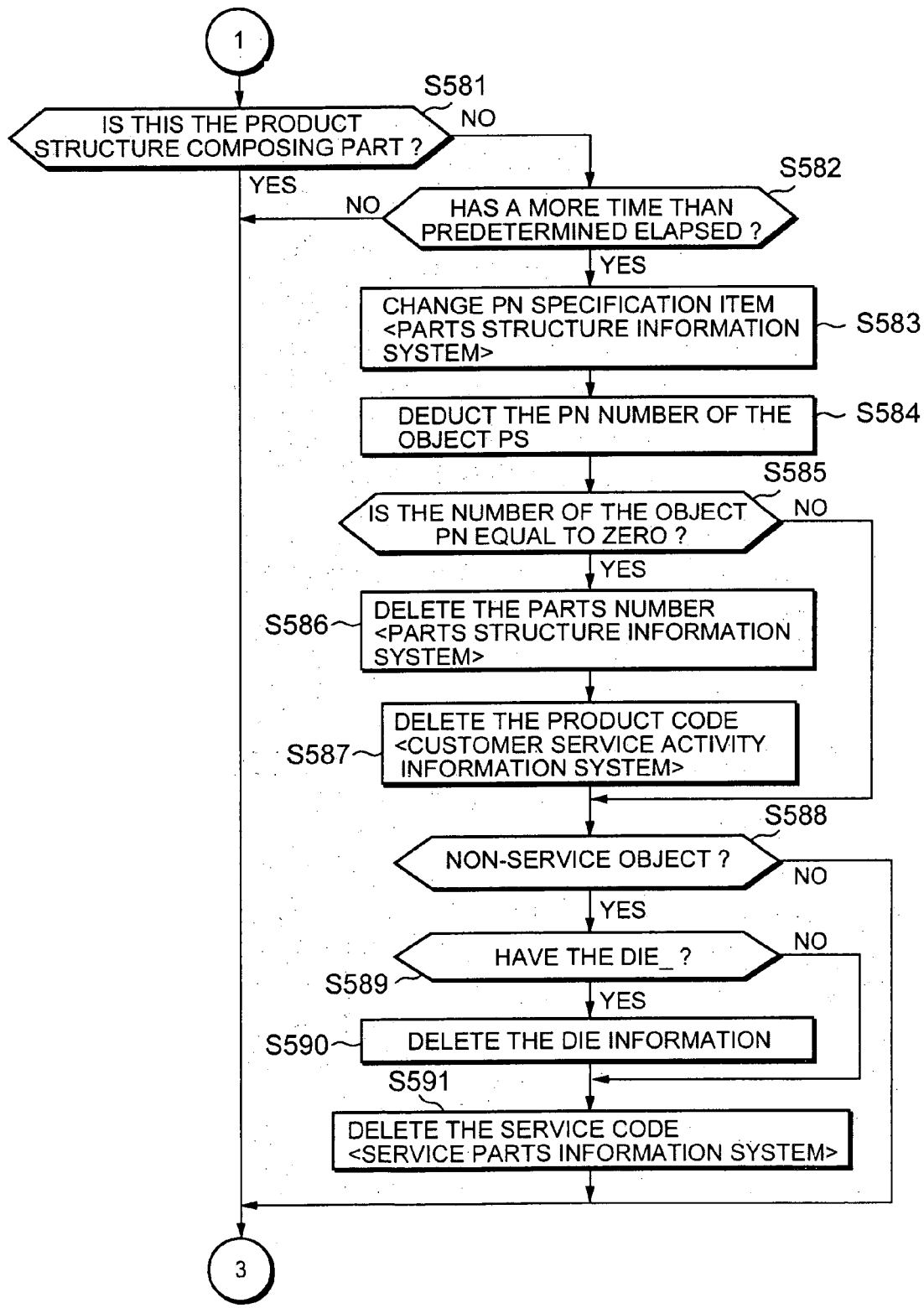
FIG. 84 is a flowchart for describing sequences of parts information search processing.
Figure 85:
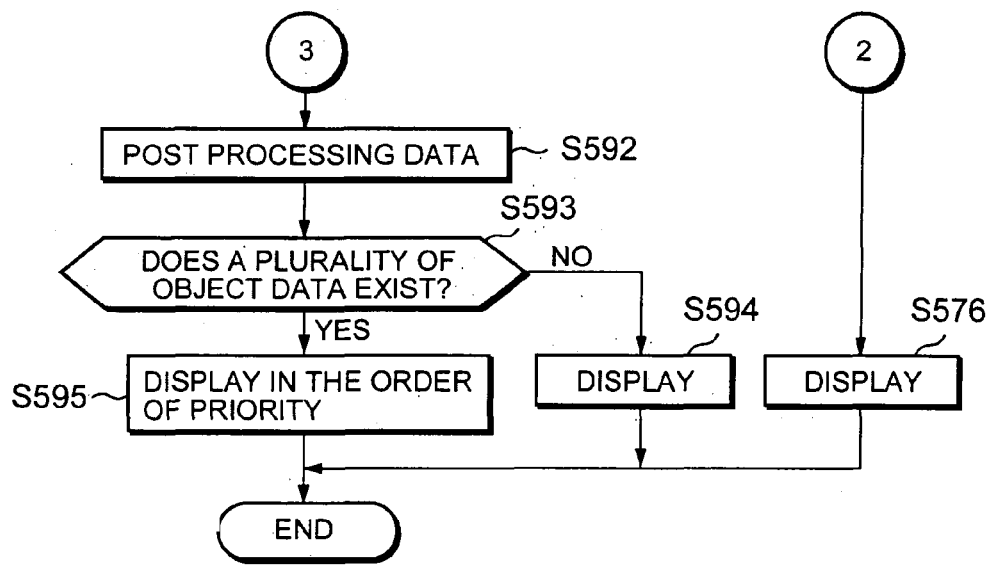
FIG. 85 is a flowchart for describing sequences of parts information search processing.

FIGS. 83, 84 and 85 are flowcharts for describing sequential steps of the parts information search processing. Here, such an example will be described in which a main database system is the parts structure information system 501A, and subordinate database systems are the parts purchasing information system 501B, the die account information system 501C, the customer service operation information system 501E, and the service parts information system 51D.

Steps of the parts information search processing when the user such as a design engineer selects a desired part on the basis of technical specifications will be described. By the way, the main database system indicates a database system that refers (at a referrer). The subordinate database systems indicate databases that are linked with the main database system.

Firstly, in step S571, the Web server 503 causes a Web browser at the parts information search terminal 502 to display the search display screen. By way of example, on this search display screen, fields for inputting information related to a technical specification of the part desired by the user such as design engineer are provided. Here, the information related to the technical specification refers to information for designating the specification of the part desired to be searched, for example, such information as a pole capacity, a maximum operating voltage, a rated voltage, outer dimension, operating temperature range and the like.

Figure 86:
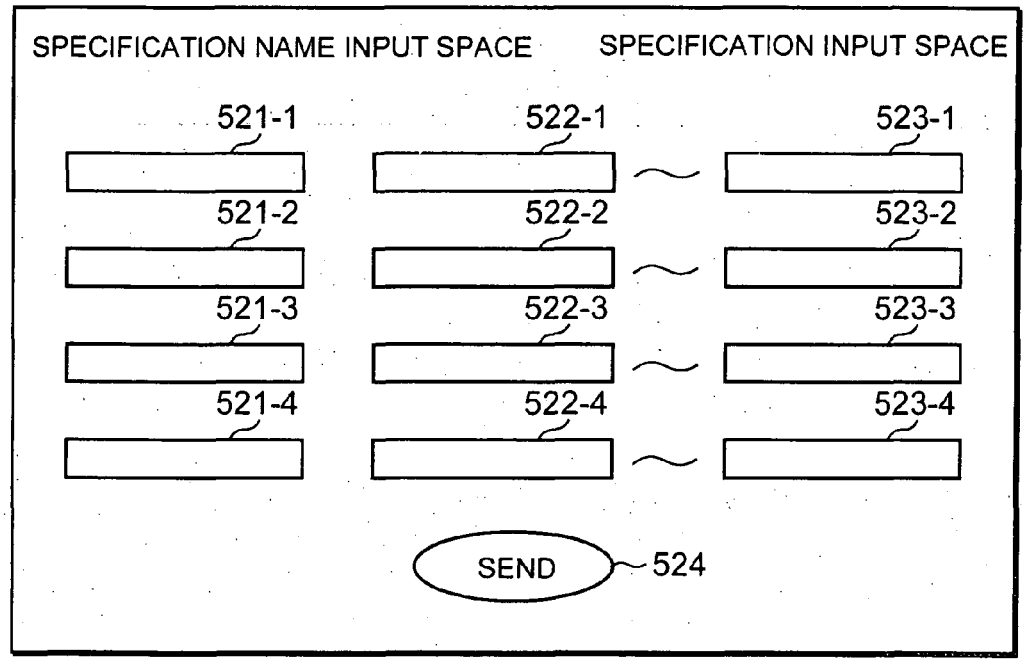
FIG. 86 is a schematic diagram showing an example of search display screen.

FIG. 86 shows an example of search display screen to be displayed on the Web browser at the parts information search terminal 502. A specification name input field 521 is a column for inputting a specification name of the part the user such as a design engineer desires to search. Specification input fields 522 and 23(523?) are for inputting a specification of the part the user desires to search, more specifically, the specification input field 522 is for inputting a lower limit value of the specification, and the specification input field 523 is for inputting an upper limit value of the specification.

A send button 524 is for instructing to send the information inputted into respective fields on the search display screen from the parts information search terminal 3 to the Web server 503. By the way, in order to execute a search of the desired part information by means of this search display screen, it is necessary to input at least the specification name and a specification range corresponding to this specification name.

Then, the Web server 503 receives the information inputted on the search display screen of the parts information search terminal 502, on the basis of the information received, searches through the parts structure information system 501A which is the main system, and on the basis of a result of this search, generates a field layout. By the way, this field layout includes at least PN.

Subsequently, in step S572, the Web server 503 extracts information pertaining to an object part of a target from the field layout generated in step S571. Then, in step S573, the Web server 503 determines whether or not the part information pertaining to the object part is extracted. If it is determined that the part information pertaining to the object part is not extracted, the Web server 503 moves the processing to step S574, and if it is determined that the part information pertaining to the object part is extracted, the Web server 503 moves the processing to step S577.

In step S573, when it is determined that the object part is not extracted, in step S574, the Web server 503 transmits an HTML file for displaying the parts information registration display screen to the parts information search terminal 502. By way of example, the parts information registration display screen is a display screen for prompting the user such as the design engineer to register the part information.

Then, in step S575, the Web server 503 receives the information inputted on the parts information registration display screen from the parts information search terminal 502, causes the parts structure information system 501A to execute a processing to register the received information in the database, and transmits an HTML file for displaying a parts information registration complete display screen to the parts information search terminal 502. By way of example, the parts information registration complete display screen is a display screen for notifying the user such as the design engineer of the completion of the part registration.

Then, in step S576, the parts information search terminal 502 receives the HTML file for displaying the parts information registration complete display screen from the parts structure information system 501A, and on the basis of this received HTML file, displays the parts information registration complete display screen.

On the other hand, when it was determined in step S573 that the object part was extracted, in step S577, the Web server 503 determines if there exist a plurality of data in a specific field within the record extracted, for example, if there exist a plurality of values therein. If it is determined that there do not exist a plurality of data, in step S578, the Web server 503 deletes the field information, and moves the processing to step S579. If it is determined that a plurality of data exist, the Web server 503 moves the processing to step S579.

Then, in step S579, the Web server 503 causes the parts purchase information system 501B to execute an analysis of a procurement performance on the basis of the PN extracted in step S572, and receives a result of analysis from the parts purchasing information system 501B. More specifically, the Web server 503 causes the parts purchasing information system 501B to execute a processing to extract information pertaining to the number (frequency) of purchases on the basis of the PN extracted in step S572. Then, the Web server 503 receives the information pertaining to the number of purchases thus extracted by execution of this processing from the parts purchasing information system 501B.

Then, in step S580, the Web server 503, on the basis of the PN extracted in step S572, causes for the parts purchase information system 501B to execute an analysis of unit price information, and receives a result of analysis from the parts purchasing information system 501B. More specifically, the Web server 503 causes for the parts purchasing information system 501B to execute a processing to extract information pertaining to a unit price/currency unit on the basis of the PN extracted in step S572. Then, the Web server 503 receives the information pertaining to the unit price/currency unit extracted by execution of this processing from the parts purchasing information system 501B.

Then, in step S581, the Web server 503 determines whether or not the part having the PN extracted in step S572 is a product structure element part. If it is determined to be a product structure element part, the Web server 503 moves the processing to step S592. If it is determined not to be a product structure element part, the Web server 503 moves the processing to step S582.

More specifically, the Web server 503 causes for the parts structure information system 501A to execute a processing to search a PS on the basis of the PN extracted in step S572.

Then, the Web server 503 determines whether or not a PS corresponding to the PN extracted in step S572 was received from the parts structure information system 501A. If it was determined that the PS corresponding to the PN extracted in step S572 was received from the parts structure information system 501A, the Web server 503 moves the processing to step S592. If it was determined that the PS corresponding to the PN extracted in step S572 was not received from the parts structure information system 501A, the Web server 503 moves the processing to step S582.

If it was determined in step S581 that it was not the product structure element part, in step S582, the Web server 503 determines if a period of time from the last purchase date of the part which was determined in step S581 not to be the product structure element part until now has elapsed a predetermined period of time or not. Here, the predetermined period of time is, for example, one year. If it was determined that the predetermined period of time has elapsed, the Web server 503 transfers the processing to step S583. If it was determined that the predetermined period of time had not elapsed, the Web server 503 transfers the processing to step S592.

More specifically, on the basis of the PN of the part which was determined not to be the product structure element part in step S581, the Web server 503 causes for the parts purchasing information system 501B to execute a processing to search the last purchase date thereof, and receives information pertaining to the last purchase date searched from the parts purchasing information system 501B. Then, the Web server 503 determines if a period of time from the last purchase date received from the parts purchasing information system 501B until the present time has elapsed the predetermined period of time. If it was determined that the predetermined period of time had elapsed, the Web server 503 moves the processing to step S583. If it was determined that the predetermined period of time had not elapsed, the parts structure information system 501A transfer the processing to step S592. By way of example, a reference date for the predetermined period of time is not necessarily limited to the last purchase date.

If it was determined that the predetermined period of time had elapsed, in step S583, on the basis of the PN of the part which was determined to have elapsed the predetermined period of time, the Web server 503 causes for the PADICS 501A to execute a processing to set a flag "ON" of a use prohibit on/off flag provided in advance in the parts structure information system 501A. Here, "ON" indicates a use prohibit status, and "OFF" indicates a use allowed status.

Then, in step S584, the Web server 503 causes for the parts structure information system 501A to subtract an effective number of PN on the PS, on the basis of the PN of the parts for which the predetermined period of time was determined to have elapsed in step S582. By the way, in the parts structure information system 501A, a field related to the effective number of PN on the PS is preset.

Then, in step S585, the parts structure information system 501A determines if the effective number of PN on the PS is "0" (in the case the whole parts were the object of deletion), as a result of processing in step S584. If the effective number of PN on the PS was determined to be "0", the parts structure information system 501A transfers the processing to step S586. If the effective number of PN on the PS was determined not to be "0", the parts structure information system 501A moves the processing to step S588.

In the case the effective number of PN on the PS was determined to be "0" in step S585, the parts structure information system 501A causes, in step S586, for the parts structure information system 501A to execute a processing to delete the PN of the parts of which the predetermined period of time was determined to have elapsed in step S582.

Then, in step S587, the Web server 503 causes for the customer service operation information system 501E to execute a processing to delete the product code of the part of which the predetermined period of time was determined to have elapsed in step S582. More specifically, the Web server 503 causes for the customer service operation information system 501E to execute the processing to delete the product code stored in the customer service operation information system 501E, on the basis of the PN of the part of which the predetermined period of time was determined to have elapsed in step S582.

Then, in step S588, the Web server 503 determines whether or not the part of which the predetermined period of time was determined to have elapsed in step S582 is a non-service object. If not determined to be the non-service object, the Web server 503 moves the processing to step S592. If determined to be the non-service object, the Web server 503 moves the processing to step S589.

More specifically, the Web server 503 causes for the parts structure information system 501A to execute a processing to extract any PS on the basis of the PN of the parts of which the predetermined period of time was determined to have elapsed in step S582, then the Web server receives this extracted PS from the parts structure information system 501A. Then, the Web server 503 causes for the customer service operation information system 501E to execute a processing to search a production termination date on the basis of the PS received from the parts structure information system 501A, and receive a result of this search from the customer service operation information system 501E.

Then, the Web server 503, on the basis of the result of search received from the customer service operation information system 501E, determines if a time from the production termination date to the present time has elapsed the predetermined period of time. If it is determined not to have elapsed the predetermined period of time, the Web server 503 moves the processing to step S592. If it is determined to have elapsed the predetermined period of time, the Web server 503 moves the processing to step S589.

If it is determined to be the non-service object in step S588, the Web server 503 determines in step S589 whether the die of the part which was determined to be the non-service object in step S588 is retained or not. If the die was determined not retained, the parts structure information system 501A moves the processing to step S591. If the die is determined to be retained, the parts structure information system 501A moves the processing to step S590.

More specifically, the Web server 503.causes for the die account information system 501C to execute a processing to search die presence/absence information, on the basis of the PN of the part which was determined to be non-service object in step S588, and receives a result of this search from the die account information system 501C. Then, the Web server 503, on the basis of the result of search received from the die account information system 501C, determines whether the die is retained or not.

In step S589, if the die is judged to be retained, the Web server 503, in step S590, causes for the die account information system 501C to execute a processing to delete the die information of the part that was determined to be the non-service object in step S588. More specifically, the Web server 503 causes for the die account information system 501C to execute the processing to delete the die information, on the basis of the PN of the part that is determined to be the non-service object in step S588.

Then, in step S591, the Web server 503 causes for the service parts information system 501D to execute a processing to delete the product code of the part that was determined in step S588 to be the non-service object. More specifically, the Web server 503 causes for the service parts information system 501D to execute the processing to delete the product code on the basis of the PN of the product that was determined instep S588 to be the non-service object.

Subsequently, in step S592, the Web server 503 stores a display object data (a processed data), for example, in a storage device provided in the Web server 503.

Then, in step S593, the Web server 503 determines whether the display object data exists in a plurality of numbers or not. If the display object data was determined to be in a plurality of numbers, the Web server 503 moves the processing to step S595. If the display object data was determined not in the plurality of numbers, the Web server 503 moves the processing to step S594.

In the case the display object data was determined not in the plurality of numbers in step S593, the Web server 503, by sending the data for displaying the display object data in step S594 to the parts information search terminal 502, causes for the parts information search terminal 502 to display the display object data on the display screen thereof.

In the case the display object data was determined in step S593 to exist in the plurality of numbers, the Web server 503, in step S595, by sending data for displaying the display object data in order of priority on the screen to the parts information search terminal 502, causes for the parts information search terminal 502 to display the display object data in the order of priority on the display screen thereof. Here, the priority order refers to, for example, a purchase record, unit price information, stable supply and the like.

By the way, process functions in the Web server 503 described above can be implemented by executing the program recorded in the recording medium. More specifically, a recording medium recording a program for implementing the above-mentioned process functions in the Web server 503 is supplied to the storage device of the Web server 503, the CPU of the Web server 503 reads and executes the program recorded in the recording medium, thereby implementing the above-mentioned process functions in the Web server 503.

Further, it should be understood that the process functions in the Web server 503 described above can be implemented not only by that the Web server 503 executes the program recorded in the recording medium, but also by that the Web server 503 receives a program for implementing the above-mentioned process functions in the Web server 503 via the network, and executes the program thus received.

Thereby, by applying the system shown in FIG. 81,the following advantages and effects are achieved. A search to uniquely extract technical specifications pertaining to respective parts from the main (mainframe) system is enabled. Thereby, the problem of the duplicated registration in the parts database system, namely, the duplicated registration because of no hit of identical parts due to a delay in set-up of the similar parts or inadequate searching can be prevented.

Further, the parts information search terminal 502, which is provided with a web browser capable of browsing a web page, and can analyze the information sent from the mainframe and display on the display screen using this web browser, has no limitation imposed as the terminal in the system configuration.

Further, when searching the parts, by analyzing the status of appropriation/allocation of the parts to another product, which is also a candidate for display, and/or an elapsed period of time from the date of registration, the data stored in the parts structure information system 501A, the parts purchasing information system 501B, the die account information system 501C, the service parts information system 501D and the customer service operation information system 501E can be deleted, thereby enabling automatically to control the registration life of the parts.

Further, it is no more required to perform a processing to delete the obsolete data positively from the respective database systems. Thereby, an increase in the numbers of the parts items to be stored in the respective databases can be suppressed. Therefore, a maintenance cost conventionally required for maintenance of consistent information in respective systems linked can be reduced. Still further, when searching the parts, because the unnecessary parts information is deleted, the unnecessary parts are no more required to be maintained. Thereby, the maintenance management cost of the parts can be reduced simultaneously.

Still further, at the time of searching, similar parts can be automatically tabulated by an integrated processing.

Still more, because the result of the search is displayed in accordance with comparative merits in prices, degrees of purchase records, stability of supply and the like, the standardization criteria of the parts can be clarified.

Furthermore, because the standardization of the parts can be performed without manual processing, a deviation from the actual status can be prevented. Namely, a speedy parts standardization promotion activity is facilitated.

In the case where the data in a specific field is unified by the automatic tabulation, because this specific field and the data in this specific field can be deleted, excessive information than is required can be suppressed.

Because positioning of the parts as the standard parts becomes clearer, reduction in prices by the merit of concentrated procurement of the parts can be fully and smoothly achieved. Here, the standard parts refer to such parts that are selected as a general purpose part in industrial fields such as electric/electronic/semiconductor industries.

Because mutual complementation between systems can be executed, adjustments of existing systems or reconfiguration thereof in order to establish a linkage between the systems are no more required, thereby eliminating interruption in respective systems at the time of interconnection thereof. Further, the maintenance management of these systems is readily facilitated.

Still further, consistency between respective systems and updating of data can be secured and executed sequentially in routine work.

Further, the result of the search can display the priority rank in order of priority. Thereby, such parts having a higher priority rank are likely to be used intensively by the user such as the design engineer. Thereby, the parts to be used can be intensified. Further, excessive issuance (registration) of similar parts as the result of inadequate search can be prevented.

Heretofore, the exemplary embodiments of the present invention have been described, however, the present invention is not limited thereto, and it should be understood that many other modifications, changes and variations can be contemplated within the scope of the invention.

For example, any database system including two or more databases can apply the present invention.

Further, at a predetermined timing (other than during the parts information search operation), by also causing for the service parts information system 501D and the die account information system 501C to utilize and execute the relational system, the future handling of the non-standard parts may be examined.

Further, as required, respective fields (PN) may be combined, and complex tabulation may be carried out so as to help plan a future guideline. For example, it may be used in a progress management, inoperative status control, an estimated die disposal ratio and the like.

Still further, the database system having the databases storing the standard parts tables may be linked with the parts structure information system 501A, the parts purchase information system 501B, the die account information system 501C, the, service parts information system 501D and the customer service operation information system 501E. Thereby, after the execution of the parts information processing described by referring to FIGS. 83, 84 and 85, the processing to secure consistency of the standard parts table with the parts structure information system 501A, the part purchase information system 501B, the die account information system 501C, the service parts information system 501D and the customer service operation information system 501E can be omitted. Thereby, the steps required for the maintenance management of the parts database system can be reduced substantially.

Further, when it was determined that the object part was not extracted in step S573, it may be arranged such that, in order to clarify a difference between an object record (an estimated record as a result of the search) and a similar record other than that, a field registration and data entry of these records concerned may be executed. Further, if the data within a specific field in the whole records throughout the system is completely the same, data sharing may be implemented by deletion of the field and deletion of the data in the corresponding records. Thereby, the amount of information within the system can be optimized automatically and constantly.

Further, automatically generating unification/standardization of similar records on the basis of the priority order of the corresponding records as a reference, and using the contents thereof, it may be arranged so that also in mutually linked database systems, addition, updating, deletion of data are automatically executed.

Furthermore, when extracting the information pertaining to the object part aimed at in step S572, if all the data on the specific field are completely the same, in the whole records on the parts structure information system 501A, this field information may be deleted. More specifically, at the time when extracting the information pertaining to the object part of interest in step S572, if all the data on the specific field are completely the same, the Web server 503 causes for the parts structure information system 501A to execute a processing to delete this field information. By the way, when executing this processing, the processing in step S578 described above may be omitted. Thereby, by streamlining unnecessary information, excessive information can be suppressed.

It should be understood that the above-mentioned embodiments can be applied in combination. Further, by executing a most preferable combination thereof, an LCA system easier to use can be constructed.

In the LCA system, by updating the parts data for constituting the system in the manner as described above, the data of the parts in use is ensured to be most update and significant, further, by allowing for the parts data to be searched in the manner as described above, a most preferred part can be searched easily and quickly from among a plurality of parts having similar specifications.

Although the above-mentioned sequential processing can be executed by hardware, but also it can be executed by software. In case the sequential processing is to be executed by software, a program constituting this software is incorporated into a dedicated hardware in a computer, or the program is installed from its recording medium into, for example, a general purpose personal computer which can execute various functions by installing various programs.

As shown in FIG. 11, the recording medium to be distributed to the user for providing a program, separate from the personal computer, is comprised of: package media such as a magnetic disc 61 recording the program (including a flexible disc), an optical disc 62 (CD-ROM (Compact Disk-Read Only Memory), a DVD (includes a Digital Versatile Disk), a photo-magnetic disc 63 (including MD (Mini-Disc): Trade Name), or a Semiconductor memory 64; and also a hard disk including a ROM 42 and a storage device 48 storing the program to be provided to the user in a status of preinstalled in the computer.

Further, in the present specification, the steps describing the program to be provided by means of the media should be understood to include not only a processing to be executed in time series in order of description, but also a processing to be executed in parallel or separately, not necessarily in time series.

Still further, in the present specification, the system represents a whole apparatus including a plurality of apparatuses.

INDUSTRIAL APPLICABILITY

According to the information processing system described hereinabove, because it is arranged that the first information processing apparatus manages the database the information processing system handles, the second information processing apparatus adds data in the database pertaining to a predetermined division to the database, the third information processing apparatus extracts data from the database for calculating an environmental load volume on the basis of the information of the product inputted and calculates the environmental load volume, the calculation of the environmental load volume can be executed easily and simply.

Further, according to the first information processing apparatus, the method thereof and the program, because it is arranged that a respective inventory data is prepared, a aggregate data is generated from a plurality of inventory data, and a aggregate data for calculating the environmental load volume is extracted from the database including the inventory data and the aforementioned aggregate data, handling and processing of the inventory data and the aggregate data becomes easy thereby enabling the environmental load volume to be calculated simply and easily.

Still further, according to a second information processing apparatus, a method and a program thereof, including the steps of: managing the table in which the user and the authorization belonging to the user are correlated; managing the database including the inventory data and the aggregate data; identifying the authorization of the user by referring to the table under management from the data inputted; and providing the image data corresponding to the authorization of the user identified above, thereby the processing required until the environmental load volume is obtained is simplified and facilitated, thereby enabling for the environmental load volume to be obtained easily.

According to a third information processing apparatus, a method, and a program thereof, including: providing information pertaining to the parts that satisfy the predetermined condition to other apparatuses; and upon a request to store in memory of the predetermined part from another apparatus, only when the predetermined part is determined to conform to the predetermined condition, the predetermined part is enabled to be stored in memory, thereby, the processing required for the procurement and delivery of the parts can be reduced.

According to the parts search apparatus and the parts search system of the invention, wherein the parts search apparatus stores the parts information containing at least the parts specification information common to the respective parts makers, searches through the parts information stored in response to the search request information from the user terminal, outputs the search result information corresponding to the search result, and sends the search result information to the user terminal, thereby enabling for the user to search the parts information of the desired specification simultaneously and easily from the parts information of the plurality of parts makers. Thereby, a lot of time conventionally spent by the user in the search of the parts can be reduced substantially.

Further, advantageously, on the display screen displayed at the user terminal in accordance with the search result information received from the parts search apparatus, there are displayed the parts of the same specification belonging to different makers and their prices, thereby enabling for the user easily to compare prices of the parts of the same specification belonging to different makers.

According to the term (terminology) conversion apparatus and the term conversion system of the present invention, wherein the term conversion apparatus receives the specification information from the user terminal, and after conversion of the terms used in this specification information to the standard terms, sends the same to the parts maker terminal, thereby enabling for the user to omit the tedious, troublesome work to correspond the specification names the user is aware of to the specification names used by the parts makers at the address of the specification information. Thereby, the specification information of the desired parts can be delivered readily to the parts makers. Further, the lot of time conventionally spent in obtaining the parts specifications from the makers can be reduced.

According to the updating apparatus of the parts database and the method of the present invention, including: receiving the inoperative parts list from the parts maker at the supplier; and marking out the inoperative parts by referring to the list, thereby enabling for the management of the parts database to be performed efficiently. Further, because of the conversion of various lists prepared in various formats provided from the suppliers to the predetermined standard format, it is possible to reduce a burden on the supplier and is easy to reflect the contents of the list on the parts database.

Still further, according to the update apparatus of the parts database and the method of the present invention, when converting to the standard format, if the inoperative parts list is outside the range of automatic conversion, a symbol indicating this fact is attached to the corresponding file name so as to be stored in the separate space, thereby eliminating the necessities of sequential browsing of this corresponding file, and the pretreatment for the subsequent processing. Thereby, advantageously, the actual work time can be reduced, and suppression of error occurrences can be expected. Further, by attaching the predetermined prefix to the file name after having gone through the conversion, even in such a case where the readable file after the conversion and other files coexist in the same folder, no trouble will occur in the subsequent operation, and inadvertent loss of files and the like can be prevented.

According to the parts database system and its updating method, the database control apparatus and its control method, the database control program and its recording medium of the invention, because each of the plurality of databases constituting the parts database system is enabled to request the information reference to the other databases using the reference key, more information related to the reference key can be identified. According to the present invention, even if the reference key is not clear between the plurality of databases desired to be linked, the reference key can be confirmed by referring to the field structures and the data retained, and can server as the reference key facilitating the execution of conversion to the standard format.

Still further, according to the parts database system and its updating method, the database control apparatus and its control method, as well as the database control program and its recording medium of the invention, the updating of the records between the respective databases can be operated in linkage using the reference key. Thereby, even if these interconnecting systems are operated separately, these procedures described above are no more required to be operated for each system, and also mutual consistency can be secured.

What is claimed is:

1. An information processing system for calculating an environmental load volume, comprising:
    a first information processing apparatus including management means for managing a database to be handled in said information system;
    a second information processing apparatus including addition means for adding to said database, data from said database managed by said management means related to a predetermined division; and
    a third information processing apparatus including calculating means for calculating said environmental load volume upon extracting data from said database based on information of an inputted product;
    whereby modification of said database by said second information processing apparatus is allowed only when said second information processing apparatus has been given a special permission.

2. The information processing system as claimed in claim 1, wherein said first, second and third information processing apparatuses connected via a network to exchange data, and said data, to be exchanged via said network, is one of enciphered and security-checked.

3. The information processing system as claimed in claim 2, wherein said data is exchanged by using a web browser.

4. A computer readable recording medium for storing a program to be executed on a computer, said computer program comprising the steps of:
    producing inventory data;
    generating aggregate data from a plurality for said inventory data produced by processing in said generating step;
    managing a database comprising said inventory data and said aggregate data; and
    extracting said aggregate data for calculation of an environmental load volume from said database managed by processing in said managing step.

* * * * *